(12) United States Patent
Yamagata et al.

(10) Patent No.: US 8,483,033 B2
(45) Date of Patent: Jul. 9, 2013

(54) OPTICAL INFORMATION RECORDING/REPRODUCING APPARATUS AND OBJECTIVE OPTICAL SYSTEM FOR THE SAME

(75) Inventors: Naoki Yamagata, Tokyo (JP); Satoshi Inoue, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/547,342

(22) Filed: Jul. 12, 2012

(65) Prior Publication Data

US 2013/0016598 A1 Jan. 17, 2013

(51) Int. Cl.
*G11B 7/135* (2012.01)

(52) U.S. Cl.
USPC ............. 369/112.23; 369/109.01; 369/112.11

(58) Field of Classification Search
USPC .............. 369/112.05, 109.01, 112.23, 112.11
See application file for complete search history.

(56) References Cited

U.S. PATENT DOCUMENTS

| 8,068,401 B2 * | 11/2011 | Koreeda et al. ........... 369/112.23 |
| 8,279,738 B2 * | 10/2012 | Inoue et al. ............... 369/112.11 |
| 2004/0047269 A1 | 3/2004 | Ikenaka et al. |
| 2004/0257958 A1 | 12/2004 | Kimura et al. |
| 2007/0064575 A1 * | 3/2007 | Noguchi ................... 369/112.23 |
| 2009/0080319 A1 * | 3/2009 | Koreeda et al. .......... 369/112.23 |
| 2009/0185472 A1 * | 7/2009 | Koreeda et al. .......... 369/109.01 |
| 2010/0284259 A1 | 11/2010 | Nakamura |
| 2011/0122758 A1 | 5/2011 | Koreeda et al. |
| 2011/0228664 A1 | 9/2011 | Koreeda et al. |

FOREIGN PATENT DOCUMENTS

| JP | 2004-164817 | 6/2004 |
| JP | 2009-110591 | 5/2009 |
| JP | 2009-199707 | 9/2009 |
| JP | 2011-129239 | 6/2011 |
| JP | 2011-198465 | 10/2011 |
| JP | 2011-210346 | 10/2011 |
| JP | 2011-216176 | 10/2011 |

\* cited by examiner

*Primary Examiner* — Van Chow
(74) *Attorney, Agent, or Firm* — Greenblum & Bernstein P.L.C.

(57) ABSTRACT

An objective optical system for an optical information recording/reproducing apparatus, at least one surface of the objective optical system being configured to be a phase shift surface having a phase shift structure, wherein: the phase shift surface has a first area contributing to converging first, second and third light beams onto recording surfaces of first, second and third optical discs, respectively; in the first area, the phase shift surface has at least two types of phase shift structures including a first phase shift structure having first steps and a second phase shift structure having second steps; the phase shift surface has a plurality of combinations of annular zones which satisfy a condition:

$$0.95 < P1/P2 < 1.05 \quad (1),$$

and the phase shift surface satisfies a following condition:

$$-3.00 < \Delta\varphi 1/\Delta\varphi 2 < -0.10 \quad (2).$$

38 Claims, 16 Drawing Sheets

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

WAVEFRONT ABERRATION
(OPTICAL DISC OD1)

WAVEFRONT ABERRATION
(OPTICAL DISC OD2)

WAVEFRONT ABERRATION
(OPTICAL DISC OD3)

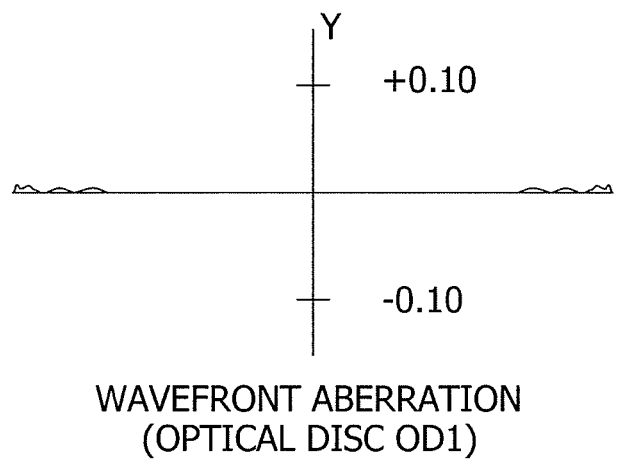
FIG. 15A  WAVEFRONT ABERRATION (OPTICAL DISC OD1)
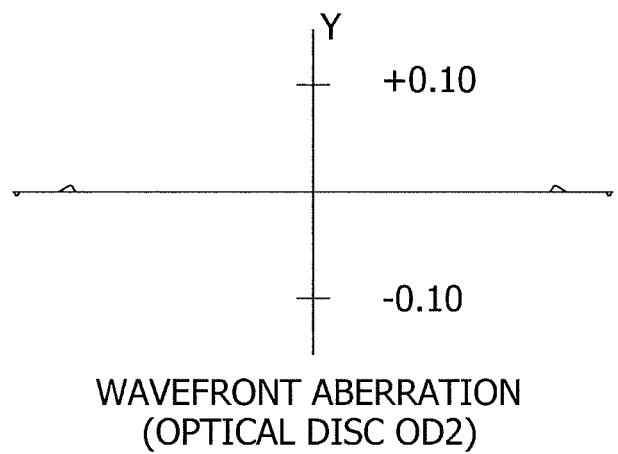
FIG. 15B  WAVEFRONT ABERRATION (OPTICAL DISC OD2)
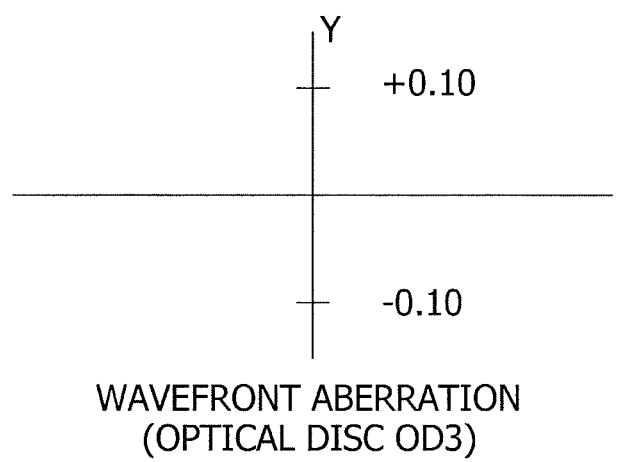
FIG. 15C  WAVEFRONT ABERRATION (OPTICAL DISC OD3)

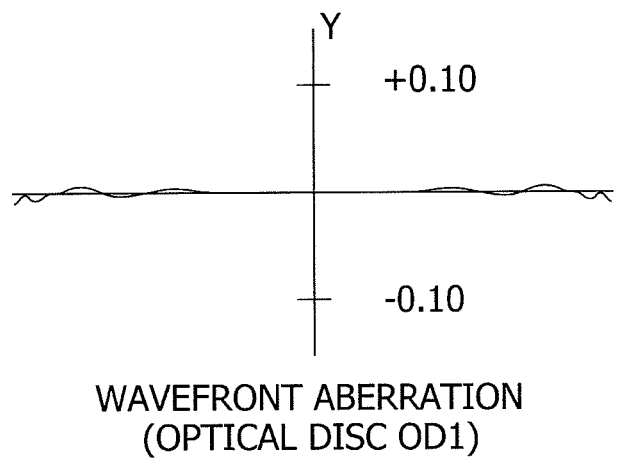
FIG. 16A  WAVEFRONT ABERRATION (OPTICAL DISC OD1)
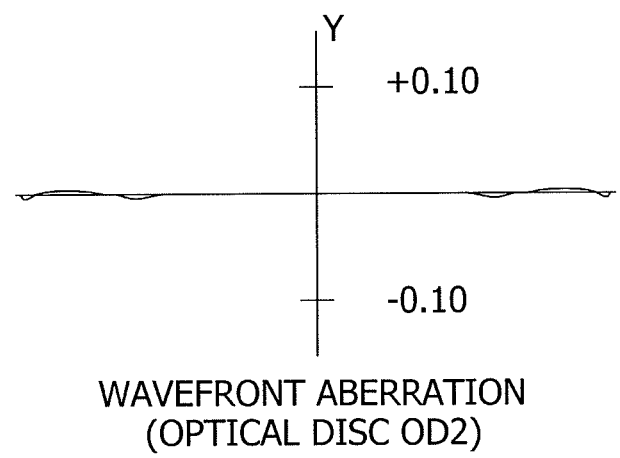
FIG. 16B  WAVEFRONT ABERRATION (OPTICAL DISC OD2)
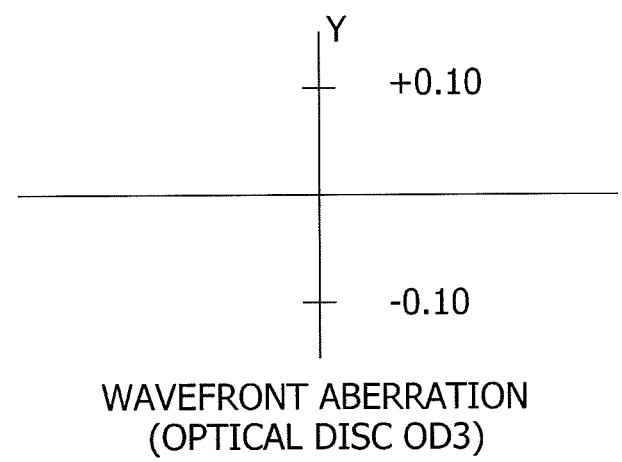
FIG. 16C  WAVEFRONT ABERRATION (OPTICAL DISC OD3)

OPTICAL INFORMATION RECORDING/REPRODUCING APPARATUS AND OBJECTIVE OPTICAL SYSTEM FOR THE SAME

BACKGROUND OF THE INVENTION

The present invention relates to an objective optical system for an optical information recording/reproducing apparatus configured to record information to and/or reproduce information from a plurality of types of optical discs based on different standards, and to an optical information recording/reproducing apparatus on which such an objective optical system is mounted.

There exist various standards of optical discs, such as DVD (Digital Versatile Disc) and BD (Blu-ray Disc), differing in recording density, protective layer thickness, etc. Therefore, an objective optical system mounted on the optical information recording/reproducing apparatus is required to have a compatibility with a plurality of types of optical discs. In this case, the term "compatibility" means to guarantee realizing information recording and information reproducing without the need for replacement of components even when the optical disc being used is changed.

In order to have the compatibility with the plurality of types of optical discs based on the different standards, it is necessary to correct the relative spherical aberration which is caused depending on the difference in protective layer thickness between the optical discs and to form a suitable beam spot in accordance with the difference in recording density between the optical discs by changing the numerical aperture NA of the objective optical system. The optical information recording/reproducing apparatus is configured to use a plurality of types of laser beams having different wavelengths respectively for the plurality of recording densities of the optical discs. The optical information recording/reproducing apparatus uses, for example, light having the wavelength of approximately 790 nm (i.e., so-called near infrared laser light) for information recording or information reproducing for CD, light having the wavelength of approximately 660 nm (i.e., so-called red laser light) for information recording or information reproducing for DVD and light having the wavelength of approximately 405 nm (i.e., so-called blue laser light) for information recording or information reproducing for BD. Japanese Patent Provisional Publication No. 2009-199707A (hereafter, referred to as patent document #1) discloses a configuration of an optical information recording/reproducing apparatus having the compatibility with the three types of optical discs.

SUMMARY OF THE INVENTION

An objective lens disclosed in patent document #1 is provided with two types of steps respectively giving different additional optical path lengths to an incident light beam. One of the two types of steps (a first step) is configured such that the diffraction orders at which the diffraction efficiencies take the maximum values for the laser beams for BD/DVD/CD are $1^{st}/0^{th}/0^{th}$ orders, and the other of the two types of steps (a second step) is configured such that the diffraction orders at which the diffraction efficiencies take the maximum values for the laser beams for BD/DVD/CD are $2^{nd}/1^{st}/1^{st}$ orders. If the steps are designed such that an adequate spot light amount is secured for all the three types of light beams having the wavelengths for BD/DVD/CD, regarding the latter step the diffraction efficiency is high because in this case the phase shift is small for each of the laser beams having the wavelengths, while, regarding the former step, the diffraction efficiency is low because in this case the phase shift is large for each of the laser beams having the wavelengths. Therefore, the objective lens has a drawback that the overall light use efficiency is low.

The present invention is advantageous in that it provides an objective optical system and an optical information recording/reproducing apparatus which have the compatibility with a plurality of types of optical discs and are configured to suppress decrease of the light use efficiency.

According to an aspect of the invention, there is provided an objective optical system for an optical information recording/reproducing apparatus configured to record information to and/or reproduce information from three types of optical discs including first, second and third optical discs differing in recording density, by selectively using light beams having first, second and third wavelengths emitted from light sources. The objective optical system comprises at least an objective lens. When λ1 (unit: nm) represents the first wavelength, λ2 (unit: nm) represents the second wavelength and λ3 (unit: nm) represents the third wavelength, λ1, λ2 and λ3 are defined as: λ1≈405, λ2≈660, and λ3≈790. When NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfy a following relationship: NA1>NA2>NA3.

At least one surface of the objective optical system being configured to be a phase shift surface having a phase shift structure including a plurality of refractive surface zones concentrically divided so as to have steps giving different phase differences to an incident light beam at a boundary between adjacent ones of the plurality of refractive surface zones. The phase shift surface has a first area contributing to converging the first, second and third light beams onto recording surfaces of the first, second and third optical discs, respectively. The first area has an effective diameter larger than NA 0.3 at the first wavelength. In the first area, the phase shift surface has at least two types of phase shift structures including a first phase shift structure having first steps and a second phase shift structure having second steps.

When P1 (unit: mm) represents an arrangement interval defined in a direction perpendicular to an optical axis direction between two first steps which adjoin with respect to each other while sandwiching at least one second step, and P2 (unit: mm) represents an arrangement interval defined in a direction perpendicular to the optical axis direction between two second steps which adjoin with respect to each other while sandwiching at least one first step and one of which is sandwiched between the two first steps, the phase shift surface is configured such that, in an area whose effective diameter is larger than NA 0.3 at the first wavelength in the first area, the phase shift surface has a plurality of combinations of annular zones which satisfy a condition (1):

$$0.95 < P1/P2 < 1.05 \qquad (1)$$

where, one of the two first steps arranged closer to the optical axis is defines as a first start step, and the other of the two first steps farther from the optical axis is defined as a first end step, when the first steps are continuously arranged in a direction perpendicular to the optical axis not to have the second steps therebetween, the arrangement interval P1 is determined by defining one of the continuously arranged first steps closest to the optical axis as the first start step and by defining the other of the continuously arranged first steps farthest from the optical axis as the first end step, one of the two second steps arranged closer to the optical axis is defines as a second start step, and the other of the two second steps farther from the optical axis is defined as a second end step, and when the second steps are continuously arranged in a direction perpendicular to the optical axis not to have the first steps therebetween, the arrangement interval P2 is determined by defining one of the continuously arranged second steps closest to the optical axis as the second start step and by defining the other of the continuously arranged second steps farthest from the optical axis as the second end step.

When $\Delta\phi 1$ (unit: radian) represents a difference between $2\pi$ and an absolute value of a phase change caused by the first steps with respect to the light beam having the first wavelength in a case where the first steps give an additional optical path length to the light beam having the first wavelength in a direction proceeding along the optical axis from each light source to an optical disc being used, and $\Delta\phi 2$ (unit: radian) represents a difference between $2\pi$ and an absolute value of a phase change caused by the second steps with respect to the light beam having the first wavelength in a case where the second steps give an additional optical path length to the light beam having the first wavelength in a direction opposite to the direction proceeding along the optical axis from the light source to the optical disc being used, in an area having an effective diameter larger than NA 0.3 at the first wavelength in the first area, the phase shift surface satisfies a following condition:

$$-3.00 < \Delta\phi 1/\Delta\phi 2 < -0.10 \quad (2).$$

The objective optical system secures the compatibility with the first to third optical discs by giving the multiple optical effects by the plurality of types of phase shift structures formed in the first area, gives phase changes, which have approximately the same period and are in opposite directions, to the light beam having the first wavelength passed through the first step and the light beam having the first wavelength passed through the second step by satisfying both of the conditions (1) and (2), and thereby aligns the wavefront by cancelling the phase changes with respect to each other.

In at least one aspect, the phase shift surface may satisfy a following condition:

$$-1.30 < \Delta\phi 1/\Delta\phi 2 < -0.35 \quad (3).$$

In at least one aspect, when $\phi 1$ (unit: $\pi$radian) represents an absolute value of a phase difference given to the light beam having the first wavelength by each first step and $\phi 2$ (unit: $\pi$radian) represents an absolute value of a phase difference given to the light beam having the first wavelength by each second step, the phase shift surface may satisfy following conditions:

$$2.2 < \phi 1 < 2.8 \quad (4), \text{ and}$$

$$1.0 < \phi 2 < 1.70 \quad (5).$$

In at least one aspect, the phase shift surface may satisfy following conditions:

$$2.3 < \phi 1 < 2.6 \quad (6), \text{ and}$$

$$1.1 < \phi 2 < 1.5 \quad (7).$$

In at least one aspect, when $\Delta OPD1$ (unit: μm) represents an absolute value of an optical path length difference given to the light beam having the first wavelength by each first step, and $\Delta OPD2$ (unit: μm) represents an absolute value of an optical path length difference given to the light beam having the first wavelength by each second step, the phase shift surface may satisfy following conditions:

$$1.1 < \Delta OPD1/\lambda 1 < 1.4 \quad (8), \text{ and}$$

$$0.50 < \Delta OPD2/\lambda 1 < 0.85 \quad (9)$$

In at least one aspect, the phase shift surface may satisfy following conditions:

$$1.15 < \Delta OPD1/\lambda 1 < 1.30 \quad (10), \text{ and}$$

$$0.55 < \Delta OPD2/\lambda 1 < 0.75 \quad (11).$$

In at least one aspect, when D1 (unit: μm) represents an absolute value of a height of the paraxially arranged first step in the optical axis direction, and D2 (unit: μm) represents an absolute value of the height of the paraxially arranged second step in the optical axis direction, the phase shift surface may satisfy following conditions:

$$0.70 < D1 < 1.10 \quad (12), \text{ and}$$

$$0.30 < D2 < 0.70 \quad (13).$$

In at least one aspect, the phase shift surface may satisfy following conditions:

$$0.80 < D1 < 0.95 \quad (14), \text{ and}$$

$$0.40 < D2 < 0.55 \quad (15).$$

In at least one aspect, when the at least two types of phase shift structures formed in the first area are expressed by diffraction structures defined by expanding an optical path difference function in a form of a following equation:

$$\phi_{ik}(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where $P_{ik2}, P_{ik4}, P_{ik6} \ldots$ represent coefficients of the $2^{nd}$ order, $4^{th}$ order, $6^{th}$ order, h represents a height from the optical axis, $m_{ik}$, represents a diffraction order at which the diffraction efficiency of an incident light beam is maximized for the i-th optical path difference function in the k-th area, and $\lambda$ represents a design wavelength of the light beam being used (incident thereon), the first phase shift structure is a diffraction structure defined by a first optical path difference function in which diffraction orders at which diffraction efficiencies for the light beams having the first, second and third wavelengths are maximized are all $1^{st}$ orders; and the second phase shift structure is a diffraction structure defined by a second optical path difference function in which diffraction orders at which diffraction efficiencies for the light beams having the first, second and third wavelengths are maximized are $1^{st}$ order, 0-th order and 0-th order, respectively.

In at least one aspect, the phase shift surface may include a second area which is located outside the first area and which contributes to converging the light beams having the first and second wavelengths onto recording surfaces of the first and second optical discs, respectively and does not contribute to converging the light beam having the third wavelength. In the second area, the phase shift surface has at least two types of phase shift structures including a third phase shift structure having third steps and a fourth phase shift structure having fourth steps.

When P3 (unit: mm) represents an arrangement interval defined in a direction perpendicular to the optical axis direction between two third steps which adjoin with respect to each other while sandwiching at least one fourth step, and P4 (unit: mm) represents an arrangement interval defined in a direction perpendicular to the optical axis direction between two fourth steps which adjoin with respect to each other while sandwiching at least one third step and one of which is sandwiched between the two third steps, the phase shift surface may satisfy a following condition:

$$0.95 < P3/P4 < 1.05 \quad (16);$$

where, one of the two third steps arranged closer to the optical axis is defines as a third start step, and the other of the two third steps farther from the optical axis is defined as a third end step, when the third steps are continuously arranged in a direction perpendicular to the optical axis not to have the fourth steps therebetween, the arrangement interval P3 is determined by defining one of the continuously arranged third steps closest to the optical axis as the third start step and by defining the other of the continuously arranged third steps farthest from the optical axis as the third end step, one of the two fourth steps arranged closer to the optical axis is defines as a fourth start step, and the other of the two fourth steps farther from the optical axis is defined as a fourth end step, and when the fourth steps are continuously arranged in a direction perpendicular to the optical axis not to have the third steps therebetween, the arrangement interval P4 is determined by defining one of the continuously arranged fourth steps closest to the optical axis as the fourth start step and by defining the other of the continuously arranged fourth steps farthest from the optical axis as the fourth end step.

When $\Delta\phi 3$ (unit: radian) represents a difference between $2\pi$ and an absolute value of a phase change caused by the third steps with respect to the light beam having the first wavelength in a case where the third steps give an additional optical path length to the light beam having the first wavelength in a direction proceeding along the optical axis from each light source to an optical disc being used, and $\Delta\phi 4$ (unit: radian) represents a difference between $2\pi$ and an absolute value of a phase change caused by the fourth steps with respect to the light beam having the first wavelength in a case where the fourth steps give an additional optical path length to the light beam having the first wavelength in a direction opposite to the direction proceeding along the optical axis from the light source to the optical disc being used, the phase shift surface may satisfy a following condition:

$$-2.70 < \Delta\phi 3/\Delta\phi 4 < -0.05 \quad (17).$$

In at least one aspect, the phase shift surface may satisfy a condition:

$$-1.05 < \Delta\phi 3/\Delta\phi 4 < -0.20 \quad (18).$$

When $\phi 3$ (unit: $\pi$radian) represents an absolute value of a phase difference given to the light beam having the first wavelength by each third step and $\phi 4$ (unit: $\pi$radian) represents an absolute value of a phase difference given to the light beam having the first wavelength by each fourth step, the phase shift surface may satisfy following conditions:

$$2.1 < \phi 3 < 2.8 \quad (19), \text{ and}$$

$$1.0 < \phi 4 < 1.70 \quad (20).$$

In at least one aspect, the phase shift surface may satisfy following conditions:

$$2.2 < \phi 3 < 2.6 \quad (21), \text{ and}$$

$$1.1 < \phi 4 < 1.5 \quad (22).$$

When $\Delta OPD3$ (unit: μm) represents an absolute value of an optical path length difference given to the light beam having the first wavelength by each third step, and $\Delta OPD4$ (unit: μm) represents an absolute value of an optical path length difference given to the light beam having the first wavelength by each fourth step, the phase shift surface may satisfy following conditions:

$$1.05 < \Delta OPD3/\lambda 1 < 1.4 \quad (23), \text{ and}$$

$$0.50 < \Delta OPD4/\lambda 1 < 0.85 \quad (24).$$

In at least one aspect, the phase shift surface may satisfy following conditions:

$$1.10 < \Delta OPD3/\lambda 1 < 1.30 \quad (25), \text{ and}$$

$$0.55 < \Delta OPD4/\lambda 1 < 0.75 \quad (26).$$

When D3 (unit: mm) represents an absolute value of a height of the paraxially arranged third step in the optical axis direction, and D4 (unit: mm) represents an absolute value of a height of the paraxially arranged fourth step in the optical axis direction, the phase shift surface may satisfy following conditions:

$$0.85 < D3 < 1.20 \quad (27), \text{ and}$$

$$0.45 < D4 < 0.85 \quad (28).$$

In at least one aspect, the phase shift surface may satisfy following conditions:

$$0.95 < D3 < 1.10 \quad (29), \text{ and}$$

$$0.55 < D4 < 0.75 \quad (30).$$

When the at least two types of phase shift structures formed in the second area are expressed by diffraction structures defined by expanding an optical path difference function in a form of a following equation:

$$\phi_{ik}(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where $P_{ik2}$, $P_{ik4}$, $P_{ik6}$ . . . represent coefficients of the $2^{nd}$ order, $4^{th}$ order, $6^{th}$ order, h represents a height from the optical axis, $m_{ik}$ represents a diffraction order at which the diffraction efficiency of the incident light beam is maximized for the i-th optical path difference function in the k-th area, and $\lambda$ represents a design wavelength of the light beam being used (incident thereon), the third phase shift structure is a diffraction structure defined by a third optical path difference function in which diffraction orders at which diffraction efficiencies for the light beams having the first and second wavelengths are maximized are all $1^{st}$ orders; and the fourth phase shift structure is a diffraction structure defined by a fourth optical path difference function in which diffraction orders at which diffraction efficiencies for the light beams having the first and second wavelengths are maximized are $1^{st}$ order and 0-th order, respectively.

In at least one aspect, the phase shift surface may have a third area which is located outside the second area and which is configured to contribute to converging the light beams having the first wavelength onto the recording surface of the first optical disc and not to contribute converging the light beams having the second and third wavelengths.

According to another aspect of the invention, there s provided an optical information recording/reproducing apparatus for recording information and/or reproducing information from three types of optical discs including first, second and third optical discs. The optical information recording/reproducing apparatus includes light sources that emit light beams having a first wave length, a second wavelength and a third wavelength, coupling lenses respectively converting degrees of divergence or convergence of the light beams having the first, second and third wavelengths emitted by the light sources, and one of the above described objective optical system.

The optical information recording/reproducing apparatus secures the compatibility with the first to third optical discs by giving the multiple optical effects by the plurality of types of phase shift structures formed in the first area, gives phase changes, which have approximately the same period and are in opposite directions, to the light beam having the first wavelength passed through the first step and the light beam having the first wavelength passed through the second step by satisfying both of the conditions (1) and (2), and thereby aligns the wavefront by cancelling the phase changes with respect to each other.

BRIEF DESCRIPTION OF THE ACCOMPANYING DRAWINGS

FIG. 1 generally illustrates a configuration of an optical information recording/reproducing apparatus according to an embodiment of the invention.

FIGS. 2A and 2B generally illustrate a configuration of an objective lens according to the embodiment of the invention.

FIGS. 15A to 15C are graphs illustrating wavefront aberrations caused when respective optical discs are used in the optical information recording/reproducing apparatus according to a tenth example of the invention.

FIGS. 16A to 16C are graphs illustrating wavefront aberrations caused when respective optical discs are used in the optical information recording/reproducing apparatus according to a eleventh example of the invention.

DETAILED DESCRIPTION OF THE EMBODIMENTS

Figure 1:
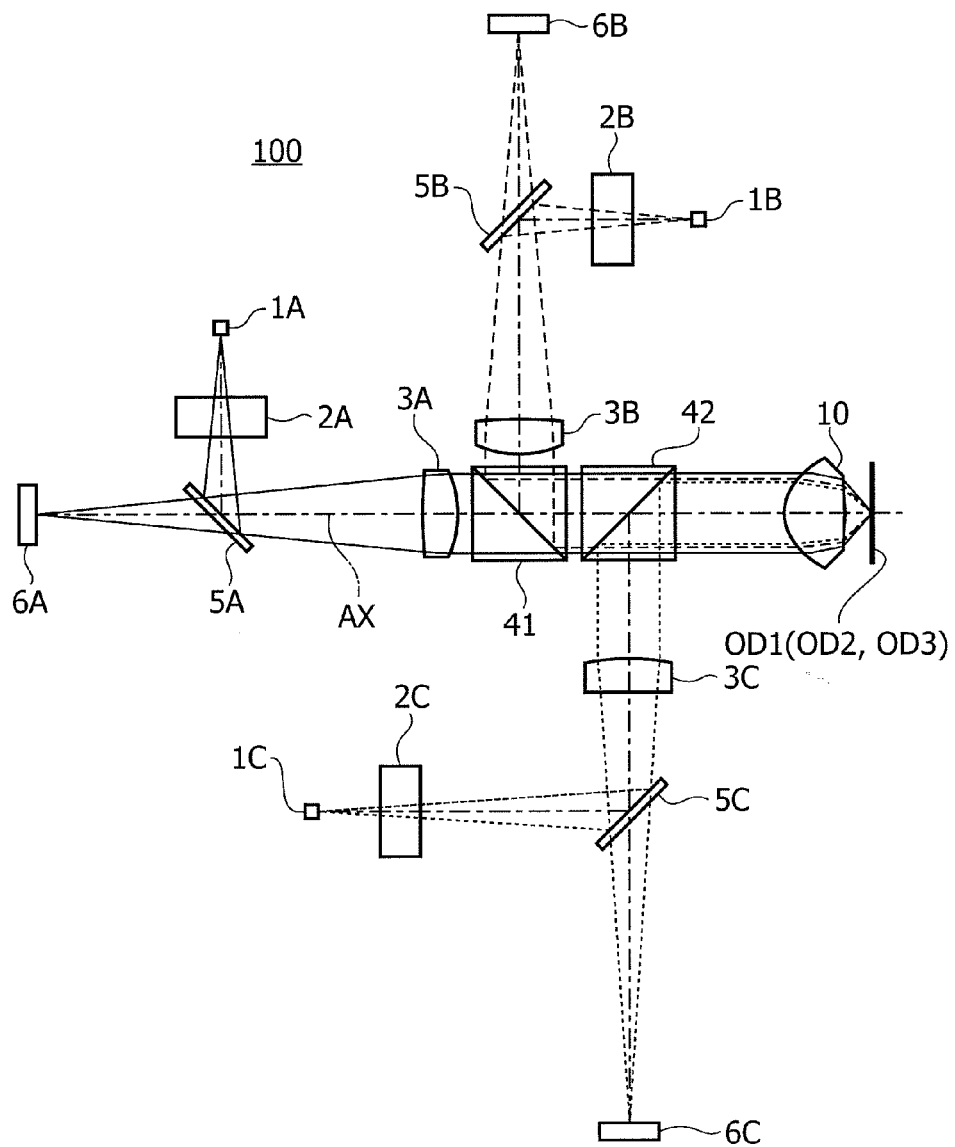

Hereinafter, an optical system and an optical information recording/reproducing apparatus according to an embodiment of the invention are described with reference to the accompanying drawings. The optical information recording/reproducing apparatus according to the embodiment has the compatibility with three types of optical discs differing in protective layer thickness and recording density. Incidentally, in this specification, the "optical information recording/reproducing apparatuses" include apparatuses for both information reproducing and information recording, apparatuses exclusively for information reproducing, and apparatuses exclusively for information recording.

In the following, of the three types of optical discs, a high-recording density optical disc (e.g. BD) is referred to as an optical disc OD1, an optical disc (e.g., DVD) having the recording density lower than that of BD is referred to as an optical disc OD2, and an optical disc (e.g., CD) having the recording density lower than DVD is referred to as an optical disc OD3.

When the protective layer thicknesses of the optical discs OD1, OD2 and OD3 are defined as t1 (unit: mm), t2 (unit: mm) and t3 (unit: mm) respectively, concrete values of the protective layer thicknesses t1, t2 and t3 are as follows.

$$t1 \approx 0.1$$

$$t2 \approx 0.6$$

$$t3 \approx 1.2$$

In consideration of errors with respect to design values due to individual differences or the temperature change, the protective layer thickness is defined by using the symbol "$\approx$" in each expression.

When information recording or information reproducing is performed for the optical discs OD1, OD2 and OD3, it is required to change the numerical aperture NA so that a suitable beam spot can be formed depending on the difference in recording density between the optical discs OD1, OD2 and OD3. When the optimal design numerical apertures required for information recording or information reproducing for the optical discs OD1, OD2 and OD3 are defined as NA1, NA2 and NA3, respectively, the following relationship holds.

$$NA1 > NA2 > NA3$$

That is, when the optical disc OD1 having the highest recording density is used, it is required to form a beam spot smaller than that for the optical disc OD2 or OD3, and therefore the largest NA is required for the optical disc OD1. On the other hand, when the optical disc OD3 having the lowest recording density is used, it is required to form a beam spot larger than that for the optical disc OD1 or OD2, and therefore the smallest NA is required for the optical disc OD3.

For information recording or information reproducing for the optical discs OD1, OD2 and OD3 differing in recording density, laser beams having different wavelengths are used in the optical information recording/reproducing apparatus. Specifically, when the optical disc OD1 is used, a laser beam having a wavelength λ1 (unit: nm) is emitted from a light source to form the smallest beam spot on a recording surface of the optical disc OD1. When the optical disc OD2 is used, a laser beam having a wavelength λ2 (unit: nm) longer than the wavelength λ1 is emitted from a light source to form a beam spot larger than that for the optical disc OD1 on a recording surface of the optical disc OD2. When the optical disc OD3 is used, a laser beam having a wavelength λ3 (unit: nm) longer than the wavelength λ2 is emitted from a light source to form a beam spot larger than that for the optical disc D2 on a recording surface of the optical disc OD3. Numerical values of λ1, λ2 and λ3 are as follows.

λ1≈405

λ2≈660

λ3≈790

Each use wavelength is defined by using the symbol "≈" in each expression so that each use wavelength includes a minute wavelength range within which each use wavelength varies due to individual differences or the temperature change.

FIG. 1 generally illustrates a configuration of an optical information recording/reproducing apparatus 100 according to the embodiment. The optical information recording/reproducing apparatus 100 includes a light source 1A which emits a laser beam having the wavelength λ1, a light source 1B which emits a laser beam having the wavelength λ2, a light source 1C which emits a laser beam having the wavelength λ3, diffraction gratings 2A to 2C, coupling lenses 3A to 3C, beam splitters 41 and 42, half mirrors 5A to 5C, photoreceptors 6A to 6C, and an objective lens 10. In FIG. 1, a reference axis AX of the optical information recording/reproducing apparatus 100 is represented by a chain line. The laser beams having the wavelengths λ1, λ2 and λ3 are respectively represented by a solid line, a dashed line and a dotted line. In a normal state, an optical axis of the objective lens 10 coincides with the reference axis AX. However, there is a case where the optical axis of the objective lens 10 shifts from the reference axis AX for a tracking operation in which the objective lens 10 moves in a radial direction of the optical disc by a tracking mechanism.

In the optical information recording/reproducing apparatus 100, the required numerical apertures NAs of the objective lens 10 differ between the optical discs. Therefore, the optical information recording/reproducing apparatus 100 may be configured to use an aperture restriction element (not shown) for defining the beam diameter for each of the laser beams having the wavelengths λ1, λ2 and λ3.

The laser beams having the wavelengths λ1, λ2 and λ3 are emitted from the light sources 1A, 1B and 1C, when the optical discs OD1, OD2 and OD3 are used, respectively. The laser beams having the wavelengths λ1, λ2 and λ3 respectively pass through the diffraction gratings 2A, 2B and 2C, optical paths of the laser beams having the wavelengths λ1, λ2 and λ3 are bent by the half mirrors 5A, 5B and 5C, respectively, and then the laser beams having the wavelengths λ1, λ2 and λ3 enter the coupling lenses 3A, 3B and 3C, respectively. The coupling lenses 3A, 3B and 3C respectively convert the laser beams having the wavelengths λ1, λ2 and λ3 into collimated beams. Each of the collimated laser beams having the wavelengths λ1 and λ2 is incident on the objective lens 10 via the beam splitters 41 and 42. The collimated laser beam having the wavelengths λ3 is incident on the objective lens 10 via the beam splitter 42. The objective lens 10 converges the incident laser beams having the wavelengths λ1, λ2 and λ3 at positions in the vicinities of the recording surfaces of the optical discs OD1, OD2 and OD3, respectively. The converged laser beams form beam spots on the recording surfaces of the optical discs OD1, OD2 and OD3, respectively. The laser beams reflected from the recording surfaces of the optical discs OD1, OD2 and OD3 return along the same optical paths proceeding to the optical discs, and are detected by the photoreceptors 6A, 6B and 6C while passing through the half mirrors 5A, 5B and 5C. The photoreceptors 6A to 6C output detection signals to a signal processing circuit (which may have a known configuration). Based on the outputs from the photoreceptors 6A to 6C, the signal processing circuit detects a focusing error signal, a tracking error signal and a reproduction signal of the information recorded on the optical disc.

As described above, each of the laser beams emerging from the coupling lenses 3A to 3C is the collimated beam. That is, each of the coupling lenses 3A to 3C functions as a collimator lens. As described above, by employing a configuration in which the collimated beam is incident on the objective lens 10, it becomes possible to prevent occurrence of off-axis aberrations, such as a coma, even when the objective lens 10 shifts for the tracking operation. It should be noted that the scope of the present invention is not limited to the configuration where the collimated beam is incident on the objective lens 10, but the scope of the present invention encompasses a so-called finite optical system where a diverging laser beam having a low degree of divergence is incident on an optical component, such as an objective lens. By employing a finite optical system, it becomes possible to correct the spherical aberration which remains when the optical disc OD3 is used, and to easily secure an adequate working distance.

FIG. 2A is a front view of the objective lens 10, and FIG. 2B is a side cross sectional view of the objective lens 10. FIG. 3 is a side cross sectional view of the objective lens 10 when the optical disc OD1 (, OD2 or OD3) is used. As described above, the objective lens 10 is used for an optical head of the optical information recording/reproducing apparatus 100 having the compatibility with the plurality of types of optical discs OD1, OD2 and OD3 based on the different standards, and has the function of converging each laser beam emitted from a semiconductor laser being a light source onto the recording surface of each optical disc.

The objective lens 10 is a biconvex single element lens made of resin, and has a first surface 10a facing the beam splitter 42 and a second surface 10b facing the optical disc. Each of the first and second surfaces 10a and 10b of the objective lens 10 is an aspherical surface. A shape of an aspherical surface is expressed by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, 1/r represents a curvature of the aspherical surface on the optical axis (i.e., r is a curvature radius (unit:

mm) of the aspherical surface on the optical axis), κ is a conical coefficient, and $A_4, A_6, \ldots$ represent aspherical coefficients larger than or equal to the fourth order. By forming each of the surfaces of the objective lens 10 to be an aspherical surface, it becomes possible to appropriately control the various aberrations, such as a spherical aberration and a coma.

As shown in FIG. 2A, the first surface 10a of the objective lens 10 includes a circular first area R1 centering at the optical axis, an annular second area R2 located outside the first area R1, and an annular third area R3 located outside the second area R2. Effective radiuses of the areas R1, R2 and R3 are defined based on NA3 (NA3 is larger than NA 0.3 at the wavelength λ1), NA2 and NA1, respectively. In the areas R1, R2 and R3, a phase shift structure is formed. The phase shift structure has a plurality of annular zones (refractive surface zones) which are concentrically formed about the optical axis and are divided by minute steps each of which extends in a direction parallel with the optical axis (see an enlarged view in FIG. 3). The phase shift structure may be formed only on the second surface 10b, or may be separated to be formed on both of the first and second surfaces 10a and 10b. It should be noted that, by providing the phase shift structure on the first surface 10a having a larger effective diameter as in the case of the embodiment, it becomes possible to design the phase shift structure such that the minimum annular zone width to be wide, and thereby it becomes possible to suppress loss of light amount at step portions of the annular zones. Furthermore, there are advantages that the phase shift structure is not worn even when the objective lens 10 is rubbed by a lens cleaner.

The phase shift structure may be formed on a separate optical element provided separately from the objective lens 10. The separate optical element may be arranged, for example, between the objective lens 10 and the beam splitter 42. In this case, the phase shift structure may be formed on one of surfaces of the separate optical element, or may be separated to be formed on both of the surfaces of the separate optical element. However, in consideration of the fact that aberrations would occur when optical axes of the objective lens and the separate optical element shift with respect to each other, it is preferable that the objective lens and the separate optical element shift together during the tracking operation.

Steps constituting the phase shift structure are provided such that a predetermined phase difference (i.e., a predetermined optical path length difference) is caused between a light beam passing through an inner side portion of a boundary of adjacent refractive surface zones and a light beam passing through an outer side portion of the boundary. In general, such a structure may be referred to as a diffraction structure. The phase shift structure configured such that the predetermined optical path length difference is an n-fold (n: integer) of a particular wavelength λα may be referred to as an n-th order diffraction structure having the blazed wavelength λα. The diffraction order of diffracted light which exhibits the maximum diffraction efficiency when a light beam having a particular wavelength λβ passes through the diffraction structure is determined as an integer m which is closest to a value determined by dividing, by the wavelength λβ, the optical path length difference given to the light beam having the wavelength λβ. In the following, the diffraction orders at which the laser beams having the wavelengths λ1, λ2 and λ3 respectively take the maximum diffraction efficiencies are referred to as "BD use diffraction order", "DVD use diffraction order" and "CD use diffraction order", respectively.

The diffraction structure (the annular zone structure) can be expressed by an i-th optical path difference function $\phi_{ik}(h)$ for a k-th area, where each of i and k is an integer. The optical path difference function $\phi_{ik}(h)$ is a function representing the functional capability of the objective lens 10 (a diffraction lens) in a form of an additional optical path length at the height h from the optical axis of the objective lens 10, and defines positions of steps in the phase shift structure. The optical path difference function $\phi_{ik}(h)$ can be expressed by a following equation:

$$\phi_{ik}(h)=(P_{ik2} \times h^2+P_{ik4} \times h^4+P_{ik6} \times h^6+P_{ik8} \times h^8+P_{ik10} \times h^{10}+P_{ik12} \times h^{12})m_{ik}\lambda$$

where $P_{ik2}, P_{ik4}, P_{ik6} \ldots$ represent coefficients of the $2^{nd}$ order, $4^{th}$ order, $6^{th}$ order, h represents a height from the optical axis, $m_{ik}$ represents a diffraction order at which the diffraction efficiency of the incident laser beam is maximized for the i-th optical path difference function in the k-th area, and λ represents a design wavelength of the laser beam being used (incident thereon).

The phase shift structure in the areas R1 and R2 has a shape defined by combining at least two types of steps (i.e., at least two types of optical path difference functions). The phase shift structure in the areas R1 and R2 gives phase differences (optical path length differences) different from each other, to the incident light beam, by combining the at least two types of steps (optical path difference functions). As a result, multiple optical effects can be given to the incident light beam.

In the area R1, a phase shift structure (hereafter, referred to as "a phase shift structure r1" for convenience of explanation) defined by combining a first phase shift structure having first steps and a second phase shift structure having second steps is formed. The phase shift structure r1 contributes to convergence for all of the laser beams having the wavelengths λ1, λ2 and λ3. That is, the phase shift structure r1 is configured to converge the laser beam having the wavelength λ1 onto the recording surface of the optical disc OD1, to converge the laser beam having the wavelength λ2 onto the recording surface of the optical disc OD2, and to converge the laser beam having the wavelength λ3 onto the recording surface of the optical disc OD3.

Figure 4:
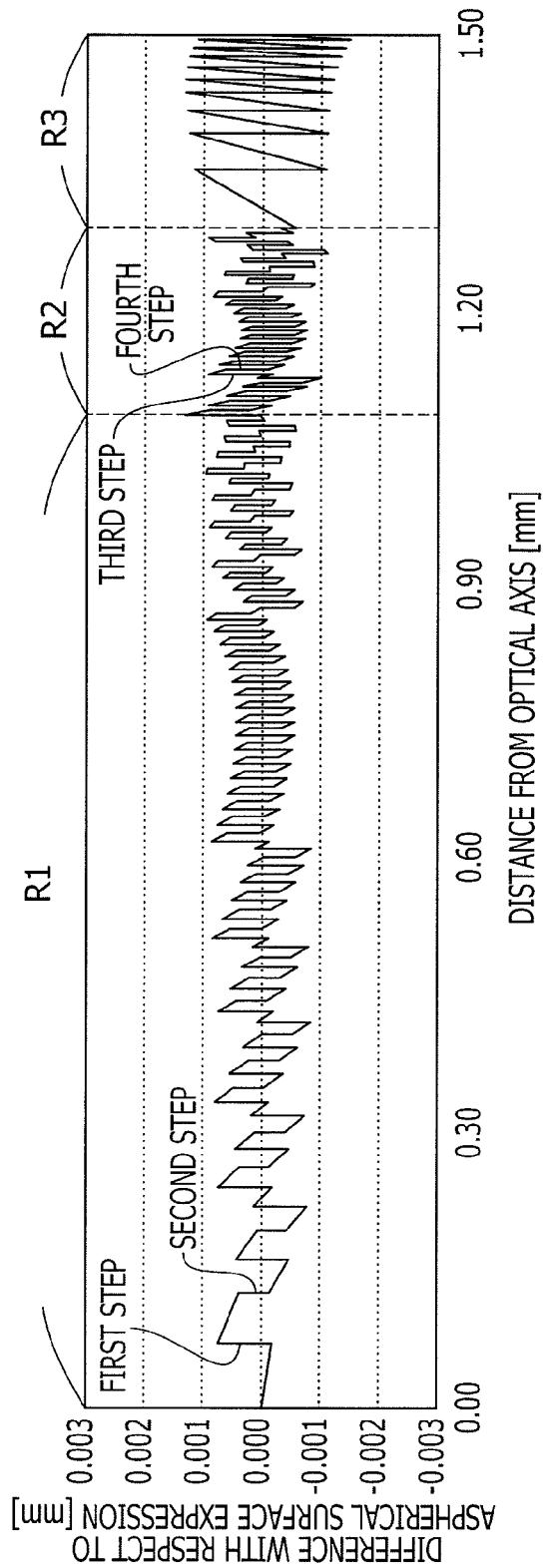
FIG. 4 is a developed view of a lens shape defined when an aspherical surface shape of a first surface of the objective lens is developed in a flat shape, and shows solely a shape of a phase shift structure formed in each area.

FIG. 4 is a developed view of a lens shape defined when the aspherical surface shape of the first surface 10a of the objective lens 10 is developed in a flat shape, and shows solely the shape of the phase shift structure formed in the areas R1 to R3. As shown in FIG. 4, in the area R1, the first step defining a projected annular zone and the second step defining the recessed shape are formed alternately.

When P1 (unit: mm) represents an arrangement interval (see "P" in the enlarged view in FIG. 3) defined in a direction perpendicular to the optical axis direction between two first steps which adjoin with respect to each other while sandwiching at least one second step therebetween, and P2 (unit: mm) represents an arrangement interval defined in a direction perpendicular to the optical axis direction between two second steps which adjoin with respect to each other while sandwiching at least one first step therebetween, i.e., two second steps one of which is sandwiched between the above described two first steps, the phase shift structure r1 is configured such that, in an area whose effective diameter is larger than NA 0.3 at the wavelength λ1 in the area R1, the phase shift structure r1 has a plurality of combinations of annular zones which satisfy a following condition:

$$0.95 < P1/P2 < 1.05 \tag{1}$$

One of the two first steps arranged to have the arrangement interval P1 closer to the optical axis is defines as a first start step, and the other of the two first steps farther from the optical axis is defined as a first end step. One of the two second steps arranged to have the arrangement interval P2 closer to the optical axis is defines as a second start step, and the other of the two second steps farther from the optical axis is defined as a second end step. When the first steps are continuously arranged in a direction perpendicular to the optical axis not to have the second step therebetween, the interval arrangement P1 is determined by defining one of the continuously arranged first steps closest to the optical axis as the first start step and by defining the other of the continuously arranged first steps farthest from the optical axis as the first end step. When the second steps are continuously arranged in a direction perpendicular to the optical axis not to have the first step therebetween, the arrangement interval P2 is determined by defining one of the continuously arranged second steps closest to the optical axis as the second start step and by defining the other of the continuously arranged second steps farthest from the optical axis as the second end step.

Figure 5A:
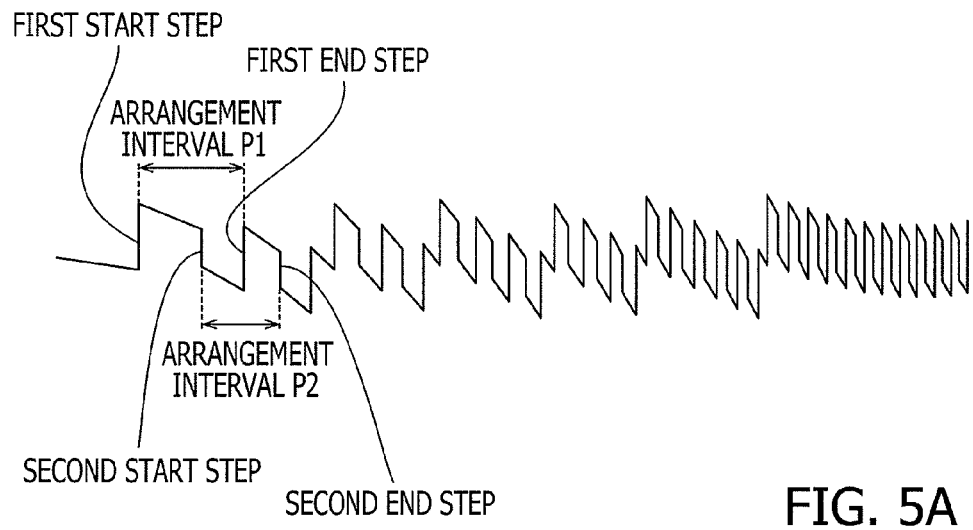
FIGS. 5A and 5B are explanatory illustrations for explaining arrangement intervals of the same type of steps formed in each area of the first surface of the objective lens.
Figure 5B:
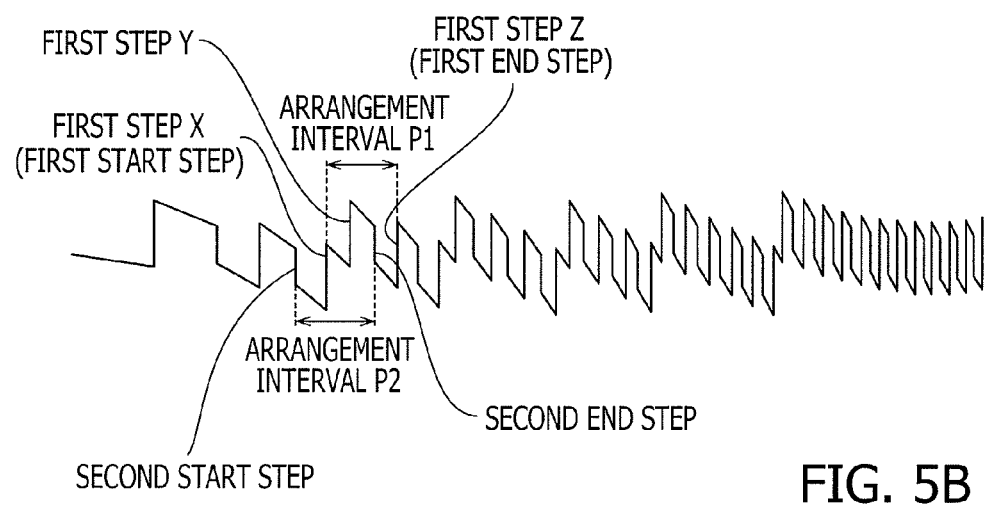

The arrangement intervals P1 and P2 will now be explained with reference to FIGS. 5A and 5B. Each of FIGS. 5A and 5B is illustrated such that the left side is closer to the optical axis. FIG. 5A shows an example of a step structure where the first step and the second step appear alternately. As shown in FIG. 5A, an interval between the first start step and the first end step adjoining with respect to each other while sandwiching the second start step is the arrangement interval P1, and an interval between the second start step and the second end step adjoining with respect to each other while sandwiching the first end step is the arrangement interval P2. FIG. 5B shows an example of a step structure where the first steps X and Y are continuously arranged without sandwiching the second step. As shown in FIG. 5B, in this case, the first step X of the first steps X and Y closer to the optical axis is the first start step, and the first end step is not the step Y but the first step Z which is positioned next to the second end step while sandwiching the second end step between the first steps Y and Z. That is, an arrangement interval between the first steps X and Z is the arrangement interval P1. The arrangement interval P2 is an interval between the second start step and the second end step arranged to adjoin with respect to each other while sandwiching the continuously arranged first steps X and Y therebetween.

Figure 2:
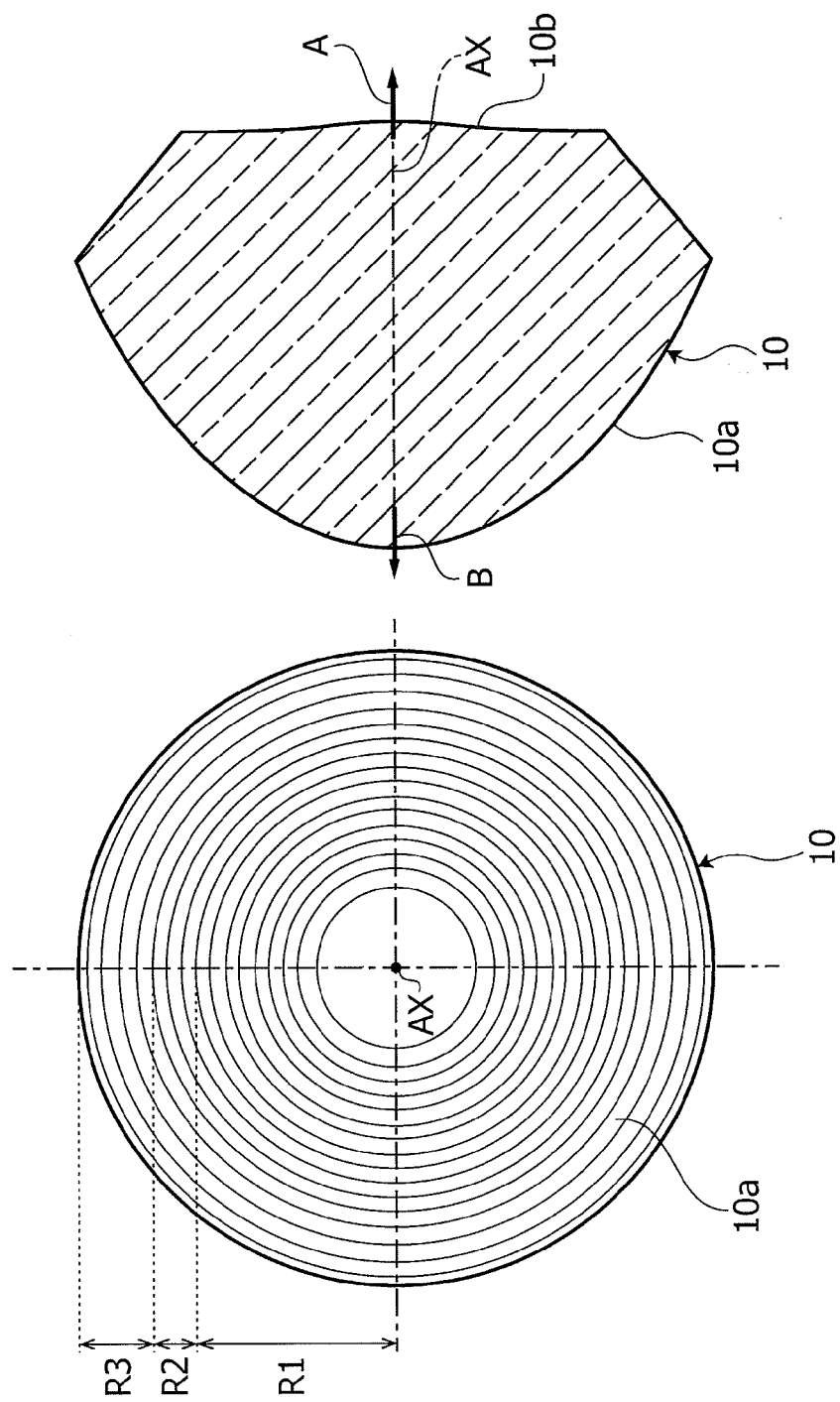
Figure 3:
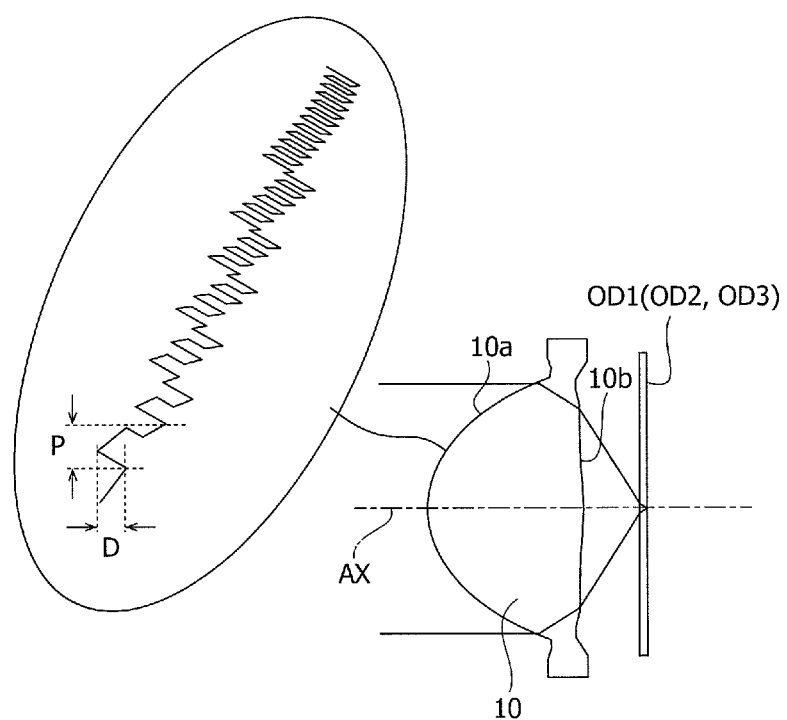
FIG. 3 illustrates a side cross section of the objective lens when an optical disc is used in the embodiment of the invention.

When $\Delta\phi_1$ (unit: radian) represents a difference between $2\pi$ and an absolute value of a phase change caused by the first step with respect to the laser beam having the wavelength $\lambda_1$ in the case where the first step gives an additional optical path length to the laser beam having the wavelength $\lambda_1$ in the direction indicated by an arrow A in FIG. 2, and $\Delta\phi_2$ (unit: radian) represents a difference between $2\pi$ and an absolute vale of the phase change caused by the second step with respect to the laser beam having the wavelength $\lambda_1$ in the case where the second step gives an additional optical path length to the laser beam having the wavelength $\lambda_1$ in the direction indicated by an arrow B in FIG. 2 which is opposite to the direction indicated by the arrow A, the phase shift structure r1 satisfies a following condition (2) at least in an area having an effective diameter larger than NA 0.3 at the wavelength $\lambda_1$ in the area R1.

$$-3.00 < \Delta\phi_1/\Delta\phi_2 < -0.10 \quad (2)$$

The phase shift structure r1 secures the compatibility with the optical discs OD1 to OD3 by giving the multiple optical effects by the first and second steps to the laser beams having the wavelengths $\lambda_1$, $\lambda_2$ and $\lambda_3$, gives phase changes, which have approximately the same period and are in opposite directions, to the laser beam having the wavelength $\lambda_1$ passed through the first step and the laser beam having the wavelength $\lambda_1$ passed through the second step by satisfying both of the conditions (1) and (2), and thereby aligns the wavefront by cancelling the phase changes with respect to each other. That is, the phase shift structure r1 is configured to effectively suppress decrease of the light use efficiency due to the phase shift by cancelling the phase shift caused by the phase shift structure with the different phase change, for the laser beam having the wavelength $\lambda_1$ for which a particularly high light use efficiency is required.

When at least one of the conditions (1) and (2) is not satisfied, the cancelling effect between the phase change given to the laser beam having the wavelength $\lambda_1$ passed through the first step and the phase change given to the laser beam having the wavelength $\lambda_1$ passed through the second step is small, and therefore a large phase shift remains and it becomes impossible to effectively suppress decrease of the light use efficiency due to the phase shift.

In order to more effectively suppress decrease of the light use efficiency of the laser beam having the wavelength $\lambda_1$ by enhancing the cancelling effect between the phase change given to the laser beam having the wavelength $\lambda_1$ passed through the first step and the phase change given to the laser beam having the wavelength $\lambda_1$ passed through the second step, the phase shift structure r1 may be configured to satisfy a following condition:

$$-1.30 < \Delta\phi_1/\Delta\phi_2 < -0.35 \quad (3).$$

When $\phi_1$ (unit: $\pi$radian) represents an absolute value of the phase difference given to the laser beam having the wavelength $\lambda_1$ by the first step and $\phi_2$ (unit: $\pi$radian) represents an absolute value of the phase difference given to the laser beam having the wavelength $\lambda_1$ by the second step, the phase shift structure r1 may be configured to satisfy following conditions (4) and (5).

$$2.2 < \phi_1 < 2.8 \quad (4)$$

$$1.0 < \phi_2 < 1.70 \quad (5)$$

When both of the conditions (4) and (5) are satisfied, the wavefront is aligned by the cancelling effect between the phase difference given to the laser beam having the wavelength $\lambda_1$ by the first step and the phase difference given to the laser beam having the wavelength $\lambda_1$ by the second step. Therefore, decrease of the light use efficiency of the laser beam having the wavelength $\lambda_1$ can be suppressed. Regarding the condition (4), the upper limit is determined to secure the light use efficiency larger than or equal to 70% for the laser beam having the wavelength $\lambda_1$, and the lower limit is determined to secure the light use efficiency larger than or equal to 40% for the laser beam having the wavelength $\lambda_3$. Regarding the condition (5), the upper and lower limits are determined to secure the light use efficiency larger than or equal to 50% for the laser beam having the wavelength $\lambda_2$. Furthermore, when both of the conditions (4) and (5) are satisfied, the height of each of the first and second steps is low, which eases the metal mold processing and the molding. Consequently, loss of light amount by a manufacturing error such as a transfer failure can be effectively suppressed.

When at least one of the conditions (4) and (5) is not satisfied, the cancelling effect for the phase differences given by the first and second steps is small, and therefore the light use efficiency of the laser beams having the wavelengths $\lambda_2$ and $\lambda_3$ decreases extremely. Furthermore, when $\phi_1$ gets larger than the upper limit of the condition (4), the height of the first step becomes high. When $\phi_2$ gets smaller than the lower limit of the condition (5), the height of the second step becomes high. In either case, a manufacturing error such as a transfer failure is easy to occur. Therefore, there is a concern that loss of light amount by a manufacturing error is caused largely. The loss of light amount of this type does not contribute to convergence of light onto the recording surface of the optical disc OD1, and appears as flare light near the spot, which causes deterioration of a reproducing property.

In order to more effectively suppress decrease of the light use efficiency of the laser beam having the wavelength λ1 by enhancing the cancelling effect between the phase difference given to the laser beam having the wavelength λ1 by the first step and the phase difference given to the laser beam having the wavelength λ1 by the second step, the phase shift structure r1 may be configured to satisfy following conditions (6) and (7).

$$2.3 < \phi 1 < 2.6 \quad (6)$$

$$1.1 < \phi 2 < 1.5 \quad (7)$$

By satisfying the condition (6), the light use efficiency for each of the laser beam having the wavelength of λ1 and the laser beam having the wavelength λ3 can be improved by approximately 10%. By satisfying the condition (7), the light use efficiency for the laser beam having the wavelength λ2 can be improved by approximately 10%.

When ΔOPD1 (unit: μm) represents an absolute value of the optical path length difference given to the laser beam having the wavelength λ1 by the first step, and ΔOPD2 (unit: μm) represents an absolute value of the optical path length difference given to the laser beam having the wavelength λ1 by the second step, the phase shift structure r1 may be configured to satisfy following conditions (8) and (9) in place of the conditions (4) and (5).

$$1.1 < \Delta OPD1/\lambda 1 < 1.4 \quad (8)$$

$$0.50 < \Delta OPD2/\lambda 1 < 0.85 \quad (9)$$

The phase shift structure r1 may be configured to satisfy following conditions (10) and (11) in place of the conditions (6) and (7).

$$1.15 < \Delta OPD1/\lambda 1 < 1.30 \quad (10)$$

$$0.55 < \Delta OPD2/\lambda 1 < 0.75 \quad (11)$$

When D1 (unit: μm) represents an absolute value of the height (see a reference symbol "D" in the enlarged view in FIG. 3) of the paraxially arranged first step in the optical axis direction, and D2 (unit: μm) represents an absolute value of the height of the paraxially arranged second step in the optical axis direction, the phase shift structure r1 may be configured to satisfy following conditions (12) and (13) in place of the conditions (4) and (5).

$$0.70 < D1 < 1.10 \quad (12)$$

$$0.30 < D2 < 0.70 \quad (13)$$

The phase shift structure r1 may be configured to satisfy following conditions (14) and (15) in place of the conditions (6) and (7).

$$0.80 < D1 < 0.95 \quad (14)$$

$$0.40 < D2 < 0.55 \quad (15)$$

The first phase shift structure can be represented as a diffraction structure defined by a first optical path difference function whose BD use diffraction order, DVD use diffraction order and CD use diffraction order are all the 1$^{st}$ orders. In addition, the second phase shift structure can be represented as a diffraction structure defined by a second optical path difference function whose BD use diffraction order, DVD use diffraction order and CD use diffraction order are the 1$^{st}$ order, the 0-th order and the 0-th order, respectively. By defining each of the use diffraction orders to be a low order, it becomes possible to set the height of each of the first and second steps to be low, which eases the metal mold processing and the molding. As a result, loss of light amount due to a manufacturing error, such as a transfer failure, can be effectively suppressed.

In the area R2, a phase shift structure (hereafter, referred to as "a phase shift structure r2" for convenience of explanation) defined by combining a third phase shift structure having third steps and a fourth phase shift structure having fourth steps is formed. The phase shift structure r2 contributes only to convergence of the laser beams having the wavelength λ1 and λ2. That is, the phase shift structure r2 is configured to converge the laser beam having the wavelength λ1 onto the recording surface of the optical disc OD1, to converge the laser beam having the wavelength λ2 onto the recording surface of the optical disc OD2, and not to converge the laser beam having the wavelength λ3 onto the recording surfaces of any of the optical discs OD1 to OD3. As shown in FIG. 4, in the area R2, generally the third step defining a projected annular zone and the fourth step defining a recessed annular zone are alternately arranged.

When P3 (unit: mm) represents an arrangement interval defined in a direction perpendicular to the optical axis direction between two third steps which adjoin with respect to each other while sandwiching at least one fourth step, and P4 (unit: mm) represents an arrangement interval defined in a direction perpendicular to the optical axis direction between two fourth steps which adjoin with respect to each other while sandwiching at least one third step, i.e., two fourth steps one of which is sandwiched between the above described two third steps, the phase shift structure r2 is configured to have a plurality of combinations of annular zones which satisfy a following condition:

$$0.95 < P3/P4 < 1.05 \quad (16).$$

One of the two third steps arranged to have the arrangement interval P3 closer to the optical axis is defines as a third start step, and the other of the two third steps farther from the optical axis is defined as a third end step. One of the two fourth steps arranged to have the arrangement interval P4 closer to the optical axis is defines as a fourth start step, and the other of the two fourth steps farther from the optical axis is defined as a fourth end step. When the third steps are continuously arranged in a direction perpendicular to the optical axis not to have the fourth step therebetween, the arrangement interval P3 is determined by defining one of the continuously arranged third steps closest to the optical axis as the third start step and by defining the other of the continuously arranged third step farthest from the optical axis as the third end step. When the fourth steps are continuously arranged in a direction perpendicular to the optical axis not to have the third step therebetween, the arrangement interval P4 is determined by defining one of the continuously arranged fourth steps closest to the optical axis as the fourth start step and by defining the other of the continuously arranged fourth step farthest from the optical axis as the fourth end step.

When Δφ3 (unit: radian) is represents a difference between 2π and an absolute value of the phase change caused by the third step with respect to the laser beam having the wavelength λ1 in the case where the third step gives an additional optical path length to the laser beam having the wavelength λ1 in the direction indicated by the arrow A in FIG. 2, and Δφ4 (unit: radian) represents a difference between 2π and an absolute value of the phase change caused by the fourth step with respect to the laser beam having the wavelength λ1 when the fourth step gives an additional optical path length to the laser beam having the wavelength λ1 in the direction indicated by an arrow B in FIG. 2 which is opposite to the direction indicated by the arrow A, the phase shift structure r2 satisfies a following condition:

$$-2.70 < \Delta\phi 3/\Delta\phi 4 < -0.05 \tag{17}$$

The phase shift structure r2 secures the compatibility with the optical discs OD1 and OD2 by giving the multiple optical effects by the third and fourth steps to the laser beams having the wavelengths λ1 and λ2, gives phase changes, which have approximately the same period and are in opposite directions, to the laser beam having the wavelength λ1 passed through the third step and the laser beam having the wavelength λ1 passed through the fourth step by satisfying both of the conditions (16) and (17), and thereby aligns the wavefront by cancelling the phase changes with respect to each other. That is, the phase shift structure r2 is configured to effectively suppress decrease of the light use efficiency due to the phase shift by cancelling the phase shift caused by the phase shift structure with the different phase change, for the laser beam having the wavelength λ1 for which a particularly high light use efficiency is required.

When at least one of the conditions (16) and (17) is not satisfied, the cancelling effect between the phase change given to the laser beam having the wavelength λ1 passed through the third step and the phase change given to the laser beam having the wavelength λ1 passed through the fourth step is small, and therefore a large phase shift remains and it becomes impossible to effectively suppress decrease of the light use efficiency due to the phase shift.

In order to more effectively suppress decrease of the light use efficiency by enhancing the cancelling effect between the phase change given to the laser beam having the wavelength λ1 passed through the third step and the phase change given to the laser beam having the wavelength λ1 passed through the fourth step, the phase shift structure r2 may be configured to satisfy a following condition:

$$-1.05 < \Delta\phi 3/\Delta\phi 4 < -0.20 \tag{18}$$

When φ3 (unit: πradian) represents an absolute value of the phase difference given to the laser beam having the wavelength λ1 by the third step and φ4 (unit: πradian) represents an absolute value of the phase difference given to the laser beam having the wavelength λ1 by the fourth step, the phase shift structure r2 may be configured to satisfy following conditions (19) and (20).

$$2.1 < \phi 3 < 2.8 \tag{19}$$

$$1.0 < \phi 4 < 1.70 \tag{20}$$

When both of the conditions (19) and (20) are satisfied, the wavefront is aligned by the cancelling effect between the phase difference given to the laser beam having the wavelength λ1 by the third step and the phase difference given to the laser beam having the wavelength λ1 by the fourth step. Regarding the condition (19), the upper limit is determined to secure the light use efficiency larger than or equal to 70% for the laser beam having the wavelength λ1, and the lower limit is determined to secure the light use efficiency larger than or equal to 50% for the laser beam having the wavelength λ2. Regarding the condition (20), the upper and lower limits are determined to secure the light use efficiency larger than or equal to 50% for the laser beam having the wavelength λ2. Therefore, decrease of the light use efficiency of the laser beam having the wavelength λ1 can be suppressed. Furthermore, when both of the conditions (19) and (20) are satisfied, the height of each of the third and fourth steps is low, which eases the metal mold processing and the molding. Consequently, loss of light amount by a manufacturing error such as a transfer failure can be effectively suppressed.

When at least one of the conditions (19) and (20) is not satisfied, the cancelling effect for the phase differences given by the third and fourth steps is small, and therefore the light use efficiency of the laser beam having the wavelength λ2 decreases extremely. Furthermore, when φ3 gets larger than the upper limit of the condition (19), the height of the third step becomes high. When φ4 gets smaller than the lower limit of the condition (20), the height of the fourth step becomes high. In either case, a manufacturing error such as a transfer failure is easy to occur. Therefore, there is a concern that loss of light amount by a manufacturing error is caused largely. The loss of light amount of this type does not contribute to convergence of light onto the recording surface of the optical disc OD1, and appears as flare light near the spot, which causes deterioration of a reproducing property.

In order to more effectively suppress decrease of the light use efficiency of the laser beam having the wavelength λ1 by enhancing the cancelling effect between the phase difference given to the laser beam having the wavelength λ1 by the third step and the phase difference given to the laser beam having the wavelength λ1 by the fourth step, the phase shift structure r2 may be configured to satisfy following conditions (21) and (22).

$$2.2 < \phi 3 < 2.6 \tag{21}$$

$$1.1 < \phi 4 < 1.5 \tag{22}$$

By satisfying the condition (21), the light use efficiency for each of the laser beam having the wavelength of λ1 and the laser beam having the wavelength λ3 can be improved by approximately 10%. By satisfying the condition (22), the light use efficiency for the laser beam having the wavelength λ2 can be improved by approximately 10%.

When ΔOPD3 (unit: μm) represents an absolute value of the optical path length difference given to the laser beam having the wavelength λ1 by the third step, and ΔOPD4 (unit: μm) represents an absolute value of the optical path length difference given to the laser beam having the wavelength λ1 by the fourth step, the phase shift structure r2 may be configured to satisfy following conditions (23) and (24) in place of the conditions (19) and (20).

$$1.05 < \Delta OPD3/\lambda 1 < 1.4 \tag{23}$$

$$0.50 < \Delta OPD4/\lambda 1 < 0.85 \tag{24}$$

The phase shift structure r2 may be configured to satisfy following conditions (25) and (26) in place of the conditions (21) and (22).

$$1.10 < \Delta OPD3/\lambda 1 < 1.30 \tag{25}$$

$$0.55 < \Delta OPD4/\lambda 1 < 0.75 \tag{26}$$

When D3 (unit: mm) represents an absolute value of the height of the paraxially arranged third step in the optical axis direction, and D4 (unit: mm) represents an absolute value of the height of the paraxially arranged fourth step in the optical axis direction, the phase shift structure r2 may be configured to satisfy following conditions (27) and (28) in place of the conditions (19) and (20).

$$0.85 < D3 < 1.20 \tag{27}$$

$$0.45 < D4 < 0.85 \tag{28}$$

The phase shift structure r2 may be configured to satisfy following conditions (29) and (30) in place of the conditions (21) and (22).

$$0.95 < D3 < 1.10 \quad (29)$$

$$0.55 < D4 < 0.75 \quad (30)$$

The third phase shift structure can be represented as a diffraction structure defined by a third optical path difference function whose BD use diffraction order and DVD use diffraction order are all the $1^{st}$ orders. In addition, the fourth phase shift structure can be represented as a diffraction structure defined by a fourth optical path difference function whose BD use diffraction order and DVD use diffraction order are the $1^{st}$ order and the 0-th order, respectively. By defining each of the use diffraction orders to be a low order, it becomes possible to set the height of each of the third and fourth steps to be low, which eases the metal mold processing and the molding. As a result, loss of light amount due to a manufacturing error, such as a transfer error, can be effectively suppressed.

The area R3 contributes only to convergence of the laser beam having the wavelength λ1. That is, the area R3 is configured to converge the laser beam having the wavelength λ1 onto the recording surface of the optical disc OD1 and not converge the laser beams having the wavelengths λ2 and λ3 onto any of the optical discs OD1 to OD3. As shown in FIG. 4, one type of sawtooth-like annular zone structure is formed in the area R3.

In the following, eleven concrete examples (first to eleventh examples) of the optical information recording/reproducing apparatus 100 on which the objective lens 10 is mounted are explained. The optical information recording/reproducing apparatus 100 according each of the first to eleventh examples has the configuration generally illustrated in FIG. 1. The objective lens 10 according to each of the first to eleventh examples has the configuration generally illustrated in FIGS. 2 and 3. Actual differences between the optical elements produced in accordance with the numerical values of the first to eleventh examples are minute in the scaling of the accompanying drawings. Therefore, the whole configurations of the optical information recording/reproducing apparatus 100 according to the first to eleventh examples are explained with reference to FIG. 1, and the configurations of the objective lens 10 according to the first to eleventh examples are explained with reference to FIG. 3.

First Example

Hereafter, a first example of the optical information recording/reproducing apparatus 100 is described. The specifications of the objective lens 10 mounted on the optical information recording/reproducing apparatus 100 according to the first example are indicated in the following Table 1. Specifically, Table 1 shows the design wavelength (use wavelength) (unit: nm), the focal length (unit: mm), NA and the magnification of the objective lens 10. Various definitions regarding Tables and drawings in the first example are also applied to Tables and drawings in the other examples.

TABLE 1

|  | unit | $1^{st}$ laser beam | $2^{nd}$ laser beam | $3^{rd}$ laser beam |
| --- | --- | --- | --- | --- |
| Design Wavelength | nm | 405 | 660 | 790 |
| Focal Length | mm | 1.765 | 1.990 | 2.053 |
| NA |  | 0.85 | 0.65 | 0.53 |
| Magnification |  | 0.00 | 0.00 | 0.00 |

As shown by the magnification in Table 1, in the optical information recording/reproducing apparatus 100 according to the first example, each of the laser beams used for the respective optical discs OD1 to OD3 is incident on the objective lens 10 as a collimated beam. Therefore, it is possible to prevent the off-axis aberrations from occurring when the objective lens 10 is shifted for a tracking operation.

The following Table 2 shows the numeral configuration of the optical information recording/reproducing apparatus 100 defined when each of the optical discs OD1 to DO3 is used.

TABLE 2

| Surface No. | r | d(405 nm) | d(660 nm) | d(790 nm) |  |
| --- | --- | --- | --- | --- | --- |
| 1-1 | 1.110 | 1.880 |  |  | Objective Lens |
| 1-2 | 1.106 |  |  |  |  |
| 1-3 | 0.999 |  |  |  |  |
| 2 | −2.938 | 0.673 | 0.613 | 0.305 |  |
| 3 | ∞ | 0.0875 | 0.600 | 1.200 | Optical Disc |
| 4 | ∞ |  |  |  |  |

| Surface No. | n(405 nm) | n(660 nm) | n(790 nm) |  |
| --- | --- | --- | --- | --- |
| 1-1 | 1.56023 | 1.54044 | 1.53635 | Objective Lens |
| 1-2 |  |  |  |  |
| 1-3 |  |  |  |  |
| 2 |  |  |  |  |
| 3 | 1.62231 | 1.57961 | 1.57307 | Optical Disc |
| 4 |  |  |  |  |

In Table 2, the surface numbers 1-1, 1-2 and 103 represent the areas R1, R2 and R3 of the first surface 10a of the objective lens 10, respectively. The surface number 2 represents the second surface 10b of the objective lens 10. The surface number 3 represents the protective layer of the targeted optical disc. In Table 2, "r" denotes the curvature radius (unit: mm) of each optical surface, "d(405 nm)" denotes the thickness of an optical component or the distance (unit: mm) from each optical surface to the next optical surface defined when the optical disc OD1 is used, "d(660 nm)" denotes the thickness of an optical component or the distance (unit: mm) from each optical surface to the next optical surface defined when the optical disc OD2 is used, and "d(790 nm)" denotes the thickness of an optical component or the distance (unit: mm) from each optical surface to the next optical surface defined when the optical disc OD3 is used. "n (406 nm)", "n (660 nm)" and "n (790 nm)" represent the refractive indexes at the respective wavelengths indicated in the parentheses.

Each of the first surface 10a (surface numbers 1-1. 1-2 and 1-3) and the second surface 10b of the objective lens 10 are aspherical surfaces. Each of the aspherical surfaces is designed to be most suitable for information recording or information reproducing for the optical discs OD1 to OD3. The following Table 3 shows the conical coefficients κ and aspherical coefficients $A_4, A_6 \ldots$ of each aspherical surface. In each of Tables, the notation "E" means the power of 10 with an exponent specified by the number to the right of E (e.g. "E-04" means "$\times 10^{-4}$").

TABLE 3

| κ | 1-1<br>−1.000 | 1-2<br>−1.000 | 1-3<br>−1.000 | 2<br>3.100 |
|---|---|---|---|---|
| A4  | 2.87100E−02  | −9.85200E−02 | −7.50430E−02 | 3.51110E−01 |
| A6  | 1.16600E−02  | 2.10900E−01  | 7.83770E−02  | −5.61660E−01 |
| A8  | −8.80800E−04 | −9.51300E−02 | −2.77640E−02 | 9.15020E−01 |
| A10 | −8.91600E−05 | 9.89250E−03  | 3.02130E−02  | −1.08740E+00 |
| A12 | 1.96460E−04  | 2.33830E−03  | −2.48190E−02 | 8.39010E−01 |
| A14 |              |              | 1.05710E−02  | −3.94180E−01 |
| A16 |              |              | −1.80380E−03 | 1.02480E−01 |
| A18 |              |              |              | −1.12240E−02 |
| A20 |              |              |              |  |
| A22 |              |              |              |  |
| A24 |              |              |              |  |

Each of the areas R1 to R3 has a unique phase shift structure (diffraction structure). Coefficients of optical path difference functions for defining the phase shift structure in each of the areas on the first surface 10a and the use diffraction orders are shown in Tables 4 and 5. "1-1" in each of Tables 4 and 5 represents BD use diffraction order/DVD use diffraction order/CD use diffraction order (1/1/1 in the first phase shift structure, 1/0/0 in the second phase shift structure) in the first and second phase shift structures constituting the phase shift structure r1 in the area R1, and the optical path difference function coefficients of the first and second phase shift structures. "1-2" in each of the Tables 4 and 5 represents BD use diffraction order/DVD use diffraction order/CD use diffraction order (1/1/- in the third phase shift structure, 1/0/- in the fourth phase shift structure) in the third and fourth phase shift structures constituting the phase shift structure r2 in the area R2, and the optical path difference function coefficients of the third and fourth phase shift structures. "1-3" in Table 5 represents the BD use diffraction order (2/-/-) in the phase shift structure formed in the area R3, and the optical path difference coefficients of the phase shift structure.

TABLE 4

| Diffraction<br>Order | 1-1<br>1/1/1 | 1-2<br>1/1/— | 1-3<br>2/—/— |
|---|---|---|---|
| P2  | 5.76530E+01  | 5.89870E+01  | 4.49720E+01 |
| P4  | −1.41280E+01 | −1.20860E+02 | −8.67570E+01 |
| P6  | 5.21900E+00  | 1.86980E+02  | 5.43030E+01 |
| P8  | −2.88500E+00 | −1.04760E+02 | −1.14172E+01 |
| P10 | 9.07300E−03  | 1.94830E+01  | 0.00000E+00 |
| P12 | 0.00000E+00  | 0.00000E+00  | 0.00000E+00 |

TABLE 5

| Diffraction<br>Order | 1-1<br>1/0/0 | 1-2<br>1/0/— |
|---|---|---|
| P2  | −3.69430E+01 | −3.60230E+01 |
| P4  | −7.43100E+00 | −7.73070E+01 |
| P6  | 1.62700E+00  | 1.21400E+02 |
| P8  | −9.77900E−01 | −6.85160E+01 |
| P10 | −1.54900E−01 | 1.27460E+01 |
| P12 | 0.00000E+00  | 0.00000E+00 |

Figure 6A:
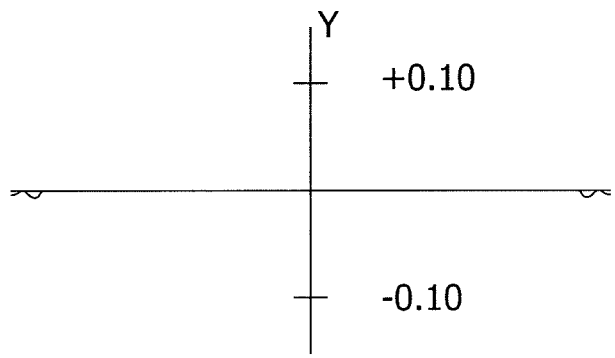
FIGS. 6A to 6C are graphs illustrating wavefront aberrations caused when respective optical discs are used in the optical information recording/reproducing apparatus according to a first example of the invention.

The concrete configuration of the phase shift structure formed in the areas R1 to R3 are shown in the following Tables 6A to 6C. In Tables 6A to 6C, the number of each annular zone constituting the phase shift structure is assigned in the order from the optical axis. The annular zone number 60 in FIG. 6A is followed by the annular one number 61 in Table 6B, and the annular zone number 120 in Table 6B is followed by the annular zone number 121 in Table 6C. The width of each annular zone is defined by an "annular zone start position" and an "annular zone end position" in Tables 6A to 6C. In Tables 6A to 6C, phase differences φ1 to φ4, optical path length differences ΔOPD1/λ1 to ΔOPD4/λ1 and the heights of steps D1 to D4 between the annular zones (steps), and, the phase difference, the optical path length difference and the height of each step in the phase shift structure in the area R3 are also shown.

TABLE 6A

| | | | Phase Difference | | Optical Path Length | | Step Height | | Annular Zone Pitch | | |
|---|---|---|---|---|---|---|---|---|---|---|---|
| | Annular<br>Zone No. | Annular Zone<br>Start Position<br>mm | φ1<br>φ3<br>πrad | φ2<br>φ4<br>πrad | ΔOPD1/λ1<br>ΔOPD3/λ1 | ΔOPD2/λ1<br>ΔOPD4/λ1 | D1<br>D3<br>μm | D2<br>D4<br>μm | P1<br>P3 | P2<br>P4 | P1/P2<br>P3/P4 |
| | | Annular Zone<br>End Position<br>mm | | | | | | | | | |
| First<br>Area | 0 | 0.000 0.071 | | | | | | | | | |
| | 1 | 0.071 0.126 | | 1.39 | | 0.69 | | 0.50 | | | |
| | 2 | 0.126 0.163 | 2.46 | | 1.23 | | 0.89 | | | 0.092 | |
| | 3 | 0.163 0.194 | | 1.39 | | 0.69 | | 0.50 | 0.068 | | 0.734 |
| | 4 | 0.194 0.220 | 2.46 | | 1.23 | | 0.89 | | | 0.078 | |
| | 5 | 0.220 0.240 | | 1.39 | | 0.69 | | 0.50 | 0.069 | | 0.888 |
| | 6 | 0.240 0.263 | | 1.39 | | 0.69 | | 0.50 | | | |
| | 7 | 0.263 0.283 | 2.46 | | 1.23 | | 0.89 | | | 0.042 | |
| | 8 | 0.283 0.301 | | 1.39 | | 0.69 | | 0.50 | 0.039 | | 0.919 |
| | 9 | 0.301 0.319 | 2.46 | | 1.23 | | 0.89 | | | 0.051 | |
| | 10 | 0.319 0.334 | | 1.39 | | 0.69 | | 0.50 | 0.048 | | 0.946 |

TABLE 6A-continued

| Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 D3 μm | Step Height D2 D4 μm | Annular Zone Pitch P1 P3 | Annular Zone Pitch P2 P4 | Annular Zone Pitch P1/P2 P3/P4 |
|---|---|---|---|---|---|---|---|---|---|---|---|
| 11 | 0.334 | 0.350 |  | 1.39 |  | 0.69 |  | 0.50 |  |  |  |
| 12 | 0.350 | 0.365 | 2.46 |  | 1.23 |  | 0.89 |  |  | 0.031 |  |
| 13 | 0.365 | 0.380 |  | 1.39 |  | 0.69 |  | 0.50 | 0.030 |  | 0.963 |
| 14 | 0.380 | 0.394 | 2.46 |  | 1.23 |  | 0.89 |  |  | 0.029 |  |
| 15 | 0.394 | 0.408 |  | 1.39 |  | 0.69 |  | 0.50 | 0.028 |  | 0.967 |
| 16 | 0.408 | 0.421 | 2.46 |  | 1.23 |  | 0.89 |  |  | 0.038 |  |
| 17 | 0.421 | 0.432 |  | 1.39 |  | 0.69 |  | 0.50 | 0.037 |  | 0.970 |
| 18 | 0.432 | 0.445 |  | 1.39 |  | 0.69 |  | 0.50 |  |  |  |
| 19 | 0.445 | 0.457 | 2.46 |  | 1.23 |  | 0.89 |  |  | 0.025 |  |
| 20 | 0.457 | 0.469 |  | 1.39 |  | 0.69 |  | 0.50 | 0.024 |  | 0.971 |
| 21 | 0.469 | 0.481 | 2.46 |  | 1.23 |  | 0.89 |  |  | 0.024 |  |
| 22 | 0.481 | 0.492 |  | 1.39 |  | 0.69 |  | 0.50 | 0.023 |  | 0.978 |
| 23 | 0.492 | 0.503 | 2.46 |  | 1.23 |  | 0.89 |  |  | 0.032 |  |
| 24 | 0.503 | 0.513 |  | 1.39 |  | 0.69 |  | 0.50 | 0.031 |  | 0.977 |
| 25 | 0.513 | 0.523 |  | 1.39 |  | 0.69 |  | 0.50 |  |  |  |
| 26 | 0.523 | 0.534 | 2.46 |  | 1.23 |  | 0.89 |  |  | 0.021 |  |
| 27 | 0.534 | 0.544 |  | 1.39 |  | 0.69 |  | 0.50 | 0.021 |  | 0.983 |
| 28 | 0.544 | 0.554 | 2.46 |  | 1.23 |  | 0.89 |  |  | 0.020 |  |
| 29 | 0.554 | 0.564 |  | 1.39 |  | 0.69 |  | 0.50 | 0.020 |  | 0.980 |
| 30 | 0.564 | 0.574 | 2.46 |  | 1.23 |  | 0.89 |  |  | 0.020 |  |
| 31 | 0.574 | 0.583 |  | 1.39 |  | 0.69 |  | 0.50 | 0.019 |  | 0.981 |
| 32 | 0.583 | 0.593 | 2.46 |  | 1.23 |  | 0.89 |  |  | 0.019 |  |
| 33 | 0.593 | 0.602 |  | 1.39 |  | 0.69 |  | 0.50 | 0.019 |  | 0.986 |
| 34 | 0.602 | 0.611 | 2.46 |  | 1.23 |  | 0.89 |  |  | 0.026 |  |
| 35 | 0.611 | 0.619 |  | 1.39 |  | 0.69 |  | 0.50 | 0.026 |  | 0.985 |
| 36 | 0.619 | 0.628 |  | 1.39 |  | 0.69 |  | 0.50 |  |  |  |
| 37 | 0.628 | 0.637 | 2.46 |  | 1.23 |  | 0.89 |  |  | 0.018 |  |
| 38 | 0.637 | 0.646 |  | 1.39 |  | 0.69 |  | 0.50 | 0.018 |  | 0.988 |
| 39 | 0.646 | 0.654 | 2.46 |  | 1.23 |  | 0.89 |  |  | 0.017 |  |
| 40 | 0.654 | 0.663 |  | 1.39 |  | 0.69 |  | 0.50 | 0.017 |  | 0.989 |
| 41 | 0.663 | 0.671 | 2.46 |  | 1.23 |  | 0.89 |  |  | 0.017 |  |
| 42 | 0.671 | 0.679 |  | 1.39 |  | 0.69 |  | 0.50 | 0.017 |  | 0.988 |
| 43 | 0.679 | 0.687 | 2.46 |  | 1.23 |  | 0.89 |  |  | 0.016 |  |
| 44 | 0.687 | 0.695 |  | 1.39 |  | 0.69 |  | 0.50 | 0.016 |  | 0.987 |
| 45 | 0.695 | 0.703 | 2.46 |  | 1.23 |  | 0.89 |  |  | 0.016 |  |
| 46 | 0.703 | 0.711 |  | 1.39 |  | 0.69 |  | 0.50 | 0.016 |  | 0.988 |
| 47 | 0.711 | 0.719 | 2.46 |  | 1.23 |  | 0.89 |  |  | 0.016 |  |
| 48 | 0.719 | 0.727 |  | 1.39 |  | 0.69 |  | 0.50 | 0.016 |  | 0.990 |
| 49 | 0.727 | 0.735 | 2.46 |  | 1.23 |  | 0.89 |  |  | 0.015 |  |
| 50 | 0.735 | 0.742 |  | 1.39 |  | 0.69 |  | 0.50 | 0.015 |  | 0.992 |
| 51 | 0.742 | 0.750 | 2.46 |  | 1.23 |  | 0.89 |  |  | 0.015 |  |
| 52 | 0.750 | 0.757 |  | 1.39 |  | 0.69 |  | 0.50 | 0.015 |  | 0.992 |
| 53 | 0.757 | 0.764 | 2.46 |  | 1.23 |  | 0.89 |  |  | 0.015 |  |
| 54 | 0.764 | 0.772 |  | 1.39 |  | 0.69 |  | 0.50 | 0.015 |  | 0.991 |
| 55 | 0.772 | 0.779 | 2.46 |  | 1.23 |  | 0.89 |  |  | 0.015 |  |
| 56 | 0.779 | 0.786 |  | 1.39 |  | 0.69 |  | 0.50 | 0.014 |  | 0.990 |
| 57 | 0.786 | 0.793 | 2.46 |  | 1.23 |  | 0.89 |  |  | 0.014 |  |
| 58 | 0.793 | 0.800 |  | 1.39 |  | 0.69 |  | 0.50 | 0.014 |  | 0.990 |
| 59 | 0.800 | 0.807 | 2.46 |  | 1.23 |  | 0.89 |  |  | 0.014 |  |
| 60 | 0.807 | 0.814 |  | 1.39 |  | 0.69 |  | 0.50 | 0.014 |  | 0.992 |

TABLE 6B

| Area | No. | Start | End | φ1/φ3 | φ2/φ4 | ΔOPD1/ΔOPD3 | ΔOPD2/ΔOPD4 | D1/D3 | D2/D4 | P1/P3 | P2/P4 | P1/P2 or P3/P4 |
|---|---|---|---|---|---|---|---|---|---|---|---|---|
| First Area | 61 | 0.814 | 0.821 | 2.46 |  | 1.23 |  | 0.89 |  |  | 0.014 |  |
|  | 62 | 0.821 | 0.828 |  | 1.39 |  | 0.69 |  | 0.50 | 0.014 |  | 0.993 |
|  | 63 | 0.828 | 0.835 | 2.46 |  | 1.23 |  | 0.89 |  |  | 0.014 |  |
|  | 64 | 0.835 | 0.842 |  | 1.39 |  | 0.69 |  | 0.50 | 0.014 |  | 0.993 |
|  | 65 | 0.842 | 0.848 | 2.46 |  | 1.23 |  | 0.89 |  |  | 0.013 |  |
|  | 66 | 0.848 | 0.855 |  | 1.39 |  | 0.69 |  | 0.50 | 0.013 |  | 0.992 |
|  | 67 | 0.855 | 0.861 | 2.46 |  | 1.23 |  | 0.89 |  |  | 0.013 |  |
|  | 68 | 0.861 | 0.868 |  | 1.39 |  | 0.69 |  | 0.50 | 0.013 |  | 0.990 |
|  | 69 | 0.868 | 0.875 | 2.46 |  | 1.23 |  | 0.89 |  |  |  |  |
|  | 70 | 0.875 | 0.882 | 2.46 |  | 1.23 |  | 0.89 |  |  | 0.020 |  |
|  | 71 | 0.882 | 0.888 |  | 1.39 |  | 0.69 |  | 0.50 | 0.020 |  | 0.994 |
|  | 72 | 0.888 | 0.895 | 2.46 |  | 1.23 |  | 0.89 |  |  | 0.013 |  |
|  | 73 | 0.895 | 0.901 |  | 1.39 |  | 0.69 |  | 0.50 | 0.013 |  | 0.992 |
|  | 74 | 0.901 | 0.907 | 2.46 |  | 1.23 |  | 0.89 |  |  | 0.013 |  |
|  | 75 | 0.907 | 0.913 |  | 1.39 |  | 0.69 |  | 0.50 | 0.013 |  | 0.995 |
|  | 76 | 0.913 | 0.920 | 2.46 |  | 1.23 |  | 0.89 |  |  | 0.012 |  |

TABLE 6B-continued

| Area | # | | | | | | | | | | | |
|---|---|---|---|---|---|---|---|---|---|---|---|---|
| | 77 | 0.920 | 0.926 | | 1.39 | | 0.69 | | 0.50 | 0.012 | | 0.995 |
| | 78 | 0.926 | 0.933 | 2.46 | | 1.23 | | 0.89 | | | | |
| | 79 | 0.933 | 0.939 | 2.46 | | 1.23 | | 0.89 | | | 0.019 | |
| | 80 | 0.939 | 0.945 | | 1.39 | | 0.69 | | 0.50 | 0.019 | | 0.993 |
| | 81 | 0.945 | 0.951 | 2.46 | | 1.23 | | 0.89 | | | 0.012 | |
| | 82 | 0.951 | 0.957 | | 1.39 | | 0.69 | | 0.50 | 0.012 | | 0.993 |
| | 83 | 0.957 | 0.963 | 2.46 | | 1.23 | | 0.89 | | | 0.012 | |
| | 84 | 0.963 | 0.968 | | 1.39 | | 0.69 | | 0.50 | 0.012 | | 0.993 |
| | 85 | 0.968 | 0.975 | 2.46 | | 1.23 | | 0.89 | | | | |
| | 86 | 0.975 | 0.981 | 2.46 | | 1.23 | | 0.89 | | | 0.018 | |
| | 87 | 0.981 | 0.987 | | 1.39 | | 0.69 | | 0.50 | 0.018 | | 0.995 |
| | 88 | 0.987 | 0.993 | 2.46 | | 1.23 | | 0.89 | | | 0.012 | |
| | 89 | 0.993 | 0.998 | | 1.39 | | 0.69 | | 0.50 | 0.011 | | 0.997 |
| | 90 | 0.998 | 1.005 | 2.46 | | 1.23 | | 0.89 | | | | |
| | 91 | 1.005 | 1.010 | 2.46 | | 1.23 | | 0.89 | | | 0.018 | |
| | 92 | 1.010 | 1.016 | | 1.39 | | 0.69 | | 0.50 | 0.018 | | 0.993 |
| | 93 | 1.016 | 1.022 | 2.46 | | 1.23 | | 0.89 | | | 0.011 | |
| | 94 | 1.022 | 1.027 | | 1.39 | | 0.69 | | 0.50 | 0.011 | | 0.993 |
| | 95 | 1.027 | 1.034 | 2.46 | | 1.23 | | 0.89 | | | | |
| | 96 | 1.034 | 1.039 | 2.46 | | 1.23 | | 0.89 | | | 0.017 | |
| | 97 | 1.039 | 1.045 | | 1.39 | | 0.69 | | 0.50 | 0.017 | | 0.998 |
| | 98 | 1.045 | 1.051 | 2.46 | | 1.23 | | 0.89 | | | | |
| | 99 | 1.051 | 1.056 | 2.46 | | 1.23 | | 0.89 | | | 0.017 | |
| | 100 | 1.056 | 1.062 | | 1.39 | | 0.69 | | 0.50 | 0.017 | | 0.993 |
| | 101 | 1.062 | 1.068 | 2.46 | | 1.23 | | 0.89 | | | | |
| | 102 | 1.068 | 1.073 | 2.46 | | 1.23 | | 0.89 | | | 0.017 | |
| | 103 | 1.073 | 1.078 | | 1.39 | | 0.69 | | 0.50 | 0.017 | | 0.994 |
| | 104 | 1.078 | 1.085 | 2.46 | | 1.23 | | 0.89 | | | 0.023 | |
| Second Area | 105 | 1.085 | 1.091 | 2.36 | | 1.18 | | 0.94 | | | | |
| | 106 | 1.091 | 1.096 | 2.36 | | 1.18 | | 0.94 | | | | |
| | 107 | 1.096 | 1.101 | | 1.48 | | 0.74 | | 0.60 | 0.023 | | 0.989 |
| | 108 | 1.101 | 1.106 | 2.36 | | 1.18 | | 0.94 | | | 0.010 | |
| | 109 | 1.106 | 1.111 | | 1.48 | | 0.74 | | 0.60 | 0.010 | | 0.996 |
| | 110 | 1.111 | 1.116 | 2.36 | | 1.18 | | 0.94 | | | 0.010 | |
| | 111 | 1.116 | 1.121 | | 1.48 | | 0.74 | | 0.60 | 0.010 | | 0.996 |
| | 112 | 1.121 | 1.126 | 2.36 | | 1.18 | | 0.94 | | | 0.014 | |
| | 113 | 1.126 | 1.130 | | 1.48 | | 0.74 | | 0.60 | 0.014 | | 0.995 |
| | 114 | 1.130 | 1.135 | | 1.48 | | 0.74 | | 0.60 | | | |
| | 115 | 1.135 | 1.140 | 2.36 | | 1.18 | | 0.94 | | | 0.010 | |
| | 116 | 1.140 | 1.145 | | 1.48 | | 0.74 | | 0.60 | 0.010 | | 0.996 |
| | 117 | 1.145 | 1.150 | 2.36 | | 1.18 | | 0.94 | | | 0.010 | |
| | 118 | 1.150 | 1.154 | | 1.48 | | 0.74 | | 0.60 | 0.010 | | 0.996 |
| | 119 | 1.154 | 1.159 | 2.36 | | 1.18 | | 0.94 | | | 0.010 | |
| | 120 | 1.159 | 1.164 | | 1.48 | | 0.74 | | 0.60 | 0.010 | | 0.996 |

TABLE 6C

| Area | # | | | | | | | | | | | |
|---|---|---|---|---|---|---|---|---|---|---|---|---|
| Second Area | 121 | 1.164 | 1.169 | 2.36 | | 1.18 | | 0.94 | | | 0.009 | |
| | 122 | 1.169 | 1.173 | | 1.48 | | 0.74 | | 0.60 | 0.009 | | 0.996 |
| | 123 | 1.173 | 1.178 | 2.36 | | 1.18 | | 0.94 | | | 0.009 | |
| | 124 | 1.178 | 1.183 | | 1.48 | | 0.74 | | 0.60 | 0.009 | | 0.996 |
| | 125 | 1.183 | 1.188 | 2.36 | | 1.18 | | 0.94 | | | 0.009 | |
| | 126 | 1.188 | 1.192 | | 1.48 | | 0.74 | | 0.60 | 0.009 | | 0.996 |
| | 127 | 1.192 | 1.197 | 2.36 | | 1.18 | | 0.94 | | | 0.009 | |
| | 128 | 1.197 | 1.201 | | 1.48 | | 0.74 | | 0.60 | 0.009 | | 0.996 |
| | 129 | 1.201 | 1.206 | 2.36 | | 1.18 | | 0.94 | | | 0.009 | |
| | 130 | 1.206 | 1.211 | | 1.48 | | 0.74 | | 0.60 | 0.009 | | 0.996 |
| | 131 | 1.211 | 1.215 | 2.36 | | 1.18 | | 0.94 | | | 0.009 | |
| | 132 | 1.215 | 1.220 | | 1.48 | | 0.74 | | 0.60 | 0.009 | | 0.996 |
| | 133 | 1.220 | 1.225 | 2.36 | | 1.18 | | 0.94 | | | 0.014 | |
| | 134 | 1.225 | 1.229 | 2.36 | | 1.18 | | 0.94 | | | | |
| | 135 | 1.229 | 1.234 | | 1.48 | | 0.74 | | 0.60 | 0.014 | | 0.997 |
| | 136 | 1.234 | 1.238 | 2.36 | | 1.18 | | 0.94 | | | 0.009 | |
| | 137 | 1.238 | 1.243 | | 1.48 | | 0.74 | | 0.60 | 0.009 | | 0.996 |
| | 138 | 1.243 | 1.248 | 2.36 | | 1.18 | | 0.94 | | | 0.014 | |
| | 139 | 1.248 | 1.252 | 2.36 | | 1.18 | | 0.94 | | | | |
| | 140 | 1.252 | 1.257 | | 1.48 | | 0.74 | | 0.60 | 0.014 | | 0.996 |
| | 141 | 1.257 | 1.262 | 2.36 | | 1.18 | | 0.94 | | | 0.014 | |
| | 142 | 1.262 | 1.266 | 2.36 | | 1.18 | | 0.94 | | | | |
| | 144 | 1.266 | 1.271 | | 1.48 | | 0.74 | | 0.60 | 0.014 | | 1.020 |
| | 145 | 1.271 | 1.275 | 2.36 | | 1.18 | | 0.94 | | | 0.009 | |
| | 146 | 1.275 | 1.279 | | 1.48 | | 0.74 | | 0.60 | 0.009 | | 0.960 |
| | 147 | 1.279 | 1.284 | 2.36 | | 1.18 | | 0.94 | | | | |
| | 148 | 1.284 | 1.290 | 2.36 | | 1.18 | | 0.94 | | | | |
| Third Area | 149 | 1.290 | 1.353 | 4.00 | | 2.00 | | 0.88 | | | | |
| | 150 | 1.353 | 1.393 | 4.00 | | 2.00 | | 0.88 | | | | |
| | 151 | 1.393 | 1.418 | 4.00 | | 2.00 | | 0.88 | | | | |

TABLE 6C-continued

| | | | | |
|---|---|---|---|---|
| 152 | 1.418 | 1.437 | 4.00 | 2.00 | 0.88 |
| 153 | 1.437 | 1.452 | 4.00 | 2.00 | 0.88 |
| 154 | 1.452 | 1.465 | 4.00 | 2.00 | 0.88 |
| 155 | 1.465 | 1.476 | 4.00 | 2.00 | 0.88 |
| 156 | 1.476 | 1.486 | 4.00 | 2.00 | 0.88 |
| 157 | 1.486 | 1.495 | 4.00 | 2.00 | 0.88 |

Figure 6B:
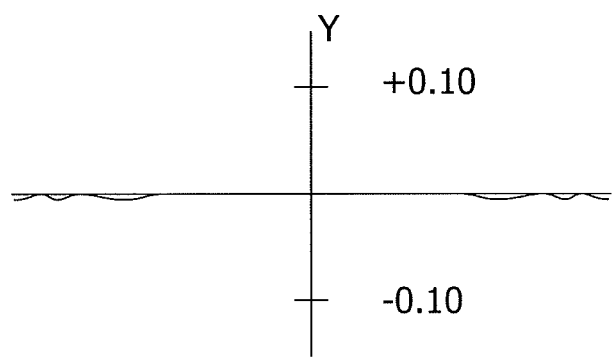
Figure 6C:
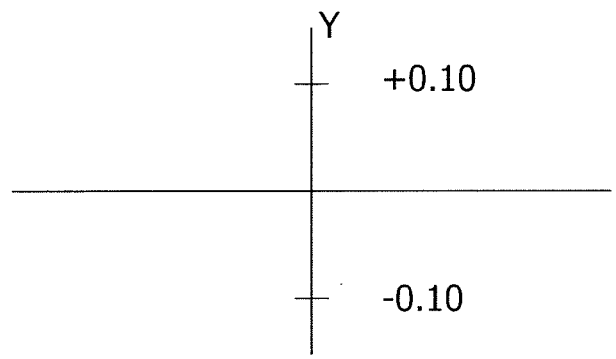

FIG. 6A is a graph illustrating a wavefront aberration cased when the optical disc OD1 is used in the optical information recording/reproducing apparatus 100 according to the first example, FIG. 6B is a graph illustrating a wavefront aberration cased when the optical disc OD2 is used in the optical information recording/reproducing apparatus 100 according to the first example, and FIG. 6C is a graph illustrating a wavefront aberration cased when the optical disc OD3 is used in the optical information recording/reproducing apparatus 100 according to the first example. In each of FIGS. 6A, 6B and 6C, the vertical axis represents the amount wavefront aberration, and the horizontal axis represents the coordinate of the entrance pupil.

Second Example

Figure 7A:
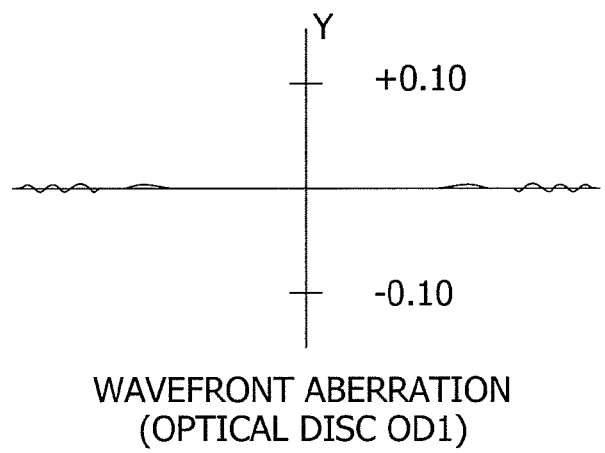
FIGS. 7A to 7C are graphs illustrating wavefront aberrations caused when respective optical discs are used in the optical information recording/reproducing apparatus according to a second example of the invention.
Figure 7B:
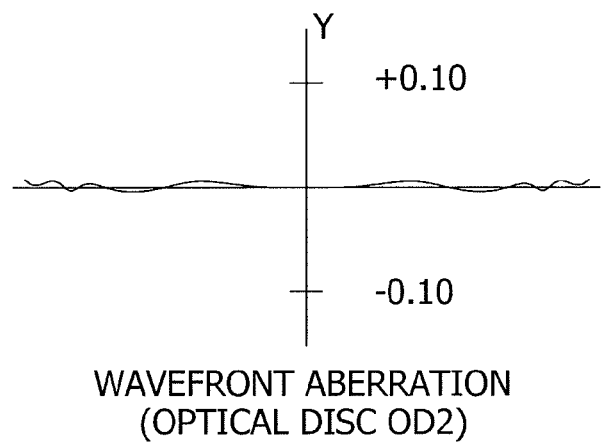
Figure 7C:
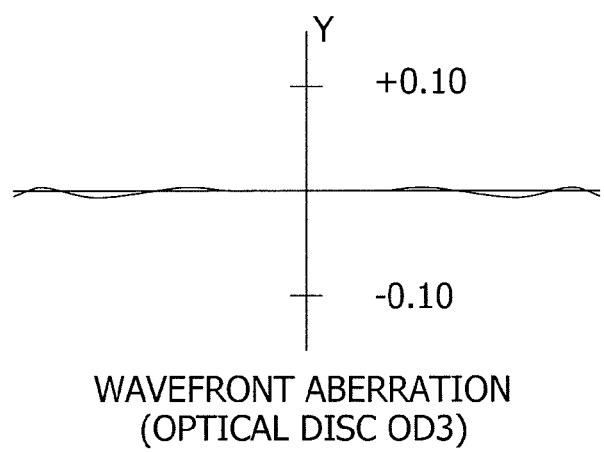

Hereafter, a second example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the second example are shown in Tables 7 to 11 and 12A to 12C. The wavefront aberrations caused when each of the optical discs OD1 to OD3 is used in the optical information recording/reproducing apparatus 100 according to the second example are shown in FIGS. 7A to 7C, respectively.

TABLE 7

| | unit | 1st laser beam | 2nd laser beam | 3rd laser beam |
|---|---|---|---|---|
| Design Wavelength | nm | 405 | 660 | 790 |
| Focal Length | mm | 1.765 | 1.990 | 2.053 |
| NA | | 0.85 | 0.65 | 0.53 |
| Magnification | | 0.00 | 0.00 | 0.00 |

TABLE 8

| Surface No. | r | d(405 nm) | d(660 nm) | d(790 nm) | |
|---|---|---|---|---|---|
| 1-1 | 1.105 | 1.780 | | | Objective Lens |
| 1-2 | 1.050 | | | | |
| 1-3 | 1.039 | | | | |
| 2 | −3.229 | 0.724 | 0.655 | 0.345 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.56023 | 1.54044 | 1.53653 | Objective Lens |
| 1-2 | | | | |
| 1-3 | | | | |
| 2 | | | | |
| 3 | 1.62231 | 1.57961 | 1.57307 | Optical Disc |
| 4 | | | | |

TABLE 9

| | 1-1 | 1-2 | 1-3 | 2 |
|---|---|---|---|---|
| κ | −1.000 | −1.000 | −1.000 | 3.100 |
| A4 | 3.17140E−02 | −2.91700E−01 | −2.33400E−02 | 3.14670E−01 |
| A6 | 1.04200E−02 | 4.89140E−01 | 5.12560E−02 | −6.04070E−01 |
| A8 | −1.26060E−03 | −2.22700E−01 | −2.77250E−02 | 1.06890E+00 |
| A10 | −1.41370E−03 | 2.26340E−02 | 3.53320E−02 | −1.23230E+00 |
| A12 | 1.01710E−03 | 4.06430E−03 | −2.96020E−02 | 8.80450E−01 |
| A14 | | | 1.30850E−02 | −3.78960E−01 |
| A16 | | | −2.25550E−03 | 9.04170E−02 |
| A18 | | | | −9.19750E−03 |
| A20 | | | | |
| A22 | | | | |
| A24 | | | | |

TABLE 10

| Diffraction Order | 1-1 1/1/1 | 1-2 1/1/— | 1-3 2/—/— |
|---|---|---|---|
| P2 | 5.57500E+01 | 7.51580E+01 | 3.02880E+01 |
| P4 | −1.37570E+01 | −2.86320E+02 | −4.99460E+01 |
| P6 | 7.03400E+00 | 4.43620E+02 | 3.04440E+01 |
| P8 | −5.26700E+00 | −2.41880E+02 | −6.61850E+00 |
| P10 | 6.53300E−01 | 4.29410E+01 | 0.00000E+00 |
| P12 | 0.00000E+00 | 0.00000E+00 | 0.00000E+00 |

TABLE 11

| Diffraction Order | 1-1 1/0/0 | 1-2 1/0/— |
|---|---|---|
| P2 | −3.49340E+01 | −2.15520E+01 |
| P4 | −5.73000E+00 | −1.85150E+02 |

TABLE 11-continued

| Diffraction Order | 1-1<br>1/0/0 | 1-2<br>1/0/— |
|---|---|---|
| P6 | −1.77800E+00 | 2.85980E+02 |
| P8 | 9.42700E−01 | −1.55790E+02 |
| P10 | −3.96600E−01 | 2.77120E+01 |
| P12 | 0.00000E+00 | 0.00000E+00 |

TABLE 12A

| | Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 D3 μm | Step Height D2 D4 μm | Annular Zone Pitch P1 P3 | Annular Zone Pitch P2 P4 | P1/P2 P3/P4 |
|---|---|---|---|---|---|---|---|---|---|---|---|---|
| First Area | 0 | 0.000 | 0.072 | | | | | | | | | |
| | 1 | 0.072 | 0.127 | | 1.31 | | 0.66 | | 0.48 | | | |
| | 2 | 0.127 | 0.166 | 2.63 | | 1.31 | | 0.95 | | | 0.094 | |
| | 3 | 0.166 | 0.198 | | 1.31 | | 0.66 | | 0.48 | 0.070 | | 0.748 |
| | 4 | 0.198 | 0.224 | 2.63 | | 1.31 | | 0.95 | | | 0.081 | |
| | 5 | 0.224 | 0.247 | | 1.31 | | 0.66 | | 0.48 | 0.071 | | 0.879 |
| | 6 | 0.247 | 0.269 | | 1.31 | | 0.66 | | 0.48 | | | |
| | 7 | 0.269 | 0.289 | 2.63 | | 1.31 | | 0.95 | | | 0.042 | |
| | 8 | 0.289 | 0.308 | | 1.31 | | 0.66 | | 0.48 | 0.039 | | 0.927 |
| | 9 | 0.308 | 0.326 | 2.63 | | 1.31 | | 0.95 | | | 0.053 | |
| | 10 | 0.326 | 0.342 | | 1.31 | | 0.66 | | 0.48 | 0.050 | | 0.950 |
| | 11 | 0.342 | 0.359 | | 1.31 | | 0.66 | | 0.48 | | | |
| | 12 | 0.359 | 0.374 | 2.63 | | 1.31 | | 0.95 | | | 0.032 | |
| | 13 | 0.374 | 0.389 | | 1.31 | | 0.66 | | 0.48 | 0.030 | | 0.953 |
| | 14 | 0.389 | 0.403 | 2.63 | | 1.31 | | 0.95 | | | 0.042 | |
| | 15 | 0.403 | 0.416 | | 1.31 | | 0.66 | | 0.48 | 0.041 | | 0.965 |
| | 16 | 0.416 | 0.430 | | 1.31 | | 0.66 | | 0.48 | | | |
| | 17 | 0.430 | 0.443 | 2.63 | | 1.31 | | 0.95 | | | 0.026 | |
| | 18 | 0.443 | 0.456 | | 1.31 | | 0.66 | | 0.48 | 0.026 | | 0.974 |
| | 19 | 0.456 | 0.468 | 2.63 | | 1.31 | | 0.95 | | | 0.025 | |
| | 20 | 0.468 | 0.480 | | 1.31 | | 0.66 | | 0.48 | 0.024 | | 0.973 |
| | 21 | 0.480 | 0.492 | 2.63 | | 1.31 | | 0.95 | | | 0.035 | |
| | 22 | 0.492 | 0.503 | | 1.31 | | 0.66 | | 0.48 | 0.034 | | 0.978 |
| | 23 | 0.503 | 0.514 | | 1.31 | | 0.66 | | 0.48 | | | |
| | 24 | 0.514 | 0.525 | 2.63 | | 1.31 | | 0.95 | | | 0.022 | |
| | 25 | 0.525 | 0.536 | | 1.31 | | 0.66 | | 0.48 | 0.022 | | 0.979 |
| | 26 | 0.536 | 0.546 | 2.63 | | 1.31 | | 0.95 | | | 0.021 | |
| | 27 | 0.546 | 0.556 | | 1.31 | | 0.66 | | 0.48 | 0.021 | | 0.983 |
| | 28 | 0.556 | 0.567 | 2.63 | | 1.31 | | 0.95 | | | 0.021 | |
| | 29 | 0.567 | 0.577 | | 1.31 | | 0.66 | | 0.48 | 0.020 | | 0.982 |
| | 30 | 0.577 | 0.587 | 2.63 | | 1.31 | | 0.95 | | | 0.029 | |
| | 31 | 0.587 | 0.596 | | 1.31 | | 0.66 | | 0.48 | 0.029 | | 0.984 |
| | 32 | 0.596 | 0.605 | | 1.31 | | 0.66 | | 0.48 | | | |
| | 33 | 0.605 | 0.615 | 2.63 | | 1.31 | | 0.95 | | | 0.019 | |
| | 34 | 0.615 | 0.624 | | 1.31 | | 0.66 | | 0.48 | 0.019 | | 0.984 |
| | 35 | 0.624 | 0.633 | 2.63 | | 1.31 | | 0.95 | | | 0.018 | |
| | 36 | 0.633 | 0.642 | | 1.31 | | 0.66 | | 0.48 | 0.018 | | 0.987 |
| | 37 | 0.642 | 0.651 | 2.63 | | 1.31 | | 0.95 | | | 0.018 | |
| | 38 | 0.651 | 0.660 | | 1.31 | | 0.66 | | 0.48 | 0.018 | | 0.989 |
| | 39 | 0.660 | 0.668 | 2.63 | | 1.31 | | 0.95 | | | 0.017 | |
| | 40 | 0.668 | 0.677 | | 1.31 | | 0.66 | | 0.48 | 0.017 | | 0.988 |
| | 41 | 0.677 | 0.685 | 2.63 | | 1.31 | | 0.95 | | | 0.017 | |
| | 42 | 0.685 | 0.694 | | 1.31 | | 0.66 | | 0.48 | 0.017 | | 0.987 |
| | 43 | 0.694 | 0.702 | 2.63 | | 1.31 | | 0.95 | | | 0.017 | |
| | 44 | 0.702 | 0.710 | | 1.31 | | 0.66 | | 0.48 | 0.016 | | 0.988 |
| | 45 | 0.710 | 0.718 | 2.63 | | 1.31 | | 0.95 | | | 0.024 | |
| | 46 | 0.718 | 0.726 | | 1.31 | | 0.66 | | 0.48 | 0.024 | | 0.990 |
| | 47 | 0.726 | 0.734 | | 1.31 | | 0.66 | | 0.48 | | | |
| | 48 | 0.734 | 0.742 | 2.63 | | 1.31 | | 0.95 | | | 0.016 | |
| | 49 | 0.742 | 0.750 | | 1.31 | | 0.66 | | 0.48 | 0.016 | | 0.989 |
| | 50 | 0.750 | 0.757 | 2.63 | | 1.31 | | 0.95 | | | 0.015 | |
| | 51 | 0.757 | 0.765 | | 1.31 | | 0.66 | | 0.48 | 0.015 | | 0.991 |
| | 52 | 0.765 | 0.773 | 2.63 | | 1.31 | | 0.95 | | | 0.015 | |
| | 53 | 0.773 | 0.780 | | 1.31 | | 0.66 | | 0.48 | 0.015 | | 0.992 |
| | 54 | 0.780 | 0.788 | 2.63 | | 1.31 | | 0.95 | | | 0.015 | |
| | 55 | 0.788 | 0.795 | | 1.31 | | 0.66 | | 0.48 | 0.015 | | 0.992 |
| | 56 | 0.795 | 0.803 | 2.63 | | 1.31 | | 0.95 | | | 0.022 | |
| | 57 | 0.803 | 0.810 | 2.63 | | 1.31 | | 0.95 | | | | | |
| | 58 | 0.810 | 0.817 | | 1.31 | | 0.66 | | 0.48 | 0.022 | | 0.984 |

TABLE 12A-continued

| | | | Phase Difference | | | | Optical Path Length | | | | Step Height | | | | Annular Zone Pitch | | | | | |
|---|---|---|---|---|---|---|---|---|---|---|---|---|---|---|---|---|---|---|---|---|---|
| | Annular Zone | Annular Zone | φ1 | φ2 | | | ΔOPD1/λ1 | ΔOPD2/λ1 | | | D1 | D2 | | | P1 | P2 | P1/P2 | | | |
| | Zone No. | Start Position mm | End Position mm | φ3 πrad | φ4 πrad | | | ΔOPD3/λ1 | ΔOPD4/λ1 | | | D3 μm | D4 μm | | | P3 | P4 | P3/P4 | | | |
| | 59 | 0.817 | 0.824 | 2.63 | | 1.31 | | 1.31 | | | | 0.95 | | | | | | | 0.014 | | |
| | 60 | 0.824 | 0.831 | | 1.31 | | 1.31 | | 0.66 | | | | 0.48 | | | 0.014 | | 1.006 | | | |

TABLE 12B

| Area | No. | Start (mm) | End (mm) | φ1 | φ3 | φ2 | φ4 | ΔOPD1/λ1 | ΔOPD3/λ1 | ΔOPD2/λ1 | ΔOPD4/λ1 | D1 | D3 | D2 | D4 | P1 | P3 | P2 | P4 | P1/P2 | P3/P4 |
|---|---|---|---|---|---|---|---|---|---|---|---|---|---|---|---|---|---|---|---|---|---|
| First Area | 61 | 0.831 | 0.838 | 2.63 | | | 1.31 | | | | | 0.95 | | | | | 0.014 | | | | |
| | 62 | 0.838 | 0.845 | | 1.31 | | 1.31 | | | 0.66 | | | | 0.48 | | 0.014 | | | | 0.992 | |
| | 63 | 0.845 | 0.852 | 2.63 | | | 1.31 | | | | | 0.95 | | | | | 0.014 | | | | |
| | 64 | 0.852 | 0.859 | | 1.31 | | 1.31 | | | 0.66 | | | | 0.48 | | 0.014 | | | | 0.992 | |
| | 65 | 0.859 | 0.866 | 2.63 | | | 1.31 | | | | | 0.95 | | | | | 0.014 | | | | |
| | 66 | 0.866 | 0.873 | | 1.31 | | 1.31 | | | 0.66 | | | | 0.48 | | 0.014 | | | | 0.993 | |
| | 67 | 0.873 | 0.879 | 2.63 | | | 1.31 | | | | | 0.95 | | | | | 0.014 | | | | |
| | 68 | 0.879 | 0.886 | | 1.31 | | 1.31 | | | 0.66 | | | | 0.48 | | 0.013 | | | | 0.995 | |
| | 69 | 0.886 | 0.893 | 2.63 | | | 1.31 | | | | | 0.95 | | | | | 0.013 | | | | |
| | 70 | 0.893 | 0.900 | | 1.31 | | 1.31 | | | 0.66 | | | | 0.48 | | 0.013 | | | | 0.994 | |
| | 71 | 0.900 | 0.906 | 2.63 | | | 1.31 | | | | | 0.95 | | | | | 0.020 | | | | |
| | 72 | 0.906 | 0.913 | 2.63 | | | 1.31 | | | | | 0.95 | | | | | | | | | |
| | 73 | 0.913 | 0.919 | | 1.31 | | 1.31 | | | 0.66 | | | | 0.48 | | 0.020 | | | | 0.995 | |
| | 74 | 0.919 | 0.926 | 2.63 | | | 1.31 | | | | | 0.95 | | | | | 0.013 | | | | |
| | 75 | 0.926 | 0.932 | | 1.31 | | 1.31 | | | 0.66 | | | | 0.48 | | 0.013 | | | | 0.993 | |
| | 76 | 0.932 | 0.939 | 2.63 | | | 1.31 | | | | | 0.95 | | | | | 0.013 | | | | |
| | 77 | 0.939 | 0.945 | | 1.31 | | 1.31 | | | 0.66 | | | | 0.48 | | 0.013 | | | | 0.993 | |
| | 78 | 0.945 | 0.952 | 2.63 | | | 1.31 | | | | | 0.95 | | | | | 0.019 | | | | |
| | 79 | 0.952 | 0.958 | 2.63 | | | 1.31 | | | | | 0.95 | | | | | | | | | |
| | 80 | 0.958 | 0.964 | | 1.31 | | 1.31 | | | 0.66 | | | | 0.48 | | 0.019 | | | | 0.995 | |
| | 81 | 0.964 | 0.971 | 2.63 | | | 1.31 | | | | | 0.95 | | | | | 0.012 | | | | |
| | 82 | 0.971 | 0.977 | | 1.31 | | 1.31 | | | 0.66 | | | | 0.48 | | 0.012 | | | | 0.996 | |
| | 83 | 0.977 | 0.983 | 2.63 | | | 1.31 | | | | | 0.95 | | | | | 0.012 | | | | |
| | 84 | 0.983 | 0.989 | | 1.31 | | 1.31 | | | 0.66 | | | | 0.48 | | 0.012 | | | | 0.994 | |
| | 85 | 0.989 | 0.995 | 2.63 | | | 1.31 | | | | | 0.95 | | | | | 0.019 | | | | |
| | 86 | 0.995 | 1.002 | 2.63 | | | 1.31 | | | | | 0.95 | | | | | | | | | |
| | 87 | 1.002 | 1.008 | | 1.31 | | 1.31 | | | 0.66 | | | | 0.48 | | 0.019 | | | | 0.996 | |
| | 88 | 1.008 | 1.014 | 2.63 | | | 1.31 | | | | | 0.95 | | | | | 0.018 | | | | |
| | 89 | 1.014 | 1.020 | 2.63 | | | 1.31 | | | | | 0.95 | | | | | | | | | |
| | 90 | 1.020 | 1.026 | | 1.31 | | 1.31 | | | 0.66 | | | | 0.48 | | 0.018 | | | | 0.996 | |
| | 91 | 1.026 | 1.032 | 2.63 | | | 1.31 | | | | | 0.95 | | | | | 0.012 | | | | |
| | 92 | 1.032 | 1.038 | | 1.31 | | 1.31 | | | 0.66 | | | | 0.48 | | 0.012 | | | | 0.995 | |
| | 93 | 1.038 | 1.044 | 2.63 | | | 1.31 | | | | | 0.95 | | | | | 0.018 | | | | |
| | 94 | 1.044 | 1.050 | 2.63 | | | 1.31 | | | | | 0.95 | | | | | | | | | |
| | 95 | 1.050 | 1.056 | | 1.31 | | 1.31 | | | 0.66 | | | | 0.48 | | 0.018 | | | | 0.997 | |
| | 96 | 1.056 | 1.062 | 2.63 | | | 1.31 | | | | | 0.95 | | | | | 0.018 | | | | |
| | 97 | 1.062 | 1.068 | 2.63 | | | 1.31 | | | | | 0.95 | | | | | | | | | |
| | 98 | 1.068 | 1.073 | | 1.31 | | 1.31 | | | 0.66 | | | | 0.48 | | 0.018 | | | | 0.996 | |
| | 99 | 1.073 | 1.079 | 2.63 | | | 1.31 | | | | | 0.95 | | | | | 0.025 | | | | |
| | 100 | 1.079 | 1.085 | 2.63 | | | 1.31 | | | | | 0.95 | | | | | | | | | |
| Second Area | 101 | 1.085 | 1.088 | 2.68 | | | 1.34 | | | | | 1.08 | | | | | | | | | |
| | 102 | 1.088 | 1.093 | | 1.34 | | 0.67 | | | | | | | 0.45 | | 0.024 | | | | 0.954 | |
| | 103 | 1.093 | 1.097 | | 1.34 | | 0.67 | | | | | | | 0.45 | | | | | | | |
| | 104 | 1.097 | 1.102 | 2.68 | | | 1.34 | | | | | 1.08 | | | | | 0.023 | | | | |
| | 105 | 1.102 | 1.107 | | 1.34 | | 0.67 | | | | | | | 0.45 | | 0.023 | | | | 0.999 | |
| | 106 | 1.107 | 1.111 | | 1.34 | | 0.67 | | | | | | | 0.45 | | | | | | | |
| | 107 | 1.111 | 1.116 | | 1.34 | | 0.67 | | | | | | | 0.45 | | | | | | | |
| | 108 | 1.116 | 1.121 | | 1.34 | | 0.67 | | | | | | | 0.45 | | | | | | | |
| | 109 | 1.121 | 1.125 | 2.68 | | | 1.34 | | | | | 1.08 | | | | | 0.019 | | | | |
| | 110 | 1.125 | 1.130 | | 1.34 | | 0.67 | | | | | | | 0.45 | | 0.019 | | | | 1.001 | |
| | 111 | 1.130 | 1.135 | | 1.34 | | 0.67 | | | | | | | 0.45 | | | | | | | |
| | 112 | 1.135 | 1.139 | | 1.34 | | 0.67 | | | | | | | 0.45 | | | | | | | |
| | 113 | 1.139 | 1.144 | 2.68 | | | 1.34 | | | | | 1.08 | | | | | 0.014 | | | | |
| | 114 | 1.144 | 1.149 | | 1.34 | | 0.67 | | | | | | | 0.45 | | 0.014 | | | | 1.002 | |
| | 115 | 1.149 | 1.153 | | 1.34 | | 0.67 | | | | | | | 0.45 | | | | | | | |
| | 116 | 1.153 | 1.158 | 2.68 | | | 1.34 | | | | | 1.08 | | | | | 0.014 | | | | |
| | 117 | 1.158 | 1.163 | | 1.34 | | 0.67 | | | | | | | 0.45 | | 0.014 | | | | 1.003 | |
| | 118 | 1.163 | 1.167 | | 1.34 | | 0.67 | | | | | | | 0.45 | | | | | | | |
| | 119 | 1.167 | 1.172 | 2.68 | | | 1.34 | | | | | 1.08 | | | | | 0.014 | | | | |
| | 120 | 1.172 | 1.177 | | 1.34 | | 0.67 | | | | | | | 0.45 | | 0.014 | | | | 1.004 | |

TABLE 12C

| | | | | | | | | | |
|---|---|---|---|---|---|---|---|---|---|
| Second Area | 121 | 1.177 | 1.182 | | 1.34 | 0.67 | 0.45 | | |
| | 122 | 1.182 | 1.187 | 2.68 | 1.34 | | 1.08 | 0.010 | |
| | 123 | 1.187 | 1.191 | | 1.34 | 0.67 | 0.45 | 0.010 | 1.005 |
| | 124 | 1.191 | 1.196 | 2.68 | 1.34 | | 1.08 | 0.010 | |
| | 125 | 1.196 | 1.201 | | 1.34 | 0.67 | 0.45 | 0.010 | 1.006 |
| | 126 | 1.201 | 1.206 | 2.68 | 1.34 | | 1.08 | 0.010 | |
| | 127 | 1.206 | 1.211 | | 1.34 | 0.67 | 0.45 | 0.010 | 1.007 |
| | 128 | 1.211 | 1.216 | 2.68 | 1.34 | | 1.08 | 0.010 | |
| | 129 | 1.216 | 1.221 | | 1.34 | 0.67 | 0.45 | 0.010 | 1.008 |
| | 130 | 1.221 | 1.226 | 2.68 | 1.34 | | 1.08 | 0.010 | |
| | 131 | 1.226 | 1.231 | | 1.34 | 0.67 | 0.45 | 0.010 | 1.009 |
| | 132 | 1.231 | 1.236 | 2.68 | 1.34 | | 1.08 | 0.015 | |
| | 133 | 1.236 | 1.241 | 2.68 | 1.34 | | 1.08 | | |
| | 134 | 1.241 | 1.246 | | 1.34 | 0.67 | 0.45 | 0.015 | 1.011 |
| | 135 | 1.246 | 1.252 | 2.68 | 1.34 | | 1.08 | 0.027 | |
| | 136 | 1.252 | 1.257 | 2.68 | 1.34 | | 1.08 | | |
| | 137 | 1.257 | 1.262 | 2.68 | 1.34 | | 1.08 | | |
| | 138 | 1.262 | 1.268 | 2.68 | 1.34 | | 1.08 | | |
| | 139 | 1.268 | 1.273 | | 1.34 | 0.67 | 0.45 | 0.027 | 1.015 |
| | 140 | 1.273 | 1.279 | 2.68 | 1.34 | | 1.08 | | |
| | 141 | 1.279 | 1.285 | 2.68 | 1.34 | | 1.08 | | |
| | 142 | 1.285 | 1.290 | 2.68 | 1.34 | | 1.08 | | |
| Third Area | 144 | 1.290 | 1.300 | 2.00 | | 1.00 | 0.89 | | |
| | 145 | 1.300 | 1.353 | 2.00 | | 1.00 | 0.89 | | |
| | 146 | 1.353 | 1.388 | 2.00 | | 1.00 | 0.89 | | |
| | 147 | 1.388 | 1.388 | 2.00 | | 1.00 | 0.89 | | |
| | 148 | 1.388 | 1.413 | 2.00 | | 1.00 | 0.89 | | |
| | 149 | 1.413 | 1.433 | 2.00 | | 1.00 | 0.89 | | |
| | 150 | 1.433 | 1.450 | 2.00 | | 1.00 | 0.89 | | |
| | 151 | 1.450 | 1.465 | 2.00 | | 1.00 | 0.89 | | |
| | 152 | 1.465 | 1.478 | 2.00 | | 1.00 | 0.89 | | |
| | 153 | 1.478 | 1.489 | 2.00 | | 1.00 | 0.89 | | |
| | 154 | 1.489 | 1.500 | 2.00 | | 1.00 | 0.89 | | |

Third Example

Figure 8A:
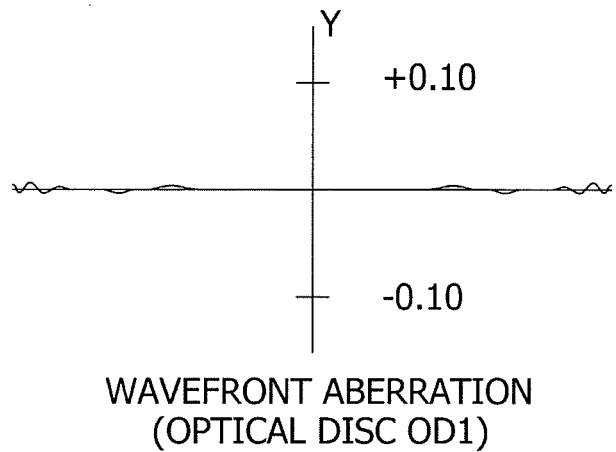
FIGS. 8A to 8C are graphs illustrating wavefront aberrations caused when respective optical discs are used in the optical information recording/reproducing apparatus according to a third example of the invention.
Figure 8B:
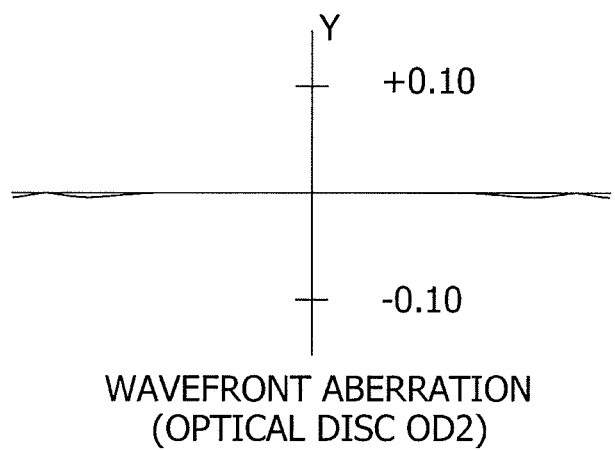
Figure 8C:
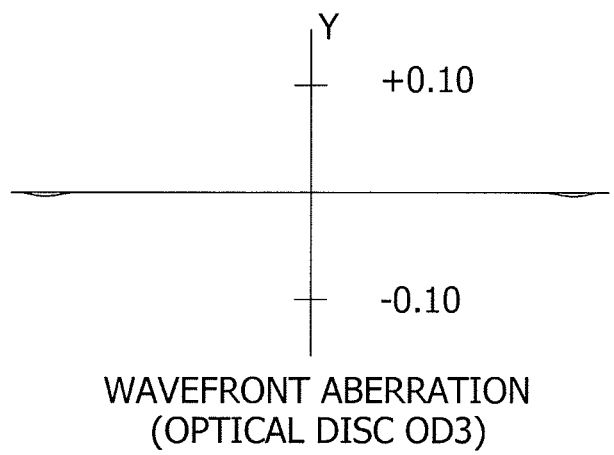

Hereafter, a third example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the third example are shown in Tables 13 to 17 and 18A to 18C. The wavefront aberrations caused when each of the optical discs OD1 to OD3 is used in the optical information recording/reproducing apparatus 100 according to the third example are shown in FIGS. 8A to 8C, respectively.

TABLE 13

| | unit | 1st laser beam | 2nd laser beam | 3rd laser beam |
|---|---|---|---|---|
| Design Wavelength | nm | 405 | 660 | 790 |
| Focal Length | mm | 1.765 | 1.990 | 2.065 |
| NA | | 0.85 | 0.65 | 0.53 |
| Magnification | | 0.00 | 0.00 | 0.00 |

TABLE 14

| Surface No. | r | d(405 nm) | d(660 nm) | d(790 nm) | |
|---|---|---|---|---|---|
| 1-1 | 1.074 | 1.950 | | | Objective Lens |
| 1-2 | 1.155 | | | | |
| 1-3 | 0.962 | | | | |
| 2 | −2.706 | 0.641 | 0.589 | 0.300 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.56023 | 1.54044 | 1.53653 | Objective Lens |
| 1-2 | | | | |
| 1-3 | | | | |
| 2 | | | | |
| 3 | 1.62231 | 1.57961 | 1.57307 | Optical Disc |
| 4 | | | | |

TABLE 15

| | 1-1 | 1-2 | 1-3 | 2 |
|---|---|---|---|---|
| κ | −1.000 | −1.000 | −1.000 | 3.100 |
| A4 | 2.70700E−02 | 8.62100E−02 | −8.34760E−02 | 4.42160E−01 |
| A6 | 2.01320E−02 | 9.10300E−05 | 7.01540E−02 | −7.04410E−01 |
| A8 | −3.61030E−03 | −1.42300E−02 | −1.12120E−02 | 1.01100E+00 |
| A10 | 1.52870E−03 | 2.71430E−03 | 8.35390E−03 | −1.10310E+00 |
| A12 | −3.25800E−04 | 9.73660E−04 | −7.80650E−03 | 8.32790E−01 |
| A14 | | | 3.79750E−03 | −3.90120E−01 |
| A16 | | | −7.52710E−04 | 9.89130E−02 |
| A18 | | | | −9.59370E−03 |

TABLE 15-continued

| κ | 1-1<br>−1.000 | 1-2<br>−1.000 | 1-3<br>−1.000 | 2<br>3.100 |
|---|---|---|---|---|
| A20 | | | | |
| A22 | | | | |
| A24 | | | | |

TABLE 16

| Diffraction Order | 1-1<br>1/1/1 | 1-2<br>1/1/— | 1-3<br>2/—/— |
|---|---|---|---|
| P2 | 7.42110E+01 | 4.74760E+01 | 6.00180E+01 |
| P4 | −1.80070E+01 | 3.31230E+01 | −9.50580E+01 |
| P6 | 1.05850E+01 | −8.79100E+00 | 5.20440E+01 |
| P8 | −3.89500E+00 | −1.53740E+01 | −1.00470E+01 |
| P10 | 6.00000E−02 | 5.33400E+00 | 0.00000E+00 |
| P12 | 0.00000E+00 | 0.00000E+00 | 0.00000E+00 |

TABLE 17

| Diffraction Order | 1-1<br>1/0/0 | 1-2<br>1/0/— |
|---|---|---|
| P2 | −2.91500E+01 | −4.75780E+01 |
| P4 | −9.11300E+00 | 2.73130E+01 |
| P6 | 6.26900E+00 | −1.00070E+01 |
| P8 | −4.21500E+00 | −9.93300E+00 |
| P10 | 5.35900E−01 | 3.76400E+00 |
| P12 | 0.00000E+00 | 0.00000E+00 |

TABLE 18A

| | Annular Zone No. | Annular Zone Start Position mm | Annular Zone End Position mm | Phase Difference φ1 φ3 πrad | φ2 φ4 πrad | Optical Path Length ΔOPD1/λ1 ΔOPD3/λ1 | ΔOPD2/λ1 ΔOPD4/λ1 | Step Height D1 D3 μm | D2 D4 μm | Annular Zone Pitch P1 P3 | P2 P4 | P1/P2 P3/P4 |
|---|---|---|---|---|---|---|---|---|---|---|---|---|
| First Area | 0 | 0.000 | 0.067 | | | | | | | | | |
| | 1 | 0.067 | 0.121 | | 1.59 | | 0.79 | | 0.57 | | | |
| | 2 | 0.121 | 0.159 | 2.30 | | 1.15 | | 0.83 | | | 0.140 | |
| | 3 | 0.159 | 0.184 | | 1.59 | | 0.79 | | 0.57 | 0.109 | | 0.783 |
| | 4 | 0.184 | 0.207 | | 1.59 | | 0.79 | | 0.57 | | | |
| | 5 | 0.207 | 0.231 | | 1.59 | | 0.79 | | 0.57 | | | |
| | 6 | 0.231 | 0.252 | 2.30 | | 1.15 | | 0.83 | | | 0.063 | |
| | 7 | 0.252 | 0.269 | | 1.59 | | 0.79 | | 0.57 | 0.057 | | 0.916 |
| | 8 | 0.269 | 0.288 | | 1.59 | | 0.79 | | 0.57 | | | |
| | 9 | 0.288 | 0.306 | 2.30 | | 1.15 | | 0.83 | | | 0.050 | |
| | 10 | 0.306 | 0.320 | | 1.59 | | 0.79 | | 0.57 | 0.048 | | 0.946 |
| | 11 | 0.320 | 0.336 | | 1.59 | | 0.79 | | 0.57 | | | |
| | 12 | 0.336 | 0.351 | 2.30 | | 1.15 | | 0.83 | | | 0.056 | |
| | 13 | 0.351 | 0.363 | | 1.59 | | 0.79 | | 0.57 | 0.053 | | 0.960 |
| | 14 | 0.363 | 0.375 | | 1.59 | | 0.79 | | 0.57 | | | |
| | 15 | 0.375 | 0.389 | | 1.59 | | 0.79 | | 0.57 | | | |
| | 16 | 0.389 | 0.402 | 2.30 | | 1.15 | | 0.83 | | | 0.038 | |
| | 17 | 0.402 | 0.413 | | 1.59 | | 0.79 | | 0.57 | 0.037 | | 0.969 |
| | 18 | 0.413 | 0.426 | | 1.59 | | 0.79 | | 0.57 | | | |
| | 19 | 0.426 | 0.438 | 2.30 | | 1.15 | | 0.83 | | | 0.035 | |
| | 20 | 0.438 | 0.448 | | 1.59 | | 0.79 | | 0.57 | 0.034 | | 0.972 |
| | 21 | 0.448 | 0.460 | | 1.59 | | 0.79 | | 0.57 | | | |
| | 22 | 0.460 | 0.471 | 2.30 | | 1.15 | | 0.83 | | | 0.032 | |
| | 23 | 0.471 | 0.481 | | 1.59 | | 0.79 | | 0.57 | 0.032 | | 0.977 |
| | 24 | 0.481 | 0.491 | | 1.59 | | 0.79 | | 0.57 | | | |
| | 25 | 0.491 | 0.502 | 2.30 | | 1.15 | | 0.83 | | | 0.030 | |
| | 26 | 0.502 | 0.511 | | 1.59 | | 0.79 | | 0.57 | 0.030 | | 0.980 |
| | 27 | 0.511 | 0.521 | | 1.59 | | 0.79 | | 0.57 | | | |
| | 28 | 0.521 | 0.531 | 2.30 | | 1.15 | | 0.83 | | | 0.029 | |
| | 29 | 0.531 | 0.540 | | 1.59 | | 0.79 | | 0.57 | 0.028 | | 0.981 |
| | 30 | 0.540 | 0.549 | | 1.59 | | 0.79 | | 0.57 | | | |
| | 31 | 0.549 | 0.559 | 2.30 | | 1.15 | | 0.83 | | | 0.027 | |
| | 32 | 0.559 | 0.567 | | 1.59 | | 0.79 | | 0.57 | 0.027 | | 0.983 |
| | 33 | 0.567 | 0.576 | | 1.59 | | 0.79 | | 0.57 | | | |
| | 34 | 0.576 | 0.585 | 2.30 | | 1.15 | | 0.83 | | | 0.026 | |
| | 35 | 0.585 | 0.593 | | 1.59 | | 0.79 | | 0.57 | 0.026 | | 0.986 |
| | 36 | 0.593 | 0.602 | | 1.59 | | 0.79 | | 0.57 | | | |
| | 37 | 0.602 | 0.611 | 2.30 | | 1.15 | | 0.83 | | | 0.025 | |
| | 38 | 0.611 | 0.618 | | 1.59 | | 0.79 | | 0.57 | 0.025 | | 0.986 |
| | 39 | 0.618 | 0.627 | | 1.59 | | 0.79 | | 0.57 | | | |
| | 40 | 0.627 | 0.635 | 2.30 | | 1.15 | | 0.83 | | | 0.024 | |
| | 41 | 0.635 | 0.642 | | 1.59 | | 0.79 | | 0.57 | 0.024 | | 0.986 |
| | 42 | 0.642 | 0.650 | | 1.59 | | 0.79 | | 0.57 | | | |
| | 43 | 0.650 | 0.659 | 2.30 | | 1.15 | | 0.83 | | | 0.016 | |
| | 44 | 0.659 | 0.667 | | 1.59 | | 0.79 | | 0.57 | 0.016 | | 0.989 |
| | 45 | 0.667 | 0.675 | 2.30 | | 1.15 | | 0.83 | | | 0.023 | |

TABLE 18A-continued

| Annular Zone No. | Annular Zone Start Position mm | Annular Zone End Position mm | φ1 φ3 πrad | φ2 φ4 πrad | ΔOPD1/λ1 ΔOPD3/λ1 | ΔOPD2/λ1 ΔOPD4/λ1 | D1 D3 μm | D2 D4 μm | P1 P3 | P2 P4 | P1/P2 P3/P4 |
|---|---|---|---|---|---|---|---|---|---|---|---|
| 46 | 0.675 | 0.681 |  | 1.59 |  | 0.79 |  | 0.57 | 0.022 |  | 0.988 |
| 47 | 0.681 | 0.689 |  | 1.59 |  | 0.79 |  | 0.57 |  |  |  |
| 48 | 0.689 | 0.697 | 2.30 |  | 1.15 |  | 0.83 |  |  | 0.022 |  |
| 49 | 0.697 | 0.703 |  | 1.59 |  | 0.79 |  | 0.57 | 0.022 |  | 0.990 |
| 50 | 0.703 | 0.711 |  | 1.59 |  | 0.79 |  | 0.57 |  |  |  |
| 51 | 0.711 | 0.718 | 2.30 |  | 1.15 |  | 0.83 |  |  | 0.021 |  |
| 52 | 0.718 | 0.724 |  | 1.59 |  | 0.79 |  | 0.57 | 0.021 |  | 0.989 |
| 53 | 0.724 | 0.732 |  | 1.59 |  | 0.79 |  | 0.57 |  |  |  |
| 54 | 0.732 | 0.739 | 2.30 |  | 1.15 |  | 0.83 |  |  | 0.022 |  |
| 55 | 0.739 | 0.746 |  | 1.59 |  | 0.79 |  | 0.57 | 0.014 |  | 0.664 |
| 56 | 0.746 | 0.753 | 2.30 |  | 1.15 |  | 0.83 |  |  | 0.020 |  |
| 57 | 0.753 | 0.759 |  | 1.59 |  | 0.79 |  | 0.57 | 0.020 |  | 0.990 |
| 58 | 0.759 | 0.766 |  | 1.59 |  | 0.79 |  | 0.57 |  |  |  |
| 59 | 0.766 | 0.773 | 2.30 |  | 1.15 |  | 0.83 |  |  | 0.020 |  |
| 60 | 0.773 | 0.779 |  | 1.59 |  | 0.79 |  | 0.57 | 0.020 |  | 0.992 |

TABLE 18B

| | Annular Zone No. | Start Position mm | End Position mm | φ1 φ3 | φ2 φ4 | ΔOPD1/λ1 ΔOPD3/λ1 | ΔOPD2/λ1 ΔOPD4/λ1 | D1 D3 | D2 D4 | P1 P3 | P2 P4 | P1/P2 P3/P4 |
|---|---|---|---|---|---|---|---|---|---|---|---|---|
| First Area | 61 | 0.779 | 0.786 |  | 1.59 |  | 0.79 |  | 0.57 |  |  |  |
|  | 62 | 0.786 | 0.793 | 2.30 |  | 1.15 |  | 0.83 |  |  | 0.014 |  |
|  | 63 | 0.793 | 0.799 |  | 1.59 |  | 0.79 |  | 0.57 | 0.013 |  | 0.990 |
|  | 64 | 0.799 | 0.806 | 2.30 |  | 1.15 |  | 0.83 |  |  | 0.019 |  |
|  | 65 | 0.806 | 0.812 |  | 1.59 |  | 0.79 |  | 0.57 | 0.019 |  | 0.992 |
|  | 66 | 0.812 | 0.818 |  | 1.59 |  | 0.79 |  | 0.57 |  |  |  |
|  | 67 | 0.818 | 0.825 | 2.30 |  | 1.15 |  | 0.83 |  |  | 0.018 |  |
|  | 68 | 0.825 | 0.830 |  | 1.59 |  | 0.79 |  | 0.57 | 0.018 |  | 0.992 |
|  | 69 | 0.830 | 0.836 |  | 1.59 |  | 0.79 |  | 0.57 |  |  |  |
|  | 70 | 0.836 | 0.843 | 2.30 |  | 1.15 |  | 0.83 |  |  | 0.013 |  |
|  | 71 | 0.843 | 0.849 |  | 1.59 |  | 0.79 |  | 0.57 | 0.013 |  | 0.992 |
|  | 72 | 0.849 | 0.855 | 2.30 |  | 1.15 |  | 0.83 |  |  | 0.018 |  |
|  | 73 | 0.855 | 0.861 |  | 1.59 |  | 0.79 |  | 0.57 | 0.018 |  | 0.993 |
|  | 74 | 0.861 | 0.867 |  | 1.59 |  | 0.79 |  | 0.57 |  |  |  |
|  | 75 | 0.867 | 0.873 | 2.30 |  | 1.15 |  | 0.83 |  |  | 0.012 |  |
|  | 76 | 0.873 | 0.879 |  | 1.59 |  | 0.79 |  | 0.57 | 0.012 |  | 0.992 |
|  | 77 | 0.879 | 0.885 | 2.30 |  | 1.15 |  | 0.83 |  |  | 0.017 |  |
|  | 78 | 0.885 | 0.890 |  | 1.59 |  | 0.79 |  | 0.57 | 0.017 |  | 0.992 |
|  | 79 | 0.890 | 0.896 |  | 1.59 |  | 0.79 |  | 0.57 |  |  |  |
|  | 80 | 0.896 | 0.902 | 2.30 |  | 1.15 |  | 0.83 |  |  | 0.012 |  |
|  | 81 | 0.902 | 0.908 |  | 1.59 |  | 0.79 |  | 0.57 | 0.012 |  | 0.993 |
|  | 82 | 0.908 | 0.914 | 2.30 |  | 1.15 |  | 0.83 |  |  | 0.017 |  |
|  | 83 | 0.914 | 0.918 |  | 1.59 |  | 0.79 |  | 0.57 | 0.016 |  | 0.993 |
|  | 84 | 0.918 | 0.924 |  | 1.59 |  | 0.79 |  | 0.57 |  |  |  |
|  | 85 | 0.924 | 0.930 | 2.30 |  | 1.15 |  | 0.83 |  |  | 0.011 |  |
|  | 86 | 0.930 | 0.936 |  | 1.59 |  | 0.79 |  | 0.57 | 0.011 |  | 0.993 |
|  | 87 | 0.936 | 0.941 | 2.30 |  | 1.15 |  | 0.83 |  |  | 0.011 |  |
|  | 88 | 0.941 | 0.947 |  | 1.59 |  | 0.79 |  | 0.57 | 0.011 |  | 0.994 |
|  | 89 | 0.947 | 0.952 | 2.30 |  | 1.15 |  | 0.83 |  |  | 0.016 |  |
|  | 90 | 0.952 | 0.957 |  | 1.59 |  | 0.79 |  | 0.57 | 0.016 |  | 0.993 |
|  | 91 | 0.957 | 0.963 |  | 1.59 |  | 0.79 |  | 0.57 |  |  |  |
|  | 92 | 0.963 | 0.968 | 2.30 |  | 1.15 |  | 0.83 |  |  | 0.011 |  |
|  | 93 | 0.968 | 0.973 |  | 1.59 |  | 0.79 |  | 0.57 | 0.011 |  | 0.993 |
|  | 94 | 0.973 | 0.979 | 2.30 |  | 1.15 |  | 0.83 |  |  | 0.011 |  |
|  | 95 | 0.979 | 0.984 |  | 1.59 |  | 0.79 |  | 0.57 | 0.011 |  | 0.994 |
|  | 96 | 0.984 | 0.989 | 2.30 |  | 1.15 |  | 0.83 |  |  | 0.015 |  |
|  | 97 | 0.989 | 0.994 |  | 1.59 |  | 0.79 |  | 0.57 | 0.015 |  | 0.994 |
|  | 98 | 0.994 | 0.999 |  | 1.59 |  | 0.79 |  | 0.57 |  |  |  |
|  | 99 | 0.999 | 1.004 | 2.30 |  | 1.15 |  | 0.83 |  |  | 0.010 |  |
|  | 100 | 1.004 | 1.010 |  | 1.59 |  | 0.79 |  | 0.57 | 0.010 |  | 0.994 |
|  | 101 | 1.010 | 1.015 | 2.30 |  | 1.15 |  | 0.83 |  |  | 0.010 |  |
|  | 102 | 1.015 | 1.020 |  | 1.59 |  | 0.79 |  | 0.57 | 0.010 |  | 0.993 |
|  | 103 | 1.020 | 1.025 | 2.30 |  | 1.15 |  | 0.83 |  |  | 0.010 |  |
|  | 104 | 1.025 | 1.030 |  | 1.59 |  | 0.79 |  | 0.57 | 0.010 |  | 0.995 |
|  | 105 | 1.030 | 1.035 | 2.30 |  | 1.15 |  | 0.83 |  |  | 0.014 |  |
|  | 106 | 1.035 | 1.039 |  | 1.59 |  | 0.79 |  | 0.57 | 0.014 |  | 0.994 |
|  | 107 | 1.039 | 1.044 |  | 1.59 |  | 0.79 |  | 0.57 |  |  |  |
|  | 108 | 1.044 | 1.049 | 2.30 |  | 1.15 |  | 0.83 |  |  | 0.010 |  |
|  | 109 | 1.049 | 1.054 |  | 1.59 |  | 0.79 |  | 0.57 | 0.010 |  | 0.994 |
|  | 110 | 1.054 | 1.059 | 2.30 |  | 1.15 |  | 0.83 |  |  | 0.010 |  |
|  | 111 | 1.059 | 1.064 |  | 1.59 |  | 0.79 |  | 0.57 | 0.010 |  | 0.995 |

TABLE 18B-continued

| Area | # | start | end | | | | | | | | | |
|---|---|---|---|---|---|---|---|---|---|---|---|---|
| | 112 | 1.064 | 1.069 | 2.30 | | 1.15 | | 0.83 | | | 0.010 | |
| | 113 | 1.069 | 1.074 | | 1.59 | | 0.79 | | 0.57 | 0.010 | | 0.994 |
| | 114 | 1.074 | 1.078 | 2.30 | | 1.15 | | 0.83 | | | 0.010 | |
| | 115 | 1.078 | 1.083 | | 1.59 | | 0.79 | | 0.57 | 0.010 | | |
| | 116 | 1.083 | 1.090 | 2.30 | | 1.15 | | 0.83 | | | | |
| Second Area | 117 | 1.090 | 1.097 | 2.25 | | 1.12 | | 0.90 | | | 0.023 | |
| | 118 | 1.097 | 1.102 | 2.25 | | 1.12 | | 0.90 | | | | |
| | 119 | 1.102 | 1.107 | | 1.64 | | 0.82 | | 0.66 | 0.023 | | 0.997 |
| | 120 | 1.107 | 1.112 | 2.25 | | 1.12 | | 0.90 | | | 0.015 | |

TABLE 18C

| Area | # | start | end | | | | | | | | | |
|---|---|---|---|---|---|---|---|---|---|---|---|---|
| Second Area | 121 | 1.112 | 1.117 | 2.25 | | 1.12 | | 0.90 | | | | |
| | 122 | 1.117 | 1.121 | | 1.64 | | 0.82 | | 0.66 | 0.015 | | 0.995 |
| | 123 | 1.121 | 1.127 | 2.25 | | 1.12 | | 0.90 | | | 0.015 | |
| | 124 | 1.127 | 1.131 | 2.25 | | 1.12 | | 0.90 | | | | |
| | 125 | 1.131 | 1.136 | | 1.64 | | 0.82 | | 0.66 | 0.015 | | 0.995 |
| | 126 | 1.136 | 1.141 | 2.25 | | 1.12 | | 0.90 | | | 0.014 | |
| | 127 | 1.141 | 1.146 | 2.25 | | 1.12 | | 0.90 | | | | |
| | 128 | 1.146 | 1.150 | | 1.64 | | 0.82 | | 0.66 | 0.014 | | 0.995 |
| | 129 | 1.150 | 1.156 | 2.25 | | 1.12 | | 0.90 | | | 0.014 | |
| | 130 | 1.156 | 1.160 | 2.25 | | 1.12 | | 0.90 | | | | |
| | 131 | 1.160 | 1.165 | | 1.64 | | 0.82 | | 0.66 | 0.014 | | 0.996 |
| | 132 | 1.165 | 1.170 | 2.25 | | 1.12 | | 0.90 | | | 0.014 | |
| | 133 | 1.170 | 1.174 | 2.25 | | 1.12 | | 0.90 | | | | |
| | 134 | 1.174 | 1.179 | | 1.64 | | 0.82 | | 0.66 | 0.014 | | 0.996 |
| | 135 | 1.179 | 1.184 | 2.25 | | 1.12 | | 0.90 | | | 0.019 | |
| | 136 | 1.184 | 1.189 | 2.25 | | 1.12 | | 0.90 | | | | |
| | 137 | 1.189 | 1.193 | 2.25 | | 1.12 | | 0.90 | | | | |
| | 138 | 1.193 | 1.198 | | 1.64 | | 0.82 | | 0.66 | 0.019 | | 0.996 |
| | 139 | 1.198 | 1.203 | 2.25 | | 1.12 | | 0.90 | | | 0.024 | |
| | 140 | 1.203 | 1.208 | 2.25 | | 1.12 | | 0.90 | | | | |
| | 141 | 1.208 | 1.213 | 2.25 | | 1.12 | | 0.90 | | | | |
| | 142 | 1.213 | 1.217 | 2.25 | | 1.12 | | 0.90 | | | | |
| | 144 | 1.217 | 1.221 | | 1.64 | | 0.82 | | 0.66 | 0.024 | | 0.996 |
| | 145 | 1.221 | 1.226 | 2.25 | | 1.12 | | 0.90 | | | 0.033 | |
| | 146 | 1.226 | 1.231 | 2.25 | | 1.12 | | 0.90 | | | | |
| | 147 | 1.231 | 1.236 | 2.25 | | 1.12 | | 0.90 | | | | |
| | 148 | 1.236 | 1.241 | 2.25 | | 1.12 | | 0.90 | | | | |
| | 149 | 1.241 | 1.246 | 2.25 | | 1.12 | | 0.90 | | | | |
| | 150 | 1.246 | 1.250 | 2.25 | | 1.12 | | 0.90 | | | | |
| | 151 | 1.250 | 1.254 | | 1.64 | | 0.82 | | 0.66 | 0.033 | | 0.996 |
| | 152 | 1.254 | 1.259 | 2.25 | | 1.12 | | 0.90 | | | | |
| | 153 | 1.259 | 1.263 | 2.25 | | 1.12 | | 0.90 | | | | |
| | 154 | 1.263 | 1.268 | 2.25 | | 1.12 | | 0.90 | | | | |
| | 155 | 1.268 | 1.274 | 2.25 | | 1.12 | | 0.90 | | | | |
| | 156 | 1.274 | 1.279 | 2.25 | | 1.12 | | 0.90 | | | | |
| | 157 | 1.279 | 1.284 | 2.25 | | 1.12 | | 0.90 | | | | |
| | 158 | 1.284 | 1.290 | 2.25 | | 1.12 | | 0.90 | | | | |
| Third Area | 159 | 1.290 | 1.327 | 4.00 | | 2.00 | | 0.86 | | | | |
| | 160 | 1.327 | 1.361 | 4.00 | | 2.00 | | 0.86 | | | | |
| | 161 | 1.361 | 1.389 | 4.00 | | 2.00 | | 0.86 | | | | |
| | 162 | 1.389 | 1.412 | 4.00 | | 2.00 | | 0.86 | | | | |
| | 163 | 1.412 | 1.431 | 4.00 | | 2.00 | | 0.86 | | | | |
| | 164 | 1.431 | 1.448 | 4.00 | | 2.00 | | 0.86 | | | | |
| | 165 | 1.448 | 1.462 | 4.00 | | 2.00 | | 0.86 | | | | |
| | 166 | 1.462 | 1.475 | 4.00 | | 2.00 | | 0.86 | | | | |
| | 167 | 1.475 | 1.486 | 4.00 | | 2.00 | | 0.86 | | | | |
| | 168 | 1.486 | 1.500 | 4.00 | | 2.00 | | 0.86 | | | | |

Fourth Example

Figure 9A:
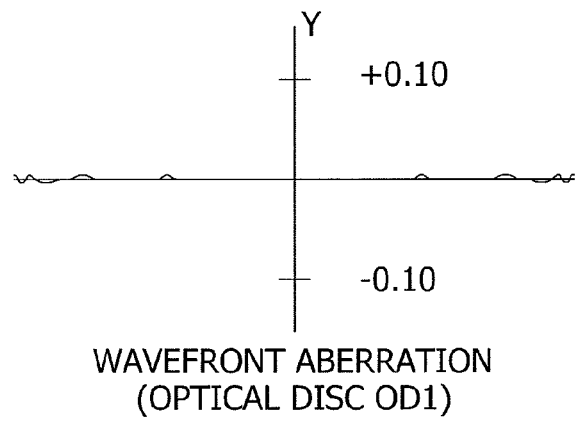
FIGS. 9A to 9C are graphs illustrating wavefront aberrations caused when respective optical discs are used in the optical information recording/reproducing apparatus according to a fourth example of the invention.
Figure 9B:
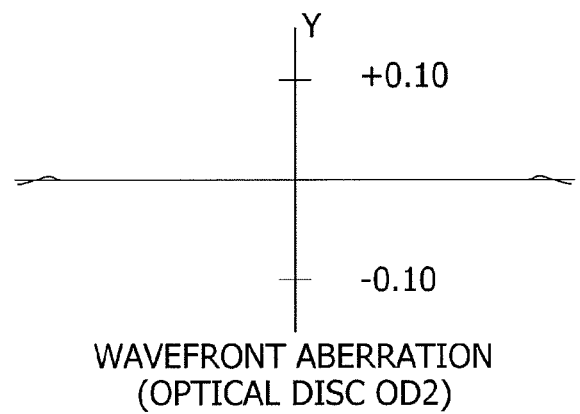
Figure 9C:
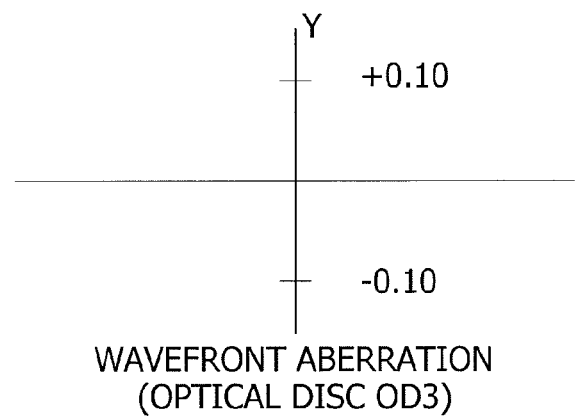

Hereafter, a fourth example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the fourth example are shown in Tables 19 to 23 and 24A to 24C. The wavefront aberrations caused when each of the optical discs OD1 to OD3 is used in the optical information recording/reproducing apparatus 100 according to the fourth example are shown in FIGS. 9A to 9C, respectively.

TABLE 19

| | unit | $1^{st}$ laser beam | $2^{nd}$ laser beam | $3^{rd}$ laser beam |
|---|---|---|---|---|
| Design Wavelength | nm | 405 | 660 | 790 |
| Focal Length | mm | 1.769 | 1.990 | 2.041 |
| NA | | 0.85 | 0.65 | 0.53 |
| Magnification | | 0.00 | 0.00 | 0.00 |

TABLE 20

| Surface No. | r | d(405 nm) | d(660 nm) | d(790 nm) | |
|---|---|---|---|---|---|
| 1-1 | 1.154 | 2.110 | | | Objective Lens |
| 1-2 | 1.149 | | | | |
| 1-3 | 0.936 | | | | |
| 2 | −2.399 | 0.554 | 0.517 | 0.201 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.56023 | 1.54044 | 1.53653 | Objective Lens |
| 1-2 | | | | |
| 1-3 | | | | |
| 2 | | | | |
| 3 | 1.62231 | 1.57961 | 1.57307 | Optical Disc |
| 4 | | | | |

TABLE 21

| | 1-1 | 1-2 | 1-3 | 2 |
|---|---|---|---|---|
| κ | −1.000 | −1.000 | −1.000 | 3.100 |
| A4 | 2.26600E−02 | −8.26030E−02 | −1.10670E−01 | 5.54800E−01 |
| A6 | 1.36540E−02 | 1.70530E−01 | 6.51190E−02 | −8.60700E−01 |
| A8 | −1.29800E−03 | −7.22300E−02 | −6.97660E−03 | 1.10520E+00 |
| A10 | 9.27250E−04 | 9.61100E−03 | 5.04510E−03 | −1.10220E+00 |
| A12 | −6.44100E−04 | 1.44600E−04 | −4.22510E−03 | 8.32800E−01 |
| A14 | | | 2.01620E−03 | −3.85130E−01 |
| A16 | | −4.02380E−04 | | 7.18230E−02 |
| A18 | | | | 6.65290E−03 |
| A20 | | | | |
| A22 | | | | |
| A24 | | | | |

TABLE 22

| Diffraction Order | 1-1<br>1/1/1 | 1-2<br>1/1/— | 1-3<br>2/—/— |
|---|---|---|---|
| P2 | 5.10310E+01 | 5.25750E+01 | 7.00300E+01 |
| P4 | −1.74740E+01 | −1.03600E+02 | −1.14880E+02 |
| P6 | 5.47100E+00 | 1.42690E+02 | 5.15700E+01 |
| P8 | −8.91800E−01 | −7.14060E+01 | −7.84700E+00 |
| P10 | −7.62500E−01 | 1.14300E+01 | 0.00000E+00 |
| P12 | 0.00000E+00 | 0.00000E+00 | 0.00000E+00 |

TABLE 23

| Diffraction Order | 1-1<br>1/0/0 | 1-2<br>1/0/— |
|---|---|---|
| P2 | −5.05620E+01 | −4.94980E+01 |
| P4 | −9.03900E+00 | −6.87640E+01 |
| P6 | 4.93600E+00 | 1.03820E+02 |
| P8 | −2.97800E+00 | −5.67320E+01 |
| P10 | −3.44400E−02 | 9.91000E+00 |
| P12 | 0.00000E+00 | 0.00000E+00 |

TABLE 24A

| | Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 D3 μm | Step Height D2 D4 μm | Annular Zone Pitch P1 P3 | Annular Zone Pitch P2 P4 | P1/P2 P3/P4 |
|---|---|---|---|---|---|---|---|---|---|---|---|---|
| First Area | 0 | 0.000 | 0.064 | | | | | | | | | |
| | 1 | 0.064 | 0.113 | | 1.39 | | 0.69 | | 0.50 | | | |
| | 2 | 0.113 | 0.165 | 2.19 | | 1.10 | | 0.79 | | | 0.130 | |
| | 3 | 0.165 | 0.193 | 2.19 | | 1.10 | | 0.79 | | | | |
| | 4 | 0.193 | 0.217 | | 1.39 | | 0.69 | | 0.50 | 0.103 | | 0.799 |
| | 5 | 0.217 | 0.237 | 2.19 | | 1.10 | | 0.79 | | | 0.044 | |
| | 6 | 0.237 | 0.258 | | 1.39 | | 0.69 | | 0.50 | 0.041 | | 0.937 |
| | 7 | 0.258 | 0.276 | 2.19 | | 1.10 | | 0.79 | | | 0.039 | |
| | 8 | 0.276 | 0.293 | | 1.39 | | 0.69 | | 0.50 | 0.035 | | 0.894 |
| | 9 | 0.293 | 0.310 | 2.19 | | 1.10 | | 0.79 | | | 0.034 | |
| | 10 | 0.310 | 0.324 | | 1.39 | | 0.69 | | 0.50 | 0.032 | | 0.935 |
| | 11 | 0.324 | 0.339 | 2.19 | | 1.10 | | 0.79 | | | 0.030 | |
| | 12 | 0.339 | 0.353 | | 1.39 | | 0.69 | | 0.50 | 0.029 | | 0.972 |
| | 13 | 0.353 | 0.367 | 2.19 | | 1.10 | | 0.79 | | | 0.027 | |

TABLE 24A-continued

| Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 D3 μm | Step Height D2 D4 μm | Annular Zone Pitch P1 P3 | Annular Zone Pitch P2 P4 | P1/P2 P3/P4 |
|---|---|---|---|---|---|---|---|---|---|---|---|
| 14 | 0.367 | 0.380 |  | 1.39 |  | 0.69 |  | 0.50 | 0.027 |  | 0.973 |
| 15 | 0.380 | 0.392 | 2.19 |  | 1.10 |  | 0.79 |  |  | 0.026 |  |
| 16 | 0.392 | 0.405 |  | 1.39 |  | 0.69 |  | 0.50 | 0.025 |  | 0.960 |
| 17 | 0.405 | 0.417 | 2.19 |  | 1.10 |  | 0.79 |  |  | 0.024 |  |
| 18 | 0.417 | 0.428 |  | 1.39 |  | 0.69 |  | 0.50 | 0.023 |  | 0.960 |
| 19 | 0.428 | 0.439 | 2.19 |  | 1.10 |  | 0.79 |  |  | 0.023 |  |
| 20 | 0.439 | 0.450 |  | 1.39 |  | 0.69 |  | 0.50 | 0.022 |  | 0.978 |
| 21 | 0.450 | 0.466 | 2.19 |  | 1.10 |  | 0.79 |  |  | 0.037 |  |
| 22 | 0.466 | 0.477 | 2.19 |  | 1.10 |  | 0.79 |  |  |  |  |
| 23 | 0.477 | 0.487 |  | 1.39 |  | 0.69 |  | 0.50 | 0.036 |  | 0.976 |
| 24 | 0.487 | 0.497 | 2.19 |  | 1.10 |  | 0.79 |  |  | 0.020 |  |
| 25 | 0.497 | 0.506 |  | 1.39 |  | 0.69 |  | 0.50 | 0.020 |  | 0.989 |
| 26 | 0.506 | 0.516 | 2.19 |  | 1.10 |  | 0.79 |  |  | 0.019 |  |
| 27 | 0.516 | 0.525 |  | 1.39 |  | 0.69 |  | 0.50 | 0.019 |  | 0.991 |
| 28 | 0.525 | 0.534 | 2.19 |  | 1.10 |  | 0.79 |  |  | 0.019 |  |
| 29 | 0.534 | 0.543 |  | 1.39 |  | 0.69 |  | 0.50 | 0.018 |  | 0.978 |
| 30 | 0.543 | 0.556 | 2.19 |  | 1.10 |  | 0.79 |  |  | 0.031 |  |
| 31 | 0.556 | 0.565 | 2.19 |  | 1.10 |  | 0.79 |  |  |  |  |
| 32 | 0.565 | 0.574 |  | 1.39 |  | 0.69 |  | 0.50 | 0.031 |  | 0.989 |
| 33 | 0.574 | 0.582 | 2.19 |  | 1.10 |  | 0.79 |  |  | 0.017 |  |
| 34 | 0.582 | 0.590 |  | 1.39 |  | 0.69 |  | 0.50 | 0.017 |  | 0.974 |
| 35 | 0.590 | 0.598 | 2.19 |  | 1.10 |  | 0.79 |  |  | 0.016 |  |
| 36 | 0.598 | 0.606 |  | 1.39 |  | 0.69 |  | 0.50 | 0.016 |  | 0.984 |
| 37 | 0.606 | 0.618 | 2.19 |  | 1.10 |  | 0.79 |  |  | 0.028 |  |
| 38 | 0.618 | 0.626 | 2.19 |  | 1.10 |  | 0.79 |  |  |  |  |
| 39 | 0.626 | 0.634 |  | 1.39 |  | 0.69 |  | 0.50 | 0.027 |  | 0.987 |
| 40 | 0.634 | 0.641 | 2.19 |  | 1.10 |  | 0.79 |  |  | 0.015 |  |
| 41 | 0.641 | 0.649 |  | 1.39 |  | 0.69 |  | 0.50 | 0.015 |  | 1.001 |
| 42 | 0.649 | 0.660 | 2.19 |  | 1.10 |  | 0.79 |  |  | 0.026 |  |
| 43 | 0.660 | 0.667 | 2.19 |  | 1.10 |  | 0.79 |  |  |  |  |
| 44 | 0.667 | 0.674 |  | 1.39 |  | 0.69 |  | 0.50 | 0.025 |  | 0.979 |
| 45 | 0.674 | 0.681 | 2.19 |  | 1.10 |  | 0.79 |  |  | 0.014 |  |
| 46 | 0.681 | 0.688 |  | 1.39 |  | 0.69 |  | 0.50 | 0.014 |  | 0.994 |
| 47 | 0.688 | 0.699 | 2.19 |  | 1.10 |  | 0.79 |  |  | 0.024 |  |
| 48 | 0.699 | 0.705 | 2.19 |  | 1.10 |  | 0.79 |  |  |  |  |
| 49 | 0.705 | 0.712 |  | 1.39 |  | 0.69 |  | 0.50 | 0.024 |  | 0.993 |
| 50 | 0.712 | 0.719 | 2.19 |  | 1.10 |  | 0.79 |  |  | 0.014 |  |
| 51 | 0.719 | 0.725 |  | 1.39 |  | 0.69 |  | 0.50 | 0.013 |  | 0.974 |
| 52 | 0.725 | 0.735 | 2.19 |  | 1.10 |  | 0.79 |  |  | 0.023 |  |
| 53 | 0.735 | 0.742 | 2.19 |  | 1.10 |  | 0.79 |  |  |  |  |
| 54 | 0.742 | 0.748 |  | 1.39 |  | 0.69 |  | 0.50 | 0.023 |  | 0.997 |
| 55 | 0.748 | 0.758 | 2.19 |  | 1.10 |  | 0.79 |  |  | 0.022 |  |
| 56 | 0.758 | 0.764 | 2.19 |  | 1.10 |  | 0.79 |  |  |  |  |
| 57 | 0.764 | 0.770 |  | 1.39 |  | 0.69 |  | 0.50 | 0.022 |  | 0.987 |
| 58 | 0.770 | 0.776 | 2.19 |  | 1.10 |  | 0.79 |  |  | 0.012 |  |
| 59 | 0.776 | 0.782 |  | 1.39 |  | 0.69 |  | 0.50 | 0.012 |  | 1.001 |
| 60 | 0.782 | 0.791 | 2.19 |  | 1.10 |  | 0.79 |  |  | 0.021 |  |

TABLE 24B

| | No. | Start | End | φ1 φ3 | φ2 φ4 | ΔOPD1/λ1 ΔOPD3/λ1 | ΔOPD2/λ1 ΔOPD4/λ1 | D1 D3 | D2 D4 | P1 P3 | P2 P4 | P1/P2 P3/P4 |
|---|---|---|---|---|---|---|---|---|---|---|---|---|
| First Area | 61 | 0.791 | 0.797 | 2.19 |  | 1.10 |  | 0.79 |  |  |  |  |
|  | 62 | 0.797 | 0.803 |  | 1.39 |  | 0.69 |  | 0.50 | 0.021 |  | 0.988 |
|  | 63 | 0.803 | 0.812 | 2.19 |  | 1.10 |  | 0.79 |  |  | 0.020 |  |
|  | 64 | 0.812 | 0.818 | 2.19 |  | 1.10 |  | 0.79 |  |  |  |  |
|  | 65 | 0.818 | 0.823 |  | 1.39 |  | 0.69 |  | 0.50 | 0.020 |  | 0.993 |
|  | 66 | 0.823 | 0.832 | 2.19 |  | 1.10 |  | 0.79 |  |  | 0.020 |  |
|  | 67 | 0.832 | 0.838 | 2.19 |  | 1.10 |  | 0.79 |  |  |  |  |
|  | 68 | 0.838 | 0.843 |  | 1.39 |  | 0.69 |  | 0.50 | 0.020 |  | 0.971 |
|  | 69 | 0.843 | 0.849 | 2.19 |  | 1.10 |  | 0.79 |  |  | 0.011 |  |
|  | 70 | 0.849 | 0.854 |  | 1.39 |  | 0.69 |  | 0.50 | 0.011 |  | 1.032 |
|  | 71 | 0.854 | 0.862 | 2.19 |  | 1.10 |  | 0.79 |  |  | 0.019 |  |
|  | 72 | 0.862 | 0.868 | 2.19 |  | 1.10 |  | 0.79 |  |  |  |  |
|  | 73 | 0.868 | 0.873 |  | 1.39 |  | 0.69 |  | 0.50 | 0.019 |  | 0.996 |
|  | 74 | 0.873 | 0.881 | 2.19 |  | 1.10 |  | 0.79 |  |  | 0.019 |  |
|  | 75 | 0.881 | 0.886 | 2.19 |  | 1.10 |  | 0.79 |  |  |  |  |
|  | 76 | 0.886 | 0.891 |  | 1.39 |  | 0.69 |  | 0.50 | 0.018 |  | 0.991 |
|  | 77 | 0.891 | 0.899 | 2.19 |  | 1.10 |  | 0.79 |  |  | 0.018 |  |
|  | 78 | 0.899 | 0.904 | 2.19 |  | 1.10 |  | 0.79 |  |  |  |  |
|  | 79 | 0.904 | 0.909 |  | 1.39 |  | 0.69 |  | 0.50 | 0.018 |  | 0.988 |

TABLE 24B-continued

| Area | # | | | | | | | | | | | |
|---|---|---|---|---|---|---|---|---|---|---|---|---|
| | 80 | 0.909 | 0.917 | 2.19 | | 1.10 | | 0.79 | | | 0.018 | |
| | 81 | 0.917 | 0.922 | 2.19 | | 1.10 | | 0.79 | | | | |
| | 82 | 0.922 | 0.927 | | 1.39 | | 0.69 | | 0.50 | 0.018 | | 0.992 |
| | 83 | 0.927 | 0.934 | 2.19 | | 1.10 | | 0.79 | | | 0.025 | |
| | 84 | 0.934 | 0.942 | 2.19 | | 1.10 | | 0.79 | | | | |
| | 85 | 0.942 | 0.947 | 2.19 | | 1.10 | | 0.79 | | | | |
| | 86 | 0.947 | 0.951 | | 1.39 | | 0.69 | | 0.50 | 0.024 | | 0.993 |
| | 87 | 0.951 | 0.958 | 2.19 | | 1.10 | | 0.79 | | | 0.017 | |
| | 88 | 0.958 | 0.963 | 2.19 | | 1.10 | | 0.79 | | | | |
| | 89 | 0.963 | 0.968 | | 1.39 | | 0.69 | | 0.50 | 0.017 | | 0.998 |
| | 90 | 0.968 | 0.975 | 2.19 | | 1.10 | | 0.79 | | | 0.016 | |
| | 91 | 0.975 | 0.979 | 2.19 | | 1.10 | | 0.79 | | | | |
| | 92 | 0.979 | 0.984 | | 1.39 | | 0.69 | | 0.50 | 0.016 | | 0.991 |
| | 93 | 0.984 | 0.991 | 2.19 | | 1.10 | | 0.79 | | | 0.023 | |
| | 94 | 0.991 | 0.998 | 2.19 | | 1.10 | | 0.79 | | | | |
| | 95 | 0.998 | 1.002 | 2.19 | | 1.10 | | 0.79 | | | | |
| | 96 | 1.002 | 1.007 | | 1.39 | | 0.69 | | 0.50 | 0.023 | | 0.997 |
| | 97 | 1.007 | 1.013 | 2.19 | | 1.10 | | 0.79 | | | 0.022 | |
| | 98 | 1.013 | 1.020 | 2.19 | | 1.10 | | 0.79 | | | | |
| | 99 | 1.020 | 1.024 | 2.19 | | 1.10 | | 0.79 | | | | |
| | 100 | 1.024 | 1.028 | | 1.39 | | 0.69 | | 0.50 | 0.022 | | 0.993 |
| | 101 | 1.028 | 1.035 | 2.19 | | 1.10 | | 0.79 | | | 0.021 | |
| | 102 | 1.035 | 1.041 | 2.19 | | 1.10 | | 0.79 | | | | |
| | 103 | 1.041 | 1.046 | 2.19 | | 1.10 | | 0.79 | | | | |
| | 104 | 1.046 | 1.050 | | 1.39 | | 0.69 | | 0.50 | 0.021 | | 0.993 |
| | 105 | 1.050 | 1.056 | 2.19 | | 1.10 | | 0.79 | | | 0.021 | |
| | 106 | 1.056 | 1.062 | 2.19 | | 1.10 | | 0.79 | | | | |
| | 107 | 1.062 | 1.066 | 2.19 | | 1.10 | | 0.79 | | | | |
| | 108 | 1.066 | 1.070 | | 1.39 | | 0.69 | | 0.50 | 0.021 | | 0.995 |
| | 109 | 1.070 | 1.078 | 2.19 | | 1.10 | | 0.79 | | | 0.011 | |
| | 110 | 1.078 | 1.085 | | 1.39 | | 0.69 | | 0.50 | 0.012 | | 1.041 |
| Second Area | 111 | 1.085 | 1.090 | 2.19 | | 1.10 | | 0.87 | | | | |
| | 112 | 1.090 | 1.095 | 2.19 | | 1.10 | | 0.87 | | | 0.017 | |
| | 113 | 1.095 | 1.099 | | 1.39 | | 0.69 | | 0.55 | 0.017 | | 0.988 |
| | 114 | 1.099 | 1.103 | 2.19 | | 1.10 | | 0.87 | | | 0.009 | |
| | 115 | 1.103 | 1.107 | | 1.39 | | 0.69 | | 0.55 | 0.008 | | 0.993 |
| | 116 | 1.107 | 1.112 | 2.19 | | 1.10 | | 0.87 | | | 0.008 | |
| | 117 | 1.112 | 1.116 | | 1.39 | | 0.69 | | 0.55 | 0.008 | | 0.993 |
| | 118 | 1.116 | 1.120 | 2.19 | | 1.10 | | 0.87 | | | 0.008 | |
| | 119 | 1.120 | 1.124 | | 1.39 | | 0.69 | | 0.55 | 0.008 | | 0.993 |
| | 120 | 1.124 | 1.130 | 2.19 | | 1.10 | | 0.87 | | | 0.014 | |

TABLE 24C

| Area | # | | | | | | | | | | | |
|---|---|---|---|---|---|---|---|---|---|---|---|---|
| Second Area | 121 | 1.130 | 1.134 | 2.19 | | 1.10 | | 0.87 | | | | |
| | 122 | 1.134 | 1.138 | | 1.39 | | 0.69 | | 0.55 | 0.014 | | 0.993 |
| | 123 | 1.138 | 1.142 | 2.19 | | 1.10 | | 0.87 | | | 0.008 | |
| | 124 | 1.142 | 1.146 | | 1.39 | | 0.69 | | 0.55 | 0.008 | | 0.993 |
| | 125 | 1.146 | 1.152 | 2.19 | | 1.10 | | 0.87 | | | 0.014 | |
| | 126 | 1.152 | 1.156 | 2.19 | | 1.10 | | 0.87 | | | | |
| | 127 | 1.156 | 1.160 | | 1.39 | | 0.69 | | 0.55 | 0.014 | | 0.999 |
| | 128 | 1.160 | 1.164 | 2.19 | | 1.10 | | 0.87 | | | 0.008 | |
| | 129 | 1.164 | 1.168 | | 1.39 | | 0.69 | | 0.55 | 0.008 | | 0.982 |
| | 130 | 1.168 | 1.173 | 2.19 | | 1.10 | | 0.87 | | | 0.013 | |
| | 131 | 1.173 | 1.177 | 2.19 | | 1.10 | | 0.87 | | | | |
| | 132 | 1.177 | 1.181 | | 1.39 | | 0.69 | | 0.55 | 0.013 | | 0.993 |
| | 133 | 1.181 | 1.184 | 2.19 | | 1.10 | | 0.87 | | | 0.007 | |
| | 134 | 1.184 | 1.188 | | 1.39 | | 0.69 | | 0.55 | 0.007 | | 0.992 |
| | 135 | 1.188 | 1.194 | 2.19 | | 1.10 | | 0.87 | | | 0.013 | |
| | 136 | 1.194 | 1.197 | 2.19 | | 1.10 | | 0.87 | | | | |
| | 137 | 1.197 | 1.201 | | 1.39 | | 0.69 | | 0.55 | 0.013 | | 0.993 |
| | 138 | 1.201 | 1.206 | 2.19 | | 1.10 | | 0.87 | | | 0.012 | |
| | 139 | 1.206 | 1.210 | 2.19 | | 1.10 | | 0.87 | | | | |
| | 140 | 1.210 | 1.213 | | 1.39 | | 0.69 | | 0.55 | 0.012 | | 0.993 |
| | 141 | 1.213 | 1.218 | 2.19 | | 1.10 | | 0.87 | | | 0.012 | |
| | 142 | 1.218 | 1.222 | 2.19 | | 1.10 | | 0.87 | | | | |
| | 143 | 1.222 | 1.225 | | 1.39 | | 0.69 | | 0.55 | 0.012 | | 0.993 |
| | 144 | 1.225 | 1.230 | 2.19 | | 1.10 | | 0.87 | | | 0.017 | |
| | 145 | 1.230 | 1.235 | 2.19 | | 1.10 | | 0.87 | | | | |
| | 146 | 1.235 | 1.239 | 2.19 | | 1.10 | | 0.87 | | | | |
| | 147 | 1.239 | 1.242 | | 1.39 | | 0.69 | | 0.55 | 0.017 | | 0.993 |
| | 148 | 1.242 | 1.247 | 2.19 | | 1.10 | | 0.87 | | | 0.011 | |
| | 149 | 1.247 | 1.250 | 2.19 | | 1.10 | | 0.87 | | | | |
| | 150 | 1.250 | 1.253 | | 1.39 | | 0.69 | | 0.55 | 0.011 | | 0.993 |
| | 151 | 1.253 | 1.258 | 2.19 | | 1.10 | | 0.87 | | | 0.019 | |
| | 152 | 1.258 | 1.263 | 2.19 | | 1.10 | | 0.87 | | | | |
| | 153 | 1.263 | 1.268 | 2.19 | | 1.10 | | 0.87 | | | | |

TABLE 24C-continued

| | | | | | | | | |
|---|---|---|---|---|---|---|---|---|
| | 154 | 1.268 | 1.270 | 2.19 | 1.10 | 0.87 | | |
| | 155 | 1.270 | 1.273 | | 1.39 | 0.69 | 0.55 | 0.020 | 1.017 |
| | 156 | 1.273 | 1.278 | 2.19 | 1.10 | 0.87 | | |
| | 157 | 1.278 | 1.283 | 2.19 | 1.10 | 0.87 | | |
| | 158 | 1.283 | 1.290 | 2.19 | 1.10 | 0.87 | | |
| Third Area | 159 | 1.290 | 1.295 | 4.00 | 2.00 | 0.83 | | |
| | 160 | 1.295 | 1.309 | 4.00 | 2.00 | 0.83 | | |
| | 161 | 1.309 | 1.323 | 4.00 | 2.00 | 0.83 | | |
| | 162 | 1.323 | 1.338 | 4.00 | 2.00 | 0.83 | | |
| | 163 | 1.338 | 1.352 | 4.00 | 2.00 | 0.83 | | |
| | 164 | 1.352 | 1.368 | 4.00 | 2.00 | 0.83 | | |
| | 165 | 1.368 | 1.383 | 4.00 | 2.00 | 0.83 | | |
| | 166 | 1.383 | 1.399 | 4.00 | 2.00 | 0.83 | | |
| | 167 | 1.399 | 1.415 | 4.00 | 2.00 | 0.83 | | |
| | 168 | 1.415 | 1.431 | 4.00 | 2.00 | 0.83 | | |
| | 169 | 1.431 | 1.448 | 4.00 | 2.00 | 0.83 | | |
| | 170 | 1.448 | 1.464 | 4.00 | 2.00 | 0.83 | | |
| | 171 | 1.464 | 1.481 | 4.00 | 2.00 | 0.83 | | |
| | 172 | 1.481 | 1.500 | 4.00 | 2.00 | 0.83 | | |

Fifth Example

Figure 10A:
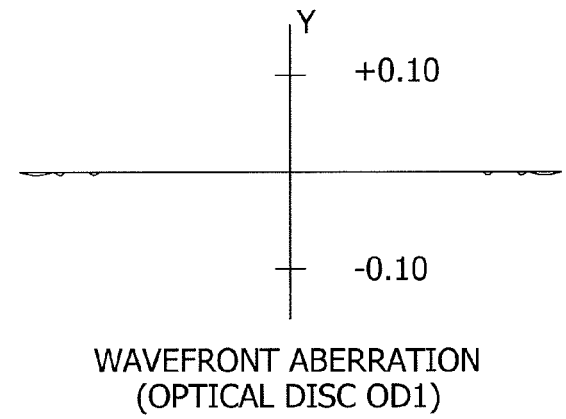
FIGS. 10A to 10C are graphs illustrating wavefront aberrations caused when respective optical discs are used in the optical information recording/reproducing apparatus according to a fifth example of the invention.
Figure 10B:
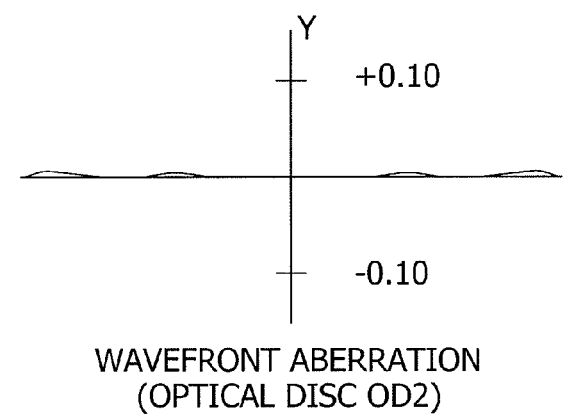
Figure 10C:
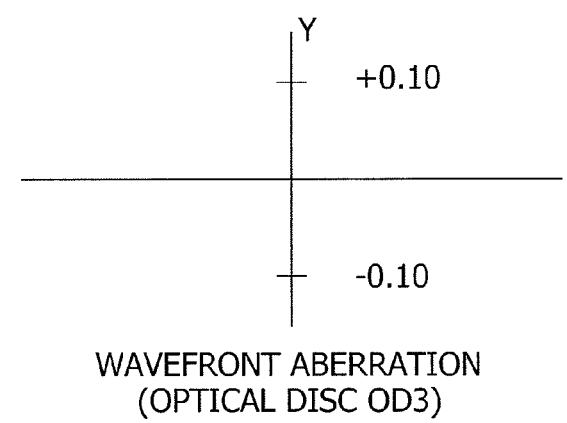

Hereafter, a fifth example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the fifth example are shown in Tables 25 to 29 and 30A and 30B. The wavefront aberrations caused when each of the optical discs OD1 to OD3 is used in the optical information recording/reproducing apparatus 100 according to the fifth example are shown in FIGS. 10A to 10C, respectively.

TABLE 25

| | unit | $1^{st}$ laser beam | $2^{nd}$ laser beam | $3^{rd}$ laser beam |
|---|---|---|---|---|
| Design Wavelength | nm | 405 | 660 | 790 |
| Focal Length | mm | 1.764 | 2.044 | 2.119 |
| NA | | 0.85 | 0.62 | 0.50 |
| Magnification | | 0.00 | 0.00 | 0.00 |

TABLE 26

| Surface No. | r | d(405 nm) | d(660 nm) | d(790 nm) | |
|---|---|---|---|---|---|
| 1-1 | 1.186 | 1.680 | | | Objective Lens |
| 1-2 | 1.201 | | | | |
| 1-3 | 1.100 | | | | |
| 2 | −9.001 | 0.752 | 0.689 | 0.379 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.65098 | 1.59978 | 1.59073 | Objective Lens |
| 1-2 | | | | |
| 1-3 | | | | |
| 2 | | | | |
| 3 | 1.62231 | 1.57961 | 1.57307 | Optical Disc |
| 4 | | | | |

TABLE 27

| κ | 1-1 −1.000 | 1-2 −1.000 | 1-3 −1.000 | 2 3.100 |
|---|---|---|---|---|
| A4 | 3.39000E−02 | −9.62700E−02 | 1.79490E−02 | 2.16910E−01 |
| A6 | 9.47600E−03 | 2.28350E−01 | 2.60340E−03 | −4.68760E−01 |
| A8 | −2.83860E−03 | −1.10000E−01 | −2.84670E−03 | 8.59730E−01 |
| A10 | 9.40900E−04 | 1.31960E−02 | 9.73240E−03 | −1.06950E+00 |
| A12 | −4.56600E−05 | 2.03100E−03 | −8.23430E−03 | 8.33790E−01 |
| A14 | | | 4.12920E−03 | −3.93780E−01 |
| A16 | | | −8.03760E−04 | 1.03440E−01 |
| A18 | | | | −1.16320E−02 |
| A20 | | | | |
| A22 | | | | |
| A24 | | | | |

TABLE 28

| Diffraction Order | 1-1 1/1/1 | 1-2 1/1/— | 1-3 2/—/— |
|---|---|---|---|
| P2 | 3.89120E+01 | 3.41270E+01 | 3.57850E+01 |
| P4 | −1.14340E+01 | −1.30400E+02 | −2.33500E+01 |
| P6 | 5.76600E+00 | 2.22700E+02 | −3.37100E+00 |
| P8 | −4.78900E+00 | −1.29100E+02 | 2.53300E+00 |
| P10 | 5.43500E−01 | 2.43190E+01 | 0.00000E+00 |
| P12 | 0.00000E+00 | 0.00000E+00 | 0.00000E+00 |

TABLE 29

| Diffraction Order | 1-1<br>1/0/0 | 1-2<br>1/0/— |
|---|---|---|
| P2 | −2.03220E+01 | −2.40000E+01 |
| P4 | −2.82600E+00 | −9.22200E+01 |
| P6 | −1.42400E+00 | 1.63320E+02 |
| P8 | −1.27200E−01 | −9.56250E+01 |
| P10 | −1.30700E−01 | 1.83210E+01 |
| P12 | 0.00000E+00 | 0.00000E+00 |

TABLE 30A

| | Annular Zone No. | Annular Zone Start Position mm | Annular Zone End Position mm | Phase Difference φ1 φ3 πrad | φ2 φ4 πrad | Optical Path Length ΔOPD1/λ1 ΔOPD3/λ1 | ΔOPD2/λ1 ΔOPD4/λ1 | Step Height D1 D3 μm | D2 D4 μm | Annular Zone Pitch P1 P3 | P2 P4 | P1/P2 P3/P4 |
|---|---|---|---|---|---|---|---|---|---|---|---|---|
| First Area | 0 | 0.000 | 0.085 | | | | | | | | | |
| | 1 | 0.085 | 0.158 | | 1.32 | | 0.66 | | 0.41 | | | |
| | 2 | 0.158 | 0.207 | 2.47 | | 1.24 | | 0.77 | | | 0.157 | |
| | 3 | 0.207 | 0.242 | | 1.32 | | 0.66 | | 0.41 | 0.118 | | 0.754 |
| | 4 | 0.242 | 0.277 | | 1.32 | | 0.66 | | 0.41 | | | |
| | 5 | 0.277 | 0.308 | 2.47 | | 1.24 | | 0.77 | | | 0.090 | |
| | 6 | 0.308 | 0.331 | | 1.32 | | 0.66 | | 0.41 | 0.081 | | 0.910 |
| | 7 | 0.331 | 0.358 | | 1.32 | | 0.66 | | 0.41 | | | |
| | 8 | 0.358 | 0.383 | 2.47 | | 1.24 | | 0.77 | | | 0.075 | |
| | 9 | 0.383 | 0.406 | | 1.32 | | 0.66 | | 0.41 | 0.048 | | 0.644 |
| | 10 | 0.406 | 0.428 | 2.47 | | 1.24 | | 0.77 | | | 0.063 | |
| | 11 | 0.428 | 0.446 | | 1.32 | | 0.66 | | 0.41 | 0.060 | | 0.951 |
| | 12 | 0.446 | 0.466 | | 1.32 | | 0.66 | | 0.41 | | | |
| | 13 | 0.466 | 0.485 | 2.47 | | 1.24 | | 0.77 | | | 0.040 | |
| | 14 | 0.485 | 0.504 | | 1.32 | | 0.66 | | 0.41 | 0.038 | | 0.963 |
| | 15 | 0.504 | 0.522 | 2.47 | | 1.24 | | 0.77 | | | 0.051 | |
| | 16 | 0.522 | 0.536 | | 1.32 | | 0.66 | | 0.41 | 0.049 | | 0.967 |
| | 17 | 0.536 | 0.553 | | 1.32 | | 0.66 | | 0.41 | | | |
| | 18 | 0.553 | 0.570 | 2.47 | | 1.24 | | 0.77 | | | 0.034 | |
| | 19 | 0.570 | 0.586 | | 1.32 | | 0.66 | | 0.41 | 0.033 | | 0.973 |
| | 20 | 0.586 | 0.602 | 2.47 | | 1.24 | | 0.77 | | | 0.044 | |
| | 21 | 0.602 | 0.614 | | 1.32 | | 0.66 | | 0.41 | 0.043 | | 0.975 |
| | 22 | 0.614 | 0.629 | | 1.32 | | 0.66 | | 0.41 | | | |
| | 23 | 0.629 | 0.644 | 2.47 | | 1.24 | | 0.77 | | | 0.030 | |
| | 24 | 0.644 | 0.658 | | 1.32 | | 0.66 | | 0.41 | 0.029 | | 0.979 |
| | 25 | 0.658 | 0.673 | 2.47 | | 1.24 | | 0.77 | | | 0.028 | |
| | 26 | 0.673 | 0.686 | | 1.32 | | 0.66 | | 0.41 | 0.028 | | 0.981 |
| | 27 | 0.686 | 0.700 | 2.47 | | 1.24 | | 0.77 | | | 0.038 | |
| | 28 | 0.700 | 0.711 | | 1.32 | | 0.66 | | 0.41 | 0.038 | | 0.982 |
| | 29 | 0.711 | 0.724 | | 1.32 | | 0.66 | | 0.41 | | | |
| | 30 | 0.724 | 0.737 | 2.47 | | 1.24 | | 0.77 | | | 0.026 | |
| | 31 | 0.737 | 0.750 | | 1.32 | | 0.66 | | 0.41 | 0.026 | | 0.984 |
| | 32 | 0.750 | 0.762 | 2.47 | | 1.24 | | 0.77 | | | 0.025 | |
| | 33 | 0.762 | 0.775 | | 1.32 | | 0.66 | | 0.41 | 0.025 | | 0.985 |
| | 34 | 0.775 | 0.787 | 2.47 | | 1.24 | | 0.77 | | | 0.025 | |
| | 35 | 0.787 | 0.799 | | 1.32 | | 0.66 | | 0.41 | 0.024 | | 0.986 |
| | 36 | 0.799 | 0.811 | 2.47 | | 1.24 | | 0.77 | | | 0.024 | |
| | 37 | 0.811 | 0.822 | | 1.32 | | 0.66 | | 0.41 | 0.024 | | 0.987 |
| | 38 | 0.822 | 0.834 | 2.47 | | 1.24 | | 0.77 | | | 0.023 | |
| | 39 | 0.834 | 0.845 | | 1.32 | | 0.66 | | 0.41 | 0.023 | | 0.988 |
| | 40 | 0.845 | 0.857 | 2.47 | | 1.24 | | 0.77 | | | 0.023 | |
| | 41 | 0.857 | 0.868 | | 1.32 | | 0.66 | | 0.41 | 0.022 | | 0.988 |
| | 42 | 0.868 | 0.879 | 2.47 | | 1.24 | | 0.77 | | | 0.022 | |
| | 43 | 0.879 | 0.890 | | 1.32 | | 0.66 | | 0.41 | 0.022 | | 0.989 |
| | 44 | 0.890 | 0.902 | 2.47 | | 1.24 | | 0.77 | | | 0.034 | |
| | 45 | 0.902 | 0.913 | 2.47 | | 1.24 | | 0.77 | | | | |
| | 46 | 0.913 | 0.924 | | 1.32 | | 0.66 | | 0.41 | 0.034 | | 0.990 |
| | 47 | 0.924 | 0.934 | 2.47 | | 1.24 | | 0.77 | | | 0.021 | |
| | 48 | 0.934 | 0.944 | | 1.32 | | 0.66 | | 0.41 | 0.021 | | 0.991 |
| | 49 | 0.944 | 0.955 | 2.47 | | 1.24 | | 0.77 | | | 0.021 | |
| | 50 | 0.955 | 0.965 | | 1.32 | | 0.66 | | 0.41 | 0.020 | | 0.991 |
| | 51 | 0.965 | 0.977 | 2.47 | | 1.24 | | 0.77 | | | 0.032 | |
| | 52 | 0.977 | 0.987 | 2.47 | | 1.24 | | 0.77 | | | | |
| | 53 | 0.987 | 0.997 | | 1.32 | | 0.66 | | 0.41 | 0.032 | | 0.991 |
| | 54 | 0.997 | 1.008 | 2.47 | | 1.24 | | 0.77 | | | 0.031 | |
| | 55 | 1.008 | 1.018 | 2.47 | | 1.24 | | 0.77 | | | | |
| | 56 | 1.018 | 1.028 | | 1.32 | | 0.66 | | 0.41 | 0.031 | | 0.992 |
| | 57 | 1.028 | 1.039 | 2.47 | | 1.24 | | 0.77 | | | 0.030 | |
| | 58 | 1.039 | 1.048 | 2.47 | | 1.24 | | 0.77 | | | | |

TABLE 30A-continued

| | | | | Phase Difference | | Optical Path Length | | Step Height | | Annular Zone Pitch | | |
|---|---|---|---|---|---|---|---|---|---|---|---|---|
| | Annular Zone No. | Annular Zone Start Position mm | Annular Zone End Position mm | φ1 φ3 πrad | φ2 φ4 πrad | ΔOPD1/λ1 ΔOPD3/λ1 | ΔOPD2/λ1 ΔOPD4/λ1 | D1 D3 μm | D2 D4 μm | P1 P3 | P2 P4 | P1/P2 P3/P4 |
| | 59 | 1.048 | 1.058 | | 1.32 | | 0.66 | | 0.41 | 0.030 | | 0.993 |
| | 60 | 1.058 | 1.069 | 2.47 | | 1.24 | | 0.77 | | | 0.050 | |

TABLE 30B

| | Zone | Start | End | φ1/φ3 | φ2/φ4 | OPD1/3 | OPD2/4 | D1/D3 | D2/D4 | P1/P3 | P2/P4 |
|---|---|---|---|---|---|---|---|---|---|---|---|
| First Area | 61 | 1.069 | 1.080 | 2.47 | | 1.24 | | 0.77 | | | |
| | 62 | 1.080 | 1.085 | 2.47 | | 1.24 | | 0.77 | | | |
| | 63 | 1.085 | 1.092 | 2.53 | | 1.27 | | 0.87 | | | |
| Second Area | 64 | 1.092 | 1.099 | | 1.44 | | 0.72 | | 0.51 | 0.051 | 1.019 |
| | 65 | 1.099 | 1.109 | | 1.44 | | 0.72 | | 0.51 | | |
| | 66 | 1.109 | 1.119 | 2.53 | | 1.27 | | 0.87 | | 0.034 | |
| | 67 | 1.119 | 1.126 | | 1.44 | | 0.72 | | 0.51 | 0.034 | 0.989 |
| | 68 | 1.126 | 1.133 | | 1.44 | | 0.72 | | 0.51 | | |
| | 69 | 1.133 | 1.143 | | 1.44 | | 0.72 | | 0.51 | | |
| | 70 | 1.143 | 1.153 | 2.53 | | 1.27 | | 0.87 | | 0.026 | |
| | 71 | 1.153 | 1.159 | | 1.44 | | 0.72 | | 0.51 | 0.026 | 0.988 |
| | 72 | 1.159 | 1.169 | | 1.44 | | 0.72 | | 0.51 | | |
| | 73 | 1.169 | 1.179 | 2.53 | | 1.27 | | 0.87 | | 0.026 | |
| | 74 | 1.179 | 1.185 | | 1.44 | | 0.72 | | 0.51 | 0.025 | 0.987 |
| | 75 | 1.185 | 1.194 | | 1.44 | | 0.72 | | 0.51 | | |
| | 76 | 1.194 | 1.204 | 2.53 | | 1.27 | | 0.87 | | 0.019 | |
| | 77 | 1.204 | 1.213 | | 1.44 | | 0.72 | | 0.51 | 0.018 | 0.987 |
| | 78 | 1.213 | 1.222 | 2.53 | | 1.27 | | 0.87 | | 0.018 | |
| | 79 | 1.222 | 1.231 | | 1.44 | | 0.72 | | 0.51 | 0.018 | 0.986 |
| | 80 | 1.231 | 1.242 | 2.53 | | 1.27 | | 0.87 | | 0.029 | |
| | 81 | 1.242 | 1.251 | 2.53 | | 1.27 | | 0.87 | | | |
| | 82 | 1.251 | 1.259 | | 1.44 | | 0.72 | | 0.51 | 0.029 | 0.986 |
| | 83 | 1.259 | 1.270 | 2.53 | | 1.27 | | 0.87 | | | |
| | 84 | 1.270 | 1.281 | 2.53 | | 1.27 | | 0.87 | | | |
| | 85 | 1.281 | 1.290 | 2.53 | | 1.27 | | 0.87 | | | |
| Third Area | 86 | 1.290 | 1.311 | 2.00 | | 1.00 | | 0.75 | | | |
| | 87 | 1.311 | 1.328 | 2.00 | | 1.00 | | 0.75 | | | |
| | 88 | 1.328 | 1.345 | 2.00 | | 1.00 | | 0.75 | | | |
| | 89 | 1.345 | 1.362 | 2.00 | | 1.00 | | 0.75 | | | |
| | 90 | 1.362 | 1.380 | 2.00 | | 1.00 | | 0.75 | | | |
| | 91 | 1.380 | 1.399 | 2.00 | | 1.00 | | 0.75 | | | |
| | 92 | 1.399 | 1.419 | 2.00 | | 1.00 | | 0.75 | | | |
| | 93 | 1.419 | 1.442 | 2.00 | | 1.00 | | 0.75 | | | |
| | 94 | 1.442 | 1.500 | 2.00 | | 1.00 | | 0.75 | | | |

Sixth Example

Figure 11A:
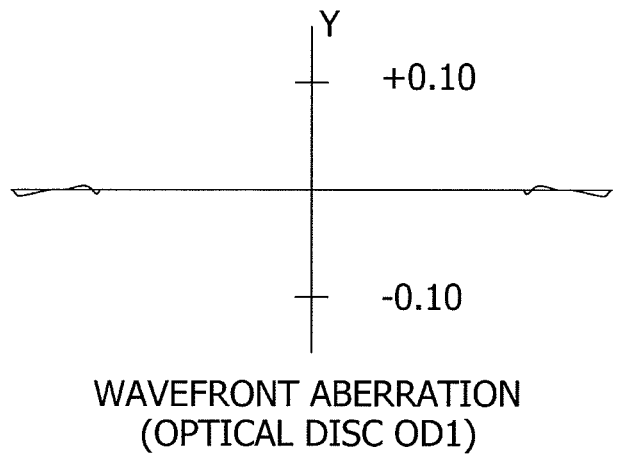
FIGS. 11A to 11C are graphs illustrating wavefront aberrations caused when respective optical discs are used in the optical information recording/reproducing apparatus according to a sixth example of the invention.
Figure 11B:
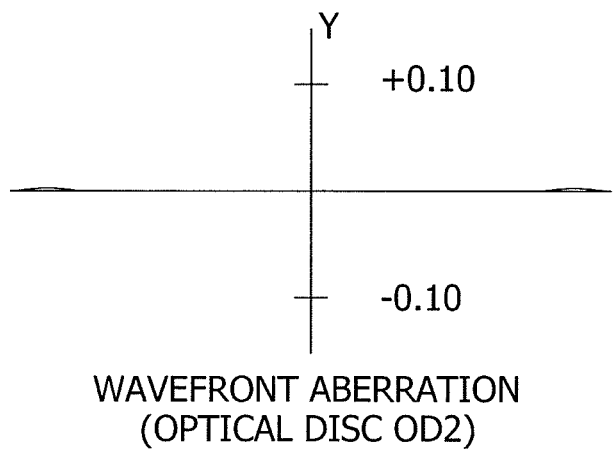
Figure 11C:
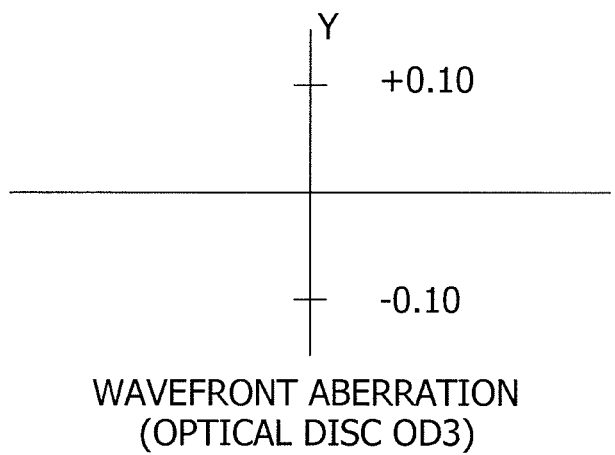

Hereafter, a sixth example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the sixth example are shown in Tables 31 to 35 and 36A to 36C. The wavefront aberrations caused when each of the optical discs OD1 to OD3 is used in the optical information recording/reproducing apparatus 100 according to the sixth example are shown in FIGS. 11A to 11C, respectively.

TABLE 31

| | unit | 1st laser beam | 2nd laser beam | 3rd laser beam |
|---|---|---|---|---|
| Design Wavelength | nm | 405 | 660 | 790 |
| Focal Length | mm | 1.764 | 1.987 | 2.049 |
| NA | | 0.85 | 0.65 | 0.53 |
| Magnification | | 0.00 | 0.00 | 0.00 |

TABLE 32

| Surface No. | R | d(405 nm) | d(660 nm) | d(790 nm) | |
|---|---|---|---|---|---|
| 1-1 | 1.065 | 1.880 | | | Objective Lens |
| 1-2 | 1.070 | | | | |
| 1-3 | 0.930 | | | | |
| 2 | −2.321 | 0.682 | 0.636 | 0.332 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.52469 | 1.50635 | 1.50313 | Objective Lens |
| 1-2 | | | | |
| 1-3 | | | | |
| 2 | | | | |
| 3 | 1.62231 | 1.57961 | 1.57307 | Optical Disc |
| 4 | | | | |

TABLE 33

| κ | 1-1<br>−1.000 | 1-2<br>−1.000 | 1-3<br>−1.000 | 2<br>1.480 |
|---|---|---|---|---|
| A4  | 2.78600E−02  | −1.06900E−01 | −5.44570E−02 | 3.75670E−01 |
| A6  | 1.30660E−02  | 2.29200E−01  | 5.02410E−02  | −3.90040E−01 |
| A8  | 1.72500E−03  | −1.01400E−01 | −8.23860E−03 | 3.09680E−01 |
| A10 | 6.15300E−04  | 1.40000E−02  | 8.31250E−03  | −1.55690E−01 |
| A12 | −6.79800E−04 | 4.48150E−04  | −4.12600E−03 | 3.92700E−02 |
| A14 |              |              | −1.10690E−04 | 1.81960E−03 |
| A16 |              |              | 9.60710E−04  | −1.75900E−03 |
| A18 |              |              | −2.79660E−04 | −9.38060E−04 |
| A20 |              |              |              | 3.92970E−04 |
| A22 |              |              |              |             |
| A24 |              |              |              |             |

TABLE 34

| Diffraction Order | 1-1<br>1/1/1 | 1-2<br>1/1/— | 1-3<br>2/—/— |
|---|---|---|---|
| P2  | 6.34550E+01  | 6.17720E+01  | 5.65130E+01 |
| P4  | −1.46570E+01 | −1.18800E+02 | −7.12700E+01 |
| P6  | 2.11500E+00  | 1.81570E+02  | 3.29000E+01 |
| P8  | 1.56700E+00  | −9.60000E+01 | −5.71400E+00 |
| P10 | −1.36100E+00 | 1.63070E+01  | 0.00000E+00 |
| P12 | 0.00000E+00  | 0.00000E+00  | 0.00000E+00 |

TABLE 35

| Diffraction Order | 1-1<br>1/0/0 | 1-2<br>1/0/— |
|---|---|---|
| P2  | −3.87210E+01 | −3.98800E+01 |
| P4  | −9.27300E+00 | −7.91270E+01 |
| P6  | 5.25200E+00  | 1.29200E+02 |
| P8  | −2.65800E+00 | −7.28570E+01 |
| P10 | −1.28300E−01 | 1.32200E+01 |
| P12 | 0.00000E+00  | 0.00000E+00 |

TABLE 36A

| | Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 μm | Step Height D2 μm | Annular Zone Pitch P1 P3 | Annular Zone Pitch P2 P4 | Annular Zone Pitch P1/P2 P3/P4 |
|---|---|---|---|---|---|---|---|---|---|---|---|---|
| First Area | 0  | 0.000 | 0.070 | | | | | | | | | |
|            | 1  | 0.070 | 0.121 |      | 1.17 |      | 0.59 |      | 0.45 |       |       |       |
|            | 2  | 0.121 | 0.157 | 2.73 |      | 1.37 |      | 1.06 |      |       | 0.087 |       |
|            | 3  | 0.157 | 0.186 |      | 1.17 |      | 0.59 |      | 0.45 | 0.065 |       | 0.743 |
|            | 4  | 0.186 | 0.211 | 2.73 |      | 1.37 |      | 1.06 |      |       | 0.075 |       |
|            | 5  | 0.211 | 0.232 |      | 1.17 |      | 0.59 |      | 0.45 | 0.067 |       | 0.887 |
|            | 6  | 0.232 | 0.253 |      | 1.17 |      | 0.59 |      | 0.45 |       |       |       |
|            | 7  | 0.253 | 0.272 | 2.73 |      | 1.37 |      | 1.06 |      |       | 0.040 |       |
|            | 8  | 0.272 | 0.288 |      | 1.17 |      | 0.59 |      | 0.45 | 0.053 |       | 1.332 |
|            | 9  | 0.288 | 0.305 |      | 1.17 |      | 0.59 |      | 0.45 |       |       |       |
|            | 10 | 0.305 | 0.321 | 2.73 |      | 1.37 |      | 1.06 |      |       | 0.033 |       |
|            | 11 | 0.321 | 0.336 |      | 1.17 |      | 0.59 |      | 0.45 | 0.031 |       | 0.951 |
|            | 12 | 0.336 | 0.351 | 2.73 |      | 1.37 |      | 1.06 |      |       | 0.030 |       |
|            | 13 | 0.351 | 0.365 |      | 1.17 |      | 0.59 |      | 0.45 | 0.029 |       | 0.960 |
|            | 14 | 0.365 | 0.378 | 2.73 |      | 1.37 |      | 1.06 |      |       | 0.040 |       |
|            | 15 | 0.378 | 0.391 |      | 1.17 |      | 0.59 |      | 0.45 | 0.039 |       | 0.966 |
|            | 16 | 0.391 | 0.403 |      | 1.17 |      | 0.59 |      | 0.45 |       |       |       |
|            | 17 | 0.403 | 0.416 | 2.73 |      | 1.37 |      | 1.06 |      |       | 0.025 |       |
|            | 18 | 0.416 | 0.428 |      | 1.17 |      | 0.59 |      | 0.45 | 0.024 |       | 0.972 |
|            | 19 | 0.428 | 0.439 | 2.73 |      | 1.37 |      | 1.06 |      |       | 0.034 |       |
|            | 20 | 0.439 | 0.450 |      | 1.17 |      | 0.59 |      | 0.45 | 0.033 |       | 0.975 |
|            | 21 | 0.450 | 0.461 |      | 1.17 |      | 0.59 |      | 0.45 |       |       |       |
|            | 22 | 0.461 | 0.472 | 2.73 |      | 1.37 |      | 1.06 |      |       | 0.022 |       |
|            | 23 | 0.472 | 0.483 |      | 1.17 |      | 0.59 |      | 0.45 | 0.022 |       | 0.978 |
|            | 24 | 0.483 | 0.493 | 2.73 |      | 1.37 |      | 1.06 |      |       | 0.021 |       |
|            | 25 | 0.493 | 0.503 |      | 1.17 |      | 0.59 |      | 0.45 | 0.021 |       | 0.980 |
|            | 26 | 0.503 | 0.513 | 2.73 |      | 1.37 |      | 1.06 |      |       | 0.030 |       |
|            | 27 | 0.513 | 0.523 |      | 1.17 |      | 0.59 |      | 0.45 | 0.029 |       | 0.982 |
|            | 28 | 0.523 | 0.532 |      | 1.17 |      | 0.59 |      | 0.45 |       |       |       |
|            | 29 | 0.532 | 0.542 | 2.73 |      | 1.37 |      | 1.06 |      |       | 0.019 |       |
|            | 30 | 0.542 | 0.551 |      | 1.17 |      | 0.59 |      | 0.45 | 0.019 |       | 0.984 |
|            | 31 | 0.551 | 0.560 | 2.73 |      | 1.37 |      | 1.06 |      |       | 0.019 |       |
|            | 32 | 0.560 | 0.570 |      | 1.17 |      | 0.59 |      | 0.45 | 0.018 |       | 0.984 |
|            | 33 | 0.570 | 0.579 | 2.73 |      | 1.37 |      | 1.06 |      |       | 0.026 |       |
|            | 34 | 0.579 | 0.587 |      | 1.17 |      | 0.59 |      | 0.45 | 0.026 |       | 0.986 |
|            | 35 | 0.587 | 0.596 |      | 1.17 |      | 0.59 |      | 0.45 |       |       |       |
|            | 36 | 0.596 | 0.604 | 2.73 |      | 1.37 |      | 1.06 |      |       | 0.017 |       |
|            | 37 | 0.604 | 0.613 |      | 1.17 |      | 0.59 |      | 0.45 | 0.017 |       | 0.987 |

TABLE 36A-continued

| Annular Zone No. | Annular Zone Start Position mm | Annular Zone End Position mm | φ1 / φ3 πrad | φ2 / φ4 πrad | ΔOPD1/λ1 ΔOPD3/λ1 | ΔOPD2/λ1 ΔOPD4/λ1 | D1 / D3 μm | D2 / D4 μm | P1 / P3 | P2 / P4 | P1/P2 P3/P4 |
|---|---|---|---|---|---|---|---|---|---|---|---|
| 38 | 0.613 | 0.621 | 2.73 |  | 1.37 |  | 1.06 |  |  | 0.017 |  |
| 39 | 0.621 | 0.629 |  | 1.17 |  | 0.59 |  | 0.45 | 0.017 |  | 0.988 |
| 40 | 0.629 | 0.637 | 2.73 |  | 1.37 |  | 1.06 |  |  | 0.016 |  |
| 41 | 0.637 | 0.645 |  | 1.17 |  | 0.59 |  | 0.45 | 0.016 |  | 0.988 |
| 42 | 0.645 | 0.653 | 2.73 |  | 1.37 |  | 1.06 |  |  | 0.016 |  |
| 43 | 0.653 | 0.661 |  | 1.17 |  | 0.59 |  | 0.45 | 0.016 |  | 0.989 |
| 44 | 0.661 | 0.669 | 2.73 |  | 1.37 |  | 1.06 |  |  | 0.016 |  |
| 45 | 0.669 | 0.677 |  | 1.17 |  | 0.59 |  | 0.45 | 0.016 |  | 0.989 |
| 46 | 0.677 | 0.684 | 2.73 |  | 1.37 |  | 1.06 |  |  | 0.022 |  |
| 47 | 0.684 | 0.692 |  | 1.17 |  | 0.59 |  | 0.45 | 0.022 |  | 0.990 |
| 48 | 0.692 | 0.699 |  | 1.17 |  | 0.59 |  | 0.45 |  |  |  |
| 49 | 0.699 | 0.707 | 2.73 |  | 1.37 |  | 1.06 |  |  | 0.015 |  |
| 50 | 0.707 | 0.714 |  | 1.17 |  | 0.59 |  | 0.45 | 0.015 |  | 0.991 |
| 51 | 0.714 | 0.721 | 2.73 |  | 1.37 |  | 1.06 |  |  | 0.015 |  |
| 52 | 0.721 | 0.728 |  | 1.17 |  | 0.59 |  | 0.45 | 0.014 |  | 0.991 |
| 53 | 0.728 | 0.736 | 2.73 |  | 1.37 |  | 1.06 |  |  | 0.014 |  |
| 54 | 0.736 | 0.743 |  | 1.17 |  | 0.59 |  | 0.45 | 0.014 |  | 0.991 |
| 55 | 0.743 | 0.750 | 2.73 |  | 1.37 |  | 1.06 |  |  | 0.014 |  |
| 56 | 0.750 | 0.757 |  | 1.17 |  | 0.59 |  | 0.45 | 0.014 |  | 0.991 |
| 57 | 0.757 | 0.763 | 2.73 |  | 1.37 |  | 1.06 |  |  | 0.014 |  |
| 58 | 0.763 | 0.770 |  | 1.17 |  | 0.59 |  | 0.45 | 0.014 |  | 0.992 |
| 59 | 0.770 | 0.777 | 2.73 |  | 1.37 |  | 1.06 |  |  | 0.014 |  |
| 60 | 0.777 | 0.784 |  | 1.17 |  | 0.59 |  | 0.45 | 0.014 |  | 0.992 |

TABLE 36B

| Area | Zone No. | Start mm | End mm | φ1 / φ3 | φ2 / φ4 | ΔOPD1/λ1 ΔOPD3/λ1 | ΔOPD2/λ1 ΔOPD4/λ1 | D1 / D3 | D2 / D4 | P1 / P3 | P2 / P4 | P1/P2 P3/P4 |
|---|---|---|---|---|---|---|---|---|---|---|---|---|
| First Area | 61 | 0.784 | 0.791 | 2.73 |  | 1.37 |  | 1.06 |  |  | 0.013 |  |
|  | 62 | 0.791 | 0.797 |  | 1.17 |  | 0.59 |  | 0.45 | 0.013 |  | 0.992 |
|  | 63 | 0.797 | 0.804 | 2.73 |  | 1.37 |  | 1.06 |  |  | 0.013 |  |
|  | 64 | 0.804 | 0.810 |  | 1.17 |  | 0.59 |  | 0.45 | 0.013 |  | 0.992 |
|  | 65 | 0.810 | 0.817 | 2.73 |  | 1.37 |  | 1.06 |  |  | 0.013 |  |
|  | 66 | 0.817 | 0.823 |  | 1.17 |  | 0.59 |  | 0.45 | 0.013 |  | 0.993 |
|  | 67 | 0.823 | 0.830 | 2.73 |  | 1.37 |  | 1.06 |  |  | 0.013 |  |
|  | 68 | 0.830 | 0.836 |  | 1.17 |  | 0.59 |  | 0.45 | 0.013 |  | 0.993 |
|  | 69 | 0.836 | 0.842 | 2.73 |  | 1.37 |  | 1.06 |  |  | 0.013 |  |
|  | 70 | 0.842 | 0.849 |  | 1.17 |  | 0.59 |  | 0.45 | 0.013 |  | 0.993 |
|  | 71 | 0.849 | 0.855 | 2.73 |  | 1.37 |  | 1.06 |  |  | 0.012 |  |
|  | 72 | 0.855 | 0.861 |  | 1.17 |  | 0.59 |  | 0.45 | 0.012 |  | 0.993 |
|  | 73 | 0.861 | 0.867 | 2.73 |  | 1.37 |  | 1.06 |  |  | 0.012 |  |
|  | 74 | 0.867 | 0.873 |  | 1.17 |  | 0.59 |  | 0.45 | 0.012 |  | 0.993 |
|  | 75 | 0.873 | 0.879 | 2.73 |  | 1.37 |  | 1.06 |  |  | 0.012 |  |
|  | 76 | 0.879 | 0.885 |  | 1.17 |  | 0.59 |  | 0.45 | 0.012 |  | 0.994 |
|  | 77 | 0.885 | 0.891 | 2.73 |  | 1.37 |  | 1.06 |  |  | 0.012 |  |
|  | 78 | 0.891 | 0.897 |  | 1.17 |  | 0.59 |  | 0.45 | 0.012 |  | 0.994 |
|  | 79 | 0.897 | 0.903 | 2.73 |  | 1.37 |  | 1.06 |  |  | 0.012 |  |
|  | 80 | 0.903 | 0.909 |  | 1.17 |  | 0.59 |  | 0.45 | 0.012 |  | 0.994 |
|  | 81 | 0.909 | 0.915 | 2.73 |  | 1.37 |  | 1.06 |  |  | 0.012 |  |
|  | 82 | 0.915 | 0.921 |  | 1.17 |  | 0.59 |  | 0.45 | 0.012 |  | 0.994 |
|  | 83 | 0.921 | 0.927 | 2.73 |  | 1.37 |  | 1.06 |  |  | 0.018 |  |
|  | 84 | 0.927 | 0.932 | 2.73 |  | 1.37 |  | 1.06 |  |  |  |  |
|  | 85 | 0.932 | 0.938 |  | 1.17 |  | 0.59 |  | 0.45 | 0.018 |  | 0.994 |
|  | 86 | 0.938 | 0.944 | 2.73 |  | 1.37 |  | 1.06 |  |  | 0.011 |  |
|  | 87 | 0.944 | 0.949 |  | 1.17 |  | 0.59 |  | 0.45 | 0.011 |  | 0.994 |
|  | 88 | 0.949 | 0.955 | 2.73 |  | 1.37 |  | 1.06 |  |  | 0.011 |  |
|  | 89 | 0.955 | 0.961 |  | 1.17 |  | 0.59 |  | 0.45 | 0.011 |  | 0.995 |
|  | 90 | 0.961 | 0.966 | 2.73 |  | 1.37 |  | 1.06 |  |  | 0.011 |  |
|  | 91 | 0.966 | 0.972 |  | 1.17 |  | 0.59 |  | 0.45 | 0.011 |  | 0.994 |
|  | 92 | 0.972 | 0.977 | 2.73 |  | 1.37 |  | 1.06 |  |  | 0.011 |  |
|  | 93 | 0.977 | 0.983 |  | 1.17 |  | 0.59 |  | 0.45 | 0.011 |  | 0.995 |
|  | 94 | 0.983 | 0.988 | 2.73 |  | 1.37 |  | 1.06 |  |  | 0.017 |  |
|  | 95 | 0.988 | 0.994 | 2.73 |  | 1.37 |  | 1.06 |  |  |  |  |
|  | 96 | 0.994 | 0.999 |  | 1.17 |  | 0.59 |  | 0.45 | 0.017 |  | 0.995 |
|  | 97 | 0.999 | 1.005 | 2.73 |  | 1.37 |  | 1.06 |  |  | 0.011 |  |
|  | 98 | 1.005 | 1.010 |  | 1.17 |  | 0.59 |  | 0.45 | 0.011 |  | 0.995 |
|  | 99 | 1.010 | 1.015 | 2.73 |  | 1.37 |  | 1.06 |  |  | 0.011 |  |
|  | 100 | 1.015 | 1.020 |  | 1.17 |  | 0.59 |  | 0.45 | 0.011 |  | 0.995 |
|  | 101 | 1.020 | 1.026 | 2.73 |  | 1.37 |  | 1.06 |  |  | 0.016 |  |
|  | 102 | 1.026 | 1.031 | 2.73 |  | 1.37 |  | 1.06 |  |  |  |  |
|  | 103 | 1.031 | 1.036 |  | 1.17 |  | 0.59 |  | 0.45 | 0.016 |  | 0.995 |

TABLE 36B-continued

|  | | | | | | | | | |
|---|---|---|---|---|---|---|---|---|---|
|  | 104 | 1.036 1.041 | 2.73 | | 1.37 | 1.06 | | 0.010 | |
|  | 105 | 1.041 1.047 | | 1.17 | 0.59 | | 0.45 | 0.010 | 0.995 |
|  | 106 | 1.047 1.052 | 2.73 | | 1.37 | 1.06 | | 0.016 | |
|  | 107 | 1.052 1.057 | 2.73 | | 1.37 | 1.06 | | | |
|  | 108 | 1.057 1.062 | | 1.17 | 0.59 | | 0.45 | 0.016 | 0.995 |
|  | 109 | 1.062 1.067 | 2.73 | | 1.37 | 1.06 | | 0.010 | |
|  | 110 | 1.067 1.072 | | 1.17 | 0.59 | | 0.45 | 0.010 | 0.995 |
|  | 111 | 1.072 1.077 | 2.73 | | 1.37 | 1.06 | | 0.015 | |
|  | 112 | 1.077 1.082 | 2.73 | | 1.37 | 1.06 | | | |
|  | 113 | 1.082 1.085 | | 1.17 | 0.59 | | 0.45 | 0.015 | 0.973 |
| Second Area | 114 | 1.085 1.088 | 2.52 | | 1.26 | 1.09 | | 0.006 | |
|  | 115 | 1.088 1.093 | | 1.39 | 0.70 | | 0.61 | 0.006 | 0.979 |
|  | 116 | 1.093 1.097 | 2.52 | | 1.26 | 1.09 | | 0.013 | |
|  | 117 | 1.097 1.101 | | 1.39 | 0.70 | | 0.61 | 0.013 | 0.995 |
|  | 118 | 1.101 1.106 | | 1.39 | 0.70 | | 0.61 | | |
|  | 119 | 1.106 1.110 | 2.52 | | 1.26 | 1.09 | | 0.009 | |
|  | 120 | 1.110 1.115 | | 1.39 | 0.70 | | 0.61 | 0.009 | 0.996 |

TABLE 36C

|  | | | | | | | | | |
|---|---|---|---|---|---|---|---|---|---|
| Second Area | 121 | 1.115 1.119 | 2.52 | | 1.26 | 1.09 | | 0.013 | |
|  | 122 | 1.119 1.123 | | 1.39 | 0.70 | | 0.61 | 0.013 | 0.996 |
|  | 123 | 1.123 1.127 | | 1.39 | 0.70 | | 0.61 | | |
|  | 124 | 1.127 1.132 | 2.52 | | 1.26 | 1.09 | | 0.009 | |
|  | 125 | 1.132 1.136 | | 1.39 | 0.70 | | 0.61 | 0.009 | 0.996 |
|  | 126 | 1.136 1.140 | 2.52 | | 1.26 | 1.09 | | 0.012 | |
|  | 127 | 1.140 1.144 | | 1.39 | 0.70 | | 0.61 | 0.012 | 0.996 |
|  | 128 | 1.144 1.148 | | 1.39 | 0.70 | | 0.61 | | |
|  | 129 | 1.148 1.153 | 2.52 | | 1.26 | 1.09 | | 0.008 | |
|  | 130 | 1.153 1.157 | | 1.39 | 0.70 | | 0.61 | 0.008 | 0.996 |
|  | 131 | 1.157 1.161 | 2.52 | | 1.26 | 1.09 | | 0.012 | |
|  | 132 | 1.161 1.165 | | 1.39 | 0.70 | | 0.61 | 0.012 | 0.997 |
|  | 133 | 1.165 1.169 | | 1.39 | 0.70 | | 0.61 | | |
|  | 134 | 1.169 1.173 | 2.52 | | 1.26 | 1.09 | | 0.008 | |
|  | 135 | 1.173 1.177 | | 1.39 | 0.70 | | 0.61 | 0.008 | 0.997 |
|  | 136 | 1.177 1.181 | 2.52 | | 1.26 | 1.09 | | 0.008 | |
|  | 137 | 1.181 1.185 | | 1.39 | 0.70 | | 0.61 | 0.008 | 0.997 |
|  | 138 | 1.185 1.190 | 2.52 | | 1.26 | 1.09 | | 0.008 | |
|  | 139 | 1.190 1.194 | | 1.39 | 0.70 | | 0.61 | 0.008 | 0.997 |
|  | 140 | 1.194 1.198 | 2.52 | | 1.26 | 1.09 | | 0.008 | |
|  | 141 | 1.198 1.202 | | 1.39 | 0.70 | | 0.61 | 0.008 | 0.997 |
|  | 142 | 1.202 1.206 | 2.52 | | 1.26 | 1.09 | | 0.008 | |
|  | 144 | 1.206 1.210 | | 1.39 | 0.70 | | 0.61 | 0.008 | 0.997 |
|  | 145 | 1.210 1.214 | 2.52 | | 1.26 | 1.09 | | 0.008 | |
|  | 146 | 1.214 1.218 | | 1.39 | 0.70 | | 0.61 | 0.008 | 0.997 |
|  | 147 | 1.218 1.222 | 2.52 | | 1.26 | 1.09 | | 0.008 | |
|  | 148 | 1.222 1.226 | | 1.39 | 0.70 | | 0.61 | 0.008 | 0.998 |
|  | 149 | 1.226 1.230 | 2.52 | | 1.26 | 1.09 | | 0.008 | |
|  | 150 | 1.230 1.234 | | 1.39 | 0.70 | | 0.61 | 0.008 | 0.998 |
|  | 151 | 1.234 1.238 | 2.52 | | 1.26 | 1.09 | | 0.008 | |
|  | 152 | 1.238 1.242 | | 1.39 | 0.70 | | 0.61 | 0.008 | 0.998 |
|  | 153 | 1.242 1.246 | 2.52 | | 1.26 | 1.09 | | 0.008 | |
|  | 154 | 1.246 1.250 | | 1.39 | 0.70 | | 0.61 | 0.008 | 0.998 |
|  | 155 | 1.250 1.254 | 2.52 | | 1.26 | 1.09 | | 0.012 | |
|  | 156 | 1.254 1.258 | 2.52 | | 1.26 | 1.09 | | | |
|  | 157 | 1.258 1.262 | | 1.39 | 0.70 | | 0.61 | 0.012 | 0.998 |
|  | 158 | 1.262 1.266 | 2.52 | | 1.26 | 1.09 | | 0.008 | |
|  | 159 | 1.266 1.270 | | 1.39 | 0.70 | | 0.61 | 0.008 | 0.998 |
|  | 160 | 1.270 1.274 | 2.52 | | 1.26 | 1.09 | | 0.012 | |
|  | 161 | 1.274 1.278 | 2.52 | | 1.26 | 1.09 | | | |
|  | 162 | 1.278 1.282 | | 1.39 | 0.70 | | 0.61 | 0.012 | 0.998 |
|  | 163 | 1.282 1.286 | 2.52 | | 1.26 | 1.09 | | | |
|  | 164 | 1.286 1.290 | 2.52 | | 1.26 | 1.09 | | | |
| Third Area | 165 | 1.290 1.319 | 4.00 | | 2.00 | 0.93 | | | |
|  | 166 | 1.319 1.347 | 4.00 | | 2.00 | 0.93 | | | |
|  | 167 | 1.347 1.373 | 4.00 | | 2.00 | 0.93 | | | |
|  | 168 | 1.373 1.397 | 4.00 | | 2.00 | 0.93 | | | |
|  | 169 | 1.397 1.419 | 4.00 | | 2.00 | 0.93 | | | |
|  | 170 | 1.419 1.439 | 4.00 | | 2.00 | 0.93 | | | |

TABLE 36C-continued

| 171 | 1.439 | 1.457 | 4.00 | 2.00 | 0.93 |
| 172 | 1.457 | 1.473 | 4.00 | 2.00 | 0.93 |
| 173 | 1.473 | 1.488 | 4.00 | 2.00 | 0.93 |
| 174 | 1.488 | 1.500 | 4.00 | 2.00 | 0.93 |

Seventh Example

Figure 12A:
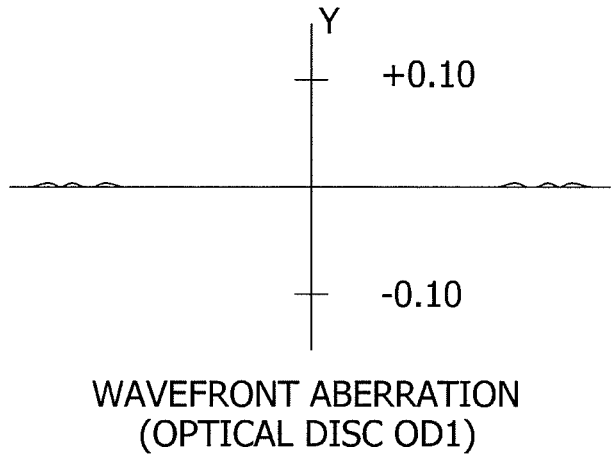
FIGS. 12A to 12C are graphs illustrating wavefront aberrations caused when respective optical discs are used in the optical information recording/reproducing apparatus according to a seventh example of the invention.
Figure 12B:
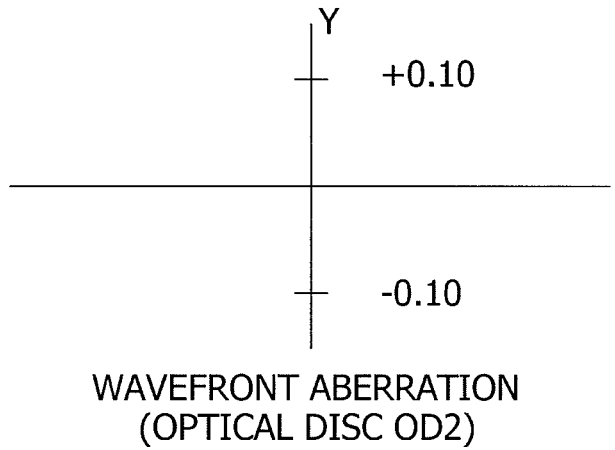
Figure 12C:
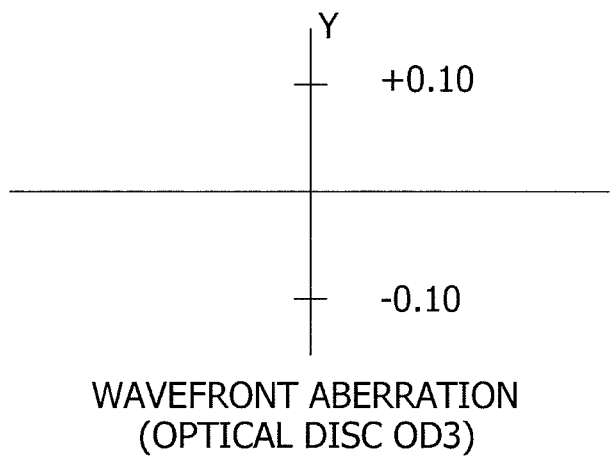

Hereafter, a seventh example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the seventh example are shown in Tables 37 to 41 and 42A to 42C. The wavefront aberrations caused when each of the optical discs OD1 to OD3 is used in the optical information recording/reproducing apparatus 100 according to the seventh example are shown in FIGS. 12A to 12C, respectively.

TABLE 37

|  | unit | $1^{st}$ laser beam | $2^{nd}$ laser beam | $3^{rd}$ laser beam |
|---|---|---|---|---|
| Design Wavelength | nm | 405 | 660 | 790 |
| Focal Length | mm | 2.200 | 2.478 | 2.549 |
| NA |  | 0.85 | 0.60 | 0.53 |
| Magnification |  | 0.00 | 0.00 | 0.00 |

TABLE 38

| Surface No. | r | d(405 nm) | d(660 nm) | d(790 nm) |  |
|---|---|---|---|---|---|
| 1-1 | 1.396 | 2.330 |  |  | Objective Lens |
| 1-2 | 1.471 |  |  |  |  |
| 1-3 | 1.285 |  |  |  |  |
| 2 | −3.805 | 0.852 | 0.850 | 0.551 |  |
| 3 | ∞ | 0.0875 | 0.600 | 1.200 | Optical Disc |
| 4 | ∞ |  |  |  |  |

TABLE 38-continued

| Surface No. | n(405 nm) | n(660 nm) | n(790 nm) |  |
|---|---|---|---|---|
| 1-1 | 1.56023 | 1.54044 | 1.53653 | Objective Lens |
| 1-2 |  |  |  |  |
| 1-3 |  |  |  |  |
| 2 |  |  |  |  |
| 3 | 1.62231 | 1.57961 | 1.57307 | Optical Disc |
| 4 |  |  |  |  |

TABLE 39

|  | 1-1 | 1-2 | 1-3 | 2 |
|---|---|---|---|---|
| κ | −1.000 | −1.000 | −1.000 | −11.400 |
| A4 | 1.58550E−02 | −8.08100E−03 | −2.83400E−02 | 1.38100E−01 |
| A6 | 3.61320E−03 | 5.55850E−02 | 2.14920E−02 | −1.17810E−01 |
| A8 | 3.57000E−04 | −2.01700E−02 | −3.15020E−05 | 6.90170E−02 |
| A10 | −1.95300E−05 | 1.86930E−03 | −2.05800E−03 | −3.15570E−02 |
| A12 | −1.47730E−05 | −6.12830E−05 | 1.54230E−03 | 1.19050E−02 |
| A14 |  |  | −6.68900E−04 | −4.00170E−03 |
| A16 |  |  | 1.56500E−04 | 1.13430E−03 |
| A18 |  |  | −1.58740E−05 | −2.16810E−04 |
| A20 |  |  |  | 1.89670E−05 |
| A22 |  |  |  |  |
| A24 |  |  |  |  |

TABLE 40

| Diffraction Order | 1-1 1/1/1 | 1-2 1/1/— | 1-3 2/—/— |
|---|---|---|---|
| P2 | 4.09880E+01 | 2.60350E+01 | 2.60000E+01 |
| P4 | −5.83500E+00 | −2.46600E+01 | −3.72670E+01 |
| P6 | 6.59200E−01 | 4.51070E+01 | 1.61400E+01 |
| P8 | 7.53000E−02 | −1.96000E+01 | −2.39000E+00 |
| P10 | −1.04500E−01 | 2.17000E+00 | 0.00000E+00 |
| P12 | 0.00000E+00 | 0.00000E+00 | 0.00000E+00 |

TABLE 41

| Diffraction Order | 1-1 1/0/0 | 1-2 1/0/— |
|---|---|---|
| P2 | −3.17850E+01 | −4.20930E+01 |
| P4 | −3.63600E+00 | −1.55950E+01 |
| P6 | 9.68100E−01 | 3.11200E+01 |
| P8 | −3.46500E−01 | −1.44070E+01 |
| P10 | −3.65500E−02 | 1.75700E+00 |
| P12 | 0.00000E+00 | 0.00000E+00 |

TABLE 42A

| Annular Zone No. | Annular Zone Start Position mm | Annular Zone End Position mm | Phase Difference φ1 φ3 πrad | φ2 φ4 πrad | Optical Path Length ΔOPD1/λ1 ΔOPD3/λ1 | ΔOPD2/λ1 ΔOPD4/λ1 | Step Height D1 D3 μm | D2 D4 μm | Annular Zone Pitch P1 P3 | P2 P4 | P1/P2 P3/P4 |
|---|---|---|---|---|---|---|---|---|---|---|---|
| First Area 0 | 0.000 | 0.089 | | | | | | | | | |
| 1 | 0.089 | 0.146 | | 1.69 | | 0.85 | | 0.61 | | | |
| 2 | 0.146 | 0.186 | 2.36 | | 1.18 | | 0.85 | | | 0.098 | |
| 3 | 0.186 | 0.219 | | 1.69 | | 0.85 | | 0.61 | 0.073 | | 0.750 |
| 4 | 0.219 | 0.249 | 2.36 | | 1.18 | | 0.85 | | | 0.062 | |
| 5 | 0.249 | 0.275 | | 1.69 | | 0.85 | | 0.61 | 0.056 | | 0.896 |
| 6 | 0.275 | 0.299 | 2.36 | | 1.18 | | 0.85 | | | 0.050 | |
| 7 | 0.299 | 0.321 | | 1.69 | | 0.85 | | 0.61 | 0.046 | | 0.911 |
| 8 | 0.321 | 0.342 | 2.36 | | 1.18 | | 0.85 | | | 0.064 | |
| 9 | 0.342 | 0.363 | | 1.69 | | 0.85 | | 0.61 | 0.060 | | 0.945 |
| 10 | 0.363 | 0.381 | | 1.69 | | 0.85 | | 0.61 | | | |
| 11 | 0.381 | 0.399 | 2.36 | | 1.18 | | 0.85 | | | 0.036 | |
| 12 | 0.399 | 0.416 | | 1.69 | | 0.85 | | 0.61 | 0.035 | | 0.956 |
| 13 | 0.416 | 0.432 | 2.36 | | 1.18 | | 0.85 | | | 0.033 | |
| 14 | 0.432 | 0.448 | | 1.69 | | 0.85 | | 0.61 | 0.032 | | 0.967 |
| 15 | 0.448 | 0.463 | 2.36 | | 1.18 | | 0.85 | | | 0.031 | |
| 16 | 0.463 | 0.478 | | 1.69 | | 0.85 | | 0.61 | 0.030 | | 0.966 |
| 17 | 0.478 | 0.492 | 2.36 | | 1.18 | | 0.85 | | | 0.029 | |
| 18 | 0.492 | 0.506 | | 1.69 | | 0.85 | | 0.61 | 0.028 | | 0.971 |
| 19 | 0.506 | 0.519 | 2.36 | | 1.18 | | 0.85 | | | 0.027 | |
| 20 | 0.519 | 0.533 | | 1.69 | | 0.85 | | 0.61 | 0.027 | | 0.979 |
| 21 | 0.533 | 0.546 | 2.36 | | 1.18 | | 0.85 | | | 0.040 | |
| 22 | 0.546 | 0.559 | | 1.69 | | 0.85 | | 0.61 | 0.039 | | 0.975 |
| 23 | 0.559 | 0.572 | | 1.69 | | 0.85 | | 0.61 | | | |
| 24 | 0.572 | 0.584 | 2.36 | | 1.18 | | 0.85 | | | 0.024 | |
| 25 | 0.584 | 0.596 | | 1.69 | | 0.85 | | 0.61 | 0.024 | | 0.985 |
| 26 | 0.596 | 0.607 | 2.36 | | 1.18 | | 0.85 | | | 0.023 | |
| 27 | 0.607 | 0.619 | | 1.69 | | 0.85 | | 0.61 | 0.023 | | 0.985 |
| 28 | 0.619 | 0.630 | 2.36 | | 1.18 | | 0.85 | | | 0.023 | |
| 29 | 0.630 | 0.641 | | 1.69 | | 0.85 | | 0.61 | 0.022 | | 0.983 |
| 30 | 0.641 | 0.652 | 2.36 | | 1.18 | | 0.85 | | | 0.022 | |
| 31 | 0.652 | 0.663 | | 1.69 | | 0.85 | | 0.61 | 0.022 | | 0.982 |
| 32 | 0.663 | 0.673 | 2.36 | | 1.18 | | 0.85 | | | 0.021 | |
| 33 | 0.673 | 0.684 | | 1.69 | | 0.85 | | 0.61 | 0.021 | | 0.983 |
| 34 | 0.684 | 0.694 | 2.36 | | 1.18 | | 0.85 | | | 0.021 | |
| 35 | 0.694 | 0.704 | | 1.69 | | 0.85 | | 0.61 | 0.020 | | 0.986 |
| 36 | 0.704 | 0.714 | 2.36 | | 1.18 | | 0.85 | | | 0.020 | |
| 37 | 0.714 | 0.724 | | 1.69 | | 0.85 | | 0.61 | 0.020 | | 0.987 |
| 38 | 0.724 | 0.734 | 2.36 | | 1.18 | | 0.85 | | | 0.020 | |
| 39 | 0.734 | 0.743 | | 1.69 | | 0.85 | | 0.61 | 0.019 | | 0.989 |
| 40 | 0.743 | 0.753 | 2.36 | | 1.18 | | 0.85 | | | 0.019 | |
| 41 | 0.753 | 0.762 | | 1.69 | | 0.85 | | 0.61 | 0.019 | | 0.989 |
| 42 | 0.762 | 0.771 | 2.36 | | 1.18 | | 0.85 | | | 0.019 | |
| 43 | 0.771 | 0.781 | | 1.69 | | 0.85 | | 0.61 | 0.019 | | 0.990 |
| 44 | 0.781 | 0.790 | 2.36 | | 1.18 | | 0.85 | | | 0.018 | |
| 45 | 0.790 | 0.799 | | 1.69 | | 0.85 | | 0.61 | 0.018 | | 0.990 |
| 46 | 0.799 | 0.808 | 2.36 | | 1.18 | | 0.85 | | | 0.018 | |
| 47 | 0.808 | 0.816 | | 1.69 | | 0.85 | | 0.61 | 0.018 | | 0.990 |
| 48 | 0.816 | 0.825 | 2.36 | | 1.18 | | 0.85 | | | 0.018 | |
| 49 | 0.825 | 0.834 | | 1.69 | | 0.85 | | 0.61 | 0.017 | | 0.989 |
| 50 | 0.834 | 0.842 | 2.36 | | 1.18 | | 0.85 | | | 0.017 | |
| 51 | 0.842 | 0.851 | | 1.69 | | 0.85 | | 0.61 | 0.017 | | 0.989 |
| 52 | 0.851 | 0.859 | 2.36 | | 1.18 | | 0.85 | | | 0.017 | |
| 53 | 0.859 | 0.868 | | 1.69 | | 0.85 | | 0.61 | 0.017 | | 0.990 |
| 54 | 0.868 | 0.876 | 2.36 | | 1.18 | | 0.85 | | | 0.017 | |
| 55 | 0.876 | 0.884 | | 1.69 | | 0.85 | | 0.61 | 0.016 | | 0.992 |
| 56 | 0.884 | 0.892 | 2.36 | | 1.18 | | 0.85 | | | 0.024 | |
| 57 | 0.892 | 0.900 | 2.36 | | 1.18 | | 0.85 | | | | |
| 58 | 0.900 | 0.908 | | 1.69 | | 0.85 | | 0.61 | 0.024 | | 0.993 |
| 59 | 0.908 | 0.916 | 2.36 | | 1.18 | | 0.85 | | | 0.016 | |
| 60 | 0.916 | 0.924 | | 1.69 | | 0.85 | | 0.61 | 0.016 | | 0.992 |

TABLE 42B

| | | | | | | | | | | | | |
|---|---|---|---|---|---|---|---|---|---|---|---|---|
| First Area | 61 | 0.924 | 0.931 | 2.36 | | 1.18 | | 0.85 | | | 0.016 | |
| | 62 | 0.931 | 0.939 | | 1.69 | | 0.85 | | 0.61 | 0.016 | | 0.993 |
| | 63 | 0.939 | 0.947 | 2.36 | | 1.18 | | 0.85 | | | 0.015 | |
| | 64 | 0.947 | 0.955 | | 1.69 | | 0.85 | | 0.61 | 0.015 | | 0.993 |
| | 65 | 0.955 | 0.962 | 2.36 | | 1.18 | | 0.85 | | | 0.015 | |

TABLE 42B-continued

|  | | | | | | | | | |
|---|---|---|---|---|---|---|---|---|---|
| | 66 | 0.962 0.970 | | 1.69 | | 0.85 | | 0.61 0.015 | 0.992 |
| | 67 | 0.970 0.977 | 2.36 | | 1.18 | | 0.85 | 0.015 | |
| | 68 | 0.977 0.985 | | 1.69 | | 0.85 | | 0.61 0.015 | 0.992 |
| | 69 | 0.985 0.991 | 2.36 | | 1.18 | | 0.85 | 0.022 | |
| | 70 | 0.991 0.999 | 2.36 | | 1.18 | | 0.85 | | |
| | 71 | 0.999 1.006 | | 1.69 | | 0.85 | | 0.61 0.022 | 0.989 |
| | 72 | 1.006 1.013 | 2.36 | | 1.18 | | 0.85 | 0.014 | |
| | 73 | 1.013 1.021 | | 1.69 | | 0.85 | | 0.61 0.014 | 1.002 |
| | 74 | 1.021 1.028 | 2.36 | | 1.18 | | 0.85 | 0.014 | |
| | 75 | 1.028 1.035 | | 1.69 | | 0.85 | | 0.61 0.014 | 0.995 |
| | 76 | 1.035 1.042 | 2.36 | | 1.18 | | 0.85 | 0.014 | |
| | 77 | 1.042 1.049 | | 1.69 | | 0.85 | | 0.61 0.014 | 0.996 |
| | 78 | 1.049 1.056 | 2.36 | | 1.18 | | 0.85 | 0.014 | |
| | 79 | 1.056 1.063 | | 1.69 | | 0.85 | | 0.61 0.014 | 0.991 |
| | 80 | 1.063 1.069 | 2.36 | | 1.18 | | 0.85 | 0.020 | |
| | 81 | 1.069 1.076 | 2.36 | | 1.18 | | 0.85 | | |
| | 82 | 1.076 1.083 | | 1.69 | | 0.85 | | 0.61 0.020 | 0.996 |
| | 83 | 1.083 1.090 | 2.36 | | 1.18 | | 0.85 | 0.014 | |
| | 84 | 1.090 1.097 | | 1.69 | | 0.85 | | 0.61 0.014 | 0.992 |
| | 85 | 1.097 1.103 | 2.36 | | 1.18 | | 0.85 | 0.013 | |
| | 86 | 1.103 1.110 | | 1.69 | | 0.85 | | 0.61 0.013 | 0.996 |
| | 87 | 1.110 1.116 | 2.36 | | 1.18 | | 0.85 | 0.019 | |
| | 88 | 1.116 1.123 | 2.36 | | 1.18 | | 0.85 | | |
| | 89 | 1.123 1.129 | | 1.69 | | 0.85 | | 0.61 0.019 | 0.995 |
| | 90 | 1.129 1.136 | 2.36 | | 1.18 | | 0.85 | 0.013 | |
| | 91 | 1.136 1.142 | | 1.69 | | 0.85 | | 0.61 0.013 | 0.994 |
| | 92 | 1.142 1.148 | 2.36 | | 1.18 | | 0.85 | 0.019 | |
| | 93 | 1.148 1.155 | 2.36 | | 1.18 | | 0.85 | | |
| | 94 | 1.155 1.161 | | 1.69 | | 0.85 | | 0.61 0.019 | 0.995 |
| | 95 | 1.161 1.168 | 2.36 | | 1.18 | | 0.85 | 0.013 | |
| | 96 | 1.168 1.174 | | 1.69 | | 0.85 | | 0.61 0.013 | 0.999 |
| | 97 | 1.174 1.180 | 2.36 | | 1.18 | | 0.85 | 0.019 | |
| | 98 | 1.180 1.186 | 2.36 | | 1.18 | | 0.85 | | |
| | 99 | 1.186 1.194 | | 1.69 | | 0.85 | | 0.61 0.019 | 1.019 |
| Second Area | 100 | 1.194 1.200 | | 1.32 | | 0.66 | | 0.52 | |
| | 101 | 1.200 1.206 | 2.46 | | 1.23 | | 0.96 | 0.031 | |
| | 102 | 1.206 1.212 | 2.46 | | 1.23 | | 0.96 | | |
| | 103 | 1.212 1.217 | | 1.32 | | 0.66 | | 0.52 0.029 | 0.965 |
| | 104 | 1.217 1.222 | | 1.32 | | 0.66 | | 0.52 | |
| | 105 | 1.222 1.228 | 2.46 | | 1.23 | | 0.96 | 0.011 | |
| | 106 | 1.228 1.234 | | 1.32 | | 0.66 | | 0.52 0.011 | 0.995 |
| | 107 | 1.234 1.239 | 2.46 | | 1.23 | | 0.96 | 0.016 | |
| | 108 | 1.239 1.244 | | 1.32 | | 0.66 | | 0.52 0.016 | 0.995 |
| | 109 | 1.244 1.249 | | 1.32 | | 0.66 | | 0.52 | |
| | 110 | 1.249 1.255 | 2.46 | | 1.23 | | 0.96 | 0.011 | |
| | 111 | 1.255 1.260 | | 1.32 | | 0.66 | | 0.52 0.011 | 0.995 |
| | 112 | 1.260 1.266 | 2.46 | | 1.23 | | 0.96 | 0.015 | |
| | 113 | 1.266 1.270 | | 1.32 | | 0.66 | | 0.52 0.015 | 0.995 |
| | 114 | 1.270 1.275 | | 1.32 | | 0.66 | | 0.52 | |
| | 115 | 1.275 1.281 | 2.46 | | 1.23 | | 0.96 | 0.011 | |
| | 116 | 1.281 1.286 | | 1.32 | | 0.66 | | 0.52 0.011 | 0.995 |
| | 117 | 1.286 1.292 | 2.46 | | 1.23 | | 0.96 | 0.011 | |
| | 118 | 1.292 1.297 | | 1.32 | | 0.66 | | 0.52 0.011 | 0.995 |
| | 119 | 1.297 1.302 | 2.46 | | 1.23 | | 0.96 | 0.011 | |
| | 120 | 1.302 1.307 | | 1.32 | | 0.66 | | 0.52 0.011 | 0.996 |

TABLE 42C

|  | | | | | | | | | |
|---|---|---|---|---|---|---|---|---|---|
| Second Area | 121 | 1.307 1.313 | 2.46 | | 1.23 | | 0.96 | 0.010 | |
| | 122 | 1.313 1.318 | | 1.32 | | 0.66 | | 0.52 0.010 | 0.996 |
| | 123 | 1.318 1.323 | 2.46 | | 1.23 | | 0.96 | 0.010 | |
| | 124 | 1.323 1.328 | | 1.32 | | 0.66 | | 0.52 0.010 | 0.996 |
| | 125 | 1.328 1.333 | 2.46 | | 1.23 | | 0.96 | 0.010 | |
| | 126 | 1.333 1.338 | | 1.32 | | 0.66 | | 0.52 0.010 | 0.996 |
| | 127 | 1.338 1.343 | 2.46 | | 1.23 | | 0.96 | 0.010 | |
| | 128 | 1.343 1.349 | | 1.32 | | 0.66 | | 0.52 0.010 | 0.996 |
| | 129 | 1.349 1.354 | 2.46 | | 1.23 | | 0.96 | 0.010 | |
| | 130 | 1.354 1.359 | | 1.32 | | 0.66 | | 0.52 0.010 | 0.996 |
| | 131 | 1.359 1.365 | 2.46 | | 1.23 | | 0.96 | | |
| | 132 | 1.365 1.370 | 2.46 | | 1.23 | | 0.96 | 0.016 | |
| | 133 | 1.370 1.375 | | 1.32 | | 0.66 | | 0.52 0.016 | 0.996 |
| | 134 | 1.375 1.380 | 2.46 | | 1.23 | | 0.96 | | |
| | 135 | 1.380 1.385 | 2.46 | | 1.23 | | 0.96 | 0.016 | |
| | 136 | 1.385 1.390 | | 1.32 | | 0.66 | | 0.52 0.016 | 0.996 |

TABLE 42C-continued

| | | | | | | | | | | |
|---|---|---|---|---|---|---|---|---|---|---|
| | 137 | 1.390 | 1.396 | 2.46 | | 1.23 | | 0.96 | | |
| | 138 | 1.396 | 1.401 | 2.46 | | 1.23 | | 0.96 | 0.016 | |
| | 139 | 1.401 | 1.406 | | 1.32 | | 0.66 | 0.52 | 0.016 | 0.997 |
| | 140 | 1.406 | 1.412 | 2.46 | | 1.23 | | 0.96 | 0.021 | |
| | 141 | 1.412 | 1.417 | 2.46 | | 1.23 | | 0.96 | | |
| | 142 | 1.417 | 1.422 | 2.46 | | 1.23 | | 0.96 | | |
| | 144 | 1.422 | 1.427 | | 1.32 | | 0.66 | 0.52 | 0.021 | 0.997 |
| | 145 | 1.427 | 1.433 | 2.46 | | 1.23 | | 0.96 | | |
| | 146 | 1.433 | 1.438 | 2.46 | | 1.23 | | 0.96 | | |
| | 147 | 1.438 | 1.444 | 2.46 | | 1.23 | | 0.96 | | |
| | 148 | 1.444 | 1.449 | 2.46 | | 1.23 | | 0.96 | | |
| | 149 | 1.449 | 1.455 | 2.46 | | 1.23 | | 0.96 | | |
| | 150 | 1.455 | 1.461 | 2.46 | | 1.23 | | 0.96 | | |
| | 151 | 1.461 | 1.466 | 2.46 | | 1.23 | | 0.96 | | |
| | 152 | 1.466 | 1.472 | 2.46 | | 1.23 | | 0.96 | | |
| | 153 | 1.472 | 1.477 | 2.46 | | 1.23 | | 0.96 | | |
| | 154 | 1.477 | 1.480 | 2.46 | | 1.23 | | 0.96 | | |
| Third Area | 155 | 1.480 | 1.496 | 4.00 | | 2.00 | | 0.83 | | |
| | 156 | 1.496 | 1.553 | 4.00 | | 2.00 | | 0.83 | | |
| | 157 | 1.553 | 1.598 | 4.00 | | 2.00 | | 0.83 | | |
| | 158 | 1.598 | 1.634 | 4.00 | | 2.00 | | 0.83 | | |
| | 159 | 1.634 | 1.662 | 4.00 | | 2.00 | | 0.83 | | |
| | 160 | 1.662 | 1.685 | 4.00 | | 2.00 | | 0.83 | | |
| | 161 | 1.685 | 1.704 | 4.00 | | 2.00 | | 0.83 | | |
| | 162 | 1.704 | 1.721 | 4.00 | | 2.00 | | 0.83 | | |
| | 163 | 1.721 | 1.736 | 4.00 | | 2.00 | | 0.83 | | |
| | 164 | 1.736 | 1.749 | 4.00 | | 2.00 | | 0.83 | | |
| | 165 | 1.749 | 1.761 | 4.00 | | 2.00 | | 0.83 | | |
| | 166 | 1.761 | 1.773 | 4.00 | | 2.00 | | 0.83 | | |
| | 167 | 1.773 | 1.783 | 4.00 | | 2.00 | | 0.83 | | |
| | 168 | 1.783 | 1.792 | 4.00 | | 2.00 | | 0.83 | | |
| | 169 | 1.792 | 1.801 | 4.00 | | 2.00 | | 0.83 | | |
| | 170 | 1.801 | 1.809 | 4.00 | | 2.00 | | 0.83 | | |
| | 171 | 1.809 | 1.817 | 4.00 | | 2.00 | | 0.83 | | |
| | 172 | 1.817 | 1.824 | 4.00 | | 2.00 | | 0.83 | | |
| | 173 | 1.824 | 1.831 | 4.00 | | 2.00 | | 0.83 | | |
| | 174 | 1.831 | 1.838 | 4.00 | | 2.00 | | 0.83 | | |
| | 175 | 1.838 | 1.844 | 4.00 | | 2.00 | | 0.83 | | |
| | 176 | 1.844 | 1.850 | 4.00 | | 2.00 | | 0.83 | | |
| | 177 | 1.850 | 1.856 | 4.00 | | 2.00 | | 0.83 | | |
| | 178 | 1.856 | 1.862 | 4.00 | | 2.00 | | 0.83 | | |
| | 179 | 1.862 | 1.870 | 4.00 | | 2.00 | | 0.83 | | |

Eighth Example

Figure 13A:
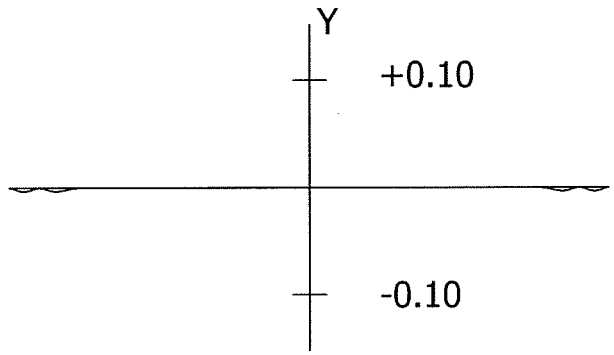
FIGS. 13A to 13C are graphs illustrating wavefront aberrations caused when respective optical discs are used in the optical information recording/reproducing apparatus according to a eighth example of the invention.
Figure 13B:
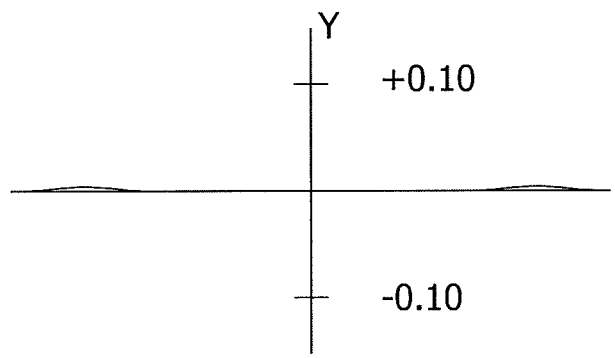
Figure 13C:
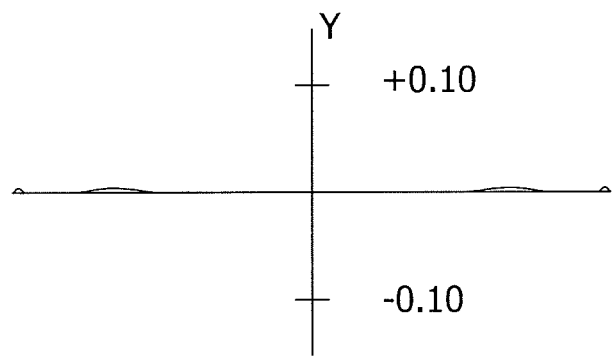

Hereafter, an eighth example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the eighth example are shown in Tables 43 to 47 and 48A to 48E. The wavefront aberrations caused when each of the optical discs OD1 to OD3 is used in the optical information recording/reproducing apparatus 100 according to the eighth example are shown in FIGS. 13A to 13C, respectively.

TABLE 43

| | unit | 1$^{st}$ laser beam | 2$^{nd}$ laser beam | 3$^{rd}$ laser beam |
|---|---|---|---|---|
| Design Wavelength | nm | 405 | 660 | 790 |
| Focal Length | mm | 1.411 | 1.725 | 1.816 |
| NA | | 0.85 | 0.62 | 0.50 |
| Magnification | | 0.00 | 0.00 | 0.00 |

TABLE 44

| Surface No. | r | d(405 nm) | d(660 nm) | d(790 nm) | |
|---|---|---|---|---|---|
| 1-1 | 0.892 | 1.620 | | | Objective Lens |
| 1-2 | 1.091 | | | | |
| 1-3 | 0.846 | | | | |
| 2 | −1.995 | 0.472 | 0.561 | 0.300 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.56023 | 1.54044 | 1.53653 | Objective Lens |
| 1-2 | | | | |
| 1-3 | | | | |
| 2 | | | | |
| 3 | 1.62231 | 1.57961 | 1.57307 | Optical Disc |
| 4 | | | | |

TABLE 45

| κ | 1-1<br>−1.000 | 1-2<br>−1.000 | 1-3<br>−1.000 | 2<br>2.530 |
|---|---|---|---|---|
| A4  | 1.06300E−02  | 2.37900E−02  | −8.10650E−02 | 8.79500E−01  |
| A6  | 1.16300E−01  | 4.64850E−01  | 1.78440E−01  | −1.68920E+00 |
| A8  | −5.38300E−02 | −3.86200E−01 | −8.42660E−02 | 2.44100E+00  |
| A10 | 1.86360E−02  | 9.25250E−02  | 1.37550E−01  | −2.33130E+00 |
| A12 | 9.35300E−04  | 1.95180E−03  | −1.74190E−01 | 1.17130E+00  |
| A14 |              |              | 1.14750E−01  | 2.75770E−01  |
| A16 |              |              | −3.17440E−02 | −7.30160E−01 |
| A18 |              |              |              | 3.05960E−01  |
| A20 |              |              |              |              |
| A22 |              |              |              |              |
| A24 |              |              |              |              |

TABLE 46

| Diffraction Order | 1-1<br>1/1/1 | 1-2<br>1/1/— | 1-3<br>2/—/— |
|---|---|---|---|
| P2  | 1.31760E+02  | 4.80410E+01  | 3.59910E+01  |
| P4  | −7.22670E+01 | −5.06860E+01 | −1.18000E+02 |
| P6  | 9.40900E+01  | 3.81670E+02  | 1.19250E+02  |
| P8  | −5.88100E+01 | −3.67390E+02 | −4.22000E+01 |
| P10 | 1.75610E+01  | 1.02040E+02  | 0.00000E+00  |
| P12 | 0.00000E+00  | 0.00000E+00  | 0.00000E+00  |

TABLE 47

| Diffraction Order | 1-1<br>1/0/0 | 1-2<br>1/0/— |
|---|---|---|
| P2  | −1.01940E+02 | −1.59650E+02 |
| P4  | −2.93900E+01 | −2.77000E+00 |
| P6  | 5.05270E+01  | 2.41900E+02  |
| P8  | −5.20050E+01 | −2.85380E+02 |
| P10 | 1.32420E+01  | 8.70170E+01  |
| P12 | 0.00000E+00  | 0.00000E+00  |

TABLE 48A

| | | | Phase Difference | | Optical Path Length | | Step Height | | Annular Zone Pitch | | |
|---|---|---|---|---|---|---|---|---|---|---|---|
| Annular Zone No. | Annular Zone Start Position mm | Annular Zone End Position mm | φ1<br>φ3<br>πrad | φ2<br>φ4<br>πrad | ΔOPD1/λ1<br>ΔOPD3/λ1 | ΔOPD2/λ1<br>ΔOPD4/λ1 | D1<br>D3<br>μm | D2<br>D4<br>μm | P1<br>P3 | P2<br>P4 | P1/P2<br>P3/P4 |
| First Area | 0  | 0.000 | 0.049 |      |      |      |      |      |       |       |       |
|            | 1  | 0.049 | 0.081 |      | 1.43 |      | 0.72 |      | 0.52  |       |       |
|            | 2  | 0.081 | 0.103 | 2.52 |      | 1.26 |      | 0.91 |       |       | 0.054 |
|            | 3  | 0.103 | 0.123 |      | 1.43 |      | 0.72 |      | 0.52  | 0.042 | 0.777 |
|            | 4  | 0.123 | 0.139 | 2.52 |      | 1.26 |      | 0.91 |       |       | 0.036 |
|            | 5  | 0.139 | 0.154 |      | 1.43 |      | 0.72 |      | 0.52  | 0.031 | 0.864 |
|            | 6  | 0.154 | 0.167 | 2.52 |      | 1.26 |      | 0.91 |       |       | 0.028 |
|            | 7  | 0.167 | 0.180 |      | 1.43 |      | 0.72 |      | 0.52  | 0.026 | 0.926 |
|            | 8  | 0.180 | 0.192 | 2.52 |      | 1.26 |      | 0.91 |       |       | 0.035 |
|            | 9  | 0.192 | 0.202 |      | 1.43 |      | 0.72 |      | 0.52  | 0.033 | 0.939 |
|            | 10 | 0.202 | 0.213 |      | 1.43 |      | 0.72 |      | 0.52  |       |       |
|            | 11 | 0.213 | 0.223 | 2.52 |      | 1.26 |      | 0.91 |       |       | 0.021 |
|            | 12 | 0.223 | 0.232 |      | 1.43 |      | 0.72 |      | 0.52  | 0.020 | 0.952 |
|            | 13 | 0.232 | 0.241 | 2.52 |      | 1.26 |      | 0.91 |       |       | 0.019 |
|            | 14 | 0.241 | 0.250 |      | 1.43 |      | 0.72 |      | 0.52  | 0.018 | 0.957 |
|            | 15 | 0.250 | 0.259 | 2.52 |      | 1.26 |      | 0.91 |       |       | 0.018 |
|            | 16 | 0.259 | 0.267 |      | 1.43 |      | 0.72 |      | 0.52  | 0.017 | 0.970 |
|            | 17 | 0.267 | 0.275 | 2.52 |      | 1.26 |      | 0.91 |       |       | 0.016 |
|            | 18 | 0.275 | 0.283 |      | 1.43 |      | 0.72 |      | 0.52  | 0.016 | 0.975 |
|            | 19 | 0.283 | 0.291 | 2.52 |      | 1.26 |      | 0.91 |       |       | 0.016 |
|            | 20 | 0.291 | 0.298 |      | 1.43 |      | 0.72 |      | 0.52  | 0.015 | 0.974 |
|            | 21 | 0.298 | 0.306 | 2.52 |      | 1.26 |      | 0.91 |       |       | 0.022 |
|            | 22 | 0.306 | 0.313 |      | 1.43 |      | 0.72 |      | 0.52  | 0.021 | 0.977 |
|            | 23 | 0.313 | 0.320 |      | 1.43 |      | 0.72 |      | 0.52  |       |       |
|            | 24 | 0.320 | 0.326 | 2.52 |      | 1.26 |      | 0.91 |       |       | 0.014 |
|            | 25 | 0.326 | 0.333 |      | 1.43 |      | 0.72 |      | 0.52  | 0.014 | 0.981 |
|            | 26 | 0.333 | 0.340 | 2.52 |      | 1.26 |      | 0.91 |       |       | 0.013 |
|            | 27 | 0.340 | 0.346 |      | 1.43 |      | 0.72 |      | 0.52  | 0.013 | 0.979 |
|            | 28 | 0.346 | 0.353 | 2.52 |      | 1.26 |      | 0.91 |       |       | 0.013 |
|            | 29 | 0.353 | 0.359 |      | 1.43 |      | 0.72 |      | 0.52  | 0.013 | 0.980 |
|            | 30 | 0.359 | 0.365 | 2.52 |      | 1.26 |      | 0.91 |       |       | 0.012 |
|            | 31 | 0.365 | 0.371 |      | 1.43 |      | 0.72 |      | 0.52  | 0.012 | 0.983 |
|            | 32 | 0.371 | 0.377 | 2.52 |      | 1.26 |      | 0.91 |       |       | 0.012 |
|            | 33 | 0.377 | 0.383 |      | 1.43 |      | 0.72 |      | 0.52  | 0.012 | 0.986 |
|            | 34 | 0.383 | 0.389 | 2.52 |      | 1.26 |      | 0.91 |       |       | 0.012 |
|            | 35 | 0.389 | 0.395 |      | 1.43 |      | 0.72 |      | 0.52  | 0.012 | 0.988 |
|            | 36 | 0.395 | 0.400 | 2.52 |      | 1.26 |      | 0.91 |       |       | 0.011 |
|            | 37 | 0.400 | 0.406 |      | 1.43 |      | 0.72 |      | 0.52  | 0.011 | 0.988 |

TABLE 48A-continued

| Annular Zone No. | Annular Zone Start Position mm | Annular Zone End Position mm | φ1 πrad / φ3 πrad | φ2 πrad / φ4 πrad | ΔOPD1/λ1 / ΔOPD3/λ1 | ΔOPD2/λ1 / ΔOPD4/λ1 | D1 μm / D3 μm | D2 μm / D4 μm | P1 / P3 | P2 / P4 | P1/P2 / P3/P4 |
|---|---|---|---|---|---|---|---|---|---|---|---|
| 38 | 0.406 | 0.411 | 2.52 |  | 1.26 |  | 0.91 |  |  | 0.011 |  |
| 39 | 0.411 | 0.417 |  | 1.43 |  | 0.72 |  | 0.52 | 0.011 |  | 0.987 |
| 40 | 0.417 | 0.422 | 2.52 |  | 1.26 |  | 0.91 |  |  | 0.011 |  |
| 41 | 0.422 | 0.427 |  | 1.43 |  | 0.72 |  | 0.52 | 0.011 |  | 0.986 |
| 42 | 0.427 | 0.433 | 2.52 |  | 1.26 |  | 0.91 |  |  | 0.011 |  |
| 43 | 0.433 | 0.438 |  | 1.43 |  | 0.72 |  | 0.52 | 0.010 |  | 0.986 |
| 44 | 0.438 | 0.443 | 2.52 |  | 1.26 |  | 0.91 |  |  | 0.010 |  |
| 45 | 0.443 | 0.448 |  | 1.43 |  | 0.72 |  | 0.52 | 0.010 |  | 0.987 |
| 46 | 0.448 | 0.453 | 2.52 |  | 1.26 |  | 0.91 |  |  | 0.010 |  |
| 47 | 0.453 | 0.458 |  | 1.43 |  | 0.72 |  | 0.52 | 0.010 |  | 0.988 |
| 48 | 0.458 | 0.463 | 2.52 |  | 1.26 |  | 0.91 |  |  | 0.010 |  |
| 49 | 0.463 | 0.468 |  | 1.43 |  | 0.72 |  | 0.52 | 0.010 |  | 0.990 |
| 50 | 0.468 | 0.473 | 2.52 |  | 1.26 |  | 0.91 |  |  | 0.010 |  |
| 51 | 0.473 | 0.477 |  | 1.43 |  | 0.72 |  | 0.52 | 0.010 |  | 0.992 |
| 52 | 0.477 | 0.482 | 2.52 |  | 1.26 |  | 0.91 |  |  | 0.009 |  |
| 53 | 0.482 | 0.487 |  | 1.43 |  | 0.72 |  | 0.52 | 0.009 |  | 0.993 |
| 54 | 0.487 | 0.491 | 2.52 |  | 1.26 |  | 0.91 |  |  | 0.009 |  |
| 55 | 0.491 | 0.496 |  | 1.43 |  | 0.72 |  | 0.52 | 0.009 |  | 0.993 |
| 56 | 0.496 | 0.501 | 2.52 |  | 1.26 |  | 0.91 |  |  | 0.009 |  |
| 57 | 0.501 | 0.505 |  | 1.43 |  | 0.72 |  | 0.52 | 0.009 |  | 0.992 |
| 58 | 0.505 | 0.510 | 2.52 |  | 1.26 |  | 0.91 |  |  | 0.009 |  |
| 59 | 0.510 | 0.514 |  | 1.43 |  | 0.72 |  | 0.52 | 0.009 |  | 0.992 |
| 60 | 0.514 | 0.518 | 2.52 |  | 1.26 |  | 0.91 |  |  | 0.009 |  |

TABLE 48B

| Area | Annular Zone No. | Start Position mm | End Position mm | φ1/φ3 | φ2/φ4 | ΔOPD1/3 | ΔOPD2/4 | D1/D3 | D2/D4 | P1/P3 | P2/P4 | Ratio |
|---|---|---|---|---|---|---|---|---|---|---|---|---|
| First Area | 61 | 0.518 | 0.523 |  | 1.43 |  | 0.72 |  | 0.52 | 0.009 |  | 0.991 |
|  | 62 | 0.523 | 0.527 | 2.52 |  | 1.26 |  | 0.91 |  |  | 0.009 |  |
|  | 63 | 0.527 | 0.531 |  | 1.43 |  | 0.72 |  | 0.52 | 0.009 |  | 0.990 |
|  | 64 | 0.531 | 0.536 | 2.52 |  | 1.26 |  | 0.91 |  |  | 0.009 |  |
|  | 65 | 0.536 | 0.540 |  | 1.43 |  | 0.72 |  | 0.52 | 0.009 |  | 0.991 |
|  | 66 | 0.540 | 0.544 | 2.52 |  | 1.26 |  | 0.91 |  |  | 0.008 |  |
|  | 67 | 0.544 | 0.548 |  | 1.43 |  | 0.72 |  | 0.52 | 0.008 |  | 0.991 |
|  | 68 | 0.548 | 0.552 | 2.52 |  | 1.26 |  | 0.91 |  |  | 0.008 |  |
|  | 69 | 0.552 | 0.557 |  | 1.43 |  | 0.72 |  | 0.52 | 0.008 |  | 0.992 |
|  | 70 | 0.557 | 0.561 | 2.52 |  | 1.26 |  | 0.91 |  |  | 0.008 |  |
|  | 71 | 0.561 | 0.565 |  | 1.43 |  | 0.72 |  | 0.52 | 0.008 |  | 0.993 |
|  | 72 | 0.565 | 0.569 | 2.52 |  | 1.26 |  | 0.91 |  |  | 0.008 |  |
|  | 73 | 0.569 | 0.573 |  | 1.43 |  | 0.72 |  | 0.52 | 0.008 |  | 0.994 |
|  | 74 | 0.573 | 0.577 | 2.52 |  | 1.26 |  | 0.91 |  |  | 0.008 |  |
|  | 75 | 0.577 | 0.581 |  | 1.43 |  | 0.72 |  | 0.52 | 0.008 |  | 0.995 |
|  | 76 | 0.581 | 0.585 | 2.52 |  | 1.26 |  | 0.91 |  |  | 0.008 |  |
|  | 77 | 0.585 | 0.588 |  | 1.43 |  | 0.72 |  | 0.52 | 0.008 |  | 0.995 |
|  | 78 | 0.588 | 0.592 | 2.52 |  | 1.26 |  | 0.91 |  |  | 0.008 |  |
|  | 79 | 0.592 | 0.596 |  | 1.43 |  | 0.72 |  | 0.52 | 0.008 |  | 0.994 |
|  | 80 | 0.596 | 0.600 | 2.52 |  | 1.26 |  | 0.91 |  |  | 0.008 |  |
|  | 81 | 0.600 | 0.604 |  | 1.43 |  | 0.72 |  | 0.52 | 0.008 |  | 0.993 |
|  | 82 | 0.604 | 0.608 | 2.52 |  | 1.26 |  | 0.91 |  |  | 0.008 |  |
|  | 83 | 0.608 | 0.611 |  | 1.43 |  | 0.72 |  | 0.52 | 0.008 |  | 0.993 |
|  | 84 | 0.611 | 0.615 | 2.52 |  | 1.26 |  | 0.91 |  |  | 0.007 |  |
|  | 85 | 0.615 | 0.619 |  | 1.43 |  | 0.72 |  | 0.52 | 0.007 |  | 0.992 |
|  | 86 | 0.619 | 0.622 | 2.52 |  | 1.26 |  | 0.91 |  |  | 0.007 |  |
|  | 87 | 0.622 | 0.626 |  | 1.43 |  | 0.72 |  | 0.52 | 0.007 |  | 0.993 |
|  | 88 | 0.626 | 0.630 | 2.52 |  | 1.26 |  | 0.91 |  |  | 0.007 |  |
|  | 89 | 0.630 | 0.633 |  | 1.43 |  | 0.72 |  | 0.52 | 0.007 |  | 0.993 |
|  | 90 | 0.633 | 0.637 | 2.52 |  | 1.26 |  | 0.91 |  |  | 0.007 |  |
|  | 91 | 0.637 | 0.640 |  | 1.43 |  | 0.72 |  | 0.52 | 0.007 |  | 0.994 |
|  | 92 | 0.640 | 0.644 | 2.52 |  | 1.26 |  | 0.91 |  |  | 0.007 |  |
|  | 93 | 0.644 | 0.648 |  | 1.43 |  | 0.72 |  | 0.52 | 0.007 |  | 0.995 |
|  | 94 | 0.648 | 0.651 | 2.52 |  | 1.26 |  | 0.91 |  |  | 0.007 |  |
|  | 95 | 0.651 | 0.655 |  | 1.43 |  | 0.72 |  | 0.52 | 0.007 |  | 0.995 |
|  | 96 | 0.655 | 0.658 | 2.52 |  | 1.26 |  | 0.91 |  |  | 0.007 |  |
|  | 97 | 0.658 | 0.661 |  | 1.43 |  | 0.72 |  | 0.52 | 0.007 |  | 0.996 |
|  | 98 | 0.661 | 0.665 | 2.52 |  | 1.26 |  | 0.91 |  |  | 0.007 |  |
|  | 99 | 0.665 | 0.668 |  | 1.43 |  | 0.72 |  | 0.52 | 0.007 |  | 0.995 |
|  | 100 | 0.668 | 0.672 | 2.52 |  | 1.26 |  | 0.91 |  |  | 0.010 |  |
|  | 101 | 0.672 | 0.675 | 2.52 |  | 1.26 |  | 0.91 |  |  |  |  |
|  | 102 | 0.675 | 0.679 |  | 1.43 |  | 0.72 |  | 0.52 | 0.010 |  | 1.009 |
|  | 103 | 0.679 | 0.682 | 2.52 |  | 1.26 |  | 0.91 |  |  | 0.007 |  |

TABLE 48B-continued

|  | | | | | | | | | |
|---|---|---|---|---|---|---|---|---|---|
| 104 | 0.682 | 0.685 |  | 1.43 |  | 0.72 | 0.52 | 0.007 | 0.971 |
| 105 | 0.685 | 0.688 | 2.52 |  | 1.26 |  | 0.91 | 0.007 | |
| 106 | 0.688 | 0.692 |  | 1.43 |  | 0.72 | 0.52 | 0.007 | 0.996 |
| 107 | 0.692 | 0.695 | 2.52 |  | 1.26 |  | 0.91 | 0.007 | |
| 108 | 0.695 | 0.698 |  | 1.43 |  | 0.72 | 0.52 | 0.006 | 0.995 |
| 109 | 0.698 | 0.701 | 2.52 |  | 1.26 |  | 0.91 | 0.006 | |
| 110 | 0.701 | 0.705 |  | 1.43 |  | 0.72 | 0.52 | 0.006 | 0.994 |
| 111 | 0.705 | 0.708 | 2.52 |  | 1.26 |  | 0.91 | 0.006 | |
| 112 | 0.708 | 0.711 |  | 1.43 |  | 0.72 | 0.52 | 0.006 | 0.994 |
| 113 | 0.711 | 0.714 | 2.52 |  | 1.26 |  | 0.91 | 0.006 | |
| 114 | 0.714 | 0.717 |  | 1.43 |  | 0.72 | 0.52 | 0.006 | 0.994 |
| 115 | 0.717 | 0.720 | 2.52 |  | 1.26 |  | 0.91 | 0.006 | |
| 116 | 0.720 | 0.724 |  | 1.43 |  | 0.72 | 0.52 | 0.006 | 0.995 |
| 117 | 0.724 | 0.727 | 2.52 |  | 1.26 |  | 0.91 | 0.006 | |
| 118 | 0.727 | 0.730 |  | 1.43 |  | 0.72 | 0.52 | 0.006 | 0.996 |
| 119 | 0.730 | 0.733 | 2.52 |  | 1.26 |  | 0.91 | 0.006 | |
| 120 | 0.733 | 0.736 |  | 1.43 |  | 0.72 | 0.52 | 0.006 | 0.996 |

TABLE 48C

| | | | | | | | | | | |
|---|---|---|---|---|---|---|---|---|---|---|
| First Area | 121 | 0.736 | 0.739 | 2.52 |  | 1.26 |  | 0.91 | 0.006 | |
| | 122 | 0.739 | 0.742 |  | 1.43 |  | 0.72 | 0.52 | 0.006 | 0.995 |
| | 123 | 0.742 | 0.745 | 2.52 |  | 1.26 |  | 0.91 | 0.006 | |
| | 124 | 0.745 | 0.748 |  | 1.43 |  | 0.72 | 0.52 | 0.006 | 0.994 |
| | 125 | 0.748 | 0.751 | 2.52 |  | 1.26 |  | 0.91 | 0.009 | |
| | 126 | 0.751 | 0.754 | 2.52 |  | 1.26 |  | 0.91 | | |
| | 127 | 0.754 | 0.757 |  | 1.43 |  | 0.72 | 0.52 | 0.009 | 0.995 |
| | 128 | 0.757 | 0.760 | 2.52 |  | 1.26 |  | 0.91 | 0.006 | |
| | 129 | 0.760 | 0.763 |  | 1.43 |  | 0.72 | 0.52 | 0.006 | 0.996 |
| | 130 | 0.763 | 0.766 | 2.52 |  | 1.26 |  | 0.91 | 0.006 | |
| | 131 | 0.766 | 0.768 |  | 1.43 |  | 0.72 | 0.52 | 0.006 | 0.995 |
| | 132 | 0.768 | 0.771 | 2.52 |  | 1.26 |  | 0.91 | 0.006 | |
| | 133 | 0.771 | 0.774 |  | 1.43 |  | 0.72 | 0.52 | 0.006 | 0.994 |
| | 134 | 0.774 | 0.777 | 2.52 |  | 1.26 |  | 0.91 | 0.006 | |
| | 135 | 0.777 | 0.780 |  | 1.43 |  | 0.72 | 0.52 | 0.006 | 0.994 |
| | 136 | 0.780 | 0.783 | 2.52 |  | 1.26 |  | 0.91 | 0.006 | |
| | 137 | 0.783 | 0.785 |  | 1.43 |  | 0.72 | 0.52 | 0.006 | 0.995 |
| | 138 | 0.785 | 0.788 | 2.52 |  | 1.26 |  | 0.91 | 0.006 | |
| | 139 | 0.788 | 0.791 |  | 1.43 |  | 0.72 | 0.52 | 0.006 | 0.996 |
| | 140 | 0.791 | 0.794 | 2.52 |  | 1.26 |  | 0.91 | 0.006 | |
| | 141 | 0.794 | 0.797 |  | 1.43 |  | 0.72 | 0.52 | 0.006 | 0.996 |
| | 142 | 0.797 | 0.799 | 2.52 |  | 1.26 |  | 0.91 | 0.005 | |
| | 143 | 0.799 | 0.802 |  | 1.43 |  | 0.72 | 0.52 | 0.005 | 0.995 |
| | 144 | 0.802 | 0.805 | 2.52 |  | 1.26 |  | 0.91 | 0.008 | |
| | 145 | 0.805 | 0.807 | 2.52 |  | 1.26 |  | 0.91 | | |
| | 146 | 0.807 | 0.810 |  | 1.43 |  | 0.72 | 0.52 | 0.008 | 0.995 |
| | 147 | 0.810 | 0.813 | 2.52 |  | 1.26 |  | 0.91 | 0.005 | |
| | 148 | 0.813 | 0.815 |  | 1.43 |  | 0.72 | 0.52 | 0.005 | 0.996 |
| | 149 | 0.815 | 0.818 | 2.52 |  | 1.26 |  | 0.91 | 0.005 | |
| | 150 | 0.818 | 0.821 |  | 1.43 |  | 0.72 | 0.52 | 0.005 | 0.994 |
| | 151 | 0.821 | 0.823 | 2.52 |  | 1.26 |  | 0.91 | 0.005 | |
| | 152 | 0.823 | 0.826 |  | 1.43 |  | 0.72 | 0.52 | 0.005 | 0.994 |
| | 153 | 0.826 | 0.829 | 2.52 |  | 1.26 |  | 0.91 | 0.005 | |
| | 154 | 0.829 | 0.831 |  | 1.43 |  | 0.72 | 0.52 | 0.005 | 0.995 |
| | 155 | 0.831 | 0.834 | 2.52 |  | 1.26 |  | 0.91 | 0.005 | |
| | 156 | 0.834 | 0.836 |  | 1.43 |  | 0.72 | 0.52 | 0.005 | 0.997 |
| | 157 | 0.836 | 0.839 | 2.52 |  | 1.26 |  | 0.91 | 0.005 | |
| | 158 | 0.839 | 0.841 |  | 1.43 |  | 0.72 | 0.52 | 0.005 | 0.996 |
| | 159 | 0.841 | 0.844 | 2.52 |  | 1.26 |  | 0.91 | 0.008 | |
| | 160 | 0.844 | 0.847 | 2.52 |  | 1.26 |  | 0.91 | | |
| | 161 | 0.847 | 0.849 |  | 1.43 |  | 0.72 | 0.52 | 0.008 | 0.995 |
| | 162 | 0.849 | 0.851 | 2.52 |  | 1.26 |  | 0.91 | 0.005 | |
| | 163 | 0.851 | 0.854 |  | 1.43 |  | 0.72 | 0.52 | 0.005 | 0.996 |
| | 164 | 0.854 | 0.856 | 2.52 |  | 1.26 |  | 0.91 | 0.005 | |
| | 165 | 0.856 | 0.859 |  | 1.43 |  | 0.72 | 0.52 | 0.005 | 0.994 |
| | 166 | 0.859 | 0.861 | 2.52 |  | 1.26 |  | 0.91 | 0.005 | |
| | 167 | 0.861 | 0.864 |  | 1.43 |  | 0.72 | 0.52 | 0.005 | 0.995 |
| | 168 | 0.864 | 0.866 | 2.52 |  | 1.26 |  | 0.91 | 0.005 | |
| | 169 | 0.866 | 0.869 |  | 1.43 |  | 0.72 | 0.52 | 0.005 | 0.997 |
| | 170 | 0.869 | 0.871 | 2.52 |  | 1.26 |  | 0.91 | 0.005 | |
| | 171 | 0.871 | 0.873 |  | 1.43 |  | 0.72 | 0.52 | 0.005 | 0.997 |
| | 172 | 0.873 | 0.876 | 2.52 |  | 1.26 |  | 0.91 | 0.005 | |
| | 173 | 0.876 | 0.878 |  | 1.43 |  | 0.72 | 0.52 | 0.005 | 0.993 |
| | 174 | 0.878 | 0.881 | 2.52 |  | 1.26 |  | 0.91 | 0.007 | |
| | 175 | 0.881 | 0.883 | 2.52 |  | 1.26 |  | 0.91 | | |
| | 176 | 0.883 | 0.885 |  | 1.43 |  | 0.72 | 0.52 | 0.007 | 0.996 |
| | 177 | 0.885 | 0.888 | 2.52 |  | 1.26 |  | 0.91 | 0.005 | |

TABLE 48C-continued

| No. | v1 | v2 | c3 | c4 | c5 | c6 | c7 | c8 | c9 | c10 | c11 |
|---|---|---|---|---|---|---|---|---|---|---|---|
| 178 | 0.888 | 0.890 | | 1.43 | | 0.72 | | 0.52 | 0.005 | | 0.994 |
| 179 | 0.890 | 0.892 | 2.52 | | 1.26 | | 0.91 | | | 0.005 | |
| 180 | 0.892 | 0.895 | | 1.43 | | 0.72 | | 0.52 | 0.005 | | 0.999 |

TABLE 48D

| Area | No. | v1 | v2 | c3 | c4 | c5 | c6 | c7 | c8 | c9 | c10 | c11 |
|---|---|---|---|---|---|---|---|---|---|---|---|---|
| First Area | 181 | 0.895 | 0.897 | 2.52 | | 1.26 | | 0.91 | | | 0.005 | |
| | 182 | 0.897 | 0.899 | | 1.43 | | 0.72 | | 0.52 | 0.005 | | 0.992 |
| | 183 | 0.899 | 0.901 | 2.52 | | 1.26 | | 0.91 | | | 0.005 | |
| | 184 | 0.901 | 0.904 | | 1.43 | | 0.72 | | 0.52 | 0.005 | | 1.001 |
| | 185 | 0.904 | 0.906 | 2.52 | | 1.26 | | 0.91 | | | 0.004 | |
| | 186 | 0.906 | 0.908 | | 1.43 | | 0.72 | | 0.52 | 0.004 | | 0.993 |
| | 187 | 0.908 | 0.910 | 2.52 | | 1.26 | | 0.91 | | | 0.010 | |
| Second Area | 188 | 0.910 | 0.911 | 2.41 | | 1.21 | | 1.01 | | | | |
| | 189 | 0.911 | 0.913 | 2.41 | | 1.21 | | 1.01 | | | | |
| | 190 | 0.913 | 0.916 | | 1.59 | | 0.79 | | 0.68 | 0.010 | | 0.981 |
| | 191 | 0.916 | 0.918 | | 1.59 | | 0.79 | | 0.68 | | | |
| | 192 | 0.918 | 0.920 | 2.41 | | 1.21 | | 1.01 | | | 0.004 | |
| | 193 | 0.920 | 0.922 | | 1.59 | | 0.79 | | 0.68 | 0.004 | | 0.997 |
| | 194 | 0.922 | 0.924 | 2.41 | | 1.21 | | 1.01 | | | 0.004 | |
| | 195 | 0.924 | 0.926 | | 1.59 | | 0.79 | | 0.68 | 0.004 | | 0.997 |
| | 196 | 0.926 | 0.928 | 2.41 | | 1.21 | | 1.01 | | | 0.006 | |
| | 197 | 0.928 | 0.930 | | 1.59 | | 0.79 | | 0.68 | 0.006 | | 0.997 |
| | 198 | 0.930 | 0.932 | | 1.59 | | 0.79 | | 0.68 | | | |
| | 199 | 0.932 | 0.934 | 2.41 | | 1.21 | | 1.01 | | | 0.004 | |
| | 200 | 0.934 | 0.936 | | 1.59 | | 0.79 | | 0.68 | 0.004 | | 0.997 |
| | 201 | 0.936 | 0.938 | 2.41 | | 1.21 | | 1.01 | | | 0.004 | |
| | 202 | 0.938 | 0.940 | | 1.59 | | 0.79 | | 0.68 | 0.004 | | 0.997 |
| | 203 | 0.940 | 0.942 | 2.41 | | 1.21 | | 1.01 | | | 0.004 | |
| | 204 | 0.942 | 0.944 | | 1.59 | | 0.79 | | 0.68 | 0.004 | | 0.963 |
| | 205 | 0.944 | 0.946 | 2.41 | | 1.21 | | 1.01 | | | 0.006 | |
| | 206 | 0.946 | 0.948 | | 1.59 | | 0.79 | | 0.68 | 0.006 | | 1.019 |
| | 207 | 0.948 | 0.949 | | 1.59 | | 0.79 | | 0.68 | | | |
| | 208 | 0.949 | 0.951 | 2.41 | | 1.21 | | 1.01 | | | 0.004 | |
| | 209 | 0.951 | 0.953 | | 1.59 | | 0.79 | | 0.68 | 0.004 | | 0.997 |
| | 210 | 0.953 | 0.955 | 2.41 | | 1.21 | | 1.01 | | | 0.004 | |
| | 211 | 0.955 | 0.957 | | 1.59 | | 0.79 | | 0.68 | 0.004 | | 0.997 |
| | 212 | 0.957 | 0.959 | 2.41 | | 1.21 | | 1.01 | | | 0.004 | |
| | 213 | 0.959 | 0.961 | | 1.59 | | 0.79 | | 0.68 | 0.004 | | 0.997 |
| | 214 | 0.961 | 0.963 | 2.41 | | 1.21 | | 1.01 | | | 0.004 | |
| | 215 | 0.963 | 0.965 | | 1.59 | | 0.79 | | 0.68 | 0.004 | | 0.997 |
| | 216 | 0.965 | 0.967 | 2.41 | | 1.21 | | 1.01 | | | 0.004 | |
| | 217 | 0.967 | 0.969 | | 1.59 | | 0.79 | | 0.68 | 0.004 | | 0.997 |
| | 218 | 0.969 | 0.970 | 2.41 | | 1.21 | | 1.01 | | | 0.004 | |
| | 219 | 0.970 | 0.972 | | 1.59 | | 0.79 | | 0.68 | 0.004 | | 0.997 |
| | 220 | 0.972 | 0.974 | 2.41 | | 1.21 | | 1.01 | | | 0.004 | |
| | 221 | 0.974 | 0.976 | | 1.59 | | 0.79 | | 0.68 | 0.004 | | 0.994 |
| | 222 | 0.976 | 0.978 | 2.41 | | 1.21 | | 1.01 | | | 0.004 | |
| | 223 | 0.978 | 0.980 | | 1.59 | | 0.79 | | 0.68 | 0.004 | | 1.012 |
| | 224 | 0.980 | 0.982 | 2.41 | | 1.21 | | 1.01 | | | 0.004 | |
| | 225 | 0.982 | 0.984 | | 1.59 | | 0.79 | | 0.68 | 0.004 | | 0.973 |
| | 226 | 0.984 | 0.986 | 2.41 | | 1.21 | | 1.01 | | | 0.004 | |
| | 227 | 0.986 | 0.987 | | 1.59 | | 0.79 | | 0.68 | 0.004 | | 0.974 |
| | 228 | 0.987 | 0.989 | 2.41 | | 1.21 | | 1.01 | | | 0.003 | |
| | 229 | 0.989 | 0.991 | | 1.59 | | 0.79 | | 0.68 | 0.004 | | 1.044 |
| | 230 | 0.991 | 0.993 | 2.41 | | 1.21 | | 1.01 | | | 0.004 | |
| | 231 | 0.993 | 0.994 | | 1.59 | | 0.79 | | 0.68 | 0.004 | | 0.989 |
| | 232 | 0.994 | 0.996 | 2.41 | | 1.21 | | 1.01 | | | 0.004 | |
| | 233 | 0.996 | 0.998 | | 1.59 | | 0.79 | | 0.68 | 0.004 | | 0.997 |
| | 234 | 0.998 | 1.000 | 2.41 | | 1.21 | | 1.01 | | | 0.004 | |
| | 235 | 1.000 | 1.002 | | 1.59 | | 0.79 | | 0.68 | 0.004 | | 0.997 |
| | 236 | 1.002 | 1.003 | 2.41 | | 1.21 | | 1.01 | | | 0.004 | |
| | 237 | 1.003 | 1.005 | | 1.59 | | 0.79 | | 0.68 | 0.004 | | 0.997 |
| | 238 | 1.005 | 1.007 | 2.41 | | 1.21 | | 1.01 | | | 0.004 | |
| | 239 | 1.007 | 1.009 | | 1.59 | | 0.79 | | 0.68 | 0.004 | | 0.998 |
| | 240 | 1.009 | 1.011 | 2.41 | | 1.21 | | 1.01 | | | 0.004 | |

TABLE 48E

| Area | No. | v1 | v2 | c3 | c4 | c5 | c6 | c7 | c8 | c9 | c10 | c11 |
|---|---|---|---|---|---|---|---|---|---|---|---|---|
| Second Area | 241 | 1.011 | 1.012 | | 1.59 | | 0.79 | | 0.68 | 0.004 | | 0.998 |
| | 242 | 1.012 | 1.014 | 2.41 | | 1.21 | | 1.01 | | | 0.004 | |
| | 243 | 1.014 | 1.016 | | 1.59 | | 0.79 | | 0.68 | 0.004 | | 0.998 |
| | 244 | 1.016 | 1.018 | 2.41 | | 1.21 | | 1.01 | | | 0.005 | |

TABLE 48E-continued

|  | | | | | | | | | | |
|---|---|---|---|---|---|---|---|---|---|---|
| | 245 | 1.018 | 1.020 | 2.41 | | 1.21 | | 1.01 | | |
| | 246 | 1.020 | 1.021 | | 1.59 | | 0.79 | | 0.68 | 0.005 | | 0.984 |
| | 247 | 1.021 | 1.023 | 2.41 | | 1.21 | | 1.01 | | 0.003 |
| | 248 | 1.023 | 1.025 | | 1.59 | | 0.79 | | 0.68 | 0.003 | | 1.019 |
| | 249 | 1.025 | 1.026 | 2.41 | | 1.21 | | 1.01 | | 0.003 |
| | 250 | 1.026 | 1.028 | | 1.59 | | 0.79 | | 0.68 | 0.003 | | 0.998 |
| | 251 | 1.028 | 1.030 | 2.41 | | 1.21 | | 1.01 | | 0.003 |
| | 252 | 1.030 | 1.032 | | 1.59 | | 0.79 | | 0.68 | 0.003 | | 0.998 |
| | 253 | 1.032 | 1.033 | 2.41 | | 1.21 | | 1.01 | | 0.005 |
| | 254 | 1.033 | 1.035 | 2.41 | | 1.21 | | 1.01 | | |
| | 255 | 1.035 | 1.037 | | 1.59 | | 0.79 | | 0.68 | 0.005 | | 0.997 |
| | 256 | 1.037 | 1.038 | 2.41 | | 1.21 | | 1.01 | | 0.003 |
| | 257 | 1.038 | 1.040 | | 1.59 | | 0.79 | | 0.68 | 0.003 | | 0.998 |
| | 258 | 1.040 | 1.042 | 2.41 | | 1.21 | | 1.01 | | 0.005 |
| | 259 | 1.042 | 1.044 | 2.41 | | 1.21 | | 1.01 | | |
| | 260 | 1.044 | 1.045 | | 1.59 | | 0.79 | | 0.68 | 0.005 | | 1.005 |
| | 261 | 1.045 | 1.047 | 2.41 | | 1.21 | | 1.01 | | 0.003 |
| | 262 | 1.047 | 1.049 | | 1.59 | | 0.79 | | 0.68 | 0.003 | | 0.986 |
| | 263 | 1.049 | 1.050 | 2.41 | | 1.21 | | 1.01 | | 0.005 |
| | 264 | 1.050 | 1.052 | 2.41 | | 1.21 | | 1.01 | | |
| | 265 | 1.052 | 1.054 | | 1.59 | | 0.79 | | 0.68 | 0.005 | | 0.992 |
| | 266 | 1.054 | 1.055 | 2.41 | | 1.21 | | 1.01 | | 0.003 |
| | 267 | 1.055 | 1.057 | | 1.59 | | 0.79 | | 0.68 | 0.003 | | 1.007 |
| | 268 | 1.057 | 1.059 | 2.41 | | 1.21 | | 1.01 | | 0.005 |
| | 269 | 1.059 | 1.060 | 2.41 | | 1.21 | | 1.01 | | |
| | 270 | 1.060 | 1.062 | | 1.59 | | 0.79 | | 0.68 | 0.005 | | 0.998 |
| | 271 | 1.062 | 1.064 | 2.41 | | 1.21 | | 1.01 | | 0.003 |
| | 272 | 1.064 | 1.065 | | 1.59 | | 0.79 | | 0.68 | 0.003 | | 0.998 |
| | 273 | 1.065 | 1.067 | 2.41 | | 1.21 | | 1.01 | | 0.005 |
| | 274 | 1.067 | 1.069 | 2.41 | | 1.21 | | 1.01 | | |
| | 275 | 1.069 | 1.070 | | 1.59 | | 0.79 | | 0.68 | 0.005 | | 0.957 |
| Third Area | 277 | 1.070 | 1.082 | 4.00 | | 2.00 | | 0.89 | | |
| | 278 | 1.082 | 1.102 | 4.00 | | 2.00 | | 0.89 | | |
| | 279 | 1.102 | 1.118 | 4.00 | | 2.00 | | 0.89 | | |
| | 280 | 1.118 | 1.132 | 4.00 | | 2.00 | | 0.89 | | |
| | 281 | 1.132 | 1.144 | 4.00 | | 2.00 | | 0.89 | | |
| | 282 | 1.144 | 1.155 | 4.00 | | 2.00 | | 0.89 | | |
| | 283 | 1.155 | 1.164 | 4.00 | | 2.00 | | 0.89 | | |
| | 284 | 1.164 | 1.173 | 4.00 | | 2.00 | | 0.89 | | |
| | 285 | 1.173 | 1.181 | 4.00 | | 2.00 | | 0.89 | | |
| | 286 | 1.181 | 1.188 | 4.00 | | 2.00 | | 0.89 | | |
| | 287 | 1.188 | 1.195 | 4.00 | | 2.00 | | 0.89 | | |
| | 288 | 1.195 | 1.200 | 4.00 | | 2.00 | | 0.89 | | |

Ninth Example

Figure 14A:
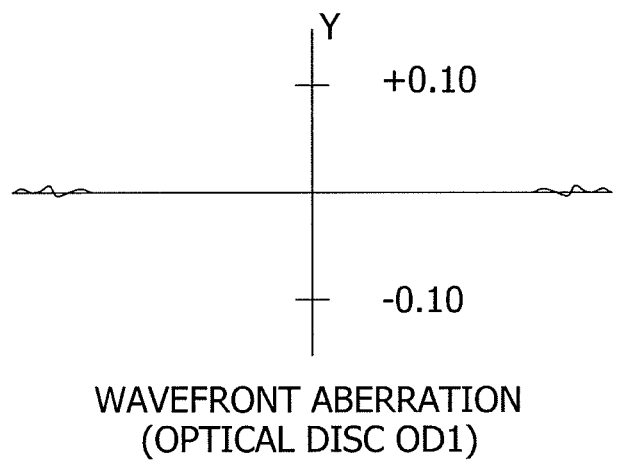
FIGS. 14A to 14C are graphs illustrating wavefront aberrations caused when respective optical discs are used in the optical information recording/reproducing apparatus according to a ninth example of the invention.
Figure 14B:
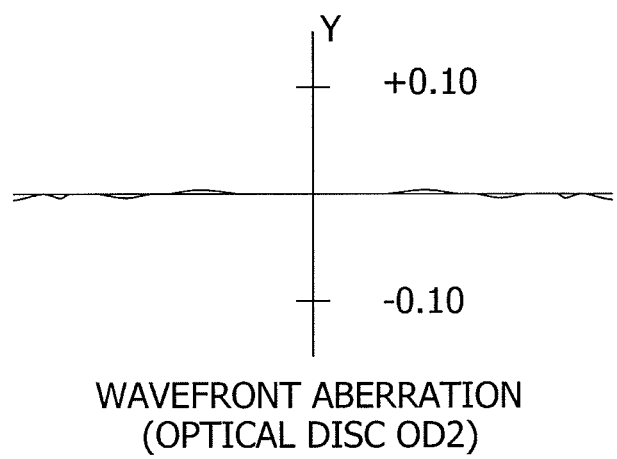
Figure 14C:
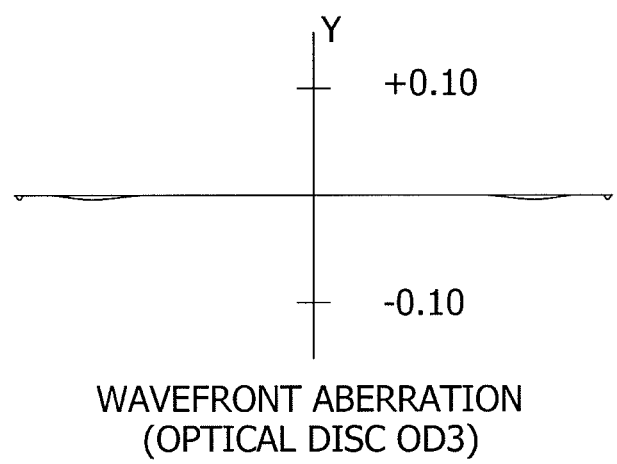

Hereafter, a ninth example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the ninth example are shown in Tables 49 to 53 and 54A to 54C. The wavefront aberrations caused when each of the optical discs OD1 to OD3 is used in the optical information recording/reproducing apparatus 100 according to the ninth example are shown in FIGS. 14A to 14C, respectively.

TABLE 49

| | unit | $1^{st}$ laser beam | $2^{nd}$ laser beam | $3^{rd}$ laser beam |
|---|---|---|---|---|
| Design Wavelength | nm | 405 | 660 | 790 |
| Focal Length | mm | 1.766 | 1.990 | 2.053 |

TABLE 49-continued

| | unit | $1^{st}$ laser beam | $2^{nd}$ laser beam | $3^{rd}$ laser beam |
|---|---|---|---|---|
| NA | | 0.85 | 0.63 | 0.50 |
| Magnification | | 0.00 | −0.02 | −0.02 |

TABLE 50

| Surface No. | r | d(405 nm) | d(660 nm) | d(790 nm) | |
|---|---|---|---|---|---|
| 1-1 | 1.108 | 1.880 | | | Objective Lens |
| 1-2 | 1.102 | | | | |
| 1-3 | 1.025 | | | | |
| 2 | −2.937 | 0.674 | 0.653 | 0.300 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.56023 | 1.54044 | 1.53653 | Objective Lens |
| 1-2 | | | | |
| 1-3 | | | | |
| 2 | | | | |
| 3 | 1.62231 | 1.57961 | 1.57307 | Optical Disc |
| 4 | | | | |

TABLE 51

| | 1-1 | 1-2 | 1-3 | 2 |
|---|---|---|---|---|
| κ | −1.000 | −1.000 | −1.000 | 3.200 |
| A4 | 2.83360E−02 | −1.51150E−01 | −5.93860E−02 | 3.61590E−01 |
| A6 | 1.30700E−02 | 2.91900E−01 | 7.13160E−02 | −5.82660E−01 |
| A8 | −1.06700E−03 | −1.31750E−01 | −2.57600E−02 | 9.37290E−01 |
| A10 | −1.56400E−04 | 1.50760E−02 | 2.85390E−02 | −1.10070E+00 |
| A12 | 2.76500E−04 | 1.57040E−03 | −2.35650E−02 | 8.43450E−01 |
| A14 | | | 1.00810E−02 | −3.94430E−01 |
| A16 | | | −1.72670E−03 | 1.02050E−01 |
| A18 | | | | −1.10800E−02 |
| A20 | | | | |
| A22 | | | | |
| A24 | | | | |

TABLE 52

| Diffraction Order | 1-1<br>1/1/1 | 1-2<br>1/1/— | 1-3<br>2/—/— |
|---|---|---|---|
| P2 | 5.83490E+01 | 6.03610E+01 | 3.63520E+01 |
| P4 | −1.51940E+01 | −1.65500E+02 | −7.49400E+01 |
| P6 | 7.30800E+00 | 2.59240E+02 | 4.82750E+01 |
| P8 | −3.65700E+00 | −1.40080E+02 | −1.04240E+01 |
| P10 | 2.43600E−01 | 2.41850E+01 | 0.00000E+00 |
| P12 | 0.00000E+00 | 0.00000E+00 | 0.00000E+00 |

TABLE 53

| Diffraction Order | 1-1<br>1/0/0 | 1-2<br>1/0/— |
|---|---|---|
| P2 | −3.61920E+01 | −3.48050E+01 |
| P4 | −7.44800E+00 | −1.05800E+02 |
| P6 | 1.55500E+00 | 1.68820E+02 |
| P8 | −1.22400E+00 | −9.36340E+01 |
| P10 | −8.39900E−02 | 1.65270E+01 |
| P12 | 0.00000E+00 | 0.00000E+00 |

TABLE 54A

| | Annular Zone No. | Annular Zone Start Position mm | Annular Zone End Position mm | Phase Difference φ1 φ3 πrad | φ2 φ4 πrad | Optical Path Length ΔOPD1/λ1 ΔOPD3/λ1 | ΔOPD2/λ1 ΔOPD4/λ1 | Step Height D1 D3 μm | D2 D4 μm | Annular Zone Pitch P1 P2 P3 P4 | P1/P2 P3/P4 |
|---|---|---|---|---|---|---|---|---|---|---|---|
| First Area | 0 | 0.000 | 0.069 | | | | | | | | |
| | 1 | 0.069 | 0.126 | | 1.35 | | 0.67 | | 0.49 | | |
| | 2 | 0.126 | 0.164 | 2.41 | | 1.21 | | 0.87 | | 0.094 | |
| | 3 | 0.164 | 0.194 | | 1.35 | | 0.67 | | 0.49 | 0.068 | 0.723 |
| | 4 | 0.194 | 0.221 | 2.41 | | 1.21 | | 0.87 | | 0.077 | |
| | 5 | 0.221 | 0.241 | | 1.35 | | 0.67 | | 0.49 | 0.068 | 0.889 |
| | 6 | 0.241 | 0.263 | | 1.35 | | 0.67 | | 0.49 | | |
| | 7 | 0.263 | 0.283 | 2.41 | | 1.21 | | 0.87 | | 0.042 | |
| | 8 | 0.283 | 0.302 | | 1.35 | | 0.67 | | 0.49 | 0.040 | 0.937 |
| | 9 | 0.302 | 0.321 | 2.41 | | 1.21 | | 0.87 | | 0.050 | |
| | 10 | 0.321 | 0.334 | | 1.35 | | 0.67 | | 0.49 | 0.048 | 0.947 |
| | 11 | 0.334 | 0.350 | | 1.35 | | 0.67 | | 0.49 | | |
| | 12 | 0.350 | 0.366 | 2.41 | | 1.21 | | 0.87 | | 0.032 | |
| | 13 | 0.366 | 0.381 | | 1.35 | | 0.67 | | 0.49 | 0.031 | 0.956 |
| | 14 | 0.381 | 0.395 | 2.41 | | 1.21 | | 0.87 | | 0.040 | |
| | 15 | 0.395 | 0.406 | | 1.35 | | 0.67 | | 0.49 | 0.039 | 0.961 |
| | 16 | 0.406 | 0.420 | | 1.35 | | 0.67 | | 0.49 | | |
| | 17 | 0.420 | 0.433 | 2.41 | | 1.21 | | 0.87 | | 0.027 | |
| | 18 | 0.433 | 0.446 | | 1.35 | | 0.67 | | 0.49 | 0.026 | 0.973 |
| | 19 | 0.446 | 0.458 | 2.41 | | 1.21 | | 0.87 | | 0.025 | |
| | 20 | 0.458 | 0.470 | | 1.35 | | 0.67 | | 0.49 | 0.025 | 0.970 |
| | 21 | 0.470 | 0.482 | 2.41 | | 1.21 | | 0.87 | | 0.033 | |
| | 22 | 0.482 | 0.491 | | 1.35 | | 0.67 | | 0.49 | 0.032 | 0.979 |
| | 23 | 0.491 | 0.502 | | 1.35 | | 0.67 | | 0.49 | | |
| | 24 | 0.502 | 0.514 | 2.41 | | 1.21 | | 0.87 | | 0.022 | |
| | 25 | 0.514 | 0.524 | | 1.35 | | 0.67 | | 0.49 | 0.022 | 0.978 |
| | 26 | 0.524 | 0.535 | 2.41 | | 1.21 | | 0.87 | | 0.021 | |
| | 27 | 0.535 | 0.545 | | 1.35 | | 0.67 | | 0.49 | 0.021 | 0.984 |
| | 28 | 0.545 | 0.556 | 2.41 | | 1.21 | | 0.87 | | 0.028 | |
| | 29 | 0.556 | 0.563 | | 1.35 | | 0.67 | | 0.49 | 0.028 | 0.978 |
| | 30 | 0.563 | 0.573 | | 1.35 | | 0.67 | | 0.49 | | |
| | 31 | 0.573 | 0.583 | 2.41 | | 1.21 | | 0.87 | | 0.020 | |
| | 32 | 0.583 | 0.593 | | 1.35 | | 0.67 | | 0.49 | 0.019 | 0.988 |
| | 33 | 0.593 | 0.602 | 2.41 | | 1.21 | | 0.87 | | 0.019 | |
| | 34 | 0.602 | 0.611 | | 1.35 | | 0.67 | | 0.49 | 0.019 | 0.982 |
| | 35 | 0.611 | 0.620 | 2.41 | | 1.21 | | 0.87 | | 0.018 | |
| | 36 | 0.620 | 0.629 | | 1.35 | | 0.67 | | 0.49 | 0.018 | 0.981 |
| | 37 | 0.629 | 0.638 | 2.41 | | 1.21 | | 0.87 | | 0.018 | |

TABLE 54A-continued

| Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 D3 μm | Step Height D2 D4 μm | Annular Zone Pitch P1 P3 | Annular Zone Pitch P2 P4 | Annular Zone Pitch P1/P2 P3/P4 |
|---|---|---|---|---|---|---|---|---|---|---|---|
| 38 | 0.638 | 0.647 |      | 1.35 |      | 0.67 |      | 0.49 | 0.018 |       | 0.984 |
| 39 | 0.647 | 0.656 | 2.41 |      | 1.21 |      | 0.87 |      |       | 0.017 |       |
| 40 | 0.656 | 0.664 |      | 1.35 |      | 0.67 |      | 0.49 | 0.017 |       | 0.990 |
| 41 | 0.664 | 0.672 | 2.41 |      | 1.21 |      | 0.87 |      |       | 0.023 |       |
| 42 | 0.672 | 0.679 |      | 1.35 |      | 0.67 |      | 0.49 | 0.023 |       | 0.986 |
| 43 | 0.679 | 0.687 |      | 1.35 |      | 0.67 |      | 0.49 |       |       |       |
| 44 | 0.687 | 0.695 | 2.41 |      | 1.21 |      | 0.87 |      |       | 0.016 |       |
| 45 | 0.695 | 0.703 |      | 1.35 |      | 0.67 |      | 0.49 | 0.016 |       | 0.989 |
| 46 | 0.703 | 0.711 | 2.41 |      | 1.21 |      | 0.87 |      |       | 0.016 |       |
| 47 | 0.711 | 0.719 |      | 1.35 |      | 0.67 |      | 0.49 | 0.016 |       | 0.992 |
| 48 | 0.719 | 0.727 | 2.41 |      | 1.21 |      | 0.87 |      |       | 0.016 |       |
| 49 | 0.727 | 0.734 |      | 1.35 |      | 0.67 |      | 0.49 | 0.015 |       | 0.991 |
| 50 | 0.734 | 0.742 | 2.41 |      | 1.21 |      | 0.87 |      |       | 0.015 |       |
| 51 | 0.742 | 0.750 |      | 1.35 |      | 0.67 |      | 0.49 | 0.015 |       | 0.990 |
| 52 | 0.750 | 0.757 | 2.41 |      | 1.21 |      | 0.87 |      |       | 0.015 |       |
| 53 | 0.757 | 0.764 |      | 1.35 |      | 0.67 |      | 0.49 | 0.015 |       | 0.989 |
| 54 | 0.764 | 0.772 | 2.41 |      | 1.21 |      | 0.87 |      |       | 0.015 |       |
| 55 | 0.772 | 0.779 |      | 1.35 |      | 0.67 |      | 0.49 | 0.014 |       | 0.989 |
| 56 | 0.779 | 0.786 | 2.41 |      | 1.21 |      | 0.87 |      |       | 0.014 |       |
| 57 | 0.786 | 0.793 |      | 1.35 |      | 0.67 |      | 0.49 | 0.014 |       | 0.989 |
| 58 | 0.793 | 0.800 | 2.41 |      | 1.21 |      | 0.87 |      |       | 0.014 |       |
| 59 | 0.800 | 0.807 |      | 1.35 |      | 0.67 |      | 0.49 | 0.014 |       | 0.990 |
| 60 | 0.807 | 0.814 | 2.41 |      | 1.21 |      | 0.87 |      |       | 0.014 |       |

TABLE 54B

| | Annular Zone No. | Start Position mm | End Position mm | φ1 φ3 πrad | φ2 φ4 πrad | ΔOPD1/λ1 ΔOPD3/λ1 | ΔOPD2/λ1 ΔOPD4/λ1 | D1 D3 μm | D2 D4 μm | P1 P3 | P2 P4 | P1/P2 P3/P4 |
|---|---|---|---|---|---|---|---|---|---|---|---|---|
| First Area | 61 | 0.814 | 0.821 |      | 1.35 |      | 0.67 |      | 0.49 | 0.014 |       | 0.990 |
| | 62 | 0.821 | 0.827 | 2.41 |      | 1.21 |      | 0.87 |      |       | 0.014 |       |
| | 63 | 0.827 | 0.834 |      | 1.35 |      | 0.67 |      | 0.49 | 0.013 |       | 0.990 |
| | 64 | 0.834 | 0.841 | 2.41 |      | 1.21 |      | 0.87 |      |       | 0.013 |       |
| | 65 | 0.841 | 0.847 |      | 1.35 |      | 0.67 |      | 0.49 | 0.013 |       | 0.992 |
| | 66 | 0.847 | 0.854 | 2.41 |      | 1.21 |      | 0.87 |      |       | 0.013 |       |
| | 67 | 0.854 | 0.860 |      | 1.35 |      | 0.67 |      | 0.49 | 0.013 |       | 0.994 |
| | 68 | 0.860 | 0.867 | 2.41 |      | 1.21 |      | 0.87 |      |       | 0.013 |       |
| | 69 | 0.867 | 0.873 |      | 1.35 |      | 0.67 |      | 0.49 | 0.013 |       | 0.995 |
| | 70 | 0.873 | 0.881 | 2.41 |      | 1.21 |      | 0.87 |      |       | 0.020 |       |
| | 71 | 0.881 | 0.887 | 2.41 |      | 1.21 |      | 0.87 |      |       |       |       |
| | 72 | 0.887 | 0.893 |      | 1.35 |      | 0.67 |      | 0.49 | 0.020 |       | 0.990 |
| | 73 | 0.893 | 0.900 | 2.41 |      | 1.21 |      | 0.87 |      |       | 0.012 |       |
| | 74 | 0.900 | 0.906 |      | 1.35 |      | 0.67 |      | 0.49 | 0.012 |       | 0.995 |
| | 75 | 0.906 | 0.912 | 2.41 |      | 1.21 |      | 0.87 |      |       | 0.012 |       |
| | 76 | 0.912 | 0.918 |      | 1.35 |      | 0.67 |      | 0.49 | 0.012 |       | 0.991 |
| | 77 | 0.918 | 0.924 | 2.41 |      | 1.21 |      | 0.87 |      |       | 0.012 |       |
| | 78 | 0.924 | 0.930 |      | 1.35 |      | 0.67 |      | 0.49 | 0.012 |       | 0.990 |
| | 79 | 0.930 | 0.936 | 2.41 |      | 1.21 |      | 0.87 |      |       | 0.012 |       |
| | 80 | 0.936 | 0.942 |      | 1.35 |      | 0.67 |      | 0.49 | 0.012 |       | 0.993 |
| | 81 | 0.942 | 0.949 | 2.41 |      | 1.21 |      | 0.87 |      |       | 0.019 |       |
| | 82 | 0.949 | 0.955 | 2.41 |      | 1.21 |      | 0.87 |      |       |       |       |
| | 83 | 0.955 | 0.960 |      | 1.35 |      | 0.67 |      | 0.49 | 0.019 |       | 0.993 |
| | 84 | 0.960 | 0.966 | 2.41 |      | 1.21 |      | 0.87 |      |       | 0.011 |       |
| | 85 | 0.966 | 0.972 |      | 1.35 |      | 0.67 |      | 0.49 | 0.011 |       | 0.996 |
| | 86 | 0.972 | 0.977 | 2.41 |      | 1.21 |      | 0.87 |      |       | 0.011 |       |
| | 87 | 0.977 | 0.983 |      | 1.35 |      | 0.67 |      | 0.49 | 0.011 |       | 0.995 |
| | 88 | 0.983 | 0.990 | 2.41 |      | 1.21 |      | 0.87 |      |       | 0.018 |       |
| | 89 | 0.990 | 0.995 | 2.41 |      | 1.21 |      | 0.87 |      |       |       |       |
| | 90 | 0.995 | 1.001 |      | 1.35 |      | 0.67 |      | 0.49 | 0.018 |       | 0.994 |
| | 91 | 1.001 | 1.006 | 2.41 |      | 1.21 |      | 0.87 |      |       | 0.011 |       |
| | 92 | 1.006 | 1.011 |      | 1.35 |      | 0.67 |      | 0.49 | 0.011 |       | 0.991 |
| | 93 | 1.011 | 1.018 | 2.41 |      | 1.21 |      | 0.87 |      |       | 0.017 |       |
| | 94 | 1.018 | 1.023 | 2.41 |      | 1.21 |      | 0.87 |      |       |       |       |
| | 95 | 1.023 | 1.029 |      | 1.35 |      | 0.67 |      | 0.49 | 0.017 |       | 1.011 |
| | 96 | 1.029 | 1.034 | 2.41 |      | 1.21 |      | 0.87 |      |       | 0.011 |       |
| | 97 | 1.034 | 1.039 |      | 1.35 |      | 0.67 |      | 0.49 | 0.010 |       | 0.967 |
| | 98 | 1.039 | 1.045 | 2.41 |      | 1.21 |      | 0.87 |      |       | 0.017 |       |
| | 99 | 1.045 | 1.051 | 2.41 |      | 1.21 |      | 0.87 |      |       |       |       |
| | 100 | 1.051 | 1.056 |      | 1.35 |      | 0.67 |      | 0.49 | 0.017 |       | 0.995 |
| | 101 | 1.056 | 1.061 | 2.41 |      | 1.21 |      | 0.87 |      |       | 0.010 |       |
| | 102 | 1.061 | 1.066 |      | 1.35 |      | 0.67 |      | 0.49 | 0.010 |       | 0.997 |
| | 103 | 1.066 | 1.072 | 2.41 |      | 1.21 |      | 0.87 |      |       | 0.016 |       |

TABLE 54B-continued

| | No | start | end | | | | | | | | | |
|---|---|---|---|---|---|---|---|---|---|---|---|---|
| | 104 | 1.072 | 1.077 | 2.41 | | 1.21 | | 0.87 | | | | |
| | 105 | 1.077 | 1.082 | | 1.35 | | 0.67 | | 0.49 | 0.016 | | 0.992 |
| | 106 | 1.082 | 1.088 | 2.41 | | 1.21 | | 0.87 | | | 0.016 | |
| | 107 | 1.088 | 1.093 | 2.41 | | 1.21 | | 0.87 | | | | |
| | 108 | 1.093 | 1.098 | | 1.35 | | 0.67 | | 0.49 | 0.016 | | 0.999 |
| | 109 | 1.098 | 1.104 | 2.19 | | 1.10 | | 0.89 | | | 0.011 | |
| | 110 | 1.104 | 1.109 | | 1.43 | | 0.72 | | 0.59 | 0.011 | | 1.041 |
| Second Area | 111 | 1.109 | 1.115 | 2.19 | | 1.10 | | 0.89 | | | 0.011 | |
| | 112 | 1.115 | 1.120 | | 1.43 | | 0.72 | | 0.59 | 0.010 | | 0.968 |
| | 113 | 1.120 | 1.125 | 2.19 | | 1.10 | | 0.89 | | | 0.013 | |
| | 114 | 1.125 | 1.127 | | 1.43 | | 0.72 | | 0.59 | 0.012 | | 0.990 |
| | 115 | 1.127 | 1.132 | | 1.43 | | 0.72 | | 0.59 | | | |
| | 116 | 1.132 | 1.137 | 2.19 | | 1.10 | | 0.89 | | | 0.010 | |
| | 117 | 1.137 | 1.142 | | 1.43 | | 0.72 | | 0.59 | 0.010 | | 0.990 |
| | 118 | 1.142 | 1.147 | 2.19 | | 1.10 | | 0.89 | | | 0.012 | |
| | 119 | 1.147 | 1.149 | | 1.43 | | 0.72 | | 0.59 | 0.012 | | 0.989 |
| | 120 | 1.149 | 1.154 | | 1.43 | | 0.72 | | 0.59 | | | |

TABLE 54C

| | No | start | end | | | | | | | | | |
|---|---|---|---|---|---|---|---|---|---|---|---|---|
| Second Area | 121 | 1.154 | 1.158 | 2.19 | | 1.10 | | 0.89 | | | 0.009 | |
| | 122 | 1.158 | 1.163 | | 1.43 | | 0.72 | | 0.59 | 0.009 | | 0.990 |
| | 123 | 1.163 | 1.167 | 2.19 | | 1.10 | | 0.89 | | | 0.009 | |
| | 124 | 1.167 | 1.172 | | 1.43 | | 0.72 | | 0.59 | 0.009 | | 0.990 |
| | 125 | 1.172 | 1.176 | 2.19 | | 1.10 | | 0.89 | | | 0.009 | |
| | 126 | 1.176 | 1.181 | | 1.43 | | 0.72 | | 0.59 | 0.009 | | 0.989 |
| | 127 | 1.181 | 1.185 | 2.19 | | 1.10 | | 0.89 | | | 0.009 | |
| | 128 | 1.185 | 1.190 | | 1.43 | | 0.72 | | 0.59 | 0.009 | | 0.990 |
| | 129 | 1.190 | 1.194 | 2.19 | | 1.10 | | 0.89 | | | 0.009 | |
| | 130 | 1.194 | 1.198 | | 1.43 | | 0.72 | | 0.59 | 0.009 | | 0.989 |
| | 131 | 1.198 | 1.202 | 2.19 | | 1.10 | | 0.89 | | | 0.008 | |
| | 132 | 1.202 | 1.206 | | 1.43 | | 0.72 | | 0.59 | 0.008 | | 0.989 |
| | 133 | 1.206 | 1.211 | 2.19 | | 1.10 | | 0.89 | | | 0.008 | |
| | 134 | 1.211 | 1.215 | | 1.43 | | 0.72 | | 0.59 | 0.008 | | 0.989 |
| | 135 | 1.215 | 1.221 | 2.19 | | 1.10 | | 0.89 | | | 0.014 | |
| | 136 | 1.221 | 1.224 | 2.19 | | 1.10 | | 0.89 | | | | |
| | 137 | 1.224 | 1.228 | | 1.43 | | 0.72 | | 0.59 | 0.014 | | 0.990 |
| | 138 | 1.228 | 1.234 | 2.19 | | 1.10 | | 0.89 | | | 0.013 | |
| | 139 | 1.234 | 1.238 | 2.19 | | 1.10 | | 0.89 | | | | |
| | 140 | 1.238 | 1.242 | | 1.43 | | 0.72 | | 0.59 | 0.013 | | 0.990 |
| | 141 | 1.242 | 1.247 | 2.19 | | 1.10 | | 0.89 | | | 0.013 | |
| | 142 | 1.247 | 1.251 | 2.19 | | 1.10 | | 0.89 | | | | |
| | 144 | 1.251 | 1.255 | | 1.43 | | 0.72 | | 0.59 | 0.013 | | 0.989 |
| | 145 | 1.255 | 1.260 | 2.19 | | 1.10 | | 0.89 | | | 0.018 | |
| | 146 | 1.260 | 1.265 | 2.19 | | 1.10 | | 0.89 | | | | |
| | 147 | 1.265 | 1.269 | 2.19 | | 1.10 | | 0.89 | | | | |
| | 148 | 1.269 | 1.272 | | 1.43 | | 0.72 | | 0.59 | 0.018 | | 0.990 |
| | 149 | 1.272 | 1.277 | 2.19 | | 1.10 | | 0.89 | | | | |
| | 150 | 1.277 | 1.282 | 2.19 | | 1.10 | | 0.89 | | | | |
| | 151 | 1.282 | 1.287 | 2.19 | | 1.10 | | 0.89 | | | | |
| | 152 | 1.287 | 1.292 | 2.19 | | 1.10 | | 0.89 | | | | |
| | 153 | 1.292 | 1.297 | 2.19 | | 1.10 | | 0.89 | | | | |
| | 154 | 1.297 | 1.301 | 2.19 | | 1.10 | | 0.89 | | | | |
| | 155 | 1.301 | 1.306 | 2.19 | | 1.10 | | 0.89 | | | | |
| | 156 | 1.306 | 1.310 | 2.19 | | 1.10 | | 0.89 | | | | |
| Third Area | 157 | 1.310 | 1.353 | 4.00 | | 2.00 | | 0.89 | | | | |
| | 158 | 1.353 | 1.387 | 4.00 | | 2.00 | | 0.86 | | | | |
| | 159 | 1.387 | 1.411 | 4.00 | | 2.00 | | 0.86 | | | | |
| | 160 | 1.411 | 1.430 | 4.00 | | 2.00 | | 0.86 | | | | |
| | 161 | 1.430 | 1.445 | 4.00 | | 2.00 | | 0.86 | | | | |
| | 162 | 1.445 | 1.458 | 4.00 | | 2.00 | | 0.86 | | | | |
| | 163 | 1.458 | 1.469 | 4.00 | | 2.00 | | 0.86 | | | | |
| | 164 | 1.469 | 1.480 | 4.00 | | 2.00 | | 0.86 | | | | |
| | 165 | 1.480 | 1.489 | 4.00 | | 2.00 | | 0.86 | | | | |
| | 166 | 1.489 | 1.500 | 4.00 | | 2.00 | | 0.86 | | | | |

Tenth Example

Hereafter, a tenth example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the tenth example are shown in Tables 55 to 59 and 60A to 60C. The wavefront aberrations caused when each of the optical discs OD1 to OD3 is used in the optical information recording/reproducing apparatus 100 according to the tenth example are shown in FIGS. 15A to 15C, respectively.

TABLE 55

|  | unit | 1st laser beam | 2nd laser beam | 3rd laser beam |
|---|---|---|---|---|
| Design Wavelength | nm | 405 | 660 | 790 |
| Focal Length | mm | 1.764 | 2.000 | 2.064 |
| NA |  | 0.85 | 0.60 | 0.47 |
| Magnification |  | 0.00 | 0.00 | 0.00 |

TABLE 56

| Surface No. | r | d(405 nm) | d(660 nm) | d(790 nm) |  |
|---|---|---|---|---|---|
| 1-1 | 1.114 | 1.880 |  |  | Objective Lens |
| 1-2 | 1.129 |  |  |  |  |
| 1-3 | 1.007 |  |  |  |  |
| 2 | −2.935 | 0.672 | 0.625 | 0.319 |  |
| 3 | ∞ | 0.0875 | 0.600 | 1.200 | Optical Disc |
| 4 | ∞ |  |  |  |  |

| Surface No. | n(405 nm) | n(660 nm) | n(790 nm) |  |
|---|---|---|---|---|
| 1-1 | 1.56023 | 1.54044 | 1.53653 | Objective Lens |
| 1-2 |  |  |  |  |
| 1-3 |  |  |  |  |
| 2 |  |  |  |  |
| 3 | 1.62231 | 1.57961 | 1.57307 | Optical Disc |
| 4 |  |  |  |  |

TABLE 57

|  | 1-1 | 1-2 | 1-3 | 2 |
|---|---|---|---|---|
| κ | −1.000 | −1.000 | −1.000 | 3.100 |
| A4 | 2.81800E−02 | −5.93400E−02 | −7.43130E−02 | 3.77280E−01 |
| A6 | 1.47400E−02 | 1.91700E−01 | 8.02730E−02 | −6.19460E−01 |
| A8 | −2.68700E−03 | −9.45800E−02 | −2.09870E−02 | 9.56070E−01 |
| A10 | 5.72900E−04 | 1.16600E−02 | 1.92360E−02 | −1.08940E+00 |
| A12 | −8.33800E−07 | 5.08200E−04 | −1.66450E−02 | 8.30880E−01 |
| A14 |  |  | 7.39140E−03 | −3.94180E−01 |
| A16 |  |  | −1.32860E−03 | 1.04850E−01 |
| A18 |  |  |  | −1.18530E−02 |
| A20 |  |  |  |  |
| A22 |  |  |  |  |
| A24 |  |  |  |  |

TABLE 58

| Diffraction Order | 1-1 1/1/1 | 1-2 1/1/— | 1-3 2/—/— |
|---|---|---|---|
| P2 | 5.87700E+01 | 5.38870E+01 | 4.19810E+01 |
| P4 | −1.57240E+01 | −8.87100E+01 | −8.66560E+01 |
| P6 | 7.65100E+00 | 1.65500E+02 | 5.71620E+01 |
| P8 | −3.81500E+00 | −9.83500E+01 | −1.24450E+01 |
| P10 | 1.69900E−01 | 1.69850E+01 | 0.00000E+00 |
| P12 | 0.00000E+00 | 0.00000E+00 | 0.00000E+00 |

TABLE 59

| Diffraction Order | 1-1 1/0/0 | 1-2 1/0/— |
|---|---|---|
| P2 | −4.07780E+01 | −4.41440E+01 |
| P4 | −7.35000E+00 | −5.42840E+01 |
| P6 | 2.98700E+00 | 1.06560E+02 |
| P8 | −2.86700E+00 | −6.64150E+01 |
| P10 | 4.47400E−01 | 1.21470E+01 |
| P12 | 0.00000E+00 | 0.00000E+00 |

TABLE 60A

|  | Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 D3 μm | Step Height D2 D4 μm | Annular Zone Pitch P1 P3 μm | Annular Zone Pitch P2 P4 μm | P1/P2 P3/P4 |
|---|---|---|---|---|---|---|---|---|---|---|---|---|
| First Area | 0 | 0.000 | 0.068 |  |  |  |  |  |  |  |  |  |
|  | 1 | 0.068 | 0.121 | 1.39 |  | 0.69 |  | 0.50 |  |  |  |  |
|  | 2 | 0.121 | 0.159 | 2.46 | 1.23 |  | 0.89 |  |  | 0.090 |  |  |
|  | 3 | 0.159 | 0.188 | 1.39 |  | 0.69 |  | 0.50 |  | 0.068 |  | 0.748 |

TABLE 60A-continued

| Annular Zone No. | Annular Zone Start Position mm | Annular Zone End Position mm | Phase Difference φ1 φ3 πrad | φ2 φ4 πrad | Optical Path Length ΔOPD1/λ1 ΔOPD3/λ1 | ΔOPD2/λ1 ΔOPD4/λ1 | Step Height D1 D3 μm | D2 D4 μm | Annular Zone Pitch P1 P3 μm | P2 P4 μm | P1/P2 P3/P4 |
|---|---|---|---|---|---|---|---|---|---|---|---|
| 4  | 0.188 | 0.214 | 2.46 |      | 1.23 |      | 0.89 |      |       | 0.076 |       |
| 5  | 0.214 | 0.234 |      | 1.39 |      | 0.69 |      | 0.50 | 0.067 |       | 0.882 |
| 6  | 0.234 | 0.255 |      | 1.39 |      | 0.69 |      | 0.50 |       |       |       |
| 7  | 0.255 | 0.275 | 2.46 |      | 1.23 |      | 0.89 |      |       | 0.041 |       |
| 8  | 0.275 | 0.293 |      | 1.39 |      | 0.69 |      | 0.50 | 0.038 |       | 0.938 |
| 9  | 0.293 | 0.310 | 2.46 |      | 1.23 |      | 0.89 |      |       | 0.036 |       |
| 10 | 0.310 | 0.327 |      | 1.39 |      | 0.69 |      | 0.50 | 0.034 |       | 0.942 |
| 11 | 0.327 | 0.342 | 2.46 |      | 1.23 |      | 0.89 |      |       | 0.032 |       |
| 12 | 0.342 | 0.357 |      | 1.39 |      | 0.69 |      | 0.50 | 0.031 |       | 0.954 |
| 13 | 0.357 | 0.371 | 2.46 |      | 1.23 |      | 0.89 |      |       | 0.041 |       |
| 14 | 0.371 | 0.383 |      | 1.39 |      | 0.69 |      | 0.50 | 0.040 |       | 0.965 |
| 15 | 0.383 | 0.397 |      | 1.39 |      | 0.69 |      | 0.50 |       |       |       |
| 16 | 0.397 | 0.410 | 2.46 |      | 1.23 |      | 0.89 |      |       | 0.026 |       |
| 17 | 0.410 | 0.422 |      | 1.39 |      | 0.69 |      | 0.50 | 0.026 |       | 0.968 |
| 18 | 0.422 | 0.434 | 2.46 |      | 1.23 |      | 0.89 |      |       | 0.025 |       |
| 19 | 0.434 | 0.446 |      | 1.39 |      | 0.69 |      | 0.50 | 0.024 |       | 0.973 |
| 20 | 0.446 | 0.458 | 2.46 |      | 1.23 |      | 0.89 |      |       | 0.023 |       |
| 21 | 0.458 | 0.469 |      | 1.39 |      | 0.69 |      | 0.50 | 0.023 |       | 0.977 |
| 22 | 0.469 | 0.480 | 2.46 |      | 1.23 |      | 0.89 |      |       | 0.032 |       |
| 23 | 0.480 | 0.490 |      | 1.39 |      | 0.69 |      | 0.50 | 0.031 |       | 0.976 |
| 24 | 0.490 | 0.500 |      | 1.39 |      | 0.69 |      | 0.50 |       |       |       |
| 25 | 0.500 | 0.511 | 2.46 |      | 1.23 |      | 0.89 |      |       | 0.021 |       |
| 26 | 0.511 | 0.521 |      | 1.39 |      | 0.69 |      | 0.50 | 0.021 |       | 0.981 |
| 27 | 0.521 | 0.531 | 2.46 |      | 1.23 |      | 0.89 |      |       | 0.020 |       |
| 28 | 0.531 | 0.541 |      | 1.39 |      | 0.69 |      | 0.50 | 0.020 |       | 0.982 |
| 29 | 0.541 | 0.550 | 2.46 |      | 1.23 |      | 0.89 |      |       | 0.019 |       |
| 30 | 0.550 | 0.560 |      | 1.39 |      | 0.69 |      | 0.50 | 0.019 |       | 0.983 |
| 31 | 0.560 | 0.569 | 2.46 |      | 1.23 |      | 0.89 |      |       | 0.019 |       |
| 32 | 0.569 | 0.578 |      | 1.39 |      | 0.69 |      | 0.50 | 0.019 |       | 0.984 |
| 33 | 0.578 | 0.588 | 2.46 |      | 1.23 |      | 0.89 |      |       | 0.018 |       |
| 34 | 0.588 | 0.596 |      | 1.39 |      | 0.69 |      | 0.50 | 0.018 |       | 0.984 |
| 35 | 0.596 | 0.605 | 2.46 |      | 1.23 |      | 0.89 |      |       | 0.018 |       |
| 36 | 0.605 | 0.614 |      | 1.39 |      | 0.69 |      | 0.50 | 0.017 |       | 0.986 |
| 37 | 0.614 | 0.622 | 2.46 |      | 1.23 |      | 0.89 |      |       | 0.025 |       |
| 38 | 0.622 | 0.630 |      | 1.39 |      | 0.69 |      | 0.50 | 0.024 |       | 0.987 |
| 39 | 0.630 | 0.638 |      | 1.39 |      | 0.69 |      | 0.50 |       |       |       |
| 40 | 0.638 | 0.646 | 2.46 |      | 1.23 |      | 0.89 |      |       | 0.017 |       |
| 41 | 0.646 | 0.655 |      | 1.39 |      | 0.69 |      | 0.50 | 0.016 |       | 0.987 |
| 42 | 0.655 | 0.663 | 2.46 |      | 1.23 |      | 0.89 |      |       | 0.016 |       |
| 43 | 0.663 | 0.671 |      | 1.39 |      | 0.69 |      | 0.50 | 0.016 |       | 0.989 |
| 44 | 0.671 | 0.678 | 2.46 |      | 1.23 |      | 0.89 |      |       | 0.016 |       |
| 45 | 0.678 | 0.686 |      | 1.39 |      | 0.69 |      | 0.50 | 0.016 |       | 0.989 |
| 46 | 0.686 | 0.694 | 2.46 |      | 1.23 |      | 0.89 |      |       | 0.015 |       |
| 47 | 0.694 | 0.701 |      | 1.39 |      | 0.69 |      | 0.50 | 0.015 |       | 0.989 |
| 48 | 0.701 | 0.709 | 2.46 |      | 1.23 |      | 0.89 |      |       | 0.015 |       |
| 49 | 0.709 | 0.716 |      | 1.39 |      | 0.69 |      | 0.50 | 0.015 |       | 0.990 |
| 50 | 0.716 | 0.724 | 2.46 |      | 1.23 |      | 0.89 |      |       | 0.015 |       |
| 51 | 0.724 | 0.731 |      | 1.39 |      | 0.69 |      | 0.50 | 0.015 |       | 0.990 |
| 52 | 0.731 | 0.738 | 2.46 |      | 1.23 |      | 0.89 |      |       | 0.015 |       |
| 53 | 0.738 | 0.746 |      | 1.39 |      | 0.69 |      | 0.50 | 0.014 |       | 0.991 |
| 54 | 0.746 | 0.753 | 2.46 |      | 1.23 |      | 0.89 |      |       | 0.014 |       |
| 55 | 0.753 | 0.760 |      | 1.39 |      | 0.69 |      | 0.50 | 0.014 |       | 0.991 |
| 56 | 0.760 | 0.768 | 2.46 |      | 1.23 |      | 0.89 |      |       | 0.022 |       |
| 57 | 0.768 | 0.774 | 2.46 |      | 1.23 |      | 0.89 |      |       |       |       |
| 58 | 0.774 | 0.781 |      | 1.39 |      | 0.69 |      | 0.50 | 0.022 |       | 0.991 |
| 59 | 0.781 | 0.788 | 2.46 |      | 1.23 |      | 0.89 |      |       | 0.014 |       |
| 60 | 0.788 | 0.795 |      | 1.39 |      | 0.69 |      | 0.50 | 0.014 |       | 0.991 |

TABLE 60B

| | | | | | | | | | | | | |
|---|---|---|---|---|---|---|---|---|---|---|---|---|
| First Area | 61 | 0.795 | 0.801 | 2.46 |      | 1.23 |      | 0.89 |      |       | 0.013 |       |
|            | 62 | 0.801 | 0.808 |      | 1.39 |      | 0.69 | 0.50 | 0.013 |       |       | 0.992 |
|            | 63 | 0.808 | 0.815 | 2.46 |      | 1.23 |      | 0.89 |      |       | 0.013 |       |
|            | 64 | 0.815 | 0.821 |      | 1.39 |      | 0.69 | 0.50 | 0.013 |       |       | 0.992 |
|            | 65 | 0.821 | 0.828 | 2.46 |      | 1.23 |      | 0.89 |      |       | 0.013 |       |
|            | 66 | 0.828 | 0.834 |      | 1.39 |      | 0.69 | 0.50 | 0.013 |       |       | 0.992 |
|            | 67 | 0.834 | 0.840 | 2.46 |      | 1.23 |      | 0.89 |      |       | 0.013 |       |
|            | 68 | 0.840 | 0.847 |      | 1.39 |      | 0.69 | 0.50 | 0.013 |       |       | 0.992 |
|            | 69 | 0.847 | 0.853 | 2.46 |      | 1.23 |      | 0.89 |      |       | 0.013 |       |

TABLE 60B-continued

|  | | | | | | | | | | |
|---|---|---|---|---|---|---|---|---|---|---|
| | 70 | 0.853 | 0.859 | | 1.39 | | 0.69 | | 0.50 | 0.012 | | 0.993 |
| | 71 | 0.859 | 0.866 | 2.46 | | 1.23 | | 0.89 | | | 0.019 | |
| | 72 | 0.866 | 0.872 | 2.46 | | 1.23 | | 0.89 | | | | |
| | 73 | 0.872 | 0.878 | | 1.39 | | 0.69 | | 0.50 | 0.019 | | 0.993 |
| | 74 | 0.878 | 0.884 | 2.46 | | 1.23 | | 0.89 | | | 0.012 | |
| | 75 | 0.884 | 0.890 | | 1.39 | | 0.69 | | 0.50 | 0.012 | | 0.993 |
| | 76 | 0.890 | 0.896 | 2.46 | | 1.23 | | 0.89 | | | 0.012 | |
| | 77 | 0.896 | 0.902 | | 1.39 | | 0.69 | | 0.50 | 0.012 | | 0.993 |
| | 78 | 0.902 | 0.908 | 2.46 | | 1.23 | | 0.89 | | | 0.012 | |
| | 79 | 0.908 | 0.914 | | 1.39 | | 0.69 | | 0.50 | 0.012 | | 0.994 |
| | 80 | 0.914 | 0.921 | 2.46 | | 1.23 | | 0.89 | | | 0.018 | |
| | 81 | 0.921 | 0.926 | 2.46 | | 1.23 | | 0.89 | | | | |
| | 82 | 0.926 | 0.932 | | 1.39 | | 0.69 | | 0.50 | 0.018 | | 0.993 |
| | 83 | 0.932 | 0.938 | 2.46 | | 1.23 | | 0.89 | | | 0.011 | |
| | 84 | 0.938 | 0.943 | | 1.39 | | 0.69 | | 0.50 | 0.011 | | 0.993 |
| | 85 | 0.943 | 0.949 | 2.46 | | 1.23 | | 0.89 | | | 0.011 | |
| | 86 | 0.949 | 0.955 | | 1.39 | | 0.69 | | 0.50 | 0.011 | | 0.993 |
| | 87 | 0.955 | 0.961 | 2.46 | | 1.23 | | 0.89 | | | 0.021 | |
| | 88 | 0.961 | 0.966 | 2.46 | | 1.23 | | 0.89 | | | | |
| | 89 | 0.966 | 0.970 | | 1.39 | | 0.69 | | 0.50 | 0.021 | | 1.021 |
| Second Area | 90 | 0.970 | 0.976 | | 1.39 | | 0.69 | | 0.54 | | | |
| | 91 | 0.976 | 0.981 | 2.46 | | 1.23 | | 0.96 | | | 0.015 | |
| | 92 | 0.981 | 0.985 | | 1.39 | | 0.69 | | 0.54 | 0.015 | | 0.943 |
| | 93 | 0.985 | 0.991 | | 1.39 | | 0.69 | | 0.54 | | | |
| | 94 | 0.991 | 0.996 | 2.46 | | 1.23 | | 0.96 | | | 0.015 | |
| | 95 | 0.996 | 1.000 | | 1.39 | | 0.69 | | 0.54 | 0.015 | | 0.994 |
| | 96 | 1.000 | 1.005 | | 1.39 | | 0.69 | | 0.54 | | | |
| | 97 | 1.005 | 1.010 | 2.46 | | 1.23 | | 0.96 | | | 0.014 | |
| | 98 | 1.010 | 1.014 | | 1.39 | | 0.69 | | 0.54 | 0.014 | | 0.995 |
| | 99 | 1.014 | 1.019 | | 1.39 | | 0.69 | | 0.54 | | | |
| | 100 | 1.019 | 1.024 | 2.46 | | 1.23 | | 0.96 | | | 0.010 | |
| | 101 | 1.024 | 1.029 | | 1.39 | | 0.69 | | 0.54 | 0.010 | | 0.995 |
| | 102 | 1.029 | 1.034 | 2.46 | | 1.23 | | 0.96 | | | 0.014 | |
| | 103 | 1.034 | 1.038 | | 1.39 | | 0.69 | | 0.54 | 0.014 | | 0.995 |
| | 104 | 1.038 | 1.043 | | 1.39 | | 0.69 | | 0.54 | | | |
| | 105 | 1.043 | 1.048 | 2.46 | | 1.23 | | 0.96 | | | 0.010 | |
| | 106 | 1.048 | 1.053 | | 1.39 | | 0.69 | | 0.54 | 0.010 | | 0.996 |
| | 107 | 1.053 | 1.058 | 2.46 | | 1.23 | | 0.96 | | | 0.014 | |
| | 108 | 1.058 | 1.062 | | 1.39 | | 0.69 | | 0.54 | 0.014 | | 0.996 |
| | 109 | 1.062 | 1.066 | | 1.39 | | 0.69 | | 0.54 | | | |
| | 110 | 1.066 | 1.071 | 2.46 | | 1.23 | | 0.96 | | | 0.009 | |
| | 111 | 1.071 | 1.076 | | 1.39 | | 0.69 | | 0.54 | 0.009 | | 0.996 |
| | 112 | 1.076 | 1.081 | 2.46 | | 1.23 | | 0.96 | | | 0.009 | |
| | 113 | 1.081 | 1.085 | | 1.39 | | 0.69 | | 0.54 | 0.009 | | 0.996 |
| | 114 | 1.085 | 1.090 | 2.46 | | 1.23 | | 0.96 | | | 0.009 | |
| | 115 | 1.090 | 1.094 | | 1.39 | | 0.69 | | 0.54 | 0.009 | | 0.996 |
| | 116 | 1.094 | 1.099 | 2.46 | | 1.23 | | 0.96 | | | 0.009 | |
| | 117 | 1.099 | 1.104 | | 1.39 | | 0.69 | | 0.54 | 0.009 | | 0.996 |
| | 118 | 1.104 | 1.108 | 2.46 | | 1.23 | | 0.96 | | | 0.009 | |
| | 119 | 1.108 | 1.113 | | 1.39 | | 0.69 | | 0.54 | 0.009 | | 0.997 |
| | 120 | 1.113 | 1.117 | 2.46 | | 1.23 | | 0.96 | | | 0.009 | |

TABLE 60C

|  | | | | | | | | | | |
|---|---|---|---|---|---|---|---|---|---|---|
| Second Area | 121 | 1.117 | 1.122 | | 1.39 | | 0.69 | | 0.54 | 0.009 | | 0.997 |
| | 122 | 1.122 | 1.127 | 2.46 | | 1.23 | | 0.96 | | | 0.009 | |
| | 123 | 1.127 | 1.131 | | 1.39 | | 0.69 | | 0.54 | 0.009 | | 0.997 |
| | 124 | 1.131 | 1.136 | 2.46 | | 1.23 | | 0.96 | | | 0.009 | |
| | 125 | 1.136 | 1.140 | | 1.39 | | 0.69 | | 0.54 | 0.009 | | 0.997 |
| | 126 | 1.140 | 1.145 | 2.46 | | 1.23 | | 0.96 | | | 0.009 | |
| | 127 | 1.145 | 1.149 | | 1.39 | | 0.69 | | 0.54 | 0.009 | | 0.997 |
| | 128 | 1.149 | 1.154 | 2.46 | | 1.23 | | 0.96 | | | 0.014 | |
| | 129 | 1.154 | 1.159 | 2.46 | | 1.23 | | 0.96 | | | | |
| | 130 | 1.159 | 1.163 | | 1.39 | | 0.69 | | 0.54 | 0.014 | | 0.998 |
| | 131 | 1.163 | 1.168 | 2.46 | | 1.23 | | 0.96 | | | 0.014 | |
| | 132 | 1.168 | 1.172 | 2.46 | | 1.23 | | 0.96 | | | | |
| | 133 | 1.172 | 1.177 | | 1.39 | | 0.69 | | 0.54 | 0.014 | | 0.998 |
| | 134 | 1.177 | 1.182 | 2.46 | | 1.23 | | 0.96 | | | 0.014 | |
| | 135 | 1.182 | 1.186 | 2.46 | | 1.23 | | 0.96 | | | | |
| | 136 | 1.186 | 1.191 | | 1.39 | | 0.69 | | 0.54 | 0.014 | | 0.998 |
| | 137 | 1.191 | 1.196 | 2.46 | | 1.23 | | 0.96 | | | | |
| | 138 | 1.196 | 1.200 | 2.46 | | 1.23 | | 0.96 | | | | |
| Third Area | 139 | 1.200 | 1.344 | 4.00 | | 2.00 | | 0.83 | | | | |
| | 140 | 1.344 | 1.389 | 4.00 | | 2.00 | | 0.83 | | | | |
| | 141 | 1.389 | 1.415 | 4.00 | | 2.00 | | 0.83 | | | | |

TABLE 60C-continued

| | | | | |
|---|---|---|---|---|
| 142 | 1.415 1.433 | 4.00 | 2.00 | 0.83 |
| 144 | 1.433 1.447 | 4.00 | 2.00 | 0.83 |
| 145 | 1.447 1.459 | 4.00 | 2.00 | 0.83 |
| 146 | 1.459 1.470 | 4.00 | 2.00 | 0.83 |
| 147 | 1.470 1.480 | 4.00 | 2.00 | 0.83 |
| 148 | 1.480 1.488 | 4.00 | 2.00 | 0.83 |
| 149 | 1.488 1.500 | 4.00 | 2.00 | 0.83 |

Eleventh Example

Hereafter, an eleventh example of the objective lens 10 and the optical information recording/reproducing apparatus 100 is described. The specifications, numerical configurations defined when each of the optical discs OD1 to OD3 is used, coefficients for optical path difference functions, use diffraction orders, and configuration of the phase shift structure of the objective lens 10 according to the eleventh example are shown in Tables 55 to 59 and 60A to 60C. The wavefront aberrations caused when each of the optical discs OD1 to OD3 is used in the optical information recording/reproducing apparatus 100 according to the eleventh example are shown in FIGS. 16A to 16C, respectively.

TABLE 61

| | unit | $1^{st}$ laser beam | $2^{nd}$ laser beam | $3^{rd}$ laser beam |
|---|---|---|---|---|
| Design Wavelength | nm | 405 | 660 | 790 |
| Focal Length | mm | 1.765 | 1.990 | 2.052 |
| NA | | 0.85 | 0.65 | 0.53 |
| Magnification | | 0.00 | 0.00 | 0.00 |

TABLE 62

| Surface No. | r | d(405 nm) | d(660 nm) | d(790 nm) | |
|---|---|---|---|---|---|
| 1-1 | 1.110 | 1.880 | | | Objective Lens |
| 1-2 | 1.159 | | | | |
| 1-3 | 0.999 | | | | |
| 2 | −2.938 | 0.673 | 0.613 | 0.304 | |
| 3 | ∞ | 0.0875 | 0.600 | 1.200 | Optical Disc |
| 4 | ∞ | | | | |

| Surface No. | n(405 nm) | n(660 nm) | n(790 nm) | |
|---|---|---|---|---|
| 1-1 | 1.56023 | 1.54044 | 1.53653 | Objective Lens |
| 1-2 | | | | |
| 1-3 | | | | |
| 2 | | | | |

TABLE 62-continued

| | | | | |
|---|---|---|---|---|
| 3 | 1.62231 | 1.57961 | 1.57307 | Optical Disc |
| 4 | | | | |

TABLE 63

| | 1-1 | 1-2 | 1-3 | 2 |
|---|---|---|---|---|
| κ | −1.000 | −1.000 | −1.000 | 3.100 |
| A4 | 2.87500E−02 | −1.32030E−01 | −7.40620E−02 | 3.77280E−01 |
| A6 | 1.16900E−02 | 2.99630E−01 | 7.84670E−02 | −6.19460E−01 |
| A8 | −1.29800E−03 | −1.40280E−01 | −2.91270E−02 | 9.56070E−01 |
| A10 | 4.44600E−04 | 1.62390E−02 | 3.18120E−02 | −1.08940E+00 |
| A12 | 7.32720E−06 | 1.74560E−03 | −2.58000E−02 | 8.30880E−01 |
| A14 | | | 1.08960E−02 | −3.94180E−01 |
| A16 | | | −1.84820E−03 | 1.04850E−01 |
| A18 | | | | −1.18530E−02 |
| A20 | | | | |
| A22 | | | | |
| A24 | | | | |

TABLE 64

| Diffraction Order | 1-1 1/1/1 | 1-2 1/1/— | 1-3 2/—/— |
|---|---|---|---|
| P2 | 5.76530E+01 | 4.20560E+01 | 8.96940E+01 |
| P4 | −1.40670E+01 | −1.47290E+02 | −1.72020E+02 |
| P6 | 4.99200E+00 | 2.64180E+02 | 1.07596E+02 |
| P8 | −2.65500E+00 | −1.48720E+02 | −2.26400E+01 |
| P10 | −6.08700E−02 | 2.61445E+01 | 0.00000E+00 |
| P12 | 0.00000E+00 | 0.00000E+00 | 0.00000E+00 |

TABLE 65

| Diffraction Order | 1-1 1/0/0 | 1-2 1/0/— |
|---|---|---|
| P2 | −3.71940E+01 | −4.79400E+01 |
| P4 | −7.44000E+00 | −9.30210E+01 |
| P6 | 1.54700E+00 | 1.71690E+02 |
| P8 | −8.66400E−01 | −9.85410E+01 |
| P10 | −1.98200E−01 | 1.76610E+01 |
| P12 | 0.00000E+00 | 0.00000E+00 |

TABLE 66A

| | Annular Zone No. | Annular Zone Start Position mm | Annular Zone End Position mm | Phase Difference φ1 φ3 πrad | Phase Difference φ2 φ4 πrad | Optical Path Length ΔOPD1/λ1 ΔOPD3/λ1 | Optical Path Length ΔOPD2/λ1 ΔOPD4/λ1 | Step Height D1 D3 μm | Step Height D2 D4 μm | Annular Zone Pitch P1 P3 μm | Annular Zone Pitch P2 P4 μm | P1/P2 P3/P4 |
|---|---|---|---|---|---|---|---|---|---|---|---|---|
| First Area | 0 | 0.000 | 0.071 | | | | | | | | | |
| | 1 | 0.071 | 0.126 | | 1.39 | | 0.69 | | 0.50 | | | |
| | 2 | 0.126 | 0.163 | 2.46 | | 1.23 | | 0.89 | | | 0.091 | |
| | 3 | 0.163 | 0.193 | | 1.39 | | 0.69 | | 0.50 | 0.067 | | 0.734 |
| | 4 | 0.193 | 0.219 | 2.46 | | 1.23 | | 0.89 | | | 0.078 | |
| | 5 | 0.219 | 0.240 | | 1.39 | | 0.69 | | 0.50 | 0.069 | | 0.888 |
| | 6 | 0.240 | 0.262 | | 1.39 | | 0.69 | | 0.50 | | | |
| | 7 | 0.262 | 0.282 | 2.46 | | 1.23 | | 0.89 | | | 0.042 | |
| | 8 | 0.282 | 0.301 | | 1.39 | | 0.69 | | 0.50 | 0.039 | | 0.924 |
| | 9 | 0.301 | 0.319 | 2.46 | | 1.23 | | 0.89 | | | 0.051 | |
| | 10 | 0.319 | 0.333 | | 1.39 | | 0.69 | | 0.50 | 0.048 | | 0.947 |
| | 11 | 0.333 | 0.349 | | 1.39 | | 0.69 | | 0.50 | | | |
| | 12 | 0.349 | 0.365 | 2.46 | | 1.23 | | 0.89 | | | 0.032 | |
| | 13 | 0.365 | 0.379 | | 1.39 | | 0.69 | | 0.50 | 0.030 | | 0.960 |
| | 14 | 0.379 | 0.393 | 2.46 | | 1.23 | | 0.89 | | | 0.029 | |
| | 15 | 0.393 | 0.407 | | 1.39 | | 0.69 | | 0.50 | 0.028 | | 0.972 |
| | 16 | 0.407 | 0.420 | 2.46 | | 1.23 | | 0.89 | | | 0.038 | |
| | 17 | 0.420 | 0.432 | | 1.39 | | 0.69 | | 0.50 | 0.037 | | 0.970 |
| | 18 | 0.432 | 0.444 | | 1.39 | | 0.69 | | 0.50 | | | |
| | 19 | 0.444 | 0.456 | 2.46 | | 1.23 | | 0.89 | | | 0.025 | |
| | 20 | 0.456 | 0.468 | | 1.39 | | 0.69 | | 0.50 | 0.024 | | 0.969 |
| | 21 | 0.468 | 0.480 | 2.46 | | 1.23 | | 0.89 | | | 0.024 | |
| | 22 | 0.480 | 0.491 | | 1.39 | | 0.69 | | 0.50 | 0.023 | | 0.973 |
| | 23 | 0.491 | 0.502 | 2.46 | | 1.23 | | 0.89 | | | 0.032 | |
| | 24 | 0.502 | 0.512 | | 1.39 | | 0.69 | | 0.50 | 0.031 | | 0.978 |
| | 25 | 0.512 | 0.522 | | 1.39 | | 0.69 | | 0.50 | | | |
| | 26 | 0.522 | 0.533 | 2.46 | | 1.23 | | 0.89 | | | 0.021 | |
| | 27 | 0.533 | 0.543 | | 1.39 | | 0.69 | | 0.50 | 0.021 | | 0.982 |
| | 28 | 0.543 | 0.553 | 2.46 | | 1.23 | | 0.89 | | | 0.020 | |
| | 29 | 0.553 | 0.563 | | 1.39 | | 0.69 | | 0.50 | 0.020 | | 0.984 |
| | 30 | 0.563 | 0.573 | 2.46 | | 1.23 | | 0.89 | | | 0.020 | |
| | 31 | 0.573 | 0.582 | | 1.39 | | 0.69 | | 0.50 | 0.019 | | 0.982 |
| | 32 | 0.582 | 0.592 | 2.46 | | 1.23 | | 0.89 | | | 0.019 | |
| | 33 | 0.592 | 0.601 | | 1.39 | | 0.69 | | 0.50 | 0.019 | | 0.982 |
| | 34 | 0.601 | 0.610 | 2.46 | | 1.23 | | 0.89 | | | 0.018 | |
| | 35 | 0.610 | 0.619 | | 1.39 | | 0.69 | | 0.50 | 0.018 | | 0.970 |
| | 36 | 0.619 | 0.629 | 2.46 | | 1.23 | | 0.89 | | | 0.025 | |
| | 37 | 0.629 | 0.636 | | 1.39 | | 0.69 | | 0.50 | 0.025 | | 0.999 |
| | 38 | 0.636 | 0.644 | | 1.39 | | 0.69 | | 0.50 | | | |
| | 39 | 0.644 | 0.653 | 2.46 | | 1.23 | | 0.89 | | | 0.017 | |
| | 40 | 0.653 | 0.661 | | 1.39 | | 0.69 | | 0.50 | 0.017 | | 0.988 |
| | 41 | 0.661 | 0.670 | 2.46 | | 1.23 | | 0.89 | | | 0.017 | |
| | 42 | 0.670 | 0.678 | | 1.39 | | 0.69 | | 0.50 | 0.017 | | 0.990 |
| | 43 | 0.678 | 0.686 | 2.46 | | 1.23 | | 0.89 | | | 0.016 | |
| | 44 | 0.686 | 0.694 | | 1.39 | | 0.69 | | 0.50 | 0.016 | | 0.990 |
| | 45 | 0.694 | 0.702 | 2.46 | | 1.23 | | 0.89 | | | 0.016 | |
| | 46 | 0.702 | 0.710 | | 1.39 | | 0.69 | | 0.50 | 0.016 | | 0.989 |
| | 47 | 0.710 | 0.718 | 2.46 | | 1.23 | | 0.89 | | | 0.016 | |
| | 48 | 0.718 | 0.726 | | 1.39 | | 0.69 | | 0.50 | 0.016 | | 0.988 |
| | 49 | 0.726 | 0.733 | 2.46 | | 1.23 | | 0.89 | | | 0.015 | |
| | 50 | 0.733 | 0.741 | | 1.39 | | 0.69 | | 0.50 | 0.015 | | 0.989 |
| | 51 | 0.741 | 0.748 | 2.46 | | 1.23 | | 0.89 | | | 0.015 | |
| | 52 | 0.748 | 0.756 | | 1.39 | | 0.69 | | 0.50 | 0.015 | | 0.990 |
| | 53 | 0.756 | 0.763 | 2.46 | | 1.23 | | 0.89 | | | 0.015 | |
| | 54 | 0.763 | 0.771 | | 1.39 | | 0.69 | | 0.50 | 0.015 | | 0.991 |
| | 55 | 0.771 | 0.778 | 2.46 | | 1.23 | | 0.89 | | | 0.015 | |
| | 56 | 0.778 | 0.785 | | 1.39 | | 0.69 | | 0.50 | 0.014 | | 0.991 |
| | 57 | 0.785 | 0.792 | 2.46 | | 1.23 | | 0.89 | | | 0.014 | |
| | 58 | 0.792 | 0.799 | | 1.39 | | 0.69 | | 0.50 | 0.014 | | 0.991 |
| | 59 | 0.799 | 0.806 | 2.46 | | 1.23 | | 0.89 | | | 0.014 | |
| | 60 | 0.806 | 0.813 | | 1.39 | | 0.69 | | 0.50 | 0.014 | | 0.991 |

TABLE 66B

| | Annular Zone No. | Annular Zone Start Position mm | Annular Zone End Position mm | φ1 φ3 πrad | φ2 φ4 πrad | ΔOPD1/λ1 ΔOPD3/λ1 | ΔOPD2/λ1 ΔOPD4/λ1 | D1 D3 μm | D2 D4 μm | P1 P3 μm | P2 P4 μm | P1/P2 P3/P4 |
|---|---|---|---|---|---|---|---|---|---|---|---|---|
| First Area | 61 | 0.813 | 0.820 | 2.46 | | 1.23 | | 0.89 | | | 0.014 | |
| | 62 | 0.820 | 0.827 | | 1.39 | | 0.69 | | 0.50 | 0.014 | | 0.992 |
| | 63 | 0.827 | 0.833 | 2.46 | | 1.23 | | 0.89 | | | 0.014 | |
| | 64 | 0.833 | 0.840 | | 1.39 | | 0.69 | | 0.50 | 0.013 | | 0.994 |
| | 65 | 0.840 | 0.848 | 2.46 | | 1.23 | | 0.89 | | | 0.021 | |

TABLE 66B-continued

|  | # | | | | | | | | | | |
|---|---|---|---|---|---|---|---|---|---|---|---|
|  | 66 | 0.848 | 0.854 | 2.46 |  | 1.23 |  | 0.89 |  |  |  |
|  | 67 | 0.854 | 0.861 |  | 1.39 |  | 0.69 |  | 0.50 | 0.021 | 1.009 |
|  | 68 | 0.861 | 0.867 | 2.46 |  | 1.23 |  | 0.89 |  |  | 0.013 |  |
|  | 69 | 0.867 | 0.874 |  | 1.39 |  | 0.69 |  | 0.50 | 0.013 | 0.969 |
|  | 70 | 0.874 | 0.880 | 2.46 |  | 1.23 |  | 0.89 |  |  | 0.013 |  |
|  | 71 | 0.880 | 0.887 |  | 1.39 |  | 0.69 |  | 0.50 | 0.013 | 0.993 |
|  | 72 | 0.887 | 0.893 | 2.46 |  | 1.23 |  | 0.89 |  |  | 0.013 |  |
|  | 73 | 0.893 | 0.899 |  | 1.39 |  | 0.69 |  | 0.50 | 0.013 | 0.992 |
|  | 74 | 0.899 | 0.906 | 2.46 |  | 1.23 |  | 0.89 |  |  | 0.013 |  |
|  | 75 | 0.906 | 0.912 |  | 1.39 |  | 0.69 |  | 0.50 | 0.012 | 0.992 |
|  | 76 | 0.912 | 0.919 | 2.46 |  | 1.23 |  | 0.89 |  |  | 0.019 |  |
|  | 77 | 0.919 | 0.925 | 2.46 |  | 1.23 |  | 0.89 |  |  |  |  |
|  | 78 | 0.925 | 0.931 |  | 1.39 |  | 0.69 |  | 0.50 | 0.019 | 0.994 |
|  | 79 | 0.931 | 0.937 | 2.46 |  | 1.23 |  | 0.89 |  |  | 0.012 |  |
|  | 80 | 0.937 | 0.943 |  | 1.39 |  | 0.69 |  | 0.50 | 0.012 | 0.995 |
|  | 81 | 0.943 | 0.949 | 2.46 |  | 1.23 |  | 0.89 |  |  | 0.012 |  |
|  | 82 | 0.949 | 0.955 |  | 1.39 |  | 0.69 |  | 0.50 | 0.012 | 0.996 |
|  | 83 | 0.955 | 0.962 | 2.46 |  | 1.23 |  | 0.89 |  |  | 0.019 |  |
|  | 84 | 0.962 | 0.968 | 2.46 |  | 1.23 |  | 0.89 |  |  |  |  |
|  | 85 | 0.968 | 0.973 |  | 1.39 |  | 0.69 |  | 0.50 | 0.018 | 0.994 |
|  | 86 | 0.973 | 0.979 | 2.46 |  | 1.23 |  | 0.89 |  |  | 0.012 |  |
|  | 87 | 0.979 | 0.985 |  | 1.39 |  | 0.69 |  | 0.50 | 0.012 | 0.992 |
|  | 88 | 0.985 | 0.992 | 2.46 |  | 1.23 |  | 0.89 |  |  | 0.018 |  |
|  | 89 | 0.992 | 0.997 | 2.46 |  | 1.23 |  | 0.89 |  |  |  |  |
|  | 90 | 0.997 | 1.003 |  | 1.39 |  | 0.69 |  | 0.50 | 0.018 | 0.996 |
|  | 91 | 1.003 | 1.009 | 2.46 |  | 1.23 |  | 0.89 |  |  | 0.011 |  |
|  | 92 | 1.009 | 1.014 |  | 1.39 |  | 0.69 |  | 0.50 | 0.011 | 0.997 |
|  | 93 | 1.014 | 1.021 | 2.46 |  | 1.23 |  | 0.89 |  |  | 0.018 |  |
|  | 94 | 1.021 | 1.026 | 2.46 |  | 1.23 |  | 0.89 |  |  |  |  |
|  | 95 | 1.026 | 1.032 |  | 1.39 |  | 0.69 |  | 0.50 | 0.017 | 0.993 |
|  | 96 | 1.032 | 1.037 | 2.46 |  | 1.23 |  | 0.89 |  |  | 0.011 |  |
|  | 97 | 1.037 | 1.043 |  | 1.39 |  | 0.69 |  | 0.50 | 0.011 | 0.994 |
|  | 98 | 1.043 | 1.049 | 2.46 |  | 1.23 |  | 0.89 |  |  | 0.017 |  |
|  | 99 | 1.049 | 1.054 | 2.46 |  | 1.23 |  | 0.89 |  |  |  |  |
|  | 100 | 1.054 | 1.060 |  | 1.39 |  | 0.69 |  | 0.50 | 0.017 | 0.998 |
|  | 101 | 1.060 | 1.066 | 2.46 |  | 1.23 |  | 0.89 |  |  | 0.017 |  |
|  | 102 | 1.066 | 1.071 | 2.46 |  | 1.23 |  | 0.89 |  |  |  |  |
|  | 103 | 1.071 | 1.077 |  | 1.39 |  | 0.69 |  | 0.50 | 0.017 | 0.993 |
|  | 104 | 1.077 | 1.084 | 2.46 |  | 1.23 |  | 0.89 |  |  | 0.023 |  |
| Second Area | 105 | 1.084 | 1.090 | 2.36 |  | 1.18 |  | 0.96 |  |  |  |  |
|  | 106 | 1.090 | 1.094 |  | 1.48 |  | 0.74 |  | 0.61 | 0.022 | 0.985 |
|  | 107 | 1.094 | 1.099 |  | 1.48 |  | 0.74 |  | 0.61 |  |  |
|  | 108 | 1.099 | 1.104 | 2.36 |  | 1.18 |  | 0.96 |  |  | 0.018 |  |
|  | 109 | 1.104 | 1.108 |  | 1.48 |  | 0.74 |  | 0.61 | 0.018 | 0.995 |
|  | 110 | 1.108 | 1.112 |  | 1.48 |  | 0.74 |  | 0.61 |  |  |
|  | 111 | 1.112 | 1.117 |  | 1.48 |  | 0.74 |  | 0.61 |  |  |
|  | 112 | 1.117 | 1.122 | 2.36 |  | 1.18 |  | 0.96 |  |  | 0.014 |  |
|  | 113 | 1.122 | 1.126 |  | 1.48 |  | 0.74 |  | 0.61 | 0.014 | 0.996 |
|  | 114 | 1.126 | 1.130 |  | 1.48 |  | 0.74 |  | 0.61 |  |  |
|  | 115 | 1.130 | 1.135 | 2.36 |  | 1.18 |  | 0.96 |  |  | 0.013 |  |
|  | 116 | 1.135 | 1.139 |  | 1.48 |  | 0.74 |  | 0.61 | 0.013 | 0.996 |
|  | 117 | 1.139 | 1.144 |  | 1.48 |  | 0.74 |  | 0.61 |  |  |
|  | 118 | 1.144 | 1.149 | 2.36 |  | 1.18 |  | 0.96 |  |  | 0.013 |  |
|  | 119 | 1.149 | 1.152 |  | 1.48 |  | 0.74 |  | 0.61 | 0.013 | 0.996 |
|  | 120 | 1.152 | 1.157 |  | 1.48 |  | 0.74 |  | 0.61 |  |  |

TABLE 66C

|  | # | | | | | | | | | | |
|---|---|---|---|---|---|---|---|---|---|---|---|
| Second Area | 121 | 1.157 | 1.162 | 2.36 |  | 1.18 |  | 0.96 |  |  | 0.014 |  |
|  | 122 | 1.162 | 1.167 |  | 1.48 |  | 0.74 |  | 0.61 | 0.009 | 0.665 |
|  | 123 | 1.167 | 1.171 | 2.36 |  | 1.18 |  | 0.96 |  |  | 0.013 |  |
|  | 124 | 1.171 | 1.175 |  | 1.48 |  | 0.74 |  | 0.61 | 0.013 | 0.996 |
|  | 125 | 1.175 | 1.180 |  | 1.48 |  | 0.74 |  | 0.61 |  |  |
|  | 126 | 1.180 | 1.184 | 2.36 |  | 1.18 |  | 0.96 |  |  | 0.009 |  |
|  | 127 | 1.184 | 1.189 |  | 1.48 |  | 0.74 |  | 0.61 | 0.009 | 0.996 |
|  | 128 | 1.189 | 1.193 | 2.36 |  | 1.18 |  | 0.96 |  |  | 0.009 |  |
|  | 129 | 1.193 | 1.198 |  | 1.48 |  | 0.74 |  | 0.61 | 0.009 | 0.997 |
|  | 130 | 1.198 | 1.202 | 2.36 |  | 1.18 |  | 0.96 |  |  | 0.009 |  |
|  | 131 | 1.202 | 1.207 |  | 1.48 |  | 0.74 |  | 0.61 | 0.009 | 0.997 |
|  | 132 | 1.207 | 1.212 | 2.36 |  | 1.18 |  | 0.96 |  |  | 0.009 |  |
|  | 133 | 1.212 | 1.216 |  | 1.48 |  | 0.74 |  | 0.61 | 0.009 | 0.997 |
|  | 134 | 1.216 | 1.221 | 2.36 |  | 1.18 |  | 0.96 |  |  | 0.009 |  |
|  | 135 | 1.221 | 1.225 |  | 1.48 |  | 0.74 |  | 0.61 | 0.009 | 0.997 |
|  | 136 | 1.225 | 1.229 | 2.36 |  | 1.18 |  | 0.96 |  |  | 0.009 |  |
|  | 137 | 1.229 | 1.234 |  | 1.48 |  | 0.74 |  | 0.61 | 0.009 | 0.997 |
|  | 138 | 1.234 | 1.239 | 2.36 |  | 1.18 |  | 0.96 |  |  | 0.014 |  |
|  | 139 | 1.239 | 1.244 | 2.36 |  | 1.18 |  | 0.96 |  |  |  |  |

TABLE 66C-continued

|  |  |  |  |  |  |  |  |  |  |
|---|---|---|---|---|---|---|---|---|---|
|  | 140 | 1.244 | 1.248 |  | 1.48 | 0.74 |  | 0.61 | 0.014 |  | 0.997 |
|  | 141 | 1.248 | 1.253 | 2.36 |  | 1.18 |  | 0.96 |  | 0.014 |
|  | 142 | 1.253 | 1.258 | 2.36 |  | 1.18 |  | 0.96 |
|  | 144 | 1.258 | 1.262 |  | 1.48 | 0.74 |  | 0.61 | 0.014 |  | 0.997 |
|  | 145 | 1.262 | 1.267 | 2.36 |  | 1.18 |  | 0.96 |  | 0.024 |
|  | 146 | 1.267 | 1.272 | 2.36 |  | 1.18 |  | 0.96 |
|  | 147 | 1.272 | 1.277 | 2.36 |  | 1.18 |  | 0.96 |
|  | 148 | 1.277 | 1.282 | 2.36 |  | 1.18 |  | 0.96 |
|  | 149 | 1.282 | 1.286 |  | 1.48 | 0.74 |  | 0.61 | 0.024 |  | 0.998 |
|  | 150 | 1.286 | 1.290 | 2.36 |  | 1.18 |  | 0.96 |
| Third Area | 151 | 1.290 | 1.321 | 2.00 |  | 1.00 |  | 0.87 |
|  | 152 | 1.321 | 1.354 | 2.00 |  | 1.00 |  | 0.87 |
|  | 153 | 1.354 | 1.376 | 2.00 |  | 1.00 |  | 0.87 |
|  | 154 | 1.376 | 1.393 | 2.00 |  | 1.00 |  | 0.87 |
|  | 155 | 1.393 | 1.406 | 2.00 |  | 1.00 |  | 0.87 |
|  | 156 | 1.406 | 1.418 | 2.00 |  | 1.00 |  | 0.87 |
|  | 157 | 1.418 | 1.428 | 2.00 |  | 1.00 |  | 0.87 |
|  | 158 | 1.428 | 1.437 | 2.00 |  | 1.00 |  | 0.87 |
|  | 159 | 1.437 | 1.445 | 2.00 |  | 1.00 |  | 0.87 |
|  | 160 | 1.445 | 1.452 | 2.00 |  | 1.00 |  | 0.87 |
|  | 161 | 1.452 | 1.459 | 2.00 |  | 1.00 |  | 0.87 |
|  | 162 | 1.459 | 1.465 | 2.00 |  | 1.00 |  | 0.87 |
|  | 163 | 1.465 | 1.471 | 2.00 |  | 1.00 |  | 0.87 |
|  | 164 | 1.471 | 1.476 | 2.00 |  | 1.00 |  | 0.87 |
|  | 165 | 1.476 | 1.481 | 2.00 |  | 1.00 |  | 0.87 |
|  | 166 | 1.481 | 1.486 | 2.00 |  | 1.00 |  | 0.87 |
|  | 167 | 1.486 | 1.491 | 2.00 |  | 1.00 |  | 0.87 |
|  | 168 | 1.491 | 1.495 | 2.00 |  | 1.00 |  | 0.87 |
|  | 169 | 1.495 | 1.500 | 2.00 |  | 1.00 |  | 0.87 |

Table 67 shows values calculated by applying the conditions (2) to (15) and (17) to (30) to the first to eleventh examples (regarding the arrangement intervals P1 to P4 of the conditions (1) and (16), see Tables showing the concrete configurations of the phase shift structures of each example). Table 68 shows a list of the light use efficiencies (diffraction efficiencies) defined when each of the optical discs OD1 to OD3 is used in the first to eleventh examples.

TABLE 67

|  | Unit | Lower Limit (1) | Lower Limit (2) | Upper Limit (2) | Upper Limit (1) | 1st Example | 2nd Example | 3rd Example | 4th Example | 5th Example | 6th Example |
|---|---|---|---|---|---|---|---|---|---|---|---|
| $\Delta\phi_1/\Delta\phi_2$ |  | −3.00 | −1.30 | −0.35 | −0.10 | −0.757 | −0.915 | −0.727 | −0.314 | −0.693 | −0.888 |
| $\phi_1$ | πrad | 2.2 | 2.30 | 2.60 | 2.80 | 2.465 | 2.627 | 2.302 | 2.193 | 2.474 | 2.735 |
| $\phi_2$ | πrad | 1.00 | 1.10 | 1.50 | 1.70 | 1.386 | 1.315 | 1.585 | 1.386 | 1.316 | 1.173 |
| $\Delta OPD_1/\lambda_1$ |  | 1.1 | 1.15 | 1.30 | 1.40 | 1.232 | 1.313 | 1.151 | 1.096 | 1.237 | 1.367 |
| $\Delta OPD_2/\lambda_1$ |  | 0.50 | 0.55 | 0.75 | 0.85 | 0.693 | 0.657 | 0.793 | 0.693 | 0.658 | 0.586 |
| D1 | μm | 0.70 | 0.80 | 0.95 | 1.10 | 0.891 | 0.950 | 0.832 | 0.793 | 0.770 | 1.056 |
| D2 | μm | 0.30 | 0.40 | 0.55 | 0.70 | 0.501 | 0.475 | 0.573 | 0.501 | 0.409 | 0.453 |
| $\Delta\phi_3/\Delta\phi_4$ |  | −2.70 | −1.05 | −0.20 | −0.05 | −0.685 | −1.038 | −0.686 | −0.314 | −0.952 | −0.851 |
| $\phi_3$ | πrad | 2.1 | 2.20 | 2.6 | 2.8 | 2.356 | 2.681 | 2.247 | 2.193 | 2.534 | 2.519 |
| $\phi_4$ | πrad | 1.00 | 1.1 | 1.5 | 1.70 | 1.480 | 1.344 | 1.640 | 1.386 | 1.439 | 1.390 |
| $\Delta OPD_3/\lambda_1$ |  | 1.05 | 1.10 | 1.30 | 1.4 | 1.178 | 1.340 | 1.124 | 1.096 | 1.267 | 1.259 |
| $\Delta OPD_4/\lambda_1$ |  | 0.50 | 0.55 | 0.75 | 0.85 | 0.740 | 0.672 | 0.820 | 0.693 | 0.719 | 0.695 |
| D3 | μm | 0.85 | 0.95 | 1.10 | 1.20 | 0.942 | 1.084 | 0.896 | 0.869 | 0.871 | 1.089 |
| D4 | μm | 0.45 | 0.55 | 0.75 | 0.85 | 0.598 | 0.454 | 0.659 | 0.554 | 0.513 | 0.613 |

|  | Unit | Lower Limit (1) | Lower Limit (2) | Upper Limit (2) | Upper Limit (1) | 7th Example | 8th Example | 9th Example | 10th Example | 11th Example |
|---|---|---|---|---|---|---|---|---|---|---|
| $\Delta\phi_1/\Delta\phi_2$ |  | −3.00 | −1.30 | −0.35 | −0.10 | −1.167 | −0.912 | −0.630 | −0.757 | −0.757 |
| $\phi_1$ | πrad | 2.2 | 2.30 | 2.60 | 2.80 | 2.356 | 2.519 | 2.411 | 2.465 | 2.465 |
| $\phi_2$ | πrad | 1.00 | 1.10 | 1.50 | 1.70 | 1.695 | 1.431 | 1.348 | 1.386 | 1.386 |
| $\Delta OPD_1/\lambda_1$ |  | 1.1 | 1.15 | 1.30 | 1.40 | 1.178 | 1.259 | 1.205 | 1.232 | 1.232 |
| $\Delta OPD_2/\lambda_1$ |  | 0.50 | 0.55 | 0.75 | 0.85 | 0.847 | 0.715 | 0.674 | 0.693 | 0.693 |
| D1 | μm | 0.70 | 0.80 | 0.95 | 1.10 | 0.852 | 0.911 | 0.871 | 0.891 | 0.891 |
| D2 | μm | 0.30 | 0.40 | 0.55 | 0.70 | 0.613 | 0.517 | 0.487 | 0.501 | 0.501 |
| $\Delta\phi_3/\Delta\phi_4$ |  | −2.70 | −1.05 | −0.20 | −0.05 | −0.685 | −0.990 | −0.338 | −0.757 | −0.685 |
| $\phi_3$ | πrad | 2.1 | 2.20 | 2.6 | 2.8 | 2.465 | 2.411 | 2.193 | 2.465 | 2.356 |
| $\phi_4$ | πrad | 1.00 | 1.1 | 1.5 | 1.70 | 1.322 | 1.585 | 1.431 | 1.386 | 1.480 |
| $\Delta OPD_3/\lambda_1$ |  | 1.05 | 1.10 | 1.30 | 1.4 | 1.232 | 1.205 | 1.096 | 1.232 | 1.178 |
| $\Delta OPD_4/\lambda_1$ |  | 0.50 | 0.55 | 0.75 | 0.85 | 0.661 | 0.793 | 0.715 | 0.693 | 0.740 |
| D3 | μm | 0.85 | 0.95 | 1.10 | 1.20 | 0.852 | 1.014 | 0.888 | 0.958 | 0.960 |
| D4 | μm | 0.45 | 0.55 | 0.75 | 0.85 | 0.517 | 0.675 | 0.585 | 0.543 | 0.610 |

TABLE 68

|  | 1st Example | 2nd Example | 3rd Example | 4th Example | 5th Example | 6th Example |
|---|---|---|---|---|---|---|
| Optical Disc OD1 | 82% | 74% | 91% | 79% | 76% | 68% |
| Optical Disc OD2 | 61% | 68% | 57% | 52% | 67% | 73% |
| Optical Disc OD3 | 62% | 64% | 50% | 46% | 79% | 76% |

|  | 7th Example | 8th Example | 9th Example | 10th Example | 11th Example |
|---|---|---|---|---|---|
| Optical Disc OD1 | 89% | 82% | 80% | 82% | 82% |
| Optical Disc OD2 | 50% | 61% | 63% | 65% | 63% |
| Optical Disc OD3 | 54% | 63% | 64% | 60% | 62% |

As shown in Table 67, the objective lens 10 according to each of the first to eleventh examples satisfies at least the conditions (1) and (2). As a result, as shown in each of the wavefront aberration graphs of FIGS. 6A to 16C, phase changes which have substantially the same period and are in opposite directions are given to the laser beam having the wavelength λ1 passed through the first step and the laser beam having the wavelength λ1 passed through the second step, and these phase changes are cancelled with each other, thereby suppressing undulation of the wavefront. Therefore, the amount of the wavefront aberration is small. That is, the objective lens 10 according to each of the first to eleventh examples is able to suppress disturbance of the wavefront while giving the multiple optical effects by the first and second steps on the laser beams having the wavelengths λ1, λ2 and λ3. Therefore, as shown in Table 68, decrease of the light use efficiency due to the phase shift by the phase shift structure can be effectively suppressed. Furthermore, the objective lens 10 according to each of the first to eleventh examples is able to additionally provide the advantages achieved by additionally satisfying the conditions other than the conditions (1) and (2).

Although the present invention has been described in considerable detail with reference to certain preferred embodiments thereof, other embodiments are possible.

This application claims priority of Japanese Patent Application No. P2011-156511, filed on Jul. 15, 2011. The entire subject matter of the application is incorporated herein by reference.

What is claimed is:

1. An objective optical system for an optical information recording/reproducing apparatus configured to record information to and/or reproduce information from three types of optical discs including first, second and third optical discs differing in recording density, by selectively using light beams having first, second and third wavelengths emitted from light sources,
the objective optical system comprising at least an objective lens,
when λ1 (unit: nm) represents the first wavelength, λ2 (unit: nm) represents the second wavelength and λ3 (unit: nm) represents the third wavelength, λ1, λ2 and λ3 being defined as:

$$\lambda 1 \approx 405, \lambda 2 \approx 660, \text{ and } \lambda 3 \approx 790,$$

when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a following relationship:

$$NA1 > NA2 > NA3,$$

at least one surface of the objective optical system being configured to be a phase shift surface having a phase shift structure including a plurality of refractive surface zones concentrically divided so as to have steps giving different phase differences to an incident light beam at a boundary between adjacent ones of the plurality of refractive surface zones,
wherein:
the phase shift surface has a first area contributing to converging the first, second and third light beams onto recording surfaces of the first, second and third optical discs, respectively;
the first area has an effective diameter larger than NA 0.3 at the first wavelength;
in the first area, the phase shift surface has at least two types of phase shift structures including a first phase shift structure having first steps and a second phase shift structure having second steps;
when P1 (unit: mm) represents an arrangement interval defined in a direction perpendicular to an optical axis direction between two first steps which adjoin with respect to each other while sandwiching at least one second step, and P2 (unit: mm) represents an arrangement interval defined in a direction perpendicular to the optical axis direction between two second steps which adjoin with respect to each other while sandwiching at least one first step and one of which is sandwiched between the two first steps, the phase shift surface is configured such that, in an area whose effective diameter is larger than NA 0.3 at the first wavelength in the first area, the phase shift surface has a plurality of combinations of annular zones which satisfy a condition (1):

$$0.95 < P1/P2 < 1.05 \qquad (1)$$

where,
one of the two first steps arranged closer to the optical axis is defines as a first start step, and the other of the two first steps farther from the optical axis is defined as a first end step,
when the first steps are continuously arranged in a direction perpendicular to the optical axis not to have the second steps therebetween, the arrangement interval P1 is determined by defining one of the continuously arranged first steps closest to the optical axis as the first start step and by defining the other of the continuously arranged first steps farthest from the optical axis as the first end step, one of the two second steps arranged closer to the optical axis is defines as a second start step, and the other of the two second steps farther from the optical axis is defined as a second end step, and when the second steps are continuously arranged in a direction perpendicular to the optical axis not to have the first steps therebetween, the arrangement interval P2 is determined by defining one of the continuously arranged second steps closest to the optical axis as the second start step and by defining the other of the continuously arranged second steps farthest from the optical axis as the second end step, when $\Delta\phi1$ (unit: radian) represents a difference between $2\pi$ and an absolute value of a phase change caused by the first steps with respect to the light beam having the first wavelength in a case where the first steps give an additional optical path length to the light beam having the first wavelength in a direction proceeding along the optical axis from each light source to an optical disc being used, and $\Delta\phi2$ (unit: radian) represents a difference between $2\pi$ and an absolute value of a phase change caused by the second steps with respect to the light beam having the first wavelength in a case where the second steps give an additional optical path length to the light beam having the first wavelength in a direction opposite to the direction proceeding along the optical axis from the light source to the optical disc being used, in an area having an effective diameter larger than NA 0.3 at the first wavelength in the first area, the phase shift surface satisfies a following condition:

$-3.00 < \Delta\phi1/\Delta\phi2 < -0.10$ (2).

2. The objective optical system according to claim 1, wherein the phase shift surface satisfies a following condition:

$-1.30 < \Delta\phi1/\Delta\phi2 < -0.35$ (3).

3. The objective optical system according to claim 1, wherein, when $\phi1$ (unit: $\pi$radian) represents an absolute value of a phase difference given to the light beam having the first wavelength by each first step and $\phi2$ (unit: $\pi$radian) represents an absolute value of a phase difference given to the light beam having the first wavelength by each second step, the phase shift surface satisfies following conditions:

$2.2 < \phi1 < 2.8$ (4), and $1.0 < \phi2 < 1.70$ (5).

4. The objective optical system according to claim 3, wherein the phase shift surface satisfies following conditions:

$2.3 < \phi1 < 2.6$ (6), and $1.1 < \phi2 < 1.5$ (7).

5. The objective optical system according to claim 1, wherein, when $\Delta OPD1$ (unit: μm) represents an absolute value of an optical path length difference given to the light beam having the first wavelength by each first step, and $\Delta OPD2$ (unit: μm) represents an absolute value of an optical path length difference given to the light beam having the first wavelength by each second step, the phase shift surface satisfies following conditions:

$1.1 < \Delta OPD1/\lambda1 < 1.4$ (8), and $0.50 < \Delta OPD2/\lambda1 < 0.85$ (9)

6. The objective optical system according to claim 5, wherein the phase shift surface satisfies following conditions:

$1.15 < \Delta OPD1/\lambda1 < 1.30$ (10), and $0.55 < \Delta OPD2/\lambda1 < 0.75$ (11).

7. The objective optical system according to claim 1, wherein, when D1 (unit: μm) represents an absolute value of a height of the paraxially arranged first step in the optical axis direction, and D2 (unit: μm) represents an absolute value of the height of the paraxially arranged second step in the optical axis direction, the phase shift surface satisfies following conditions:

$0.70 < D1 < 1.10$ (12), and $0.30 < D2 < 0.70$ (13).

8. The objective optical system according to claim 7, wherein the phase shift surface satisfies following conditions:

$0.80 < D1 < 0.95$ (14), and $0.40 < D2 < 0.55$ (15).

9. The objective optical system according to claim 1, wherein:

when the at least two types of phase shift structures formed in the first area are expressed by diffraction structures defined by expanding an optical path difference function in a form of a following equation:

$\phi_{ik}(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$ where $P_{ik2}$, $P_{ik4}$, $P_{ik6}$ ... represent coefficients of the $2^{nd}$ order, $4^{th}$ order, $6^{th}$ order, h represents a height from the optical axis, $m_{ik}$, represents a diffraction order at which the diffraction efficiency of an incident light beam is maximized for the i-th optical path difference function in the k-th area, and $\lambda$ represents a design wavelength of the light beam being used (incident thereon), the first phase shift structure is a diffraction structure defined by a first optical path difference function in which diffraction orders at which diffraction efficiencies for the light beams having the first, second and third wavelengths are maximized are all $1^{st}$ orders; and the second phase shift structure is a diffraction structure defined by a second optical path difference function in which diffraction orders at which diffraction efficiencies for the light beams having the first, second and third wavelengths are maximized are $1^{st}$ order, 0-th order and 0-th order, respectively.

10. The objective optical system according to claim 1, wherein:

the phase shift surface includes a second area which is located outside the first area and which contributes to converging the light beams having the first and second wavelengths onto recording surfaces of the first and second optical discs, respectively and does no contribute to converging the light beam having the third wavelength;

in the second area, the phase shift surface has at least two types of phase shift structures including a third phase shift structure having third steps and a fourth phase shift structure having fourth steps;

when P3 (unit: mm) represents an arrangement interval defined in a direction perpendicular to the optical axis direction between two third steps which adjoin with respect to each other while sandwiching at least one fourth step, and P4 (unit: mm) represents an arrangement interval defined in a direction perpendicular to the optical axis direction between two fourth steps which adjoin with respect to each other while sandwiching at least one third step and one of which is sandwiched between the two third steps, the phase shift surface satisfies a following condition:

$$0.95 < P3/P4 < 1.05 \quad (16);$$

where,
one of the two third steps arranged closer to the optical axis is defines as a third start step, and the other of the two third steps farther from the optical axis is defined as a third end step,
when the third steps are continuously arranged in a direction perpendicular to the optical axis not to have the fourth steps therebetween, the arrangement interval P3 is determined by defining one of the continuously arranged third steps closest to the optical axis as the third start step and by defining the other of the continuously arranged third steps farthest from the optical axis as the third end step,
one of the two fourth steps arranged closer to the optical axis is defines as a fourth start step, and the other of the two fourth steps farther from the optical axis is defined as a fourth end step, and
when the fourth steps are continuously arranged in a direction perpendicular to the optical axis not to have the third steps therebetween, the arrangement interval P4 is determined by defining one of the continuously arranged fourth steps closest to the optical axis as the fourth start step and by defining the other of the continuously arranged fourth steps farthest from the optical axis as the fourth end step,
when $\Delta\phi 3$ (unit: radian) is represents a difference between $2\pi$ and an absolute value of a phase change caused by the third steps with respect to the light beam having the first wavelength in a case where the third steps give an additional optical path length to the light beam having the first wavelength in a direction proceeding along the optical axis from each light source to an optical disc being used, and $\Delta\phi 4$ (unit: radian) represents a difference between $2\pi$ and an absolute value of a phase change caused by the fourth steps with respect to the light beam having the first wavelength in a case where the fourth steps give an additional optical path length to the light beam having the first wavelength in a direction opposite to the direction proceeding along the optical axis from the light source to the optical disc being used, the phase shift surface satisfies a following condition:

$$-2.70 < \Delta\phi 3/\Delta\phi 4 < -0.05 \quad (17).$$

11. The objective optical system according to claim 10, wherein the phase shift surface satisfies a condition:

$$-1.05 < \Delta\phi 3/\Delta\phi 4 < -0.20 \quad (18).$$

12. The objective optical system according to claim 10, wherein, when $\phi 3$ (unit: $\pi$radian) represents an absolute value of a phase difference given to the light beam having the first wavelength by each third step and $\phi 4$ (unit: $\pi$radian) represents an absolute value of a phase difference given to the light beam having the first wavelength by each fourth step, the phase shift surface satisfies following conditions:

$$2.1 < \phi 3 < 2.8 \quad (19), \text{ and}$$

$$1.0 < \phi 4 < 1.70 \quad (20).$$

13. The objective optical system according to claim 12, wherein the phase shift surface satisfies following conditions:

$$2.2 < \phi 3 < 2.6 \quad (21), \text{ and}$$

$$1.1 < \phi 4 < 1.5 \quad (22).$$

14. The objective optical system according to claim 10, wherein, when $\Delta OPD3$ (unit: μm) represents an absolute value of an optical path length difference given to the light beam having the first wavelength by each third step, and $\Delta OPD4$ (unit: μm) represents an absolute value of an optical path length difference given to the light beam having the first wavelength by each fourth step, the phase shift surface satisfies following conditions:

$$1.05 < \Delta OPD3/\lambda 1 < 1.4 \quad (23), \text{ and}$$

$$0.50 < \Delta OPD4/\lambda 1 < 0.85 \quad (24).$$

15. The objective optical system according to claim 14, wherein the phase shift surface satisfies following conditions:

$$1.10 < \Delta OPD3/\lambda 1 < 1.30 \quad (25), \text{ and}$$

$$0.55 < \Delta OPD4/\lambda 1 < 0.75 \quad (26).$$

16. The objective optical system according to claim 10, wherein, when D3 (unit: mm) represents an absolute value of a height of the paraxially arranged third step in the optical axis direction, and D4 (unit: mm) represents an absolute value of a height of the paraxially arranged fourth step in the optical axis direction, the phase shift surface satisfies following conditions:

$$0.85 < D3 < 1.20 \quad (27), \text{ and}$$

$$0.45 < D4 < 0.85 \quad (28).$$

17. The objective optical system according to claim 16, wherein the phase shift surface satisfies following conditions:

$$0.95 < D3 < 1.10 \quad (29), \text{ and}$$

$$0.55 < D4 < 0.75 \quad (30).$$

18. The objective optical system according to claim 10, wherein:
when the at least two types of phase shift structures formed in the second area are expressed by diffraction structures defined by expanding an optical path difference function in a form of a following equation:

$$\phi_{ik}(h) = (P_{ik2} \times h^2 + P_{ik4} \times h^4 + P_{ik6} \times h^6 + P_{ik8} \times h^8 + P_{ik10} \times h^{10} + P_{ik12} \times h^{12})m_{ik}\lambda$$

where $P_{ik2}$, $P_{ik4}$, $P_{ik6}$ ... represent coefficients of the $2^{nd}$ order, $4^{th}$ order, $6^{th}$ order, h represents a height from the optical axis, $m_{ik}$ represents a diffraction order at which the diffraction efficiency of the incident light beam is maximized for the i-th optical path difference function in the k-th area, and $\lambda$ represents a design wavelength of the light beam being used (incident thereon),
the third phase shift structure is a diffraction structure defined by a third optical path difference function in which diffraction orders at which diffraction efficiencies for the light beams having the first and second wavelengths are maximized are all $1^{st}$ orders; and
the fourth phase shift structure is a diffraction structure defined by a fourth optical path difference function in which diffraction orders at which diffraction efficiencies for the light beams having the first and second wavelengths are maximized are $1^{st}$ order and 0-th order, respectively.

19. The objective optical system according to claim 10, wherein the phase shift surface has a third area which is located outside the second area and which is configured to contribute to converging the light beams having the first wavelength onto the recording surface of the first optical disc and not to contribute converging the light beams having the second and third wavelengths.

20. An optical information recording/reproducing apparatus for recording information and/or reproducing information from three types of optical discs including first, second and third optical discs, comprising:

light sources that emit light beams having a first wavelength, a second wavelength and a third wavelength;

coupling lenses respectively converting degrees of divergence or convergence of the light beams having the first, second and third wavelengths emitted by the light sources; and an objective optical system that converges the light beams whose degrees of divergence or convergence have been converted, onto recording surfaces of the first, second and third optical discs, respectively, wherein:

the objective optical system comprises at least an objective lens, when $\lambda 1$ (unit: nm) represents the first wavelength, $\lambda 2$ (unit: nm) represents the second wavelength and $\lambda 3$ (unit: nm) represents the third wavelength $\lambda 1$, $\lambda 2$ and $\lambda 3$ being defined as:

$$\lambda 1 \approx 405, \lambda 2 \approx 660, \text{ and } \lambda 3 \approx 790,$$

when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfy a following relationship:

$$NA1 > NA2 > NA3,$$

at least one surface of the objective optical system being configured to be a phase shift surface having a phase shift structure including a plurality of refractive surface zones concentrically divided so as to have steps giving different phase differences to an incident light beam at a boundary between adjacent ones of the plurality of refractive surface zones, the phase shift surface has a first area contributing to converging the first, second and third light beams onto recording surfaces of the first, second and third optical discs, respectively;

the first area has an effective diameter larger than NA 0.3 at the first wavelength;

in the first area, the phase shift surface has at least two types of phase shift structures including a first phase shift structure having first steps and a second phase shift structure having second steps;

when P1 (unit: mm) represents an arrangement interval defined in a direction perpendicular to an optical axis direction between two first steps which adjoin with respect to each other while sandwiching at least one second step, and P2 (unit: mm) represents an arrangement interval defined in a direction perpendicular to the optical axis direction between two second steps which adjoin with respect to each other while sandwiching at least one first step and one of which is sandwiched between the two first steps, the phase shift surface is configured such that, in an area whose effective diameter is larger than NA 0.3 at the first wavelength in the area R1, the phase shift surface has a plurality of combinations of annular zones which satisfy a condition (1):

$$0.95 < P1/P2 < 1.05 \qquad (1)$$

where, one of the two first steps arranged closer to the optical axis is defines as a first start step, and the other of the two first steps farther from the optical axis is defined as a first end step, when the first steps are continuously arranged in a direction perpendicular to the optical axis not to have the second steps therebetween, the arrangement interval P1 is determined by defining one of the continuously arranged first steps closest to the optical axis as the first start step and by defining the other of the continuously arranged first steps farthest from the optical axis as the first end step, one of the two second steps arranged closer to the optical axis is defines as a second start step, and the other of the two second steps farther from the optical axis is defined as a second end step, and when the second steps are continuously arranged in a direction perpendicular to the optical axis not to have the first steps therebetween, the arrangement interval P2 is determined by defining one of the continuously arranged second steps closest to the optical axis as the second start step and by defining the other of the continuously arranged second steps farthest from the optical axis as the second end step, when $\Delta\phi 1$ (unit: radian) represents a difference between $2\pi$ and an absolute value of a phase change caused by the first steps with respect to the light beam having the first wavelength in a case where the first steps give an additional optical path length to the light beam having the first wavelength in a direction proceeding along the optical axis from each light source to an optical disc being used, and $\Delta\phi 2$ (unit: radian) represents a difference between $2\pi$ and an absolute value of a phase change caused by the second steps with respect to the light beam having the first wavelength in a case where the second steps give an additional optical path length to the light beam having the first wavelength in a direction opposite to the direction proceeding along the optical axis from the light source to the optical disc being used, in an area having an effective diameter larger than NA 0.3 at the first wavelength in the first area, the phase shift surface satisfies a following condition:

$$-3.00 < \Delta\phi 1/\Delta\phi 2 < -0.10 \qquad (2).$$

21. The optical information recording/reproducing apparatus according to claim 20, wherein the phase shift surface satisfies a following condition:

$$-1.30 < \Delta\phi 1/\Delta\phi 2 < -0.35 \qquad (3).$$

22. The optical information recording/reproducing apparatus according to claim 20, wherein, when $\phi 1$ (unit: $\pi$radian) represents an absolute value of a phase difference given to the light beam having the first wavelength by each first step and $\phi 2$ (unit: $\pi$radian) represents an absolute value of a phase difference given to the light beam having the first wavelength by each second step, the phase shift surface satisfies following conditions:

$$2.2 < \phi1 < 2.8 \qquad (4), \text{ and}$$

$$1.0 < \phi2 < 1.70 \qquad (5).$$

23. The optical information recording/reproducing apparatus according to claim 22,
wherein the phase shift surface satisfies following conditions:

$$2.3 < \phi1 < 2.6 \qquad (6), \text{ and}$$

$$1.1 < \phi2 < 1.5 \qquad (7).$$

24. The optical information recording/reproducing apparatus according to claim 20,
wherein, when ΔOPD1 (unit: μm) represents an absolute value of an optical path length difference given to the light beam having the first wavelength by each first step, and ΔOPD2 (unit: μm) represents an absolute value of an optical path length difference given to the light beam having the first wavelength by each second step, the phase shift surface satisfies following conditions:

$$1.1 < \Delta OPD1/\lambda1 < 1.4 \qquad (8), \text{ and}$$

$$0.50 < \Delta OPD2/\lambda1 < 0.85 \qquad (9)$$

25. The optical information recording/reproducing apparatus according to claim 24,
wherein the phase shift surface satisfies following conditions:

$$1.15 < \Delta OPD1/\lambda1 < 1.30 \qquad (10), \text{ and}$$

$$0.55 < \Delta OPD2/\lambda1 < 0.75 \qquad (11).$$

26. The optical information recording/reproducing apparatus according to claim 20,
wherein, when D1 (unit: μm) represents an absolute value of a height of the paraxially arranged first step in the optical axis direction, and D2 (unit: μm) represents an absolute value of the height of the paraxially arranged second step in the optical axis direction, the phase shift surface satisfies following conditions:

$$0.70 < D1 < 1.10 \qquad (12), \text{ and}$$

$$0.30 < D2 < 0.70 \qquad (13).$$

27. The optical information recording/reproducing apparatus according to claim 26,
wherein the phase shift surface satisfies following conditions:

$$0.80 < D1 < 0.95 \qquad (14), \text{ and}$$

$$0.40 < D2 < 0.55 \qquad (15).$$

28. The optical information recording/reproducing apparatus according to claim 20,
wherein:
when the at least two types of phase shift structures formed in the first area are expressed by diffraction structures defined by expanding an optical path difference function in a form of a following equation:

$$\phi_{ik}(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik}\lambda$$

where $P_{ik2}$, $P_{ik4}$, $P_{ik6}$ ... represent coefficients of the $2^{nd}$ order, $4^{th}$ order, $6^{th}$ order, h represents a height from the optical axis, $m_{ik}$ represents a diffraction order at which the diffraction efficiency of an incident light beam is maximized for the i-th optical path difference function in the k-th area, and λ represents a design wavelength of the light beam being used (incident thereon),
the first phase shift structure is a diffraction structure defined by a first optical path difference function in which diffraction orders at which diffraction efficiencies for the light beams having the first, second and third wavelengths are maximized are all $1^{st}$ orders; and
the second phase shift structure is a diffraction structure defined by a second optical path difference function in which diffraction orders at which diffraction efficiencies for the light beams having the first, second and third wavelengths are maximized are $1^{st}$ order, 0-th order and 0-th order, respectively.

29. The optical information recording/reproducing apparatus according to claim 20,
wherein:
the phase shift surface includes a second area which is located outside the first area and which contributes to converging the light beams having the first and second wavelengths onto recording surfaces of the first and second optical discs, respectively and does no contribute to converging the light beam having the third wavelength;
in the second area, the phase shift surface has at least two types of phase shift structures including a third phase shift structure having third steps and a fourth phase shift structure having fourth steps;
when P3 (unit: mm) represents an arrangement interval defined in a direction perpendicular to the optical axis direction between two third steps which adjoin with respect to each other while sandwiching at least one fourth step, and P4 (unit: mm) represents an arrangement interval defined in a direction perpendicular to the optical axis direction between two fourth steps which adjoin with respect to each other while sandwiching at least one third step and one of which is sandwiched between the two third steps, the phase shift surface satisfies a following condition:

$$0.95 < P3/P4 < 1.05 \qquad (16);$$

where,
one of the two third steps arranged closer to the optical axis is defines as a third start step, and the other of the two third steps farther from the optical axis is defined as a third end step,
when the third steps are continuously arranged in a direction perpendicular to the optical axis not to have the fourth steps therebetween, the arrangement interval P3 is determined by defining one of the continuously arranged third steps closest to the optical axis as the third start step and by defining the other of the continuously arranged third steps farthest from the optical axis as the third end step,
one of the two fourth steps arranged closer to the optical axis is defines as a fourth start step, and the other of the two fourth steps farther from the optical axis is defined as a fourth end step, and
when the fourth steps are continuously arranged in a direction perpendicular to the optical axis not to have the third steps therebetween, the arrangement interval P4 is determined by defining one of the continuously arranged fourth steps closest to the optical axis as the fourth start step and by defining the other of the continuously arranged fourth steps farthest from the optical axis as the fourth end step, when Δφ3 (unit: radian) is represents a difference between 2π and an absolute value of a phase change caused by the third steps with respect to the light beam having the first wavelength in a case where the third steps give an additional optical path length to the light beam having the first wavelength in a direction proceeding along the optical axis from each light source to an optical disc being used, and Δφ4 (unit: radian) represents a difference between 2π and an absolute value of a phase change caused by the fourth steps with respect to the light beam having the first wavelength in a case where the fourth steps give an additional optical path length to the light beam having the first wavelength in a direction opposite to the direction proceeding along the optical axis from the light source to the optical disc being used, the phase shift surface satisfies a following condition:

$$-2.70 < \Delta\phi3/\Delta\phi4 < -0.05 \tag{17}.$$

30. The optical information recording/reproducing apparatus according to claim 29,
wherein the phase shift surface satisfies a condition:

$$-1.05 < \Delta\phi3/\Delta\phi4 < -0.20 \tag{18}.$$

31. The optical information recording/reproducing apparatus according to claim 29,
wherein, when φ3 (unit: πradian) represents an absolute value of a phase difference given to the light beam having the first wavelength by each third step and φ4 (unit: πradian) represents an absolute value of a phase difference given to the light beam having the first wavelength by each fourth step, the phase shift surface satisfies following conditions:

$$2.1 < \phi3 < 2.8 \tag{19, and}$$

$$1.0 < \phi4 < 1.70 \tag{20}.$$

32. The optical information recording/reproducing apparatus according to claim 31,
wherein the phase shift surface satisfies following conditions:

$$2.2 < \phi3 < 2.6 \tag{21, and}$$

$$1.1 < \phi4 < 1.5 \tag{22}.$$

33. The optical information recording/reproducing apparatus according to claim 29,
wherein, when ΔOPD3 (unit: μm) represents an absolute value of an optical path length difference given to the light beam having the first wavelength by each third step, and ΔOPD4 (unit: μm) represents an absolute value of an optical path length difference given to the light beam having the first wavelength by each fourth step, the phase shift surface satisfies following conditions:

$$1.05 < \Delta OPD3/\lambda1 < 1.4 \tag{23, and}$$

$$0.50 < \Delta OPD4/\lambda1 < 0.85 \tag{24}.$$

34. The optical information recording/reproducing apparatus according to claim 33,
wherein the phase shift surface satisfies following conditions:

$$1.10 < \Delta OPD3/\lambda1 < 1.30 \tag{25, and}$$

$$0.55 < \Delta OPD4/\lambda1 < 0.75 \tag{26}.$$

35. The optical information recording/reproducing apparatus according to claim 29,
wherein, when D3 (unit: mm) represents an absolute value of a height of the paraxially arranged third step in the optical axis direction, and D4 (unit: mm) represents an absolute value of a height of the paraxially arranged fourth step in the optical axis direction, the phase shift surface satisfies following conditions:

$$0.85 < D3 < 1.20 \tag{27, and}$$

$$0.45 < D4 < 0.85 \tag{28}.$$

36. The optical information recording/reproducing apparatus according to claim 35,
wherein the phase shift surface satisfies following conditions:

$$0.95 < D3 < 1.10 \tag{29, and}$$

$$0.55 < D4 < 0.75 \tag{30}.$$

37. The optical information recording/reproducing apparatus according to claim 29,
wherein:
when the at least two types of phase shift structures formed in the second area are expressed by diffraction structures defined by expanding an optical path difference function in a form of a following equation:

$$\phi_{ik}(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where $P_{ik2}$, $P_{ik4}$, $P_{ik6}$ ... represent coefficients of the $2^{nd}$ order, $4^{th}$ order, $6^{th}$ order, h represents a height from the optical axis, $m_{ik}$ represents a diffraction order at which the diffraction efficiency of the incident light beam is maximized for the i-th optical path difference function in the k-th area, and λ represents a design wavelength of the light beam being used (incident thereon),
the third phase shift structure is a diffraction structure defined by a third optical path difference function in which diffraction orders at which diffraction efficiencies for the light beams having the first and second wavelengths are maximized are all $1^{st}$ orders; and
the fourth phase shift structure is a diffraction structure defined by a fourth optical path difference function in which diffraction orders at which diffraction efficiencies for the light beams having the first and second wavelengths are maximized are 1 order and 0-th order, respectively.

38. The optical information recording/reproducing apparatus according to claim 29,
wherein the phase shift surface has a third area which is located outside the second area and which is configured to contribute to converging the light beams having the first wavelength onto the recording surface of the first optical disc and not to contribute converging the light beams having the second and third wavelengths.

* * * * *

UNITED STATES PATENT AND TRADEMARK OFFICE
CERTIFICATE OF CORRECTION

PATENT NO. : 8,483,033 B2
APPLICATION NO. : 13/547342
DATED : July 9, 2013
INVENTOR(S) : Naoki Yamagata et al.

It is certified that error appears in the above-identified patent and that said Letters Patent is hereby corrected as shown below:

On the Title page of the printed patent, please add item 30 on the Title Page:
--Foreign Application Priority Data
July 15, 2011  (JP)     2011-156511--

Signed and Sealed this
Third Day of September, 2013

Teresa Stanek Rea
*Acting Director of the United States Patent and Trademark Office*